US010419655B2

(12) United States Patent
Sivan

(10) Patent No.: US 10,419,655 B2
(45) Date of Patent: Sep. 17, 2019

(54) ESTIMATING AND USING RELATIVE HEAD POSE AND CAMERA FIELD-OF-VIEW

(71) Applicant: Snap-Aid Patents LTD., Tel Aviv (IL)

(72) Inventor: Ishay Sivan, Tel-Aviv (IL)

(73) Assignee: Snap-Aid Patents LTD., Tel Aviv (IL)

( * ) Notice: Subject to any disclaimer, the term of this patent is extended or adjusted under 35 U.S.C. 154(b) by 123 days.

(21) Appl. No.: 15/567,088

(22) PCT Filed: Apr. 19, 2016

(86) PCT No.: PCT/IL2016/050408
§ 371 (c)(1),
(2) Date: Oct. 17, 2017

(87) PCT Pub. No.: WO2016/174659
PCT Pub. Date: Nov. 3, 2016

(65) Prior Publication Data
US 2019/0182415 A1 Jun. 13, 2019

Related U.S. Application Data

(60) Provisional application No. 62/153,154, filed on Apr. 27, 2015, provisional application No. 62/156,918, (Continued)

(51) Int. Cl.
H04N 5/232 (2006.01)
G06F 3/01 (2006.01)
(Continued)

(52) U.S. Cl.
CPC ......... *H04N 5/23203* (2013.01); *G06F 1/163* (2013.01); *G06F 3/012* (2013.01); *G06F 3/013* (2013.01); *H04W 4/80* (2018.02)

(58) Field of Classification Search
CPC ..... H04N 5/23203; G06F 3/013; G06F 1/163; G06F 3/012; H04W 4/80
See application file for complete search history.

(56) References Cited

U.S. PATENT DOCUMENTS 4,248,123 A 2/1981 Bunger et al.
4,496,149 A 1/1985 Schwartzberg
(Continued)

FOREIGN PATENT DOCUMENTS

CN 103747183 4/2014
CN 103838378 6/2014
(Continued)

OTHER PUBLICATIONS

Roberto Valenti et al., "Combining Head Pose and Eye Information for Gaze Estimation", published in IEEE Transaction on Image Processing, vol. 21, No. 2, Feb. 2012 (14 pages).
(Continued)

Primary Examiner — Abdelaaziz Tissire
(74) Attorney, Agent, or Firm — May Patents Ltd.

(57) ABSTRACT

A video or still hand-held digital camera is activated or controlled based on estimation of a user head pose or gaze direction. The system comprises uses two wearable devices associated with right and left sides of the user body, each comprises an RF beacon. The head pose or gaze detection is estimated by comparing the signal strength (such as RSSI) or the phase of the RF signals from the wearable devices at the digital camera device. An angular deviation between the head pose (or gaze detection) and the digital camera (such as the line of sight) is estimated, and the digital camera is activated or controlled based on comparing the angular deviation to a set threshold. The RF signals may be Personal Area Network (PAN) signals, such as Bluetooth Low Energy (BLE) signals. The wearable devices may be head mounted, structured as glasses, earpieces, headphones, or hat mounted.

55 Claims, 58 Drawing Sheets

Related U.S. Application Data filed on May 5, 2015, provisional application No. 62/219,944, filed on Sep. 17, 2015.

(51) Int. Cl.
  *G06F 1/16* (2006.01)
  *H04W 4/00* (2018.01)
  *H04W 4/80* (2018.01)

(56) References Cited

U.S. PATENT DOCUMENTS

| | | |
|---|---|---|
| 4,516,260 A | 5/1985 | Breedlove et al. |
| 4,796,891 A | 1/1989 | Milner |
| 4,840,602 A | 6/1989 | Rose |
| 4,968,255 A | 11/1990 | Lee et al. |
| 5,138,459 A | 11/1992 | Roberts et al. |
| 5,163,323 A | 11/1992 | Davidson |
| 5,189,463 A | 2/1993 | Capper et al. |
| 5,341,144 A | 8/1994 | Stove |
| 5,349,129 A | 9/1994 | Wisniewski et al. |
| 5,359,404 A | 10/1994 | Dunne |
| 5,402,170 A | 3/1995 | Parulski et al. |
| 5,442,592 A | 8/1995 | Toda et al. |
| 5,483,501 A | 1/1996 | Park et al. |
| 5,546,088 A | 8/1996 | Trummer et al. |
| 5,546,156 A | 8/1996 | McIntyre |
| 5,578,755 A | 11/1996 | Offenberg |
| 5,652,651 A | 7/1997 | Dunne |
| 5,774,091 A | 6/1998 | McEwan |
| 5,793,704 A | 8/1998 | Freger |
| 5,798,791 A | 8/1998 | Katayama et al. |
| 5,949,531 A | 9/1999 | Ehbets et al. |
| 5,962,786 A | 10/1999 | Le Traon et al. |
| 6,006,021 A | 12/1999 | Tognazzini |
| 6,040,898 A | 3/2000 | Mrosik et al. |
| 6,043,868 A | 3/2000 | Dunne |
| 6,132,281 A | 10/2000 | Klitsner et al. |
| 6,191,724 B1 | 2/2001 | McEwan |
| 6,232,911 B1 | 5/2001 | O'Conner |
| 6,501,539 B2 | 12/2002 | Chien et al. |
| 6,527,611 B2 | 3/2003 | Cummings |
| 6,535,161 B1 | 3/2003 | McEwan |
| 6,624,881 B2 | 9/2003 | Waibel et al. |
| 6,670,212 B2 | 12/2003 | McNie et al. |
| 6,801,305 B2 | 10/2004 | Stierle et al. |
| 6,804,168 B2 | 10/2004 | Schlick et al. |
| 6,859,144 B2 | 2/2005 | Newman et al. |
| 6,876,441 B2 | 4/2005 | Barker |
| 6,879,281 B2 | 4/2005 | Gresham et al. |
| 6,897,891 B2 | 5/2005 | Itsukaichi |
| 6,940,545 B1 | 6/2005 | Ray et al. |
| 7,095,362 B2 | 8/2006 | Hoetzel et al. |
| 7,196,776 B2 | 3/2007 | Ohtomo et al. |
| 7,196,970 B2 | 3/2007 | Moon et al. |
| 7,202,941 B2 | 4/2007 | Munro |
| 7,263,031 B2 | 8/2007 | Sanoner et al. |
| 7,326,866 B2 | 2/2008 | Kelley, Jr. et al. |
| 7,432,952 B2 | 7/2008 | Fukuoka |
| 7,412,077 B2 | 8/2008 | Li et al. |
| 7,414,186 B2 | 8/2008 | Scarpa et al. |
| 7,542,665 B2 | 6/2009 | Lei |
| 7,617,729 B2 | 11/2009 | Axelrod et al. |
| 7,679,996 B2 | 3/2010 | Gross |
| 7,716,985 B2 | 5/2010 | Zhang et al. |
| 7,774,155 B2 | 8/2010 | Sato et al. |
| 7,787,105 B2 | 8/2010 | Hipp |
| 7,892,876 B2 | 2/2011 | Mehregany |
| 8,063,785 B2 | 11/2011 | Sacchetti |
| 8,131,118 B1 | 3/2012 | Jing et al. |
| 8,244,053 B2 | 8/2012 | Steinberg et al. |
| 8,265,348 B2 | 9/2012 | Steinberg et al. |
| 8,285,067 B2 | 10/2012 | Steinberg et al. |
| 8,310,655 B2 | 11/2012 | Mimeault |
| 8,319,949 B2 | 11/2012 | Cantin et al. |
| 8,434,868 B2 | 5/2013 | Sato et al. |
| 8,558,921 B2 | 10/2013 | Walker et al. |
| 8,656,781 B2 | 2/2014 | Lavoie |
| 8,687,880 B2 | 4/2014 | Wei et al. |
| 8,700,626 B2 | 4/2014 | Bedingfield |
| 8,736,819 B2 | 5/2014 | Nagai |
| 8,773,509 B2 | 7/2014 | Pan |
| 8,781,162 B2 | 7/2014 | Zhu et al. |
| 8,806,947 B2 | 8/2014 | Kajitani |
| 8,890,657 B2 | 11/2014 | Lin et al. |
| 8,941,561 B1 | 1/2015 | Starner |
| 8,948,832 B2 | 2/2015 | Hong et al. |
| 8,970,824 B2 | 3/2015 | Chang et al. |
| 9,103,669 B2 | 8/2015 | Giacotto et al. |
| 9,128,565 B2 | 9/2015 | Kajitani et al. |
| 9,189,692 B2 | 11/2015 | Konigsberg et al. |
| 9,268,136 B1 | 2/2016 | Starner et al. |
| 9,661,215 B2* | 5/2017 | Sivan .................. H04N 19/597 |
| 9,866,748 B2* | 1/2018 | Sivan .................. H04N 19/597 |
| 10,067,560 B1* | 9/2018 | Koenck .................. G06F 3/012 |
| 2002/0101515 A1 | 8/2002 | Yoshida et al. |
| 2004/0089814 A1 | 5/2004 | Cheatle |
| 2005/0238194 A1 | 10/2005 | Chornenky |
| 2006/0247526 A1 | 11/2006 | Lee et al. |
| 2007/0030348 A1 | 2/2007 | Snyder |
| 2007/0195167 A1 | 8/2007 | Ishiyama |
| 2007/0201847 A1 | 8/2007 | Lei |
| 2007/0256337 A1 | 11/2007 | Segan |
| 2008/0062297 A1 | 3/2008 | Sako et al. |
| 2008/0212831 A1 | 9/2008 | Hope |
| 2009/0052703 A1 | 2/2009 | Hammershoi |
| 2009/0058606 A1 | 3/2009 | Munch et al. |
| 2009/0102940 A1 | 4/2009 | Uchida |
| 2009/0212997 A1 | 8/2009 | Michalski |
| 2009/0273682 A1* | 11/2009 | Shekarri .................. G01P 1/127 |
| | | 348/207.1 |
| 2010/0268772 A1 | 10/2010 | Romanek et al. |
| 2010/0328471 A1 | 12/2010 | Boland et al. |
| 2011/0170067 A1 | 7/2011 | Sato et al. |
| 2012/0086847 A1 | 4/2012 | Foster |
| 2012/0182447 A1 | 7/2012 | Gabay |
| 2012/0213445 A1 | 8/2012 | Luu et al. |
| 2012/0249768 A1 | 10/2012 | Binder |
| 2012/0278705 A1 | 11/2012 | Yang et al. |
| 2012/0293635 A1 | 11/2012 | Sharma et al. |
| 2013/0050507 A1 | 2/2013 | Syed et al. |
| 2013/0063538 A1 | 3/2013 | Hubner et al. |
| 2013/0201316 A1 | 8/2013 | Binder et al. |
| 2013/0222638 A1 | 8/2013 | Wheeler et al. |
| 2013/0258089 A1 | 10/2013 | Lyons et al. |
| 2013/0265169 A1 | 10/2013 | Mates |
| 2013/0271553 A1* | 10/2013 | Chu .................. H04N 7/141 |
| | | 348/14.01 |
| 2013/0335559 A1 | 12/2013 | Van Toorenburg et al. |
| 2014/0050367 A1 | 2/2014 | Chen et al. |
| 2014/0070613 A1 | 3/2014 | Garb et al. |
| 2014/0119655 A1 | 5/2014 | Liu et al. |
| 2014/0139667 A1 | 5/2014 | Kang |
| 2014/0159877 A1 | 6/2014 | Huang |
| 2014/0184854 A1 | 7/2014 | Musatenko |
| 2014/0204193 A1 | 7/2014 | Zhang et al. |
| 2014/0226864 A1 | 8/2014 | Venkatraman et al. |
| 2014/0362446 A1 | 12/2014 | Bickerstaff et al. |
| 2014/0375772 A1* | 12/2014 | Gabara .................. H04N 13/296 |
| | | 348/47 |
| 2015/0091740 A1 | 4/2015 | Bai et al. |
| 2015/0182116 A1* | 7/2015 | Pletcher .................. A61B 5/0026 |
| | | 600/345 |
| 2015/0193658 A1 | 7/2015 | Miller et al. |
| 2015/0208003 A1* | 7/2015 | Kuznetsov .................. H04N 5/30 |
| | | 348/46 |
| 2015/0323993 A1* | 11/2015 | Levesque .................. G02B 27/0172 |
| | | 345/156 |
| 2015/0338518 A1* | 11/2015 | Sebastian .................. G01S 17/08 |
| | | 356/4.01 |
| 2015/0349556 A1 | 12/2015 | Mercando et al. |
| 2015/0355463 A1 | 12/2015 | Sako et al. |

(56) References Cited

U.S. PATENT DOCUMENTS

| | | | |
|---|---|---|---|
| 2015/0378431 | A1 | 12/2015 | Donaldson |
| 2017/0217371 | A1* | 8/2017 | Yatsuri ..................... B60R 1/00 |

FOREIGN PATENT DOCUMENTS

| | | |
|---|---|---|
| CN | 204406324 | 6/2015 |
| EP | 2031418 A1 | 3/2009 |
| EP | 2613572 | 7/2013 |
| JP | 7306467 | 11/1995 |
| JP | 2006050494 | 2/2006 |
| JP | 2007208922 | 8/2007 |
| JP | 2008033200 | 2/2008 |
| KR | 20120056954 | 6/2012 |
| WO | 2004036246 | 4/2004 |
| WO | 2012013914 | 2/2012 |
| WO | 2012083380 | 6/2012 |
| WO | 2012127220 | 9/2012 |
| WO | 2013044983 | 4/2013 |
| WO | 2014064690 | 5/2014 |
| WO | 2014076695 | 5/2014 |
| WO | 2014116826 | 7/2014 |
| WO | 2014155072 | 10/2014 |
| WO | 2014199155 | 12/2014 |
| WO | 2015022700 | 2/2015 |
| WO | 2015162605 | 10/2015 |

OTHER PUBLICATIONS

Roberto Valenti, Adel Lablack, Nicu Sebe, Chabane Djeraba, and Theo Gevers, "Visual Gaze estimation by Joint Head and Eye Information" (4 pages).
Data-sheet Multi Color LED Part No. 08L5015RGBC, by RSR Electronics, Inc. from NJ, U.S.A. (2 pages).
Lite-On Electronics, Inc., Publication BNS-OD-C131/A4 downloaded Mar. 2011 (6 pages).
Data-sheet LIS302DL STMicroelectronics NV, 'MEMS motion sensor 3-axis—±2g/±8g smart digital output "piccolo" accelerometer', Rev. 4, Oct. 2008 (42 pages).
Data-sheet 'Datasheet SQ-SEN-200 Omnidirectional Tilt and Vibration Sensor' Updated Aug. 3, 2009, available from SignalQuest, Inc. of Lebanon, NH, USA (6 pages).
OPTi 82C931 'Plug and Play Integrated Audio Controller', described in Data Book 912-3000-035 Revision: 2.1, published on Aug. 1, 1997 (64 pages).
YMF721 OPL4-ML2 FM + Wavetable Synthesizer LSI available from Yamaha Corporation described in YMF721 Catalog No. LSI-4MF721A20, Jul. 10, 1997 (41 pages).
Miroslav BOTTA and Milan SIMEK (both of Dept. of Telecommunication, Faculty of Electrical Engineering and Communication, Brno University of Technology, Brno, Czech Republic) entitled: "Adaptive Distance Estimation Based on RSSI in 802.15.4 Network", published 2013 in Radioengineering Journal [ISSN: 1210-2512] (7 pages).
Datasheet Form No. EBC—4407cp-Z (downloaded from the Internet Mar. 2016) entitled: "Energizer A76—ZEROMERCURY Miniature Alkaline" (1 page).
Application Note AN-001 entitled: "A User's Guide: How to Shop for a Radio Direction Finding System", published 2008 by RDF Products [Rev B03/07-08/an001_apl_01] (40 pages).
Anja Bekkelien, "Bluetooth Indoor Positioning", a Master of Computer Science Thesis, the University of Geneva submitted Mar. 2012 (56 pages).
R. Faragher and R. Harle (both from University of Cambridge, UK), "An Analysis of the Accuracy of Bluetooth Low Energy for Indoor Positioning Applications", published in the Proceedings of the 27th International Technical Meeting of The Satellite Division of the Institute of Navigation (ION GNSS+ 2014) [Tampa, Florida, Sep. 2014, pp. 201-210] (10 pages).
Erik Vlugt, "Bluetooth Low Energy, Beacons and Retail", VeriFone publication Oct. 23, 2013 (12 pages).

Datasheet # SWRS158A entitled: "CC2650 SimpleLink™ Multistandard Wireless MCU", by Texas Instrument, published Feb. 2015, Revised Oct. 2015 (59 pages).
Charalampos Papamanthou, Franco P. Preparata, and Roberto Tamassia,"Algorithms for Location Estimation Based on RSSI Sampling", of the Department of Computer Science and Center for Geometric Computing, Brown University, [S. Fekete (Ed.): Algosensors 2008, LNCS 5389, pp. 72-86, 2008] (15 pages).
Datasheet Form No. EBC—4120M (downloaded from the Internet Mar. 2016) entitled: "Energizer CR2032—Lithium Coin" (2 pages).
Rohde & Schwarz Radiomonitoring & Radiolocation Catalog 2011/2012 entitled: "Introduction into Theory of Direction Finding" (24 pages).
Daniel Guerin, Shane Jackson, and Jonathan Kelly, "Passive Direction Finding—A Phase Interferometry Direction Finding System for an Airborne Platform", Worcester Polytechnic Institute, Oct. 10, 2012 (94 pages).
Datasheet entitled: "LSM9DS1—iNEMO inertial module: 3D accelerometer, 3D gyroscope, 3D magnetometer", published Mar. 2015 (72 pages).
Qiang Ji and Xiaojie Yang entitled: "Real-Time Eye, Gaze, and Face Pose Tracking for Monitoring Driver Vigilance", Elsevier Science Ltd. 2002 published paper in Real-Time Imaging 8, 357-377 (2002) [doi:10.1006/rtim.2002.0279] (21 pages).
Ling Wang "Measuring Optical Absorption Coefficient of Pure Water in UV Using the Integrating Cavity Absorption Meter", Graduate Studies of Texas A&M University (May 2008) (110 pages).
Apple Inc. developer guide entitled: "Getting Started with iBeacon", Version 1.0 published Jun. 2, 2014 (11 pages).
Gregory Connor Richard Melia, "Electromagnetic Absorption by the Human Body from 1 to 15 GHz", Ph.D. degree thesis to The University of York Department of Electronics (Aug. 2013) (170 pages).
Sam Naghshineh, Golafsoun Ameri, Mazdak Zereshki & Dr. S. Krishnan, Dr. M. Abdoli-Eramaki "Human Motion capture using Tri-Axial accelerometers", (downloaded from the Internet Mar. 2016) (49 pages).
Andy Cavallini, "iBeacons Bible 1.0", downloaded Mar. 2016 from the Internet (15 pages).
Rohit, P. Gaur, Krupa, and N. Jariwala, "A Survey on Methods and Models of Eye Tracking, Head Pose and Gaze Estimation", International Journal of Scientific Development and Research (IJSDR) [IJSDR16JE03008], Mar. 2016 [ISSN: 2455-2631] (9 pages).
Luis M. Bergasa, Jesus Nuevo, Miguel A. Sotelo Manuel Vhzquez, "Real-Time System for Monitoring Driver Vigilance", presented in 2004 IEEE Intelligent Vehicles Symposium (Parma, Italy Jun. 14-17, 2004) (78 pages).
Master's Thesis by Martin Veskrna, "Positioning system for small devices using principles of inertial navigation system", of Masaryk University,Faculty of Informatics dated 2013 (71 pages).
Carles Gomez et al., "Overview and Evaluation of Bluetooth Low Energy: An Emerging Low-Power Wireless Technology", published 2012 in Sensors [ISSN 1424-8220] [Sensors 2012, 12, 11734-11753; doi:10.3390/s120211734] (20 pages).
Design Note DN505 (Document No. SWRA114D) by Siri Johnsrud and Tarjei Aaberge entitled: "RSSI Interpretation and Timing",Texas Instruments Incorporated 2010 (16 pages).
Texas Instrument 2015 publication # SWRT022 entitled: "SimpleLink™ Ultra-Low Power—Wireless Microcontroller Platform" (6 pages).
Datasheet "ButterflyGyro™—STIM300 Intertia Measurement Unit", dated Oct. 2015 [TS1524 rev. 20] (84 pages).
Jiuqiang Xu, Wei Liu, Fenggao Lang, and Yuanyuan Zhang, Chenglong Wang, entitled: "Distance Measurement Model Based on RSSI in WSN", Wireless Sensor Network [2010, 2, 606-611 doi:10.4236/wsn.2010.28072] Aug. 2010 (6 pages).
David J. Jefferies and Juan Fanals (both from School of Electronic Engineering—IT and Maths, University of Surrey, Surrey, England, UK), "Microwave Absorption in Humans" (downloaded Apr. 2016) (13 pages).
Application Note (document No.—XST-AN012a), "Received Signal Strength Indication", MaxStream, Inc., published Feb. 2004(5 pages).

(56) References Cited

OTHER PUBLICATIONS

Application Note No. AN1928/D (Revision 0—Feb. 20, 2001), "Roadrunner—Modular digital still camera reference design", Freescale Semiconductor, Inc. (30 pages).
Stephen Azevedo and Thomas E. McEwan, "Micropower Impulse Radar", Science & Technology Review Jan./Feb. 1996 (7 pages).
Robert Lange, "3D Time-of-flight Measurement with Custom Solid-State Image Sensors in CMOS/CCD-Technology", Department of Electrical Engineering and Computer Science at University of Siegen, Jun. 28, 2000 (223 pages).
Michael Klotz and Hermann Rohling, "24 GHz radar sensor for automotive applications", published Apr. 2001 in the Journal of telecommunications and Information Technology (4 pages).
T. Yamawaki et al., "60-GHz Millimeter-Wave Automotive Radar", Fujitsu paper (Fujitsu Ten Tech. J. No. 1 (1998)) (12 pages).
T. Yamawaki et al., "Millimeter-Wave Obstacle detection Radar", Fujitsu paper (Fujitsu Ten Tech. M. No. 15 (2000)) (13 pages).
Rajan P. Thomas et al., "Range Detection based on Ultrasonic Principle", Electrical, Electronics and Instrumentation Engineering (IJAREEIE) vol. 3, Issue 2, Feb. 2014 (ISSN: 2320-3765) (5 pages).
Application Note (May 2012, 3361276C_EN), "101 applications for laser distance meters", by Fluke Corporation (4 pages).
Application note AN16, "SiSonic Design Guide", Knowles Acoustics, Revision 1.0 dated Apr. 20, 2006 (29 pages).
Delvadiya Harikrushna et al., "Design, Implementation, and Charactrization of XOR Phase Detector for DPLL in 45 nm CMOS Technology", Advanced Computing: An International Journal (ACIJ), vol. 2, No. 6, Nov. 2011 (13 pages).
Xubo Wang, Anh Dinh and Daniel Teng, Chapter 3: "Radar Sensing Using Ultra Wideband—Design and Implementation", InTech 2012 (24 pages).
Siciliano B. and Khatib, O. (Editors), Chapter 21: "Sonar Sensing" of the book "Springer Handbook of Robotics", published 2008 by Springer (ISBN: 978-3-540-23957-4) (31 pages).
Data sheet Rev. D (D06052-0/9115(D)), "Phase Detector/ frequency Synthesizer—ADF4002", 2015 (20 pages).
Technical White Paper (0115/MW/HBD/PDF 331817-001US) by Meiyuan Zhao of Security & Privacy Research, Intel Labs entitled: "Advanced Driver Assistant System—Threats, Requirements, Security Solutions", Intel Corporation 2015 (36 pages).
International Search Report of PCT/IL2016/050408 dated Sep. 1, 2016.
Written Opinion of PCT/IL2016/050408 dated Sep. 1, 2016.
International Preliminary Report on Patentability of PCT/IB2016/050408 dated Aug. 25, 2017.
ASEF eye locator is described in the web-site: 'github.com/laoyang/ASEF' (preceded by https://) (5 pages).
Book entitled: "Practical Design Techniques for Sensor Signal Conditioning", by Analog Devices, Inc., 1999 (ISBN-0-916550-20-6) (366 pages).
Shahram Mohammad Nejad and Saeed Olyaee, "Comparison of TOF, FMCW and Phase-Shift Laser Range-Finding Methods by Simulation and Measurement", published in the Quarterly Journal of Technology & Education vol. 1, No. 1, Autumn 2006 (2 pages).
Data sheet numbered 243003_eng.xml, distance sensor P/N VDM28-15-L/73c/136 available from PEPPERL+FUCHS Group headquartered in Germany, issued Oct. 24, 2014 (4 pages).
Garry Berkovic and Ehud Shafir, "Optical methods for distance and displacement measurements", published in Advances in Optics and Photonics 4, 441-471 (2012) doi:AOP.4.000441 (31 pages).
PEPPERL+FUCHS Group guide Part No. 255933 , "Technology Guide Ultrasonic", dated (Oct. 2015) (70 pages).
Data sheet entitled: "Industrial Distance Meter FMCW 94/10/x at 94 GHz", downloaded on Dec. 2014 (8 pages).
Agilent Technologies Application Note 90B, "DC Power Supply Handbook", dated Oct. 1, 2000 (5925-4020) (126 pages).
Application Note 1554, "Understanding Linear Power Supply Operation", dated Feb. 4, 2005 (5989-2291EN) (8 pages).
On Semiconductor® Reference Manual Rev. 4 "Switch-Mode Power Supply", dated Apr. 2014 (SMPSRM/D) (73 pages).
Chapter 20: "Wireless Technologies" of the publication No. 1-587005-001-3 by Cisco Systems, Inc. (Jul. 1999) "Internetworking Technologies Handbook" (42 pages).
Book published 2005 by Pearson Education, Inc. William Stallings [ISBN: 0-13-191835-4] "Wireless Communications and Networks—second Edition" (569 pages).
Telecom Regulatory Authority, "WiFi Technology", published on Jul. 2003 (60 pages).
Bluetooth SIG published Dec. 2, 2014 standard Covered Core Package version: 4.2, "Master Table of Contents & Compliance Requirements—Specification vol. 0" (2772 pages).
ECMA International white paper Ecma/TC32-TG19/2005/012 "Near Field Communication—White paper" (12 pages).
Rohde&Schwarz White Paper 1MA182_4e "Near Field Communication (NFC) Technology and Measurements White Paper", (26 pages).
Jan Kremer Consulting Services (JKCS) white paper "NFC—Near Field Communication—White paper" (44 pages).
Erin-Ee-Lin Lau, Boon-Giin Lee, Seung-Chul Lee, and Wan-Young Chung, "User Location Tracking System for Indoor and Outdoor Environments", International Journal on Smart Sensing and Intelligent Systems, vol. 1, No. 2, Jun. 2008 (15 pages).
Xiaoping Yun et al., "Self-Contained Position Tracking of Human Movement Using Small Inertial/Magnetic Sensor Module", published 2007 IEEE International Conference on Robotics and Automation (Rome, Italy, Apr. 10-14, 2007) (8 pages).
Data sheet Rev. A "LF-2.7GHz—RF/IF Gain and Phase Detector—AD8302", 2002 (24 pages).
IPhone 6 technical specification (retrieved Oct. 2015 from www.apple.com/iphone-6/specs/), (32 pages).
User Guide, "iPhone User Guide for iOS 8.4 Software", dated 2015 (019-00155/2015-06) by Apple Inc. (196 pages).
User manual numbered English (EU), "SM-G925F SM-G925FQ SM-G925I User Manual" Mar. 2015 (Rev. 1.0) (145 pages).
Publication entitled: "Android Tutorial", downloaded from tutorialspoint.com on Jul. 2014 (216 pages).
Publication entitled: "IOS Tutorial", downloaded from tutorialspoint.com on Jul. 2014 (185 pages).
Robert Bosch GmbH, "Bosch Automotive Electric and Automotive Electronics" (5th Edition, Jul. 2007) [ISBN—978-3-658-01783-5] (530 pages).
Lex Fridman, Philipp Langhans, Joonbum Lee, and Bryan Reimer, "Driver Gaze Region Estimation Without Using Eye Movement", Massachusetts Institute of Technology (MIT) published Mar. 1, 2016 [arXiv:1507.04760v2 [cs.CV] Mar. 1, 2016] (7 pages).
Book by Wikipedia entitled: "Electronics" downloaded from en.wikibooks.org dated Mar. 15, 2015 (401 pages).
Mark Tatham and Katherine Morton, "Development in Speech Synthesis", published 2005 by John Wiley & Sons Ltd., ISBN: 0-470-85538-X (357 pages).
John Holmes and Wendy Holmes, "Speech Synthesis and Recognition", 2nd Edition, published 2001 ISBN: 0-7484-0856-8 (317 pages).
'Natural Speech & Complex Sound Synthesizer', User's Manual Revision 1.0 Jul. 27, 2004 (17 pages).
IXYS Integrated Circuits Division specification DS-CPC1965Y-R07, "CPC1965Y AC Solid State Relay" (6 pages).
Data sheet "BTA06 T/D/S/A BTB06 T/D/S/A—Sensitive Gate Triacs" published by SGS-Thomson Microelectronics Mar. 1995 (6 pages).
Product Specifications from Philips Semiconductors "TrenchMOS™ transistor Standard level FET BUK7524-55" Rev 1.000 dated Jan. 1997 (9 pages).
Data-sheet "Programmable Single-/Dual-/Triple-Tone Gong, SAE 800, Siemens semiconductor Group, 02.05", (15 pages).
The manual "80186/80188 High-Integration 16-Bit Microprocessors" by Intel Corporation (34 pages).
The manual "MC68360 Quad Integrated Communications Controller—User's Manual" by Motorola, Inc. (962 pages).
Data sheet [DS-TM4C123GH6PM-15842.2741, SPMS376E, Revision 15842.2741 Jun. 2014], "Tiva™ TM4C123GH6PM Microcontroller—Data Sheet", published 2015 by Texas Instruments Incorporated (1409 pages).

(56) References Cited

OTHER PUBLICATIONS

Data sheet Rev. 1.00 dated Nov. 2, 2006, on EPSON 7910 series 'Multi-Melody IC' available from Seiko-Epson Corporation, Electronic Devices Marketing Division located in Tokyo, Japan (4 pages).
Data sheet "Natural Language Processor with Motor, Sensor and Display Control", P/N 80/0317-K, published 2010 by Sensory, Inc. of Santa-Clara, California, U.S.A (164 pages).
Data sheet "General Purpose Timers" publication No. 19/0481 Rev.2 Nov. 1992 (8 pages).
Application Note AN170 "NE555 and NE556 Applications" from Philips semiconductors dated Dec. 1988 (19 pages).
Galaxy S6 Edge—Technical Specification (retrieved Oct. 2015 from www.samsung.com/us/explore/galaxy-s-6-features-and-specs) (1 page).
Robert Berdan "Digital Photography Basics for Beginners", downloaded from www.canadianphotographer.com (12 pages).
Joseph Ciaglia et al., "Absolute Beginner's Guide to Digital Photography", Que Publishing (ISBN—0-7897-3120-7), published on Apr. 2004 (381 pages).
Al Bovik, "Handbook of Image & Video Processing", by Academic Press, ISBN: 0-12-119790-5, 2000 (500 pages).
IETF RFC 5013, "The Dublin Core Metadata Element Set", Aug. 2007 (9 pages).
IETF RFC 2731, "Encoding Dublin Core Metadata in HTML", Dec. 1999 (22 pages).
David J. Fleet and Yair Weiss entitled: "Optical Flow Estimation" (24 pages).
J. L. Baron, D.J. Fleet, and S.S. Beauchemin, "Performance of Optical Flow Techniques", IJCV 12:1, pp. 43-77, 1994 (60 pages).
Daniel Kormann, Peter Dunker, and Ronny Paduscheck, all of the Fraunhofer Institute for Digital Media in Ilmenau, Germany, "Automatic Rating and Selection of Digital Photographs", Springer-Verlag Berlin Heidelberg 2009 (4 pages).
Erik Murphy-Chutorian and Mohan Trivedi, "Head Pose Estimation in Computer Vision: A Survey", IEEE Transaction on Pattern Analysis and Machine Intelligence published 2008 (Digital Object Identifier 10.1109/TPAMI.2008.106) (20 pages).
Xiangxin Zhu and Deva Ramanan of the University of California, Irvine, "Face detection, Pose Estimation, and Landmark Localization in the Wild" (8 pages).
Jian-Gang Wang, Eric Sung, and Ronda Venkateswarlu, all of Singapore, "Eye Gaze Estimation from a Single Image of One Eye", published in Proceedings of the Ninth IEEE International Conference on Computer Vision (ICCV 2003) (8 pages).
Dinh Quang Tri, Van Tan Thang, Nguyen Dinh Huy, and Doan The Thao of the University of Technology, HoChin Minh, Viet Nam, "Gaze Estimation with a Single Camera based on an ARM-based Embedded Linux Platform", published in the International Symposium on Mechatronics and Robotics (Dec. 10, 2013, HCMUT, Viet Nam) (5 pages).
Jia-Gang Wang and Eric Sung of the Nanyang Technological University, Singapore, "Gaze Detection via Images of Irises" (10 pages).
Ian-Gang Wang and Eric Sung of the School of Electrical and Electronic Engineering ,Nanyang Technological University, Singapore 639798, "Gaze Direction Determination" (14 pages).
Roberto Valenti and Theo Gevers, "Accurate Eye Center Location through Invariant Isocentric Patterns", published in IEEE Transaction on Pattern Analysis and Machine Intelligence (2011) (14 pages).
Fabian Timm and Erhardt Barth, "Accurate Eye Localisation by Means of Gradients" (6 pages).
Application Note No. 1, "Laser distance measurement with TDC's", (downloaded Jan. 2016) (4 pages).
Application Note No. AN4841, "S12ZVL LIN Enabled Ultrasonic Distance Measurement—Based on the MC9S12ZVL32 MagniV Device", Rev. 1.0, Mar. 2014 by Freescale Semiconductor, Inc. (26 pages).
Guide entitled: "Operating/Safety Instructions—GLR225" Robert Bosch Tool Corporation (24 pages).
Dr.-Ing. Detlef Brumbi, "Fundamentals of Radar Technology for Level Gauging, 4th Edition", Krohne Messtechnik Gmbh & Co. KF Jul. 2003 publication (7.02337.22.00) (65 pages).
Application Note AN98035, "Circulators and Isolators, unique passive devices", Philips Semiconductors N.V., released Mar. 23, 1998 (35 pages).
Handbook "Data Acquisition Handbook—A Reference for DAQ and Analog & Digital Signal Conditioning", Measurement Computing Corporation, published 2004-2012 (145 pages).
Dipl. Ing. Michael Klotz, "An Automotive Short Range High Resolution Pulse Radar Network", dated Jan. 2002 (139 pages).
User Guide, "Ultrasonic Distance Finder" (Model DT100-EU-EN V4.2 6/09), Extech Instruments Corporation (a FLIR Company) 2006 (8 pages).
Jain Siddharth, "A survey of Laser Range Finding", Dec. 2, 2003 (14 pages).
Marvin J. Weber, "Handbook of Laser Wavelengths", Lawrence Berkeley National Laboratory published 1999 by CRC Press LLC (ISBN: 0-8493-3508-6) (771 pages).
Cytron Technologies user manual, "Product User's Manual—HC-SR04 Ultrasonic Sensor", (10 pages).
Data-sheet (PD11721h), "HRLV-MaxSonar®-EZ™ Series—High Resolution, Precision, Low Voltage Ultrasonic Range Finder MB1003, MB1013, MB1023, MB1033, MB1043", MaxBotix® Incorporated 2014 (15 pages).
Application Note "FMCW Radar Sensors—Application Notes", by Sivers IMA AB Rev. A 2011-06-2011 (44 pages).
Ari Kilpela (of the Department of Electrical and Information Engineering, University of Oulu), "Pulsed time-of-flight laser range finder techniques for fast, high precision measurement applications", University of Oulu, Finland, published 2004 (ISBN 951-42-7261-7) (98 pages).
Pengcheng Hu et al., "Phase-shift laser range finder based on high speed and high precision phase-measuring techniques", published in The 10th International Symposium of Measurement Technology and Intelligent Instruments (Jun. 29-Jul. 2, 2011) (5 pages).
Shahram Mohammad Nejad and Kiazand Fasihi (both from Department of Electrical Engineering, Iran University of Science and Technology (IUST), Tehran, Iran), "A new design of laser phase-shift range finder independent of environmental conditions and thermal drift", Jan. 2016 (4 pages).
Zhao Zeng-rong and Bai Ran, "A FMCW Radar Distance Measure System based on LabVIEW", published in Journal of Computers, vol. 6, No. 4, Apr. 2011 (8 pages).
Markus-Christian Amann et al., "Laser ranging: a critical review of usual techniques for distance measurements", Photo-Optical Instrumentation Engineers paper (Opt. Eng. 40(1) (Jan. 10-19, 2001), 0091-3286/2001) (10 pages).
Egismos Technology Corporation document No. EG-QS-T-PM-ST-0001 "Laser Range Finder—LDK Model 2 Series", (dated Apr. 23, 2015) (8 pages).
Egismos Technology Corporation form No. DAT-LRM-05, "Laser Range Finder RS232 EV-kit", (dated Jun. 21, 2014) (8 pages).
Guide (2609140584 02/09), "Operating/Safety Instructions—DLR130", Robert Bosch Tool Corporation 2009 (36 pages).
OSRAM Opto Semiconductors Gmbh (of Regensburg, Germany), "Range Finding Using Pulse Lasers", dated Sep. 10, 2004 (7 pages).
Md. Shamsul Arefin and Tajrian Mollick, "Design of an Ultrasonic Distance Meter", an International Journal of Scientific & Engineering Research vol. 4, Issue 3, Mar. 2013 (ISSN 2229-5518) (10 pages).
Ioannis Sarkas, "Circuit and System Design for MM-Wave Radio and Radar Applications", Thesis submitted to the University of Toronto, 2013 (234 pages).
Murugavel Raju, "Ultrasonic Distance Measurements With the MSP430", Texas Instruments Incorporated Application Report (SLAA136A—Oct. 2001) (18 pages).
Data sheet C10115945 Revision A dated May 16, 2014, "Digital Zero-Height SiSonic™ Microphone With Multi-Mode and Ultrasonic Support" (15 pages).

(56) References Cited

OTHER PUBLICATIONS

Specification DMS, C10109833 Revision A dated Jul. 20, 2009, ""Mini" SiSonic Ultrasonic Acoustic Sensor Specification", (10 pages).

PhD Thesis by Alexandre Dugarry, "Advanced Driver Assistance Systems—Information Management and Presentation", submitted on Jun. 2004 to the Cranfield University, School of Engineering, Applied Mathematics and Computing Group (124 pages).

White-paper entitled: "Design and Test of fast Laser Driver Circuits", iC-Haus GmBH Aug. 2012 (10 pages).

* cited by examiner

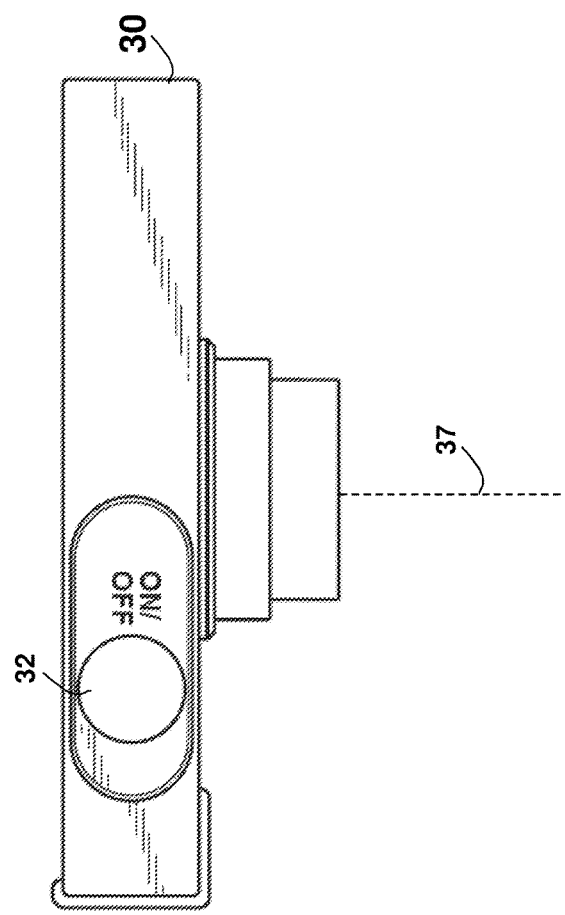

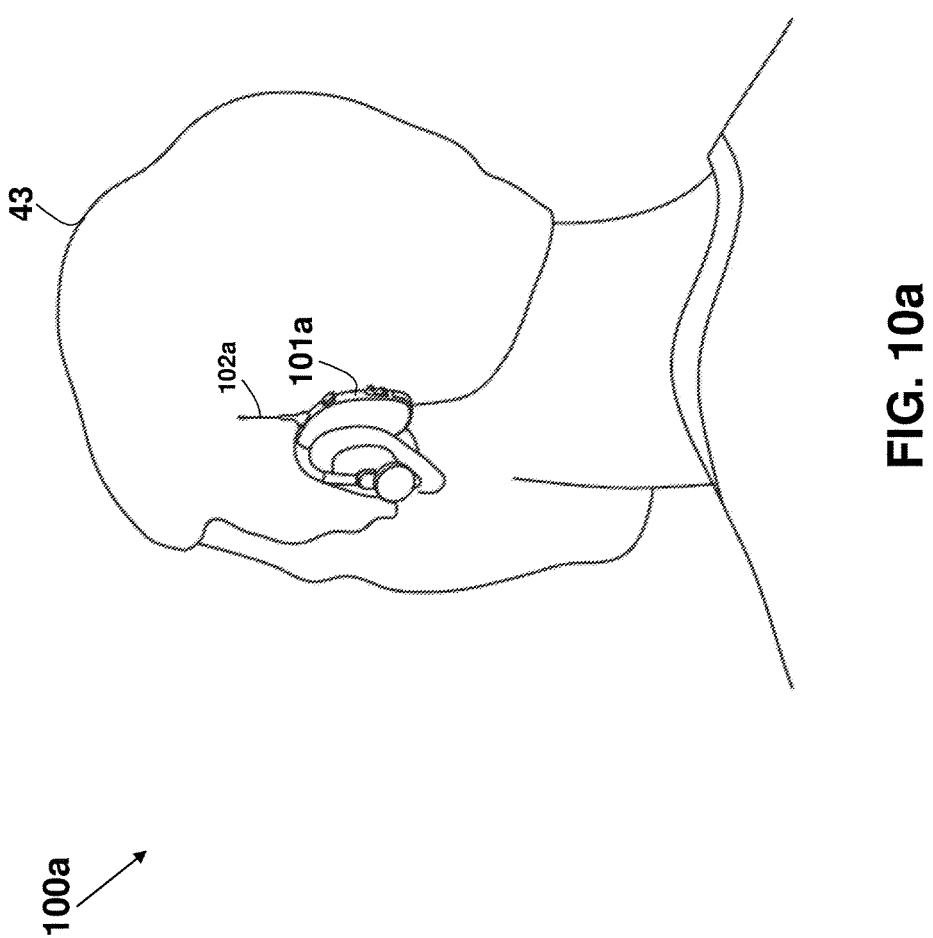

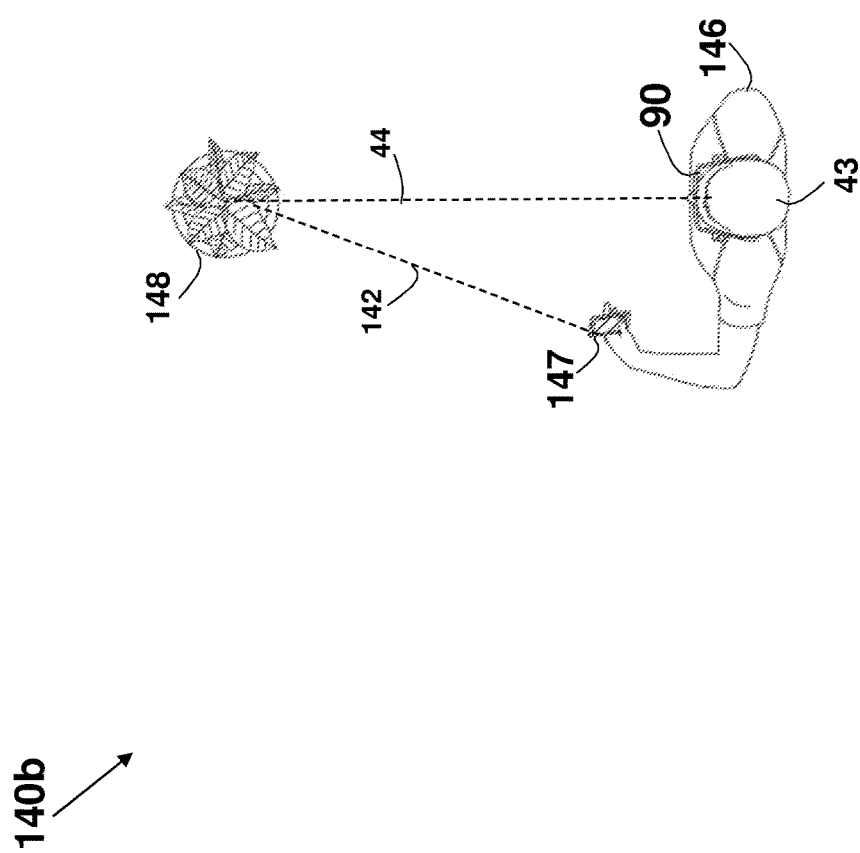

ESTIMATING AND USING RELATIVE HEAD POSE AND CAMERA FIELD-OF-VIEW

CROSS-REFERENCES TO RELATED APPLICATIONS

This is a national phase of a PCT/IL2016/050408 filed on Apr. 19, 2016 which claims priority to U.S. Provisional Patent Application No. 62/153,154 filed Apr. 27, 2015, to U.S. Provisional Patent Application No. 62/156,918 filed May 5, 2015 and to U.S. Provisional Patent Application No. 62/219,944 filed Sep. 17, 2015. The above provisional applications are commonly assigned and are incorporated herein by reference in their entirety for all purposes.

TECHNICAL FIELD

This disclosure generally relates to an apparatus and method for estimating the relative alignment of user gaze and a camera Field-Of-View (FOV), and in particular controlling the camera operation using Radio-Frequency (RF) beacons or IMU (Inertial Measurement Unit) housed in one or more wearable device.

BACKGROUND

Unless otherwise indicated herein, the materials described in this section are not prior art to the claims in this application and are not admitted to be prior art by inclusion in this section.

Digital photography is described in an article by Robert Berdan (downloaded from 'canadianphotographer.com' preceded by 'www.') entitled: "Digital Photography Basics for Beginners", and in a guide published on April 2004 by Que Publishing (ISBN—0-7897-3120-7) entitled: *"Absolute Beginner's Guide to Digital Photography"* authored by Joseph Ciaglia et al., which are both incorporated in their entirety for all purposes as if fully set forth herein.

A digital camera 10 shown in FIG. 1 may be a digital still camera which converts captured image into an electric signal upon a specific control, or can be a video camera, wherein the conversion between captured images to the electronic signal is continuous (e.g., 24 frames per second). The camera 10 is preferably a digital camera, wherein the video or still images are converted using an electronic image sensor 12. The digital camera 10 includes a lens 11 (or few lenses) for focusing the received light centered around an optical axis 8 (referred to herein as a line-of-sight) onto the small semiconductor image sensor 12. The optical axis 8 is an imaginary line along which there is some degree of rotational symmetry in the optical system, and typically passes through the center of curvature of the lens 11 and commonly coincides with the axis of the rotational symmetry of the sensor 12. The image sensor 12 commonly includes a panel with a matrix of tiny light-sensitive diodes (photocells), converting the image light to electric charges and then to electric signals, thus creating a video picture or a still image by recording the light intensity. Charge-Coupled Devices (CCD) and CMOS (Complementary Metal-Oxide-Semiconductor) are commonly used as the light-sensitive diodes. Linear or area arrays of light-sensitive elements may be used, and the light sensitive sensors may support monochrome (black & white), color or both. For example, the CCD sensor KAI-2093 Image Sensor 1920 (H)×1080 (V) Interline CCD Image Sensor or KAF-50100 Image Sensor 8176 (H)×6132 (V) Full-Frame CCD Image Sensor can be used, available from Image Sensor Solutions, Eastman Kodak Company, Rochester, N.Y.

An image processor block 13 receives the analog signal from the image sensor 12. The Analog Front End (AFE) in the block 13 filters, amplifies, and digitizes the signal, using an analog-to-digital (A/D) converter. The AFE further provides Correlated Double Sampling (CDS), and provides a gain control to accommodate varying illumination conditions. In the case of a CCD-based sensor 12, a CCD AFE (Analog Front End) component may be used between the digital image processor 13 and the sensor 12. Such an AFE may be based on VSP2560 *'CCD Analog Front End for Digital Cameras'* available from Texas Instruments Incorporated of Dallas, Tex., U.S.A. The block 13 further contains a digital image processor, which receives the digital data from the AFE, and processes this digital representation of the image to handle various industry-standards, and to execute various computations and algorithms. Preferably, additional image enhancements may be performed by the block 13 such as generating greater pixel density or adjusting color balance, contrast, and luminance. Further, the block 13 may perform other data management functions and processing on the raw digital image data. Commonly, the timing relationship of the vertical/horizontal reference signals and the pixel clock are also handled in this block. Digital Media System-on-Chip device TMS320DM357 available from Texas Instruments Incorporated of Dallas, Tex., U.S.A. is an example of a device implementing in a single chip (and associated circuitry) part or all of the image processor 13, part or all of a video compressor 14 and part or all of a transceiver 15. In addition to a lens or lens system, color filters may be placed between the imaging optics and the photosensor array 12 to achieve desired color manipulation.

The processing block 13 converts the raw data received from the photosensor array 12 (which can be any internal camera format, including before or after Bayer translation) into a color-corrected image in a standard image file format. The camera 10 further comprises a connector 19, and a transmitter or a transceiver 15 is disposed between the connector 19 and the image processor 13. The transceiver 15 may further includes isolation magnetic components (e.g. transformer-based), balancing, surge protection, and other suitable components required for providing a proper and standard interface via the connector 19. In the case of connecting to a wired medium, the connector 19 further contains protection circuitry for accommodating transients, over-voltage and lightning, and any other protection means for reducing or eliminating the damage from an unwanted signal over the wired medium. A band pass filter may also be used for passing only the required communication signals, and rejecting or stopping other signals in the described path. A transformer may be used for isolating and reducing common-mode interferences. Further a wiring driver and wiring receivers may be used in order to transmit and receive the appropriate level of signal to and from the wired medium. An equalizer may also be used in order to compensate for any frequency dependent characteristics of the wired medium.

Other image processing functions performed by the image processor 13 may include adjusting color balance, gamma and luminance, filtering pattern noise, filtering noise using Wiener filter, changing zoom factors, recropping, applying enhancement filters, applying smoothing filters, applying subject-dependent filters, and applying coordinate transformations. Other enhancements in the image data may include applying mathematical algorithms to generate greater pixel density or adjusting color balance, contrast and/or luminance.

The image processing may further include an algorithm for motion detection by comparing the current image with a reference image and counting the number of different pixels, where the image sensor 12 or the digital camera 10 are assumed to be in a fixed location and thus assumed to capture the same image. Since images are naturally differ due to factors such as varying lighting, camera flicker, and CCD dark currents, pre-processing is useful to reduce the number of false positive alarms. Algorithms that are more complex are necessary to detect motion when the camera itself is moving, or when the motion of a specific object must be detected in a field containing other movement that can be ignored. Further, the video or image processing may use, or be based on, the algorithms and techniques disclosed in the book entitled: "*Handbook of Image & Video Processing*", edited by Al Bovik, by Academic Press, ISBN: 0-12-119790-5, which is incorporated in its entirety for all purposes as if fully set forth herein.

A controller 18, located within the camera device or module 10, may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. The controller 18 commonly includes a memory that may include a static RAM (random Access Memory), dynamic RAM, flash memory, ROM (Read Only Memory), or any other data storage medium. The memory may include data, programs, and/or instructions and any other software or firmware executable by the processor. Control logic can be implemented in hardware or in software, such as a firmware stored in the memory. The controller 18 controls and monitors the device operation, such as initialization, configuration, interface, and commands.

The digital camera device or module 10 requires power for its described functions such as for capturing, storing, manipulating, and transmitting the image. A dedicated power source may be used such as a battery or a dedicated connection to an external power source via connector 19. The power supply may contain a DC/DC converter. In another embodiment, the power supply is power fed from the AC power supply via AC plug and a cord, and thus may include an AC/DC converter, for converting the AC power (commonly 115 VAC/60 Hz or 220 VAC/50 Hz) into the required DC voltage or voltages. Such power supplies are known in the art and typically involves converting 120 or 240 volt AC supplied by a power utility company to a well-regulated lower voltage DC for electronic devices. In one embodiment, the power supply is integrated into a single device or circuit, in order to share common circuits. Further, the power supply may include a boost converter, such as a buck boost converter, charge pump, inverter and regulators as known in the art, as required for conversion of one form of electrical power to another desired form and voltage. While the power supply (either separated or integrated) can be an integral part and housed within the camera 10 enclosure, it may be enclosed as a separate housing connected via cable to the camera 10 assembly. For example, a small outlet plug-in step-down transformer shape can be used (also known as wall-wart, "power brick", "plug pack", "plug-in adapter", "adapter block", "domestic mains adapter", "power adapter", or AC adapter). Further, the power supply may be a linear or switching type.

Various formats that can be used to represent the captured image are TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. In many cases, video data is compressed before transmission, in order to allow its transmission over a reduced bandwidth transmission system. A video compressor 14 (or video encoder) is shown in FIG. 26 disposed between the image processor 13 and the transceiver 15, allowing for compression of the digital video signal before its transmission over a cable or over-the-air. In some cases, compression may not be required, hence obviating the need for such compressor 14. Such compression can be lossy or lossless types. Common compression algorithms are JPEG (Joint Photographic Experts Group) and MPEG (Moving Picture Experts Group). The above and other image or video compression techniques can make use of intraframe compression commonly based on registering the differences between part of single frame or a single image. Interframe compression can further be used for video streams, based on registering differences between frames. Other examples of image processing include run length encoding and delta modulation. Further, the image can be dynamically dithered to allow the displayed image to appear to have higher resolution and quality.

The single lens or a lens array 11 is positioned to collect optical energy representative of a subject or a scenery, and to focus the optical energy onto the photosensor array 12. Commonly, the photosensor array 12 is a matrix of photosensitive pixels, which generates an electric signal that is a representative of the optical energy directed at the pixel by the imaging optics. The captured image (still images or as video data) may be stored in a memory 17, that may be volatile or non-volatile memory, and may be a built-in or removable media. Many stand-alone cameras use SD format, while a few use CompactFlash or other types. A LCD or TFT miniature display 16 typically serves as an Electronic ViewFinder (EVF) where the image captured by the lens is electronically displayed. The image on this display is used to assist in aiming the camera at the scene to be photographed. The sensor records the view through the lens; the view is then processed, and finally projected on a miniature display, which is viewable through the eyepiece. Electronic viewfinders are used in digital still cameras and in video cameras. Electronic viewfinders can show additional information, such as an image histogram, focal ratio, camera settings, battery charge, and remaining storage space. The display 16 may further display images captured earlier that are stored in the memory 17.

While the digital camera 10 has been exampled above with regard to capturing a single image using the single lens 11 and the single sensor 12, it is apparent that multiple images can be equally considered, using multiple image capturing mechanisms. An example of two capturing mechanisms is shown for a digital camera 10a shown in FIG. 1a. Lenses 11 and 11a are respectively associated with sensors 12 and 12a, which in turn respectively connects to image processors 13 and 13a. In the case where a compression function is used, video compressors 14 and 14a, respectively, compress the data received from the processors 13 and 13a. In one embodiment, two transceivers (each of the same as transceiver 15, for example) and two ports (each of the same type as port 19, for example) are used. Further, two communication mediums (each similar or the same as described above) can be employed, each carrying the image corresponding to the respective lens. Further, the same medium can be used using Frequency Division/Domain Multiplexing (FDM). In such an environment, each signal is carried in a dedicated frequency band, distinct from the other signals concurrently carried over the same medium. The signals are combined onto the medium and separated from the medium using various filtering schemes, employed in a multiplexer 21. In another embodiment, the multiple images are carried using Time Domain/Division Multiplexing (TDM). The digital data stream from the video compressors 14 and 14b is multiplexed into a single stream by the multiplexer 21, serving as a time multiplexer. The combined signal is then fed to the single transceiver 15 for transmitting onto the medium. Using two or more image-capturing components can further be used to provide stereoscopic video, allowing 3-D or any other stereoscopic view of the content, or other methods of improving the displayed image quality of functionality.

A pictorial view of a digital camera 30 is shown in FIGS. 3-3c, that may correspond to the digital camera 10 shown in FIG. 1 or 10a shown in FIG. 1a. A pictorial front view of the digital camera 30 is shown in FIG. 3, illustrating a shutter and/or on-off button 32, a flash mechanism cover or opening 31, and a cover or opening 33 for light sensing, such as for operating the flash light mechanism via opening 31. The digital camera 30 further comprises a lens 34 in a lens housing (that may correspond to the lens 11 in the digital camera 10). The digital camera 10 captures images along the optical axis 37 shown in FIGS. 3a and 3c, that may correspond to the optical axis 8 of the integrated digital camera 10 shown in FIG. 1. A top view of the digital camera 30 is shown in FIG. 3a, and a rear view of the integrated digital camera 30 is shown in FIG. 3b. Most of the rear side is employed by a display 38, typically an LCD display that correspond to the display 16 shown as part of the digital camera 10 shown in FIG. 1, and serves as a view finder and for displaying the angle meter outputs (or any functions thereof), and may be part of a user interface functionality (corresponding for example to the user interface 9 shown as part of the digital camera 10 in FIG. 1. The rear side of the digital camera 30 further comprises various user operated buttons for controlling the digital camera and the angle meter operation, such as the zoom control 39, the camera mode (such as still or video) button 39a, a menu control 39c, and optimizing the camera to a specific scene via control switches 39b, all may be part of the corresponding user interface functionality 9 shown in FIG. 1.

A digital camera is described in U.S. Pat. No. 6,897,891 to Itsukaichi entitled: "Computer System Using a Camera That is Capable of Inputting Moving Picture or Still Picture Data", in U.S. Patent Application Publication No. 2007/0195167 to Ishiyama entitled: "Image Distribution System, Image Distribution Server, and Image Distribution Method", in U.S. Patent Application Publication No. 2009/0102940 to Uchida entitled: "Imaging Device and imaging Control Method", and in U.S. Pat. No. 5,798,791 to Katayama et al. entitled: "Multieye Imaging Apparatus", which are all incorporated in their entirety for all purposes as if fully set forth herein.

A digital camera capable of being set to implement the function of a card reader or camera is disclosed in U.S. Patent Application Publication 2002/0101515 to Yoshida et al. entitled: "Digital camera and Method of Controlling Operation of Same", which is incorporated in its entirety for all purposes as if fully set forth herein. When the digital camera capable of being set to implement the function of a card reader or camera is connected to a computer via a USB, the computer is notified of the function to which the camera has been set. When the computer and the digital camera are connected by the USB, a device request is transmitted from the computer to the digital camera. Upon receiving the device request, the digital camera determines whether its operation at the time of the USB connection is that of a card reader or PC camera. Information indicating the result of the determination is incorporated in a device descriptor, which the digital camera then transmits to the computer. Based on the device descriptor, the computer detects the type of operation to which the digital camera has been set. The driver that supports this operation is loaded and the relevant commands are transmitted from the computer to the digital camera.

A prior art example of a portable electronic camera connectable to a computer is disclosed in U.S. Pat. No. 5,402,170 to Parulski et al. entitled: "Hand-Manipulated Electronic Camera Tethered to a Personal Computer", a digital electronic camera which can accept various types of input/output cards or memory cards is disclosed in U.S. Pat. No. 7,432,952 to Fukuoka entitled: "Digital Image Capturing Device having an Interface for Receiving a Control Program", and the use of a disk drive assembly for transferring images out of an electronic camera is disclosed in U.S. Pat. No. 5,138,459 to Roberts et al., entitled: "Electronic Still Video Camera with Direct Personal Computer (PC) Compatible Digital Format Output", which are all incorporated in their entirety for all purposes as if fully set forth herein. A camera with human face detection means is disclosed in U.S. Pat. No. 6,940,545 to Ray et al., entitled: "Face Detecting Camera and Method", and in U.S. Patent Application Publication No. 2012/0249768 to Binder entitled: "System and Method for Control Based on Face or Hand Gesture Detection", which are both incorporated in their entirety for all purposes as if fully set forth herein. A digital still camera is described in an Application Note No. AN1928/D (Revision 0-20 Feb. 2001) by Freescale Semiconductor, Inc. entitled: "Roadrunner—Modular digital still camera reference design", which is incorporated in its entirety for all purposes as if fully set forth herein.

An imaging method is disclosed in U.S. Pat. No. 8,773,509 to Pan entitled: "Imaging Device, Imaging Method and Recording Medium for Adjusting Imaging Conditions of Optical Systems Based on Viewpoint Images", which is incorporated in its entirety for all purposes as if fully set forth herein. The method includes: calculating an amount of parallax between a reference optical system and an adjustment target optical system; setting coordinates of an imaging condition evaluation region corresponding to the first viewpoint image outputted by the reference optical system; calculating coordinates of an imaging condition evaluation region corresponding to the second viewpoint image outputted by the adjustment target optical system, based on the set coordinates of the imaging condition evaluation region corresponding to the first viewpoint image, and on the calculated amount of parallax; and adjusting imaging conditions of the reference optical system and the adjustment target optical system, based on image data in the imaging condition evaluation region corresponding to the first viewpoint image, at the set coordinates, and on image data in the imaging condition evaluation region corresponding to the second viewpoint image, at the calculated coordinates, and outputting the viewpoint images in the adjusted imaging conditions.

A portable hand-holdable digital camera is described in Patent Cooperation Treaty (PCT) International Publication Number WO 2012/013914 by Adam LOMAS entitled: "Portable Hand-Holdable Digital Camera with Range Finder", which is incorporated in its entirety for all purposes as if fully set forth herein. The digital camera comprises a camera housing having a display, a power button, a shoot button, a flash unit, and a battery compartment; capture means for capturing an image of an object in two dimensional form and for outputting the captured two-dimensional image to the display; first range finder means including a zoomable lens unit supported by the housing for focusing on an object and calculation means for calculating a first distance of the object from the lens unit and thus a distance between points on the captured two-dimensional image viewed and selected on the display; and second range finder means including an emitted-beam range finder on the housing for separately calculating a second distance of the object from the emitted-beam range finder and for outputting the second distance to the calculation means of the first range finder means for combination therewith to improve distance determination accuracy.

A camera having a pointing aid emitter is described in U.S. Pat. No. 5,546,156 to McIntyre entitled: "Camera with Pointing Aid", which is incorporated in its entirety for all purposes as if fully set forth herein. The pointing aid emitter produces a visible beam generally aligned with the optical axis of the camera objective lens such that the visible beam illuminates an object in the scene includes a scene measurement system that measures an aspect of the scene and an emitter controller that adjusts the output power of the pointing aid emitter in accordance with the scene aspect measured by the scene measurement system to reduce power consumption and reduce the risk of damage to the object that is illuminated by the beam. The scene measurement system of the camera preferably comprises an ambient light measuring system of a camera automatic exposure system and a distance measuring system of a camera automatic focus system. The emitter preferably comprises a laser light source that produces a visible laser beam.

A camera that receives light from a field of view, produces signals representative of the received light, and intermittently reads the signals to create a photographic image is described in U.S. Pat. No. 5,189,463 to Axelrod et al. entitled: "Camera Aiming Mechanism and Method", which is incorporated in its entirety for all purposes as if fully set forth herein. The intermittent reading results in intermissions between readings. The invention also includes a radiant energy source that works with the camera. The radiant energy source produces a beam of radiant energy and projects the beam during intermissions between readings. The beam produces a light pattern on an object within or near the camera's field of view, thereby identifying at least a part of the field of view. The radiant energy source is often a laser and the radiant energy beam is often a laser beam. A detection mechanism that detects the intermissions and produces a signal that causes the radiant energy source to project the radiant energy beam. The detection mechanism is typically an electrical circuit including a retriggerable multivibrator or other functionally similar component.

Shutter button. A shutter-release button (sometimes just shutter release or shutter button) is a push-button found on many cameras, used to take a picture when pushed. When pressed, the shutter of the camera is "released", so that it opens to capture a picture, and then closes, allowing an exposure time as determined by the shutter speed setting (which may be automatic). The term "release" comes from old mechanical shutters that were "cocked" or "tensioned" by one lever, and then "released" by another. In modern or digital photography, this notion is less meaningful, so the term "shutter button" is more used.

Image. A digital image is a numeric representation (normally binary) of a two-dimensional image. Depending on whether the image resolution is fixed, it may be of a vector or raster type. Raster images have a finite set of digital values, called picture elements or pixels. The digital image contains a fixed number of rows and columns of pixels, which are the smallest individual element in an image, holding quantized values that represent the brightness of a given color at any specific point. Typically, the pixels are stored in computer memory as a raster image or raster map, a two-dimensional array of small integers, where these values are commonly transmitted or stored in a compressed form. The raster images can be created by a variety of input devices and techniques, such as digital cameras, scanners, coordinate-measuring machines, seismographic profiling, airborne radar, and more. Common image formats include GIF, JPEG, and PNG.

The Graphics Interchange Format (better known by its acronym GIF) is a bitmap image format that supports up to 8 bits per pixel for each image, allowing a single image to reference its palette of up to 256 different colors chosen from the 24-bit RGB color space. It also supports animations and allows a separate palette of up to 256 colors for each frame. GIF images are compressed using the Lempel-Ziv-Welch (LZW) lossless data compression technique to reduce the file size without degrading the visual quality. The GIF (GRAPHICS INTERCHANGE FORMAT) Standard Version 89a is available from www.w3.org/Graphics/GIF/spec-gif89a.txt.

JPEG (seen most often with the .jpg or .jpeg filename extension) is a commonly used method of lossy compression for digital images, particularly for those images produced by digital photography. The degree of compression can be adjusted, allowing a selectable tradeoff between storage size and image quality and typically achieves 10:1 compression with little perceptible loss in image quality. JPEG/Exif is the most common image format used by digital cameras and other photographic image capture devices, along with JPEG/JFIF. The term "JPEG" is an acronym for the Joint Photographic Experts Group, which created the standard. JPEG/JFIF supports a maximum image size of 65535×65535 pixels—one to four gigapixels (1000 megapixels), depending on the aspect ratio (from panoramic 3:1 to square). JPEG is standardized under as ISO/IEC 10918-1:1994 entitled: *"Information technology—Digital compression and coding of continuous-tone still images: Requirements and guidelines"*.

Portable Network Graphics (PNG) is a raster graphics file format that supports lossless data compression that was created as an improved replacement for Graphics Interchange Format (GIF), and is the commonly used lossless image compression format on the Internet. PNG supports palette-based images (with palettes of 24-bit RGB or 32-bit RGBA colors), grayscale images (with or without alpha channel), and full-color non-palette-based RGB images (with or without alpha channel). PNG was designed for transferring images on the Internet, not for professional-quality print graphics, and, therefore, does not support non-RGB color spaces such as CMYK. PNG was published as an ISO/IEC15948:2004 standard entitled: *"Information technology—Computer graphics and image processing—Portable Network Graphics (PNG): Functional specification"*.

Metadata. The term "metadata", as used herein, refers to data that describes characteristics, attributes, or parameters of other data, in particular, files (such as program files) and objects. Such data is typically structured information that describes, explains, locates, and otherwise makes it easier to retrieve and use an information resource. Metadata typically includes structural metadata, relating to the design and specification of data structures or "data about the containers of data"; and descriptive metadata about individual instances of application data or the data content. Metadata may include the means of creation of the data, the purpose of the data, time and date of creation, the creator or author of the data, the location on a computer network where the data were created, and the standards used.

For example, metadata associated with a computer word processing file might include the title of the document, the name of the author, the company to whom the document belongs, the dates that the document was created and last modified, keywords which describe the document, and other descriptive data. While some of this information may also be included in the document itself (e.g., title, author, and data), metadata may be a separate collection of data that may be stored separately from, but associated with, the actual document. One common format for documenting metadata is eXtensible Markup Language (XML). XML provides a formal syntax, which supports the creation of arbitrary descriptions, sometimes called "tags." An example of a metadata entry might be <title>War and Peace</title>, where the bracketed words delineate the beginning and end of the group of characters that constitute the title of the document that is described by the metadata. In the example of the word processing file, the metadata (sometimes referred to as "document properties") is entered manually by the author, the editor, or the document manager. The metadata concept is further described in a National Information Standards Organization (NISO) Booklet entitled: "*Understanding Metadata*" (ISBN: 1-880124-62-9), in the IETF RFC 5013 entitled: "*The Dublin Core Metadata Element Set*", and in the IETF RFC 2731 entitled: "*Encoding Dublin Core Metadata in HTML*", which are all incorporated in their entirety for all purposes as if fully set forth herein. An extraction of metadata from files or objects is described in a U.S. Pat. No. 8,700,626 to Bedingfield, entitled: "Systems, Methods and Computer Products for Content-Derived Metadata", and in a U.S. Patent Application Publication 2012/0278705 to Yang et al., entitled: "System and Method for Automatically Extracting Metadata from Unstructured Electronic Documents", which are both incorporated in their entirety for all purposes as if fully set forth herein.

Metadata can be stored either internally in the same file, object, or structure as the data (this is also called internal or embedded metadata), or externally in a separate file or field separated from the described data. A data repository typically stores the metadata detached from the data, but can be designed to support embedded metadata approaches. Metadata can be stored in either human-readable or binary form. Storing metadata in a human-readable format such as XML can be useful because users can understand and edit it without specialized tools, however, these formats are rarely optimized for storage capacity, communication time, and processing speed. A binary metadata format enables efficiency in all these respects, but requires special libraries to convert the binary information into a human-readable content.

Tag. A tag is a type of metadata relating to non-hierarchical keyword or term assigned to a digital image, describing the image and allows it to be found again by browsing or searching. Tags may be chosen informally and personally by the item's creator or by its viewer, depending on the system.

Optical flow. Optical flow or optic flow is the pattern of apparent motion of objects, surfaces, and edges in a visual scene caused by the relative motion between an observer (an eye or a camera) and the scene. Motion estimation is the process of determining motion vectors that describe the transformation from one 2D image to another, usually from adjacent frames in a video sequence. The motion vectors may be represented by a translational model or by many other models that can approximate the motion of a real video camera, such as rotation and translation in all three dimensions and zoom. Optical flow techniques are described in an article by David J. Fleet and Yair Weiss entitled: "*Optical Flow Estimation*", and in an article by J. L. Baron, D. J. Fleet, and S. S. Beauchemin entitled: "*Performance of Optical Flow Techniques*", which are both incorporated in their entirety for all purposes as if fully set forth herein.

Digital photography is described in an article by Robert Berdan (downloaded from www.canadianphotographer.com) entitled: Digital Photography Basics for Beginners", and in a guide published on April 2004 by Que Publishing (ISBN—0-7897-3120-7) entitled: Absolute Beginner's Guide to Digital Photography" authored by Joseph Ciaglia et al., which are both incorporated in their entirety for all purposes as if fully set forth herein.

A method and an apparatus for rating a captured image based on accessing a database of reference images that have an associated rating value, and selecting reference images to form a metadata-based subset of reference images, are described in U.S. Patent Application Publication No. 2012/0213445 to LUU et al., entitled: "Method, Apparatus, and System for Rating Images", which is incorporated in its entirety for all purposes as if fully set forth herein. A method and an apparatus for disqualifying an unsatisfactory scene as an image acquisition control for a camera by analyzing mouth regions in an acquired image, are described in U.S. Pat. No. 8,265,348 to Steinberg et al., entitled: "Digital Image Acquisition Control and Correction Method and Apparatus", which is incorporated in its entirety for all purposes as if fully set forth herein. An apparatus and a method for facilitating analysis of a digital image by using image recognition processing in a server, allowing for suggesting for meta-tagging the image by a user, are described in U.S. Pat. No. 8,558,921 to Walker et al., entitled: "Systems and Methods for Suggesting Meta-Information to a Camera User", which is incorporated in its entirety for all purposes as if fully set forth herein.

Systems and methods for determining the location where an image was captured using a central system that compares the submitted images to images in an image library to identify matches are described in U.S. Pat. No. 8,131,118 to Jing et al., entitled: "Inferring Locations from an Image", which is incorporated in its entirety for all purposes as if fully set forth herein. Further, methods for automatically rating and selecting digital photographs by estimating the importance of each photograph by analyzing its content as well as its metadata, are described in an article by Daniel Kormann, Peter Dunker, and Ronny Paduscheck, all of the Fraunhofer Institute for Digital Media in Ilmenau, Germany, entitled: "*Automatic Rating and Selection of Digital Photographs*", which is incorporated in its entirety for all purposes as if fully set forth herein.

Various systems and methods are known for analyzing and for providing the user a feedback regarding the quality of a digital image captured by a digital camera. A processor within a digital camera, which generates and utilizes a recipe data file and communicates with a network-based storage location for uploading and downloading, is described in U.S. Patent Application Publication No. 2013/0050507 to Syed et al., entitled: "Recipe Based Real-Time Assistance for Digital Image Capture and Other Consumer Electronics Devices", a method and system for determining effective policy profiles that includes client devices configured to initiate a request for at least one effective policy profile, a server mechanism communicatively coupled to the client devices and configured to receive the request, and a policy data storage component configured to store a plurality of policy profiles, are described in U.S. Patent Application Publication No. 2010/0268772 to Romanek et al., entitled: "System and Method for Determining Effective Policy Profiles in a Client-Server Architecture", methods and apparatuses for analyzing, characterizing and/or rating composition of images and providing instructive feedback or automatic corrective actions are described in U.S. Patent Application Publication No. 2012/0182447 to Gabay entitled: "Methods, Circuits, Devices, Apparatuses and Systems for Providing Image Composition Rules, Analysis and Improvement", an approach for providing device angle image correction where an image (e.g., still or moving) of a subject is captured via a camera of a mobile device is described in U.S. Patent Application Publication No. 2013/0063538 to Hubner et al., entitled: "Method and Apparatus for Providing Device Angle Image Correction", an apparatus and an associated method that facilitate capturing an image in an electronic camera with the image being completely focused are described in U.S. Patent Application Publication No. 2012/0086847 to Foster entitled: "Convergence Feedback Indicator, Provided When Taking a Picture in a Camera Application", a method for providing real-time feedback of an estimated quality of a captured final image including calculating a quality score of a preliminary obtained image is described in U.S. Patent Application Publication No. 2014/0050367 to CHEN et al., entitled: "Smart Document Capture Based on Estimated Scanned-Image Quality", and methods and systems for determining augmentability information associated with an image frame captured by a digital imaging part of a user device are described in PCT International Application Publication No. WO2013/044983 to Hofmann et al., entitled: "Feedback to User for Indicating Augmentability of an Image", which are all incorporated in their entirety for all purposes as if fully set forth herein.

Further, a digital image acquisition system that includes a portable apparatus for capturing digital images and a digital processing component for detecting, analyzing, invoking subsequent image captures, and informing the photographer regarding motion blur, and reducing the camera motion blur in an image captured by the apparatus, is described in U.S. Pat. No. 8,244,053 entitled: "Method and Apparatus for Initiating Subsequent Exposures Based on Determination of Motion Blurring Artifacts", and in U.S. Pat. No. 8,285,067 entitled: "Method Notifying Users Regarding Motion Artifacts Based on Image Analysis", both to Steinberg et al. which are both incorporated in their entirety for all purposes as if fully set forth herein.

Furthermore, a camera that has the release button, a timer, a memory and a control part, and the timer measures elapsed time after the depressing of the release button is released, used to prevent a shutter release moment to take a good picture from being missed by shortening time required for focusing when a release button is depressed again, is described in Japanese Patent Application Publication No. JP2008033200 to Hyo Hana entitled: "Camera", a through image that is read by a face detection processing circuit, and the face of an object is detected, and is detected again by the face detection processing circuit while half pressing a shutter button, used to provide an imaging apparatus capable of photographing a quickly moving child without fail, is described in a Japanese Patent Application Publication No. JP2007208922 to Uchida Akihiro entitled: "Imaging Apparatus", and a digital camera that executes image evaluation processing for automatically evaluating a photographic image (exposure condition evaluation, contrast evaluation, blur or focus blur evaluation), and used to enable an image photographing apparatus such as a digital camera to automatically correct a photographic image, is described in Japanese Patent Application Publication No. JP2006050494 to Kita Kazunori entitled: "Image Photographing Apparatus", which are all incorporated in their entirety for all purposes as if fully set forth herein.

Head Pose. Various systems and methods are known for estimating the head pose using a digital camera. A method for head pose estimation based on including receiving block motion vectors for a frame of video from a block motion estimator, selecting a block for analysis, determining an average motion vector for the selected block, and estimating the orientation of the user head in the video frame based on the accumulated average motion vector is described in U.S. Pat. No. 7,412,077 to Li et al., entitled: "Apparatus and Methods for Head Pose Estimation and Head Gesture Detection", methods for generating a low dimension pose space and using the pose space to estimate head rotation angles of a user's head are described in U.S. Pat. No. 8,687,880 to Wei et al., entitled: "Real Time Head Pose Estimation", techniques for performing accurate and automatic head pose estimation, integrated with a scale-invariant head tracking method based on facial features detected from a located head in images are described in U.S. Pat. No. 8,781,162 to Zhu et al., entitled: "Method and System for Head Tracking and Pose Estimation", a three-dimensional pose of the head of a subject determined based on depth data captured in multiple images is described in U.S. Patent Application Publication No. 2012/0293635 to Sharma et al., entitled: "Head Pose Estimation Using RGBD Camera", and a device and method for estimating head pose and obtaining an excellent head pose recognition result free from the influence of an illumination change, the device including a head area extracting unit, a head pitch angle unit, a head yaw unit, and a head pose displaying unit, is disclosed in U.S. Patent Application Publication No. 2014/0119655 to LIU et al., entitled: "Device and Method for Estimating Head Pose", which are all incorporated in their entirety for all purposes as if fully set forth herein.

Further head pose techniques are described in IEEE Transaction on Pattern Analysis and Machine Intelligence published 2008 (Digital Object Identifier 10.1109/TPAMI.2008.106) by Erik Murphy-Chutorian and Mohan Trivedi entitled: "*Head Pose Estimation in Computer Vision: A Survey*", and in an article by Xiangxin Zhu and Deva Ramanan of the University of California, Irvine, entitled: "*Face detection, Pose Estimation, and Landmark Localization in the Wild*", which are both incorporated in their entirety for all purposes as if fully set forth herein. Further head-pose and eye-gaze information and techniques are described in a book by Jian-Gang Wang entitled: "*Head-Pose and Eye-Gaze estimation: With Use of Face Domain knowledge*" (ISBN-13: 978-3659132100).

Measuring the eye gaze using a monocular image that zooms in on only one eye of a person is described in an article published in Proceedings of the Ninth IEEE International Conference on Computer Vision (ICCV 2003) by Jian-Gang Wang, Eric Sung, and Ronda Venkateswarlu, all of Singapore, entitled: "*Eye Gaze Estimation from a Single Image of One Eye*", and an Isophote Curvature method employed to calculate the location of irises center using faces in images from camera detected by Haar-like feature is described in a paper published in the International Symposium on Mechatronics and Robotics (Dec. 10, 2013, HCMUT, Viet Nam), by Dinh Quang Tri, Van Tan Thang, Nguyen Dinh Huy, and Doan The Thao of the University of Technology, HoChin Minh, Viet Nam, entitled: "*Gaze Estimation with a Single Camera based on an ARM-based Embedded Linux Platform*", an approach for accurately measuring the eye gaze of faces from images of irises is described in an article by Jia-Gang Wang and Eric Sung of the Nanyang Technological University, Singapore, entitled: "*Gaze Detection via Images of Irises*", two novel approaches, called the "two-circle" and "one-circle" algorithm respectively, for measuring eye gaze using monocular image that zooms in on two eyes or only one eye of a person are described in a paper by Jian-Gang Wang and Eric Sung of the School of Electrical and Electronic Engineering, Nanyang Technological University, Singapore 639798, entitled: "*Gaze Direction Determination*", ASEF eye locator is described in the web-site: 'github.com/laoyang/ASEF' (preceded by https://), a locating the center of the eye within the area of the pupil on low resolution images using isophrote properties to gain invariance to linear lighting changes is described in a paper published in IEEE Transaction on Pattern Analysis and Machine Intelligence (2011) by Roberto Valenti and Theo Gevers entitled: "*Accurate Eye Center Location through Invariant Isocentric Patterns*", and an approach for accurate and robust eye center localization by using image gradients is described in an article by Fabian Timm and Erhardt Barth entitled: "*Accurate Eye Localisation by Means of Gradients*", which are all incorporated in their entirety for all purposes as if fully set forth herein.

A survey regarding eye tracking and head pose is disclosed in an article published March 2016 in International Journal of Scientific Development and Research (IJSDR) [IJSDR16JE03008] by Rohit, P. Gaur, Krupa, and N. Jariwala, [ISSN: 2455-2631] entitled: "*A Survey on Methods and Models of Eye Tracking, Head Pose and Gaze Estimation*", which is incorporated in its entirety for all purposes as if fully set forth herein.

A method for controlling a zoom mode function of a portable imaging device equipped with multiple camera modules based on the size of an identified user's face or based on at least one of the user's facial features is described in U.S. Patent Application Publication No. 2014/0184854 to Musatenko, entitled: "Front Camera Face Detection for Rear Camera Zoom Function", methods and apparatus for image capturing based on a first camera mounted on a rear side of a mobile terminal and a second camera mounted on the front side of the mobile terminal are described in U.S. Patent Application Publication No. 2014/0139667 to KANG, entitled: "Image Capturing Control Apparatus and Method", a method and device for capturing accurate composition of an intended image/self-image/self-image with surrounding objects, with desired quality or high resolution and quality of the image achieved by using motion sensor/direction sensor/position sensor and by matching minimum number of contrast points are described in PCT International Application Publication No. WO 2015/022700 to RAMSUNDAR SHANDILYA et al., entitled: "A Method for Capturing an Accurately Composed High Quality Self-Image Using a Multi Camera Device", a method and computer program product for remotely controlling a first image capturing unit in a portable electronic device including a first and second image capturing unit, and the device detects and tracks an object via the second capturing unit and detects changes in an area of the object are described in U.S. Patent Application Publication No. 2008/0212831 to Hope, entitled: "Remote Control of an Image Capturing Unit in a Portable Electronic Device", methods and devices for camera aided motion direction and speed estimation of a mobile device based on capturing a plurality of images that represent views from the mobile device and adjusting perspectives of the plurality of images are described in U.S. Patent Application Publication No. 2014/0226864 to Subramaniam Venkatraman et al., entitled: "Camera Aided Motion Direction and Speed Estimation", and a smart mobile phone with a front camera and a back camera where the position coordinates of pupil centers in the front camera reference system, when the mobile device holder watches a visual focus on a display screen are collected through the front camera, is described in the Abstract of Chinese Patent Application Publication No. CN 103747183 Huang Hedong, entitled: "Mobile Phone Shooting Focusing Method", which are all incorporated in their entirety for all purposes as if fully set forth herein.

Auto focus. An automatic focus (a.k.a. autofocus or AF) optical system uses a sensor, a control system and a motor or tunable optical element to focus on an automatically or manually selected point or area. An electronic rangefinder has a display instead of the motor; the adjustment of the optical system has to be done manually until indication. Autofocus methods are distinguished by their type as being either active, passive or hybrid variants. Autofocus systems rely on one or more sensors to determine correct focus, where some AF systems rely on a single sensor, while others use an array of sensors. Most modern SLR cameras use through-the-lens optical AF sensors, with a separate sensor array providing light metering, although the latter can be programmed to prioritize its metering to the same area as one or more of the AF sensors. Through-the-lens optical autofocusing is often speedier and more precise than can be achieved manually with an ordinary viewfinder, although a more precise manual focus may be achieved with special accessories, such as focusing magnifiers. Autofocus accuracy within ⅓ of the depth of field (DOF) at the widest aperture of the lens is common in professional AF SLR cameras.

Most multi-sensor AF cameras allow manual selection of the active sensor, and many offer automatic selection of the sensor using algorithms, which attempt to discern the location of the subject. Some AF cameras are able to detect whether the subject is moving towards or away from the camera, including speed and acceleration data, keep focus on the subject, and is used mainly in sports and other action photography. The data collected from AF sensors is used to control an electromechanical system that adjusts the focus of the optical system. A variation of autofocus is an electronic rangefinder, a system in which focus data are provided to the operator, but adjustment of the optical system is still performed manually. The speed of the AF system is highly dependent on the maximum aperture offered by the lens. F-stops of around f/2 to f/2.8 are generally considered optimal in terms of focusing speed and accuracy. Faster lenses than this (e.g., f/1.4 or f/1.8) typically have very low depth of field, meaning that it takes longer to achieve correct focus, despite the increased amount of light.

Active AF systems measure distance to the subject independently of the optical system, and subsequently adjust the optical system for correct focus. There are various ways to measure distance, including ultrasonic sound waves and infrared light. In the first case, sound waves are emitted from the camera, and by measuring the delay in their reflection, distance to the subject is calculated. An exception to the two-step approach is the mechanical autofocus provided in some enlargers, which adjust the lens directly.

Passive AF systems determine correct focus by performing passive analysis of the image that is entering the optical system. They generally do not direct any energy, such as ultrasonic sound or infrared light waves, toward the subject. However, an autofocus assist beam of usually infrared light is required when there is not enough light to take passive measurements. Passive autofocusing can be achieved by phase detection or contrast measurement.

Shutter button. A shutter-release button (sometimes just shutter release or shutter button) is a push-button found on many cameras, used to take a picture when pushed. When pressed, the shutter of the camera is "released", so that it opens to capture a picture, and then closes, allowing an exposure time as determined by the shutter speed setting (which may be automatic). The term "release" comes from old mechanical shutters that were "cocked" or "tensioned" by one lever, and then "released" by another. In modern or digital photography, this notion is less meaningful, so the term "shutter button" is more used.

Distance meter. In many trades and industries there is a need for fast and accurate non-contact distance measuring tool. For example, in the construction industry and trades, distance meters (also known as range-finders) are commonly used for many applications as a substitute to the old-fashioned contact-based tape measure, providing speed, accuracy, versatility, convenience, and functionality. Laser distance-measuring devices are widely used in a variety of applications, such as power engineering, hydraulic engineering, architecture, geographic investigation, and athletic ranging, for measuring distance between two stationary objects. By way of example, measurement of wall length is a common requirement for real estate agents, carpenters, carpet layers, painters, architects, interior decorators, builders and others who need to know interior wall dimensions in their respective professions.

Various applications of distance meters are described in Application Note by Fluke Corporation (5/2012, 3361276C_EN) entitled: "101 *applications for laser distance meters*", which is incorporated in its entirety for all purposes as if fully set forth herein. Other Applications include surveying, navigation, to permit focus in photography, choosing a golf club according to distance, and correcting aim of a projectile weapon for distance. A device that measure distance from the observer to a target is commonly referred to as a rangefinder. Distance measuring devices may use active methods to measure (such as ultrasonic ranging module, laser rangefinder, radar distance measurement), while others measure distance using trigonometry (stadiametric rangefinders and parallax, or coincidence, rangefinders). In a typical use of a rangefinder for golf, one will aim the reticle at the flagstick and press a button to get the yardage. Users of firearms use long distance rangefinders to measure the distance to a target in order to allow for projectile drop. Rangefinders are also used for surveying in forestry, where special devices with anti-leaf filters are used.

Typical block diagram 20 of a non-contact active distance meter 22 is schematically shown in FIG. 2. The general distance meter 22 transmits an over-the-air propagating signal, which may be an electromagnetic wave (such as microwave, radar, or millimeter wave), a visible or non-visible (such as infrared or ultraviolet) light beam, or acoustic wave, such as audible or non-audible sound. The wave is emitted by the emitter 24a and is propagating over the air, schematically shown as a dashed line 26a, and upon hitting on a surface A 28, is backscattered or reflected back (for example, by using an appropriate reflector) from a point 23 (or small area), schematically shown as a dashed line 26b, and detected or sensed by the sensor 24b. The reflected beam 26b at the location or point 23 may be a result of a diffused (or omni-directional) reflection of the incident beam 26a, a result of a reflection in an angle that is equal to the angle of incidence (mirror-like reflection) as shown in the arrangement 20, or may be a result of a retroreflection where the beam 26b is reflected (or backscattered) in the same direction from which the incident beam 26a came. The transmitter or driver 27a drives the emitter 24a, and the sensor 24b output signal is processed or manipulated by the receiver 27b. A correlator 29 stimulates the driver 27a and controls the transmitted wave by the emitter 24a, and receives the receiver 27b output indicating the intercepted wave by the sensor 24b. By correlating the received signal to the transmitted signal, the correlator 29 may estimate, measure, or calculate the distance from the emitter 24a/sensor 24b set to the surface A 28, and the estimated distance is provided to the output block 25 for signaling the distance to a user or for sending the reading to another unit.

Any element designed for, or capable of directly or indirectly affecting, changing, producing, or creating a propagating phenomenon, such as propagating waves (over the air, liquid, or solid material) or any other physical phenomenon under an electric signal control may be used as the emitter 24a. Typically, a sensor 24b may be used to sense, detect, or measure the phenomenon affected, or propagated, by the emitter 24a. The emitter 24a may affect the amount of a property, or of a physical quantity or the magnitude relating to a physical phenomenon, body or substance. Alternatively or in addition, the emitter 24 may be used to affect the time derivative thereof, such as the rate of change of the amount, the quantity or the magnitude. In the case of space related quantity or magnitude, an actuator may affect the linear density, surface density, or volume density, relating to the amount of property per volume. Alternatively or in addition, emitter 24a may affect the flux (or flow) of a property through a cross-section or surface boundary, the flux density, or the current. In the case of a scalar field, the emitter 24a may affect the quantity gradient. The emitter 24a may affect the amount of property per unit mass or per mole of substance. A single emitter 24a may be used to measure two or more phenomena.

The emitter 24a input signal, the sensor 24b output signal, or both may be conditioned by a signal conditioning circuit. The signal conditioner may involve time, frequency, or magnitude related manipulations, typically adapted to optimally operate, activate, or interface the emitter 24a or the sensor 24b. A signal conditioner 27aa may be used for conditioning the signal driving or controlling the emitter 24a, and a signal conditioner 27ba may be used for conditioning the signal received from the sensor 24b, as part of a distance meter 22a shown in an arrangement 20a in FIG. 2a. The driver (or transmitter) 27a may be used in addition to, or as part of, signal conditioner 27aa, and the receiver (or amplifier) 27b may be used in addition to, or as part of, signal conditioner 27ba. The signal conditioner 27aa or 27ba (or both) may be linear or non-linear, and may include an operation or an instrument amplifier, a multiplexer, a frequency converter, a frequency-to-voltage converter, a voltage-to-frequency converter, a current-to-voltage converter, a current loop converter, a charge converter, an attenuator, a sample-and-hold circuit, a peak-detector, a voltage or current limiter, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a de-compressor, a coder (or decoder), a modulator (or demodulator), a pattern recognizer, a smoother, a noise remover, an average or RMS circuit, or any combination thereof. In the case of analog sensor 24b, an Analog-to-Digital (A/D) converter may be used to convert the conditioned sensor output signal to a digital sensor data. In the case of analog emitter 24a, a Digital-to-Analog (D/A) converter may be used to convert the conditioned sensor output signal to a digital sensor data. The signal conditioner 27aa or 27ba may include a computer for controlling and managing the unit operation, processing the sensor 24b data or the emitter 24a driving data.

The signal conditioner 27aa or 27ba (or both) may use the any one of the schemes, components, circuits, interfaces, or manipulations described in an handbook published 2004-2012 by Measurement Computing Corporation entitled: "*Data Acquisition Handbook—A Reference For DAQ And Analog & Digital Signal Conditioning*", which is incorporated in its entirety for all purposes as if fully set forth herein. Further, the conditioning may be based on the book entitled: "*Practical Design Techniques for Sensor Signal Conditioning*", by Analog Devices, Inc., 1999 (ISBN-0-916550-20-6), which is incorporated in its entirety for all purposes as if fully set forth herein.

The correlator 29 is typically implemented using one of four predominant methods for active distance measurement: interferometric, triangulation, pulsed time-of-flight (TOF), and phase measuring. Interferometric methods may result in accuracies of less than one micrometer over ranges of up to several millimeters, while triangulation techniques may result in devices with accuracy in the micrometer range, but may be limited to measure distances out to several inches. Various techniques that may be used by the correlator 29 are described in a paper by Shahram Mohammad Nejad and Saeed Olyaee published in the Quarterly Journal of Technology & Education Vol. 1, No. 1, Autumn 2006, entitled: "*Comparison of TOF, FMCW and Phase-Shift Laser Range-Finding Methods by Simulation and Measurement*", which is incorporated in its entirety for all purposes as if fully set forth herein.

Reflection (or backscattering) is the change in direction of a wavefront at an interface between two different media, so that the wavefront returns into the medium from which it originated. Common examples include the reflection of light, sound, and water waves, and the law of reflection is that for specular reflection the angle at which the wave is incident on the surface equals the angle at which it is reflected.

In one example, a single component, typically a transducer is used as both the emitter 24a and the sensor 24b. During transmission, the transducer serves as the emitter 24a and is coupled to the transmission path (such as to the signal conditioner 27aa) to emit the incident wave signal 26a. During reception, the transducer serves as the sensor 24b and is coupled to the reception path (such as to the signal conditioner 27ba) to sense or detect the reflected (or back-scattered) wave signal 26b. Typically a duplexer is connected between the transducer, the transmission path (such as to the signal conditioner 27aa), and the reception path (such as to the signal conditioner 27ba). The duplexer is typically an electronic component or circuit that allows for a bi-directional (duplex) connection to the transducer to be shared by the transmission and the reception paths, while providing isolation therebetween. The duplexer may be based on frequency, commonly by using filters (such as a waveguide filter), on polarization (such as an orthomode transducer), or timing. The duplexer is designed for operation in the frequency band or bands used by both the transmission and the reception paths, and is capable of handling the output power of the transmitter that is provided to the transducer. Further, the duplexer provides a rejection of the transmitter noise occurring at a receive frequency during reception time, and further provides an isolation of the reception path from the transmitted power or transmission path in order to minimize desensitization or saturation of the reception path or components therein.

In one example, a distance meter uses a radar. A horn antenna is serving as the transducer and is used for both transmitting and receiving electro-magnetic microwave signals, and the duplexer is implemented as a circulator. The circulator may be a passive non-reciprocal three-port device, in which a microwave or radio frequency signal entering any port is transmitted to the next port in rotation (only). A port in this context is a point where an external waveguide or transmission line (such as a microstrip line or a coaxial cable), connects to the device. For a three-port circulator, a signal applied to port 1 only comes out of port 2; a signal applied to port 2 only comes out of port 3; a signal applied to port 3 only comes out of port 1. The circulator is used as a type of duplexer, to route signals from the transmitter to the antenna and from the antenna to the receiver, without allowing signals to pass directly from transmitter to receiver. The circulator may be a ferrite circulator or a non-ferrite circulator. Ferrite circulators are composed of magnetized ferrite materials, and are typically 3-port "Y-junction" based on cancellation of waves propagating over two different paths near a magnetized material. Waveguide circulators may be of either type, while the 3-port type are more compact and are based on striplines. A permanent magnet may be used to produce the magnetic flux through the waveguide. Ferrimagnetic garnet crystal is used in optical circulators. Passive circulators are described in an application note AN98035 released Mar. 23, 1998 by Philips Semiconductors N.V. entitled: "*Circulators and Isolators, unique passive devices*", which is incorporated in its entirety for all purposes as if fully set forth herein. The circulator may consist of, comprise, use, or be based on, a phase shift circulator, a Faraday rotation circulator, a ring circulator, a junction circulator, an edge guided mode circulator, or a lumped element circulator.

Laser. A laser (an acronym for "Light Amplification by Stimulated Emission of Radiation") is a technology or device that emits light through a process of optical amplification based on the stimulated emission of electromagnetic radiation, where the term "light" includes electromagnetic radiation of any frequency, not only visible light, such as infrared laser, ultraviolet laser, or X-ray laser. A laser differs from other sources of light in that it emits light coherently. Spatial coherence allows a laser to be focused to a tight spot, and further allows a laser beam to stay narrow over great distances (collimation), enabling applications such as laser pointers. Lasers can also have high temporal coherence, which allows them to emit light with a very narrow spectrum, i.e., they can emit a single color of light. Temporal coherence can be used to produce pulses of light as short as a femtosecond. Lasers are distinguished from other light sources by their coherence. Spatial coherence is typically expressed through the output being a narrow beam, which is diffraction-limited. Laser beams can be focused to very tiny spots, achieving a very high irradiance, or they can have very low divergence in order to concentrate their power at a great distance.

Temporal (or longitudinal) coherence implies a polarized wave at a single frequency whose phase is correlated over a relatively great distance (the coherence length) along the beam. A beam produced by a thermal or other incoherent light source has an instantaneous amplitude and phase that vary randomly with respect to time and position, thus having a short coherence length. Lasers are commonly characterized according to their wavelength in a vacuum, and most "single wavelength" lasers actually produce radiation in several modes having slightly differing frequencies (wavelengths), often not in a single polarization. Although temporal coherence implies monochromaticity, there are lasers that emit a broad spectrum of light or emit different wavelengths of light simultaneously. There are some lasers that are not single spatial mode and consequently have light beams that diverge more than is required by the diffraction limit. However, all such devices are classified as "lasers" based on their method of producing light, i.e., stimulated emission. Lasers are typically employed in applications where light of the required spatial or temporal coherence could not be produced using simpler technologies.

In one example, distance measuring is based on the electro-optical techniques, where the measuring uses light waves, where the transmitted beam 26a and the reflected (or backscattered) beams 26b are visible or non-visible light beams. A laser technology may be used, wherein laser technology or device involves generating an intense beam of coherent monochromatic light (or other electromagnetic radiation) by stimulated emission of photons from excited atoms or molecules. In such optical measuring technique, the emitter 24a is typically a laser diode 24aa and the sensor 24b is an optical pick-up sensor, such as a photo-diode 24ba, both parts of an optical-based distance meter 22b, schematically described in an arrangement 20b in FIG. 2b. Alternatively or in addition, the emitter 24a may be a gas, chemical, or excimer laser based. A laser diode driver (such as the driver 27a) and associated circuitry may be based on an iC-Haus GmBH white-paper 08-2013 entitled: "*Design and Test of fast Laser Driver Circuits*", which is incorporated in its entirety for all purposes as if fully set forth herein. Laser ranging is described in 2001 Society of Photo-Optical Instrumentation Engineers paper (Opt. Eng. 40(1) 10-19 (January 2001), 0091-3286/2001) by Markus-Christian Amann et al. entitled: "*Laser ranging. a critical review of usual techniques for distance measurements*", which is incorporated in its entirety for all purposes as if fully set forth herein. Various optical components for beam shaping, deflection, or filtering such as lenses, wavelength filters, or mirrors may be provided and positioned as part of the optical transmission path or the optical reception path, or both.

Reflection of light is either specular (mirror-like), backscattered, or diffused (retaining the energy, but losing the image) depending on the nature of the interface. In specular reflection the phase of the reflected (or backscattered) waves depends on the choice of the origin of coordinates, but the relative phase between s and p (TE and TM) polarizations is fixed by the properties of the media and of the interface between them. A mirror provides the most common model for specular light reflection, and typically consists of a glass sheet with a metallic coating where the reflection actually occurs. Reflection is commonly enhanced in metals by suppression of wave propagation beyond their skin depths. Reflection also occurs at the surface of transparent media, such as water or glass. In fact, reflection of light may occur whenever light travels from a medium of a given refractive index into a medium with a different refractive index. In the most general case, a certain fraction of the light is reflected from the interface, and the remainder is refracted. Solving Maxwell's equations for a light ray striking a boundary allows the derivation of the Fresnel equations, which can be used to predict how much of the light is reflected (or backscattered), and how much is refracted in a given situation. This is analogous to the way impedance mismatch in an electric circuit causes reflection of signals. Total internal reflection of light from a denser medium occurs if the angle of incidence is above the critical angle. When light reflects off a material denser (with higher refractive index) than the external medium, it undergoes a polarity inversion. In contrast, a less dense, lower refractive index material will reflect light in phase.

When light strikes the surface of a (non-metallic) material it bounces off in all directions due to multiple reflections by the microscopic irregularities inside the material (e.g., the grain boundaries of a polycrystalline material, or the cell or fiber boundaries of an organic material) and by its surface, if it is rough. Thus, an 'image' is not formed, and this is called diffuse reflection. The exact form of the reflection depends on the structure of the material. One common model for diffuse reflection is Lambertian reflectance, in which the light is reflected with equal luminance (in photometry) or radiance (in radiometry) in all directions, as defined by Lambert's cosine law. The light sent to our eyes by most of the objects we see is due to diffuse reflection from their surface, so that this is our primary mechanism of physical observation. Various laser wavelengths and technologies are described in a book by Marvin J. Weber of Lawrence Berkeley National Laboratory published 1999 by CRC Press LLC (ISBN: 0-8493-3508-6) entitled: "*Handbook of Laser Wavelengths*", which is incorporated in its entirety for all purposes as if fully set forth herein.

A device for measuring distance with a visible measuring beam generated by a semiconductor laser is described in U.S. Pat. No. 5,949,531 to Ehbets et al. entitled: "Device for Distance Measurement", which is incorporated in its entirety for all purposes as if fully set forth herein. The device has a collimator object lens to collimate the measuring beam towards the optical axis of the collimator object lens, an arrangement to modulate the measuring radiation, a reception object lens to receive and image the measuring beam reflected (or backscattered) from a distant object on a receiver, a switchable beam deflection device to generate an internal reference path between the semiconductor laser and the receiver and an electronic evaluation device to find and display the distance measured from the object. According to the invention, the receiver contains a light guide with a downstream opto-electronic transducer, in which the light guide inlet surface is arranged in the imaging plane of the reception object lens for long distances from the object and can be controllably moved from this position transversely to the optical axis. In an alternative embodiment, the light inlet surface is fixed and there are optical means outside the optical axis of the reception object lens, which for short object distances, deflect the imaging position of the measuring beam to the optical axis of the reception object lens. The measuring radiation is pulse modulated with excitation pulses with a pulse width of less than two nanoseconds.

A distance-measuring instrument is described in U.S. Pat. No. 8,736,819 to Nagai entitled: "Distance Measuring Instrument", which is incorporated in its entirety for all purposes as if fully set forth herein. The instrument comprising a light emitting unit for emitting a distance measuring light, a photodetecting unit for receiving and detecting a reflected distance measuring light from an object to be measured and a part of the distance measuring light emitted from the light emitting unit as an internal reference light, a sensitivity adjusting unit for electrically adjusting photodetecting sensitivity of the photodetecting unit, and a control arithmetic unit for calculating a measured distance based on a photodetection signal of the reflected distance measuring light from the photodetecting unit and based on a photodetection signal of the internal reference light, wherein the control arithmetic unit can measure a distance by selecting a prism mode measurement and a non-prism mode measurement, and controls so that photodetecting sensitivity of the photodetecting unit is changed by the sensitivity adjusting unit in response to the selected measurement mode.

A system and a method for acquiring a detected light optical signal and generating an accumulated digital trace are described in U.S. Pat. No. 8,310,655 to Mimeault entitled: "Detection and Ranging Methods and Systems", which is incorporated in its entirety for all purposes as if fully set forth herein. The method comprises providing a light source for illumination of a field of view, an optical detector, an analog-to-digital converter (ADC), emitting one pulse from the light source in the field of view, detecting a reflection signal of the pulse by the optical detector, acquiring j points for the detected reflection signal by the ADC, storing, in a buffer, the digital signal waveform of j points, introducing a phase shift of 2pi/P, repeating, P times, the steps of emitting, detecting, acquiring, storing and introducing, to store, in the buffer, an interleaved waveform of P×j points, accumulating M traces of interleaved P×j points for a total of N=M×P acquisition sets, N being a total number of pulses emitted, creating one combined trace of the reflected signal of j×P points by adding each point of the M traces Additionally, the combined trace can be compared to a detected reference reflection signal of the pulse to determine a distance traveled by the pulse An optoelectronic distance-measuring device is disclosed in U.S. Pat. No. 9,103,669 to Giacotto et al. entitled: "Distance Measuring Device", which is incorporated in its entirety for all purposes as if fully set forth herein. The device has a transmitting unit with a driver stage for emitting optical pulses, a receiving unit for receiving a portion of the optical pulses, said portion being reflected from a target object, and converting it into an electrical reception signal, via a photosensitive electrical component. It also has an analog-digital converter for digitizing the reception signal, and an electronic evaluation unit to ascertain a distance from the target object based on a signal propagation time using the digitized reception signal. The driver stage can be designed so that at least two pulse durations of different length for the optical pulses can be set.

A laser speed detector is described in U.S. Pat. No. 5,359,404 to Dunne entitled: "Laser-Based Speed Measuring Device", which is incorporated in its entirety for all purposes as if fully set forth herein. The detector includes a laser rangefinder, which determines the time-of-flight of an infrared laser pulse to a target and a microprocessor-based microcontroller. The device is small enough to be easily hand-held, and includes a trigger and a sighting scope for a user to visually select a target and to trigger operation of the device upon the selected target. The laser rangefinder includes self-calibrating interpolation circuitry, a digital logic-operated gate for reflected laser pulses in which both the "opening" and the "closing" of the gate can be selectably set by the microcontroller, and dual collimation of the outgoing laser pulse such that a minor portion of the outgoing laser pulse is sent to means for producing a timing reference signal.

A method for detecting an object using visible light comprises providing a visible-light source having a function of illuminating an environment is described in U.S. Pat. No. 8,319,949 to Cantin et al. entitled: "Method for Detecting Objects with Visible Light", which is incorporated in its entirety for all purposes as if fully set forth herein. The visible-light source is driven to emit visible light in a predetermined mode, with visible light in the predetermined mode being emitted such that the light source maintains said function of illuminating an environment. A reflection/backscatter of the emitted visible light is received from an object. The reflection/backscatter is filtered over a selected wavelength range as a function of a desired range of detection from the light source to obtain a light input. The presence or position of the object is identified with the desired range of detection as a function of the light input and of the predetermined mode.

A laser based range finder which may be inexpensively produced yet provides highly accurate precision range measurements is described in U.S. Pat. No. 5,652,651 to Dunne entitled: "Laser Range Finder Having Selectable Target Acquisition Characteristics and Range Measuring Precision", which is incorporated in its entirety for all purposes as if fully set forth herein. The finder has a number of user selectable target acquisition and enhanced precision measurement modes, which may viewed on an in-sight display during aiming and operation of the instrument. Extremely efficient self-calibrating precision timing and automatic noise threshold circuits incorporated in the design provide a compact, low-cost, highly accurate and reliable ranging instrument for a multitude of uses and is adaptable for both recreational and laser based "tape measure" applications.

An apparatus for optical distance measurement is described in U.S. Pat. No. 6,801,305 to Stierle et al. entitled: "Device for Optically Measuring Distances", which is incorporated in its entirety for all purposes as if fully set forth herein. The apparatus is having a transmitter unit for emitting optical radiation, in particular laser radiation, in the direction of a target object; having a receiver unit for receiving the radiation reflected by the target object; and having a control and evaluation unit for ascertaining the distance between the apparatus and the target object, and also having at least one optical means for beam guidance. It is proposed that the relative position of the at least one optical means and the light source of the apparatus to one another be variable.

A high precision laser range finder is described in U.S. Pat. No. 6,501,539 to Chien et al. entitled: "High Precision Laser Range Finder with an Automatic Peak Control Loop", which is incorporated in its entirety for all purposes as if fully set forth herein. The high precision laser range finder comprises an APC loop for eliminating a timing jitter problem due to different reflections on a target. The APC loop comprises a laser receiver, a peak holding circuit, an integrator and a high voltage generator. The peak holding circuit is connected with the laser receiver for detecting a signal strength outputted from the laser receiver. The high voltage generator provides the laser driver and laser receiver with voltage to control the strength of the emitted laser pulse signal of the laser driver and the gain of the avalanche photo-detector. The integrator is used to eliminate the steady error in the APC loop. Furthermore, a time to amplitude converting circuit comprises an AJD converter for obtaining a distance data and then filtering in a microprocessor to increase the measurement accuracy.

A distance-measuring system is described in U.S. Pat. No. 7,196,776 to Ohtomo et al. entitled: "Distance-Measuring System", which is incorporated in its entirety for all purposes as if fully set forth herein. The system comprises a light source unit for emitting a distance-measuring light, a photodetection optical system having a photodetection optical axis, a projecting optical system having a projecting light optical axis and for projecting the distance-measuring light from the light source unit to an object to be measured and for guiding the distance-measuring light reflected from the object to be measured toward the photodetection optical system, and an internal reference optical system for guiding the distance-measuring light from the light source unit to the photodetection optical system as an internal reference light, wherein the light source unit can emit two distance-measuring lights with different spreading angles, and one of the light source unit and the projection optical system has a decentering member for decentering the distance-measuring light with respect to the projecting light optical axis.

An optoelectronic laser distance-measuring instrument with preselectable or sensitive reference points arranged on the outer edge of a portable housing is described in U.S. Pat. No. 6,624,881 to Waibel et al. entitled: "Optoelectronic Laser Distance-Measuring", which is incorporated in its entirety for all purposes as if fully set forth herein. The device comprises a microcontroller, a non-erasable memory, a mass memory, a keypad, a display, a radiation source, and a radiation receiver. The microcontroller controls the radiation source to emit a modulated laser beam. The laser beam is received by the radiation receiver after being reflected by a target object, and is modulated by the microcontroller. The time that the laser beam takes during the journey is recorded, and is multiplied by a propagation velocity of the laser beam to determine the distance that the device is distant from the target object. Data of measurement are stored in the mass memory, and the result is shown on the display. In addition, operation modes and correction algorithms, which are stored in the non-erasable memory, can be selected through the keypad for desired result of measurement. Although the conventional laser distance-measuring device can measure a straight distance of an object from the device, it has difficulty to measure a distance between two spaced points, which often happens in the fields of architecture and construction. For example, workers usually need to measure the height of a wall, a tree, or a building.

Apparatus and method are provided in U.S. Pat. No. 6,876,441 to Barker entitled: "Optical Sensor for Distance Measurement", which is incorporated in its entirety for all purposes as if fully set forth herein, for distance measurement to a remote surface using high frequency modulated transmitted and reflected laser beams and phase-shift calculations. To improve phase-shift resolution, the reflected bean is further modulated, before detection, at a high frequency similar yet different from that of the transmitted beam so as create a resulting detector signal having at least a lower frequency signal, which is easily detected by a response-limited detector. The lower frequency signal retains the phase-shift information and thus enables determination of the phase-shift information with stable, inexpensive low-frequency optical detectors. Three-dimensional mapping can performed wherein one or more apparatus employ a plurality of detectors or a scanner that produce a plurality of sequential reflected beams, each of which results in a plurality of phase-shift information for an area on the surface.

A rangefinder for measuring a distance of an object is described in U.S. Pat. No. 8,970,824 to Chang et al. entitled: "Rangefinder", which is incorporated in its entirety for all purposes as if fully set forth herein. The rangefinder includes a case, in which a refractor, a measuring light source, a light receiver, a receiving lens, a reference light source, and a reflector are provided. The measuring light source emits measuring light to the refractor, and the refractor refracts the measuring light to the object. The measuring light reflected by the object emits to the light receiver through the receiving lens. The reference light emits reference light to the reflector, and the reflector reflects the reference light to the light receiver. The refractor and the reflector may be turned for calibration.

Alternatively or in addition to laser diode, the optical emitter 24aa may use a visible or non-visible Light-Emitting Diode (LED). A circuit and apparatus for generating a light pulse from an inexpensive light-emitting diode (LED) for an accurate distance measurement and ranging instrument is described in U.S. Pat. No. 6,043,868 to Dunne entitled: "Distance Measurement and Ranging Instrument Having a Light Emitting Diode-Based Transmitter", which is incorporated in its entirety for all purposes as if fully set forth herein. The instrument comprises an LED and a firing circuit. An optional pre-biasing circuit provides a reverse-bias signal to the LED to ensure the LED does not begin to emit light before a firing circuit can provide a sufficiently high current pulse of short duration as a forward current through the LED. The LED is driven by the firing circuit with a pulse of high peak power and short duration. The resulting light pulse from the LED can be inexpensively used to derive distance and ranging information for use in a distance measurement and ranging device.

A Light-Emitting Diode (LED) is a semiconductor light source, based on the principle that when a diode is forward-biased (switched on), electrons are able to recombine with electron holes within the device, releasing energy in the form of photons. This effect is called electroluminescence and the color of the light (corresponding to the energy of the photon) is determined by the energy gap of the semiconductor. Conventional LEDs are made from a variety of inorganic semiconductor materials, such as Aluminum Gallium Arsenide (AlGaAs), Gallium Arsenide Phosphide (GaAsP), Aluminum gallium indium phosphide (AlGaInP), Gallium (III) Phosphide (GaP), Zinc Selenide (ZnSe), Indium Gallium Nitride (InGaN), and Silicon Carbide (SiC) as substrate.

Optical-based distance measurement is described in a dissertation by Robert Lange submitted June 28, 200 to the Department of Electrical Engineering and Computer Science at University of Siegen entitled "3D Time-of-flight Measurement with Custom Solid-State Image Sensors in CMOS/CCD-Technology", which is incorporated in its entirety for all purposes as if fully set forth herein. An example of a laser-based distance meter is a distance sensor P/N VDM28-15-L/73c/136 available from PEPPERL+ FUCHS Group headquartered in Germany and described in a data sheet numbered 243003_eng.xml issued 2014 Oct. 24, which is incorporated in its entirety for all purposes as if fully set forth herein. Noncontact optical sensing techniques that may be used to measure distance to objects, and related parameters such as displacements, surface profiles, velocities and vibrations are described in an article by Garry Berkovic and Ehud Shafir published in Advances in Optics and Photonics 4, 441-471 (2012) doi:AOP.4.000441 entitled: "*Optical methods for distance and displacement measurements*", which is incorporated in its entirety for all purposes as if fully set forth herein. Various techniques for laser ranging such as active laser triangulation, pulsed time-of-flight (TOF), phase shift, FMCW, and correlation are described in a paper by Jain Siddharth dated Dec. 2, 2003, entitled: "*A survey of Laser Range Finding*", which is incorporated in its entirety for all purposes as if fully set forth herein.

An example of commercially available laser-based distance meters are Model GLR225-225 Ft. Laser Measure and Model DLR130, both available from Robert Bosch Tool Corporation. Headquartered in Germany, and respectively described in a guide entitled: "*Operating/Safety Instructions—GLR225*" and in a 2009 guide (2609140584 02/09) entitled: "*Operating/Safety Instructions—DLR130*", which are both incorporated in their entirety for all purposes as if fully set forth herein. A laser-based distance meter may consist of, may comprise, or may use a module of LDK Model 2 series available from Egismos Technology Corporation headquartered in Burnaby, B.C. Canada, described in Egismos Technology Corporation document no. EG-QS-T-PM-ST-0001 (dated 2015 Apr. 23) entitled: "*Laser Range Finder—LDK Model 2 Series*", which is incorporated in its entirety for all purposes as if fully set forth herein. Further, a laser-based distance meter may consist of, may comprise, or may use a module of EV-kit available from Egismos Technology Corporation headquartered in Burnaby, B.C. Canada, described in Egismos Technology Corporation form no. DAT-LRM-05 (dated 2014 Jun. 21) entitled: "*Laser Range Finder RS232 EV-kit*", which is incorporated in its entirety for all purposes as if fully set forth herein.

Photosensor. A photosensor (or photodetector) is a sensor of light. A photosensor may be a semiconductor device, such as a photodiode or a phototransistor, and may use the photovoltaic effect of the photoconductive effects.

Photodiode. A photodiode is a semiconductor device that converts light into current, where the current is generated when photons are absorbed in the photodiode. A small amount of current may also be produced when no light is present. Photodiodes may contain optical filters, built-in lenses, and may have large or small surface areas, and usually have a slower response time as their surface area increases. Photodiodes are similar to regular semiconductor diodes except that they may be either exposed (to detect vacuum UV or X-rays) or packaged with a window or optical fiber connection to allow light to reach the sensitive part of the device. Many diodes designed for use specifically as a photodiode use a PIN junction rather than a p-n junction, to increase the speed of response. A photodiode is typically designed to operate in reverse bias.

A photodiode use a p-n junction or PIN structure, and when a photon of sufficient energy strikes the diode, it creates an electron-hole pair. This mechanism is also known as the inner photoelectric effect. If the absorption occurs in the junction depletion region, or one diffusion length away from it, these carriers are swept from the junction by the built-in electric field of the depletion region, and thus holes move toward the anode, and electrons toward the cathode, and a photocurrent is produced. The total current through the photodiode is the sum of the dark current (current that is generated in the absence of light) and the photocurrent, so the dark current must be minimized to maximize the sensitivity of the device.

When used in zero bias or photovoltaic mode, the flow of photocurrent out of the device is restricted and a voltage builds up. This mode exploits the photovoltaic effect, which is the basis for solar cells—a traditional solar cell is just a large area photodiode. In a photoconductive mode, the diode is often reverse biased (with the cathode driven positive with respect to the anode). This reduces the response time because the additional reverse bias increases the width of the depletion layer, which decreases the junction's capacitance. The reverse bias also increases the dark current without much change in the photocurrent. For a given spectral distribution, the photocurrent is linearly proportional to the illuminance (and to the irradiance). Although this mode is faster, the photoconductive mode tends to exhibit more electronic noise. The leakage current of a good PIN diode is so low (<1 nA) that the Johnson-Nyquist noise of the load resistance in a typical circuit often dominates. In addition to emission, an LED can be used as a photodiode in light detection, and this capability may be used in a variety of applications including ambient light detection and bidirectional communications. As a photodiode, an LED is sensitive to wavelengths equal to or shorter than the predominant wavelength it emits. For example, a green LED is sensitive to blue light and to some green light, but not to yellow or red light.

PIN diode. A PIN diode is a diode with a wide, undoped intrinsic semiconductor region between a p-type semiconductor and an n-type semiconductor region. The p-type and n-type regions are typically heavily doped because they are used for ohmic contacts, and the wide intrinsic region is in contrast to an ordinary PN diode. The wide intrinsic region makes the PIN diode an inferior rectifier (one typical function of a diode), but it makes the PIN diode suitable for attenuators, fast switches, photodetectors, and high voltage power electronics applications. A PIN diode operates under what is known as high-level injection. In other words, the intrinsic "i" region is flooded with charge carriers from the "p" and "n" regions. The diode will conduct current once the flooded electrons and holes reach an equilibrium point, where the number of electrons is equal to the number of holes in the intrinsic region. When the diode is forward biased, the injected carrier concentration is typically several orders of magnitude higher than the intrinsic level carrier concentration. Due to this high level injection, which in turn is due to the depletion process, the electric field extends deeply (almost the entire length) into the region. This electric field helps in speeding up of the transport of charge carriers from P to N region, which results in faster operation of the diode, making it a suitable device for high frequency operations. As a photodetector, the PIN diode is reverse biased. Under reverse bias, the diode ordinarily does not conduct (save a small dark current or Is leakage). When a photon of sufficient energy enters the depletion region of the diode, it creates an electron—hole pair. The reverse bias field sweeps the carriers out of the region creating a current. Some detectors can use avalanche multiplication.

Avalanche photodiode. An Avalanche photodiodes have a similar structure to regular photodiodes, but they are operated with much higher reverse bias. This allows each photo-generated carrier to be multiplied by avalanche breakdown, resulting in internal gain within the photodiode, which increases the effective responsivity of the device. An avalanche photodiode (APD) is a highly sensitive semiconductor electronic device that exploits the photoelectric effect to convert light to electricity. APDs can be thought of as photodetectors that provide a built-in first stage of gain through avalanche multiplication. From a functional standpoint, they can be regarded as the semiconductor analog to photomultipliers. By applying a high reverse bias voltage (typically 100-200 V in silicon), APDs show an internal current gain effect (around 100) due to impact ionization (avalanche effect). However, some silicon APDs employ alternative doping and beveling techniques compared to traditional APDs that allow greater voltage to be applied (>1500 V) before breakdown is reached and hence a greater operating gain (>1000). In general, the higher the reverse voltage the higher the gain. If very high gain is needed (105 to 106), certain APDs (single-photon avalanche diodes) can be operated with a reverse voltage above the APD's breakdown voltage. In this case, the APD needs to have its signal current limited and quickly diminished. Active and passive current quenching techniques have been used for this purpose. APDs that operate in this high-gain regime are in Geiger mode. This mode is particularly useful for single photon detection when the dark count event rate is sufficiently low.

Phototransistor. A phototransistor is a light-sensitive transistor. A common type of phototransistor, called a photobipolar transistor, is in essence a bipolar transistor encased in a transparent case so that light can reach the base-collector junction. The electrons that are generated by photons in the base-collector junction are injected into the base, and this photodiode current is amplified by the transistor's current gain β (or hfe). If the emitter is left unconnected, the phototransistor becomes a photodiode. While phototransistors have a higher responsivity for light, they are not able to detect low levels of light any better than photodiodes. Phototransistors also have significantly longer response times. Field-effect phototransistors, also known as photoFETs, are light-sensitive field-effect transistors. Unlike photobipolar transistors, photoFETs control drain-source current by creating a gate voltage.

CMOS. Complementary Metal-Oxide-Semiconductor (CMOS) is a technology for constructing integrated circuits. The typical design style with CMOS uses complementary and symmetrical pairs of p-type and n-type metal oxide semiconductor field effect transistors (MOSFETs) for logic functions CCD. A Charge-Coupled Device (CCD) is a device for the movement of electrical charge, usually from within the device to an area where the charge can be manipulated, for example conversion into a digital value. This is achieved by "shifting" the signals between stages within the device one at a time. CCDs move charge between capacitive bins in the device, with the shift allowing for the transfer of charge between bins. In a CCD image sensor, pixels are represented by p-doped MOS capacitors. These capacitors are biased above the threshold for inversion when image acquisition begins, allowing the conversion of incoming photons into electron charges at the semiconductor-oxide interface; the CCD is then used to read out these charges. CCD image sensors are widely used in professional, medical, and scientific applications where high-quality image data is required.

An ultrasonic distance measurement principle is based on an ultrasonic transmitter that emits an ultrasonic wave in one direction, and started timing when it launched. Ultrasonic spread in the air, and would return immediately when it encountered obstacles on the way. At last, the ultrasonic receiver would stop timing when it received the reflected wave. As Ultrasonic spread velocity is about 340 meters/second in the air, based on the timer record 't', we can calculate the distance (s) between the obstacle and transmitter, namely: s=340t/2, which is so-called time difference distance measurement principle The principle of ultrasonic distance measurement used the already-known air spreading velocity, measuring the time from launch to reflection when it encountered obstacle, and then calculate the distance between the transmitter and the obstacle according to the time and the velocity. Thus, the principle of ultrasonic distance measurement is the same with radar. Distance Measurement formula is expressed as: L=C×T, where in the formula, L is the measured distance, and C is the ultrasonic spreading velocity in air, also, T represents time (T is half the time value from transmitting to receiving).

When a longitudinal sound wave strikes a flat surface, sound is reflected (or backscattered) in a coherent manner, provided that the dimension of the reflective surface is large compared to the wavelength of the sound. Note that audible sound has a very wide frequency range (from 20 to about 20,000 Hz), and thus a very wide range of wavelengths (from about 20 mm to 20 m). As a result, the overall nature of the reflection varies according to the texture and structure of the surface. For example, porous materials will absorb some energy, and rough materials (where rough is relative to the wavelength) tend to reflect in many directions—to scatter the energy, rather than to reflect it coherently.

In the pulse echo method, an ultrasonic pulse having a frequency typically ranging from about 20 kHz to about 100 kHz is generated and transmitted to an object at time T0. Then, the ultrasonic pulse is reflected (or backscattered) from the object, thereby an echo pulse of the ultrasonic pulse being detected by a sensor at time T1. In this regard, a propagation time of the pulse can be defined to be (T1−T0) and, accordingly a distance to the object can be given by a half of a multiplication of the propagation time and a velocity of an ultrasonic wave c, i.e., (0.5×(T1−T0)×c), wherein a velocity of an ultrasonic wave c is a known value. One of good reasons to adopt an ultrasonic wave having a frequency ranging from 20 kHz to 100 kHz is to implement a high directivity of an ultrasonic pulse in the air. Generally, when a piston-shaped ultrasonic wave generator having a radius a harmonically oscillates with a frequency set to 'f', an ultrasonic wave beam propagates through the air with a form of a nearly planar wave in a near field. However, the beam becomes spread wide, thereby having a form of a circular cone in a far field, by a diffraction thereof in proportional to a propagating distance. Accordingly, a beam width becomes larger as the wave propagates farther from the wave generator and, consequently, an angle is formed between an outermost sideline of the propagating beam and a central direction line of the propagation. The angle of convergence of the ultrasonic wave is inversely proportional to the frequency f and the radius α of the piston-shaped ultrasonic wave generator. As the angle of convergence becomes smaller, the beam width of the ultrasonic wave becomes narrower and, resultantly, a spatial resolution can be increased. Therefore, it is generally desirable to minimize the beam width to achieve a high resolution in a spatial domain.

The relation between the angle of convergence and the beam width of the ultrasonic wave teaches that the beam width is minimized by increasing the frequency f of the ultrasonic wave. However, the method of increasing the frequency of the ultrasonic wave has a drawback that a measurable range of a distance decreases, because the ultrasonic wave is attenuated in proportional to square of the frequency. Another method for minimizing the beam width is to increase the radius a of the piston-shaped ultrasonic wave generator. However, it is practically difficult to implement the larger radius of the piston-shaped ultrasonic wave generator mechanically. Furthermore, a size of a sensor therein becomes large in proportional to the diameter thereof. For the reasons stated above, the commonly used sensors has the radius which is less than or equal to 15 mm, and measures the distance by using the ultrasonic wave at the frequency of 40 kHz. Meanwhile, a directivity characteristic of the sensors can be represented with a half power beam width 2θHP (hereinafter, referred to as HPBW for simplicity). For example, for a commonly used sensor having the radius of 12 mm and using the frequency of 40 kHz, the HPBW is known to be about 20 degrees. In this case, the beam width of the wave becomes larger than 1 m at a 5 m distant place from the sensor. In this regard, although the beam width is also slightly dependent on other factors, e.g., duration of the pulse or a source type (piston source or Gaussian source), the sensor having the aforementioned directivity characteristic is generally called to have the spatial resolution of 1 m at a 5 m distant place from the sensor.

In one example, distance measuring is based on the electro-acoustic techniques, where the measuring uses transmitting a short pulse of sound, typically at a frequency inaudible to the ear (ultrasonic sound or ultrasound). Afterwards the device listens for an echo. The time elapsed during transmission to echo reception gives information on the distance to the object. In such a scheme, the propagating waves are audible or non-audible sound (acoustic) waves, the emitter 11 is an ultrasonic transducer 24ac that may be a speaker, and the sensor 24bc is an ultrasonic transducer that may be a microphone, serving as part of an acoustic-based distance meter 22c shown in a view 20c in FIG. 2c. Range detection using acoustic echoing is described in an article published in the International Journal of Advanced Research in Electrical, Electronics and Instrumentation Engineering (IJAREEIE) Vol. 3, Issue 2, February 2014 (ISSN: 2320-3765) by Rajan P. Thomas et al. entitled: "*Range Detection based on Ultrasonic Principle*", and in chapter 21 entitled: "*Sonar Sensing*" of the book "*Springer Handbook of Robotics*" by Siciliano B. and Khatib, O. (Editors) published 2008 by Springer (ISBN: 978-3-540-23957-4), which are both incorporated in their entirety for all purposes as if fully set forth herein.

In one example, the acoustic sensor 24bc may consist of, or may comprise, a microphone Model Number SPH0641LU4H-1 or SiSonic™ sensor Model Number SPM0404UD5 both available from Knowles Electronics or Knowles Acoustics (a division of Knowles Electronics, LLC) headquartered in Itasca, Ill., U.S.A., and respectively described in a product data sheet C10115945 Revision A dated May 16, 2014 entitled: "*Digital Zero-Height SiSonic™ Microphone With Multi-Mode And Ultrasonic Support*" and in a specification DMS, C10109833 Revision A dated Jul. 20, 2009 entitled: ""*Mini" SiSonic Ultrasonic Acoustic Sensor Specification*", which are both incorporated in their entirety for all purposes as if fully set forth herein. Using acoustic sensors is described in Knowles Acoustics application note AN16 Revision 1.0 dated Apr. 20, 2006 entitled: "*SiSonic Design Guide*", which is incorporated in its entirety for all purposes as if fully set forth herein.

Acoustics-based distance meters are typically based on that in dry air, at 20° C. (68° F.), the speed of sound is 343 meters per second. Weather conditions, however, affect the behavior of the sound waves, and the speed of sound varies with pressure, temperature, and humidity. A system and method for compensating ultrasonic sensors mounted on a vehicle for speed of sound variations is described in U.S. Pat. No. 8,656,781 to Lavoie entitled: "Method and System for Compensation of Ultrasonic Sensor", which is incorporated in its entirety for all purposes as if fully set forth herein. The ultrasonic sensor is operatively coupled to a power train control module having a pressure sensor that continuously monitors atmospheric pressure and a controller configured for computing a compensated speed of sound using the monitored atmospheric pressure. The ultrasonic sensor sends an ultrasonic wave and determines the time lag in receiving the reflected ultrasonic wave from an object. Subsequently, the ultrasonic sensor generates a signal corresponding to the relative distance between the vehicle and the object using the compensated speed of sound and the time lag.

A distance measuring device that is humidity and temperature compensated is described in U.S. Pat. No. 7,263,031 to Sanoner et al. entitled: "Distance Measuring Device for Acoustically Measuring Distance", which is incorporated in its entirety for all purposes as if fully set forth herein. The device includes a transmitter for transmitting an acoustic signal at a distant object, an acoustic signal receiver for receiving a reflected acoustic signal reflected from the distant object, a temperature sensor detecting air temperature, a humidity sensor detecting air humidity, an amplifier amplifying the reflected acoustic signal, a comparator coupled to the amplifier comparing the amplified reflected acoustic signal with a reference and generating a comparator output when the level of the amplified reflected acoustic signal exceeds the reference, a gain controller increasing the gain from transmitting an acoustic signal until the comparator output is generated, a threshold generator providing the reference to the comparator and decreasing the reference at an exponential rate from transmitting the acoustic signal until the comparator output is generated, and a controller determining use of only the air temperature, velocity of the acoustic signal, and distance traveled from transmitting the acoustic signal until the comparator output is generated.

Ultrasound. Ultrasounds (a.k.a. supersonic) are sound waves with frequencies higher than the upper audible limit of human hearing. Ultrasound is not different from 'normal' (audible) sound in its physical properties, only in that humans cannot hear it. This limit varies from person to person and is approximately 20 KHz (kilohertz) (20,000 hertz) in healthy, young adults. Ultrasound devices operate with frequencies from 20 KHz up to several gigahertz. An ultrasound herein may comprise a sound wave having a carrier or center frequency of above than 20 KHz, 30 KHz, 50 KHz, 80 KHz, 100 KHz, 150 KHz, 200 KHz, 250 KHz, 300 KHz, 350 KHz, 400 KHz, 450 KHz, 500 KHz, 550 KHz, 600 KHz, 650 KHz, 700 KHz, 750 KHz, 800 KHz, 850 KHz, 900 KHz, or 950 KHz. Alternatively or in addition, an ultrasound herein may comprise a sound wave having a carrier or center frequency lower than 25 KHz, 30 KHz, 50 KHz, 80 KHz, 100 KHz, 150 KHz, 200 KHz, 250 KHz, 300 KHz, 350 KHz, 400 KHz, 450 KHz, 500 KHz, 550 KHz, 600 KHz, 650 KHz, 700 KHz, 750 KHz, 800 KHz, 850 KHz, 900 KHz, or 950 KHz.

Ultrasonic transducers are transducers that convert ultrasound waves to electrical signals or vice versa. Those that both transmit and receive may also be called ultrasound transceivers; many ultrasound sensors besides being sensors are indeed transceivers because they can both sense and transmit. Active ultrasonic sensors generate high-frequency sound waves and evaluate the echo, which is received back by the sensor, measuring the time interval between sending the signal and receiving the echo to determine the distance to an object. Passive ultrasonic sensors are typically microphones that detect ultrasonic noise that is present under certain conditions, convert it to an electrical signal, and report it to a computer. Ultrasonic transducers are typically based on or using piezoelectric transducers or capacitive transducers. Piezoelectric crystals change size and shape when a voltage is applied; AC voltage makes them oscillate at the same frequency and produce ultrasonic sound. Capacitive transducers use electrostatic fields between a conductive diaphragm and a backing plate. The beam pattern of a transducer can be determined by the active transducer area and shape, the ultrasound wavelength, and the sound velocity of the propagation medium. Since piezoelectric materials generate a voltage when force is applied to them, they can also work as ultrasonic detectors. Some systems use separate transmitters and receivers, while others combine both functions into a single piezoelectric transceiver. Ultrasound transmitters can also use non-piezoelectric principles, such as magnetostriction. Materials with this property change size slightly when exposed to a magnetic field, and make practical transducers. A capacitor ("condenser") microphone has a thin diaphragm that responds to ultrasound waves. Changes in the electric field between the diaphragm and a closely spaced backing plate convert sound signals to electric currents, which can be amplified.

Typically a microphone 24*bc* may be based on converting audible or inaudible (or both) incident sound to an electrical signal by measuring the vibration of a diaphragm or a ribbon. The microphone may be a condenser microphone, an electret microphone, a dynamic microphone, a ribbon microphone, a carbon microphone, or a piezoelectric microphone. The speaker 24*ac* may be a sounder that converts electrical energy to sound waves transmitted through the air, an elastic solid material, or a liquid, usually by means of a vibrating or moving ribbon or diaphragm. The sound may be audible or inaudible (or both), and may be omnidirectional, unidirectional, bidirectional, or provide other directionality or polar patterns. A sounder may be an electromagnetic loudspeaker, a piezoelectric speaker, an electrostatic loudspeaker (ESL), a ribbon or planar magnetic loudspeaker, or a bending wave loudspeaker. A sounder may be an electromechanical type, such as an electric bell, a buzzer (or beeper), a chime, a whistle or a ringer and may be either electromechanical or ceramic-based piezoelectric sounders. The sounder may emit a single or multiple tones, and can be in continuous or intermittent operation.

A short distance ultrasonic distance meter with provisions to reduce the ill-effects of ringing when measurements are of obstacles closer than about ten inches is disclosed in U.S. Pat. No. 5,483,501 to Park et al. entitled: "Short Distance Ultrasonic Distance Meter", which is incorporated in its entirety for all purposes as if fully set forth herein. In one embodiment an opposite phase ultrasonic wave is introduced by a circuit and in another embodiment a strain sensor introduces negative feedback to effect cancellation of ringing. Finally, in a third embodiment, both the negative feedback and opposite phase methods are employed for optimal results.

A non-contact type ultrasonic distance measuring device that includes a microprocessor for controlling operation of a transducer that functions as both a sonic transmitter and receiver is described in U.S. Pat. No. 5,163,323 to Davidson entitled: "Ultrasonic Distance Measuring Instrument", which is incorporated in its entirety for all purposes as if fully set forth herein. Microprocessor programming provides a control scheme whereby an operator can program different modes of operation into the instrument by depressing buttons arranged on a rear display panel of the instrument. Mode programming is accomplished in a manner similar to setting a digital watch, with the modes displayed in a display window. The mode programming and component operation provide a gate scheme where gate control is provided through application of gain control through three amplifiers, one of which is a fourth order bandpass filter that is operated by the microprocessor to provide a controlled increase in gain or "Q" as the elapsed time from a transmission becomes greater. The program self-adjusts during operation to sense the distances to close targets and to targets as far away as seventy feet and can provide an accurate identification of a target through clutter as may exist in some instrument applications. Pulsing control is also provided for in the mode programming, whereby, after a single pulse is sent, the instrument will not send a next pulse until the expiration of a set period.

A system and method for sensing proximity of an object includes a signal generator, which generates a plurality of signals, is described in U.S. Pat. No. 7,679,996 to Gross entitled: "Methods and Device for Ultrasonic Range Sensing", which is incorporated in its entirety for all purposes as if fully set forth herein. A transducer is in communication with the signal generator to receive the plurality of signals from the signal generator. The transducer is capable of transforming a plurality of signals from the signal generator into a plurality of ultrasonic waves. The plurality of ultrasonic waves includes a first ultrasonic wave and a second ultrasonic wave, wherein the first ultrasonic wave and the second ultrasonic wave are formed out of phase. The plurality of ultrasonic waves are directed toward and reflected (or backscattered) by the object. The transducer receives the plurality of ultrasonic waves reflected by the object, which become a plurality of received ultrasonic waves. An analog to digital converter is in communication with the transducer. The received plurality of ultrasonic waves reflected by the object is communicated to the analog to digital converter by the transducer.

An ultrasonic distance meter cancels out the effects of temperature and humidity variations by including a measuring unit and a reference unit is described in U.S. Pat. No. 5,442,592 to Toda et al. entitled: "Ultrasonic Distance Meter", which is incorporated in its entirety for all purposes as if fully set forth herein. In each of the units, a repetitive series of pulses is generated, each having a repetition rate directly related to the respective distance between an electroacoustic transmitter and an electroacoustic receiver. The pulse trains are provided to respective counters, and the ratio of the counter outputs is utilized to determine the distance being measured.

An ultrasonic ranging method for measuring a distance to an object in an air is described in U.S. Pat. No. 7,196,970 to Moon et al. entitled: "Ultrasonic Ranging System and Method Thereof in Air by Using Parametric Array", which is incorporated in its entirety for all purposes as if fully set forth herein. The method includes the steps of generating a first and a second primary ultrasonic waves having a frequency f1 and f2, respectively, transmitting the first and the second primary ultrasonic waves in a same direction, wherein a secondary ultrasonic wave having a frequency corresponding to the difference of two frequencies fd=f1−f2 is created by a nonlinear property of the air and radiated to the object, detecting an echo pulse of the secondary ultrasonic wave reflected from the object, and measuring the distance to the object based on a propagation time of the secondary wave.

A method and device for ultrasonic ranging is described in U.S. Pat. No. 5,793,704 to Freger entitled: "Method and Device for Ultrasonic Ranging", which is incorporated in its entirety for all purposes as if fully set forth herein. As in prior art devices, ultrasound pulses are transmitted by the device towards a target, and echo pulses from the target are received. The timing of the maximum of the amplitude envelope of the echo pulses is picked and used as a measure of the return time of these pulses. This maximum envelope time is relatively independent of the speed of sound between the device and the target. Preferably, the duration of the echo pulses is less than the response time of the receiving circuit, to enable an accurate pick of the amplitude envelope maximum.

An ultrasonic wave propagation time measurement system is disclosed in U.S. Pat. No. 8,806,947 to Kajitani entitled: "Ultrasonic Wave Propagation Time Measurement System", which is incorporated in its entirety for all purposes as if fully set forth herein. The system comprises: a transmitting section that transmits an electromagnetic wave signal indicating transmission timing and an ultrasonic wave signal, and a receiving section that detects the transmitted electromagnetic wave signal and the ultrasonic wave signal and calculates an ultrasonic wave propagation time based on reception times of the electromagnetic wave signal and the ultrasonic wave signal; and an initial mode setting mechanism that constitutes an optimum ultrasonic wave transmission/reception system by selecting the set values of one or more setting parameters is provided in a controlling unit that controls the transmission of the signals in the transmitting section and in a data processing unit that controls the detection and calculation in receiving section.

A method for measuring distance, which improves the resolution and the selectivity in an echo method, using propagation-time measurement, is disclosed in U.S. Pat. No. 6,804,168 to Schlick et al. entitled: "Method for Measuring Distance", which is incorporated in its entirety for all purposes as if fully set forth herein. In this context, a received signal is sampled without first having to smooth the signal.

An ultrasonic wave transmitter device is described in U.S. Pat. No. 9,128,565 to Kajitani et al. entitled: "Ultrasonic Wave Transmitter Device, Ultrasonic Wave Propagation Time Measurement System and Ultrasonic Wave Propagation Time Measurement Method", which is incorporated in its entirety for all purposes as if fully set forth herein. The device includes an ultrasonic wave driving circuit that modulates an ultrasonic wave based on a pseudorandom signal to generate an ultrasonic wave-driving signal, and an ultrasonic wave transmitter driven by the ultrasonic wave-driving signal to send out an ultrasonic wave signal of a frequency higher than a fundamental frequency of the ultrasonic wave-driving signal. The ultrasonic wave transmitter includes a cylindrically shaped piezoelectric or magnetostrictive element sending out the ultrasonic wave signal and an ultrasonic wave absorber that covers part of a base member holding the piezoelectric or magnetostrictive element.

A distance measurement method and device using ultrasonic is described in U.S. Patent Application Publication No. 2006/0247526 to Lee et al. entitled: "Distance Measurement Method and Device Using Ultrasonic Waves", which is incorporated in its entirety for all purposes as if fully set forth herein. The method provides for sufficiently amplifying a received ultrasonic wave signal and separating a specific frequency from an ultrasonic wave signal mixed with an unnecessary signal to extract an arrival signal of a first pulse. It is thus possible to calculate a distance of an object safely.

An ultrasonic distance measurement is described in an Application Note No. AN4841 Rev. 1.0, 3/2014 by Freescale Semiconductor, Inc. entitled: "*S12ZVL LIN Enabled Ultrasonic Distance Measurement—Based on the MC9S12ZVL32 MagniV Device*", which is incorporated in its entirety for all purposes as if fully set forth herein. The ultrasonic distance measurement is further described in PEPPERL+FUCHS Group guide Part No. 255933 dated (10/15) entitled: "*Technology Guide Ultrasonic*", which is incorporated in its entirety for all purposes as if fully set forth herein. An ultrasonic module HC-SR04 is available from Cytron Technologies Sdn. Bhd. Headquartered in Johor, Malaysia, and described in Cytron Technologies user manual entitled: "*Product User's Manual—HC-SR04 Ultrasonic Sensor*", which is incorporated in its entirety for all purposes as if fully set forth herein. An ultrasonic distance meter is further described is an International Journal of Scientific & Engineering Research Volume 4, Issue 3, March 2013 (IS SN 2229-5518) by Md. Shamsul Arefin and Tajrian Mollick entitled: "*Design of an Ultrasonic Distance Meter*", and in Texas Instruments Incorporated Application Report (SLAA136A—Oct. 2001) by Murugavel Raju entitled: "*Ultrasonic Distance Measurements With the MSP430*", which are both incorporated in their entirety for all purposes as if fully set forth herein. Another ultrasonic-based distance meter is Extech DT100 available from Extech Instruments Corporation (a FLIR Company) described in a User Guide dated 2006 entitled: "*Ultrasonic Distance Finder*" (Model DT100-EU-EN V4.2 6/09), which is incorporated in its entirety for all purposes as if fully set forth herein. Ultrasonic range finders may use or comprise HRLV-MaxSonar® modules available from MaxBotix® Incorporated headquartered in Brainerd, Minn., U.S.A. and described in a MaxBotix® Incorporated 2014 data-sheet (PD11721h) entitled: "*HRL V-MaxSonar®-EZ™ Series—High Resolution, Precision, Low Voltage Ultrasonic Range Finder MB1003, MB1013, MB1023, MB1033, MB1043*", which is incorporated in its entirety for all purposes as if fully set forth herein. An ultrasonic distance measurement is further described in an Application Note by Freescale Semiconductor, Inc. Document Number: AN4841 Rev. 1.0, 3/2014 entitled: "*S12ZVL LIN Enabled Ultrasonic Distance Measurement—Based on the MC9S12ZVL32 MagniV Device*", which is incorporated in its entirety for all purposes as if fully set forth herein.

RADAR. In a radar system, an antenna may serve as the emitter 24a or as the sensor 24b. Preferably, the same antenna may be used for both transmitting the electromagnetic wave functioning as the emitter 24a, and for receiving the reflected (or backscattered) waves functioning as the sensor 24b. The transmitted wave may use a millimeter wave, defined as wavelength of 10 to 1 millimeter (corresponding to a frequency of 30 to 300 GHz), and may use an ISM frequency band. Alternatively or in addition, the W-Band may be used, ranging from 75 to 110 GHz (wavelength of ~2.73-4 mm). The W-band is used for satellite communications, millimeter-wave radar research, military radar targeting and tracking applications, and some non-military applications. Further, a frequency around 77 GHz (76-77 GHz) that is typically used for automotive cruise control radar may be used, as well as a frequency band of 79 GHz (77-81 GHz).

The radar may use, or may be based on, a Micropower Impulse Radar (MIR), which rapidly emit radio pulses (approximately one million per second) that are extremely short (less than a billionth of a second in duration) and that are in a frequency range substantially lower than convention radars. Low frequency pulses are better able to penetrate solid objects. Additionally, MIR radars are extremely selective in their range gating capabilities. It is possible to examine and record only those echoes that could have been generated by an object within a certain range from the radar unit and ignore all others. Due to the high pulse rate and low frequency, echoes from many objects that may be lined up in a row may be received, thus allowing the radar to "see behind" objects, detecting other objects that would otherwise be visually hidden. MIR is described in an article published in Science & Technology Review January/February 1996 entitled: "*Micropower Impulse Radar*", and using UWB is described in InTech 2012 Chapter 3 document by Xubo Wang, Anh Dinh and Daniel Teng entitled: "*Radar Sensing Using Ultra Wideband—Design and Implementation*", which are both incorporated in their entirety for all purposes as if fully set forth herein.

Antenna. An antenna (plural antennae or antennas), or aerial, is an electrical device which converts electric power into radio waves, and vice versa, and is usually used with a radio transmitter or radio receiver. In transmission, a radio transmitter supplies an electric current oscillating at radio frequency (i.e. a high frequency Alternating Current (AC)) to the antenna's terminals, and the antenna radiates the energy from the current as electromagnetic waves (radio waves). In reception, an antenna intercepts some of the power of an electromagnetic wave in order to produce a tiny voltage at its terminals that is applied to a receiver to be amplified.

Typically an antenna consists of an arrangement of metallic conductors (elements), electrically connected (often through a transmission line) to the receiver or transmitter. An oscillating current of electrons forced through the antenna by a transmitter will create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming radio wave exert force on the electrons in the antenna elements, causing them to move back and forth, creating oscillating currents in the antenna. Antennas can be designed to transmit and receive radio waves in all horizontal directions equally (omnidirectional antennas), or preferentially in a particular direction (directional or high gain antennas). In the latter case, an antenna may also include additional elements or surfaces with no electrical connection to the transmitter or receiver, such as parasitic elements, parabolic reflectors or horns, which serve to direct the radio waves into a beam or other desired radiation pattern.

Directional antenna. A directional antenna or beam antenna is an antenna that radiates or receives greater power in specific directions allowing for increased performance and reduced interference from unwanted sources. Directional antennas provide increased performance over dipole antennas—or omnidirectional antennas in general—when a greater concentration of radiation in a certain direction is desired. A High-Gain Antenna (HGA) is a directional antenna with a focused, narrow radiowave beam width. This narrow beam width allows more precise targeting of the radio signals. When transmitting, a high-gain antenna allows more of the transmitted power to be sent in the direction of the receiver, increasing the received signal strength. When receiving, a high gain antenna captures more of the signal, again increasing signal strength. Due to reciprocity, these two effects are equal—an antenna that makes a transmitted signal 100 times stronger (compared to an isotropic radiator), will also capture 100 times as much energy as the isotropic antenna when used as a receiving antenna. Due to their directivity, directional antennas also send less (and receive less) signal from directions other than the main beam. This property may be used to reduce interference.

There are many ways to make a high-gain antenna—the most common are parabolic antennas, helical antennas, Yagi antennas, and phased arrays of smaller antennas of any kind. Horn antennas can also be constructed with high gain, but are less commonly seen.

Aperture antenna. Aperture antennas are the main type of directional antennas used at microwave frequencies and above, and consist of a small dipole or loop feed antenna inside a three-dimensional guiding structure large compared to a wavelength, with an aperture to emit the radio waves. Since the antenna structure itself is nonresonant, they can be used over a wide frequency range by replacing or tuning the feed antenna. A parabolic antenna is widely used high gain antenna at microwave frequencies and above, and consists of a dish-shaped metal parabolic reflector with a feed antenna at the focus. It can have some of the highest gains of any antenna type, up to 60 dBi, but the dish must be large compared to a wavelength. A horn antenna is a simple antenna with moderate gains of 15 to 25 dBi consists of a flaring metal horn attached to a waveguide. Used for applications such as radar guns, radiometers and as feed antennas for parabolic dishes. A slot antenna consist of a waveguide with one or more slots cut in it to emit the microwaves. Linear slot antennas emit narrow fan-shaped beams, and are used as UHF broadcast antennas and marine radar antennas. A dielectric resonator antenna consists of small ball or puck-shaped piece of dielectric material excited by aperture in waveguide used at millimeter wave frequencies.

Horn antenna. A horn antenna or microwave horn is an antenna that consists of a flaring metal waveguide shaped like a horn to direct radio waves in a beam. Horns are widely used as antennas at UHF and microwave frequencies, above 300 MHz, and are used as feeders (called feed horns) for larger antenna structures such as parabolic antennas, as standard calibration antennas to measure the gain of other antennas, and as directive antennas for such devices as radar guns, automatic door openers, and microwave radiometers. Their advantages are moderate directivity, low standing wave ratio (SWR), broad bandwidth, and simple construction and adjustment. An advantage of horn antennas is that since they have no resonant elements, they can operate over a wide range of frequencies, a wide bandwidth. The usable bandwidth of horn antennas is typically of the order of 10:1, and can be up to 20:1 (for example allowing it to operate from 1 GHz to 20 GHz). The input impedance is slowly varying over this wide frequency range, allowing low voltage standing wave ratio (VSWR) over the bandwidth. The gain of horn antennas typically ranges up to 25 dBi, with 10-20 dBi being.

Horns can have different flare angles as well as different expansion curves (elliptic, hyperbolic, etc.) in the E-field and H-field directions, making possible a wide variety of different beam profiles. A pyramidal horn is a common horn antenna with the horn in the shape of a four-sided pyramid, with a rectangular cross section, used with rectangular waveguides, and radiate linearly polarized radio waves. A sectoral horn is a pyramidal horn with only one pair of sides flared and the other pair parallel, and produces a fan-shaped beam, which is narrow in the plane of the flared sides, but wide in the plane of the narrow sides. An E-plane horn is a sectoral horn flared in the direction of the electric or E-field in the waveguide, an H-plane horn is a sectoral horn flared in the direction of the magnetic or H-field in the waveguide, and a conical horn is a horn in the shape of a cone, with a circular cross section, typically used with cylindrical waveguides. An exponential horn (also called a scalar horn) is a horn with curved sides, in which the separation of the sides increases as an exponential function of length, and can have pyramidal or conical cross sections. Exponential horns have minimum internal reflections, and almost constant impedance and other characteristics over a wide frequency range, and are used in applications requiring high performance, such as feed horns for communication satellite antennas and radio telescopes. A corrugated horn is a horn antenna with parallel slots or grooves, small compared with a wavelength, covering the inside surface of the horn, transverse to the axis. Corrugated horns have wider bandwidth and smaller sidelobes and cross-polarization, and are widely used as feed horns for satellite dishes and radio telescopes. A dual-mode conical horn may be used to replace the corrugated horn for use at sub-mm wavelengths where the corrugated horn is lossy and difficult to fabricate. A diagonal horn is a simple dual-mode horn superficially looks like a pyramidal horn with a square output aperture. However, the square output aperture is seen to be rotated 45° relative to the waveguide. These horns are typically machined into split blocks and used at sub-mm wavelengths. A ridged horn is a pyramidal horn with ridges or fins attached to the inside of the horn, extending down the center of the sides, and the fins lower the cutoff frequency, increasing the antenna's bandwidth. A septum horn is a horn, which is divided into several sub-horns by metal partitions (septums) inside, attached to opposite walls.

Using radar technology for distance measuring is described in Krohne Messtechnik Gmbh & Co. KG 07/2003 publication (7.02337.22.00) by Dr.-Ing. Detlef Brumbi entitled: "*Fundamentals of Radar Technology for Level Gauging, 4th Edition*", which is incorporated in its entirety for all purposes as if fully set forth herein. Radar distance measuring system is described in a paper published in Journal of Computers, Vol. 6, No. 4, April 2011 by Zhao Zeng-rong and Bai Ran entitled: "*A FMCW Radar Distance Measure System based on LabVIEW*", which is incorporated in its entirety for all purposes as if fully set forth herein. Automotive radar systems using integrated 24 GHz radar sensor techniques are described in a paper by Michael Klotz and Hermann Rohling published 4/2001 in the Journal of telecommunications and Information Technology entitled: "24 *GHz radar sensor for automotive applications*", which is incorporated in its entirety for all purposes as if fully set forth herein.

A micropower impulse radar that may be used to take measurements, such as those needed to establish room size and the dimensions and location of objects within the walls of a room, is described in U.S. Pat. No. 6,006,021 to Tognazzini entitled: "Device for Mapping Dwellings and Other Structures in 3D", which is incorporated in its entirety for all purposes as if fully set forth herein. A computer controls the scanning of the radar and the collection of datapoints. A global positioning satellite (GPS) unit locates the precise portion of the radar and another unit loads a fixed referenced location to which all measurements from different rooms are baselined. By collecting points and referencing them to a common point or wireframe representation of a building can be developed from which "as built" architectural plans can be produced.

A system and method for the taking of a large number of distance images having distance picture elements is described in U.S. Pat. No. 7,787,105 to Hipp entitled: "Taking Distance Images", which is incorporated in its entirety for all purposes as if fully set forth herein. Electromagnetic radiation is transmitted in the form of transmission pulses at objects, and reflected (or backscattered) echo pulses are detected. Measurements are made by determining the pulse time of flight of the distances of objects which respectively form a distance picture element and at which the transmission pulses are reflected. A time measuring device carries out a plurality of associated individual measurements for each distance image to be taken. Stored event lists of all time measuring channels are read out and evaluated in order to convert the respective time information contained in the event lists into distance values corresponding to the distance picture elements.

A device for distance measurement by radar is described in U.S. Pat. No. 6,232,911 to O'Conner entitled: "Device for Distance Measurement by Radar", which is incorporated in its entirety for all purposes as if fully set forth herein. The device comprises a frequency-modulated radar-transmitter and -receiver by which a radar beam is directed onto an object to be measured and in which by mixing the transmitted and the received frequency a beat signal is obtained. By use of frequency modulation the frequency of the transmitted radar signal of the radar-transmitter and -receiver is variable periodically according to a saw tooth function. The frequency of the beat signal, due to the travel time of the radar signal reflected by the object, represents a measured value for the distance of the object. A signal processing circuit generates from the beat signal obtained a measured value of the distance. For this purpose, the beat signal is fed into a phase control circuit or phase locked loop circuit the output frequency of which makes the measured value of distance.

A radar range finder for high-precision, contactless range measurement is described in U.S. Pat. No. 5,546,088 to Trummer et al. entitled: "High-Precision Radar Range Finder", which is incorporated in its entirety for all purposes as if fully set forth herein. The finder is based on the FMCW principle and operates with digital signal processing at a limited frequency shift.

A radar system for determining the range at a future time of a target moving relative to the radar system is described in U.S. Pat. No. 5,341,144 to Stove entitled: "Vehicular Cruise Control System and Radar System Therefor", which is incorporated in its entirety for all purposes as if fully set forth herein. The system comprises an R.F. source for providing a signal at a frequency, which increases over time from a base frequency f (Hz) at a rate r (Hz/s) for a sweep duration d(s). This signal is transmitted and a signal reflected by the target is mixed with a portion of the transmitted signal to give a signal having a frequency proportional to the range of the target. The R.F. source is arranged to have a sweep rate r equal to the base frequency f divided by a time t (s) which time is the delay until the target will be at the measured range. A predicted range may thus be derived without complex compensation for relative velocity. The system may further provide velocity feedback without requiring extra circuitry.

A radar measuring device which, with a simple design, ensures reliable distance determination even when a mixed signal is zero, and a method for operating a radar measuring device, is described in U.S. Pat. No. 7,095,362 to Hoetzel et al. entitled: "Radar measurement Device, Especially for a Motor Vehicle, and Method for Operating a Radar Measurement Device", which is incorporated in its entirety for all purposes as if fully set forth herein. The radar measuring device includes a high-frequency oscillator which emits two different carrier frequency signals, a first switching device for switching the carrier frequency signals as a function of first pulse signals and emitting radar pulse signals, a transmission antenna and a receiving antenna, a second switching device for switching the carrier frequency signals as a function of a delayed second pulse signal and emitting delayed radar pulse signals, and a mixing device for mixing received radar signals with the delayed radar pulse signals and emitting mixed signals. The phase differences between the received radar signals and delayed radar pulse signals differ by a predetermined value when the two carrier frequency signals are emitted. An amplitude signal is subsequently determined from the first and second mixed signal.

A radar range finder and hidden object locator is based on ultra-wide band radar with a high resolution swept range gate is described in U.S. Pat. No. 5,774,091 to McEwan entitled: "Short Range Micro-Power Impulse Radar with High Resolution Swept Range Gate with Damped Transmit and Receive Cavities", which is incorporated in its entirety for all purposes as if fully set forth herein. The device generates an equivalent time amplitude scan with a typical range of 4 inches to 20 feet, and an analog range resolution as limited by a jitter of on the order of 0.01 inches. A differential sampling receiver is employed to effectively eliminate ringing and other aberrations induced in the receiver by the near proximity of the transmit antenna, so a background subtraction is not needed, simplifying the circuitry while improving performance. Uses of the invention include a replacement of ultrasound devices for fluid level sensing, automotive radar, such as cruise control and parking assistance, hidden object location, such as stud and rebar finding. In addition, this technology can be used when positioned over a highway lane to collect vehicle count and speed data for traffic control. Techniques are used to reduce clutter in the receive signal, such as decoupling the receive and transmit cavities by placing a space between them, using conductive or radiative damping elements on the cavities, and using terminating plates on the sides of the openings.

Harmonic techniques that are employed to leverage low-cost, ordinary surface mount technology (SMT) to high microwave frequencies where tight beamforming with a small antenna makes reliable, high-accuracy pulse-echo radar systems possible, are described in U.S. Pat. No. 6,191,724 to McEwan entitled: "Short Pulse Microwave Transceiver", which is incorporated in its entirety for all purposes as if fully set forth herein. The implementation comprises a 24 GHz short-pulse transceiver comprised of a pulsed harmonic oscillator employed as a transmitter and an integrating, pulsed harmonic sampler employed as a receiver. The transmit oscillator generates a very short (0.5 ns) phase-coherent harmonic-rich oscillation at a sub-multiple of the actual transmitter frequency. A receiver local oscillator operates at a sub-multiple of the transmit frequency and is triggered with controlled timing to provide a very short (0.5 ns), phase-coherent local oscillator burst. The local oscillator burst is coupled to an integrating harmonic sampler to produce an integrated, equivalent-time replica of the received RF. The harmonic techniques overcome four major problems with non-harmonic approaches: 1) expensive, precision assembly, 2) high local oscillator noise, 3) sluggish oscillator startup, and 4) spurious local oscillator injection locking on external RF. The transceiver can be used for automotive backup and collision warning, precision radar rangefinding for fluid level sensing and robotics, precision radiolocation, wideband communications, and time-resolved holographic imaging.

A pulse-echo radar measures non-contact range while powered from a two-wire process control loop is described in U.S. Pat. No. 6,535,161 to McEwan entitled: "Loop Powered Radar Rangefinder", which is incorporated in its entirety for all purposes as if fully set forth herein. A key improvement over prior loop-powered pulse-echo radar is the use of carrier-based emissions rather than carrier-free ultrawideband impulses, which are prohibited by FCC regulations. The radar is based on a swept range-gate homodyne transceiver having a single RF transistor and a single antenna separated from the radar transceiver by a transmission line. The transmission line offers operational flexibility while imparting a reflection, or timing fiducial, at the antenna plane. Time-of-flight measurements are based on the time difference between a reflected fiducial pulse and an echo pulse, thereby eliminating accuracy-degrading propagation delays in the transmitters and receivers of prior radars. The loop-powered rangefinder further incorporates a current regulator for improved signaling accuracy, a simplified sensitivity-time-control (STC) based on a variable transconductance element, and a jam detector. Applications include industrial tank level measurement and control, vehicular control, and robotics.

A radar-based distance measuring device is described in U.S. Pat. No. 7,095,362 to Hoetzel et al. entitled: "Radar Measurement Device, Especially for a Motor Vehicle, and Method for Operating a Radar Measurement Device", which is incorporated in its entirety for all purposes as if fully set forth herein. The device, with a simple design, ensures reliable distance determination even when a mixed signal is zero, and a method for operating a radar-measuring device. The radar measuring device includes: A high-frequency oscillator which emits two different carrier frequency signals (F1,F2), a first switching device for switching the carrier frequency signals (F1,F2) as a function of first pulse signals (P1) and emitting radar pulse signals (T1,2), a transmission antenna and a receiving antenna, a second switching device for switching the carrier frequency signals as a function of a delayed second pulse signal (P2) and emitting delayed radar pulse signals (S1,2), and a mixing device for mixing received radar signals (R1,2) with the delayed radar pulse signals (S1,2) and emitting mixed signals (M1,2). The phase differences between the received radar signals (R1,2) and delayed radar pulse signals (S1,2) differ by a predetermined value when the two carrier frequency signals (F1,2) are emitted. An amplitude signal is subsequently determined from the first and second mixed signal (M1,2).

A radar based sensor detection system is described in U.S. Pat. No. 6,879,281 to Gresham et al. entitled: "Pulse Radar Detection System", which is incorporated in its entirety for all purposes as if fully set forth herein. The system comprises a microwave source operative to provide a continuous wave signal at an output. A pulse-former is coupled to the output of the source and is operative to provide at an output a variable length pulse that increases the transmitted energy of the radar system according to the range of object detection. A modulator is coupled to the output of the pulse-former for providing a modulated pulse signal when required. A transmit/receive switch coupled to the output of the modulator is selectively operative between a first transmit position and a second receive position. A transmit channel coupled to the transmit/receive switch transmits the pulse signal when the switch is operated in the transmit position. A receiving channel coupled to the transmit/receive switch receives the modulator signal when the switch is operated in the receive position. First and second voltage multipliers each have a local oscillator input for receiving the modulator signal in the receive position, and each have an input signal port, and an output port. A receiver channel receives a reflected transmitted signal from an object and applies the received signal to the receive signal input ports of the voltage multipliers. An autocorrelator coupled to the output ports of the voltage multipliers correlates the received signal to produce an output signal indicating the detection and position of the object.

An automotive radar is described in a Fujitsu paper (FUJITSU TEN TECH. J. NO. 1 (1998)) by T. Yamawaki et al. entitled: "60-*GHz Millimeter-Wave Automotive Radar*", a radar-based circuit and system is described in a Thesis submitted 2013 by Ioannis Sarkas to the University of Toronto entitled: "*Circuit and System Design for MM-Wave Radio and Radar Applications*", radar sensors are described in an Application Note by Sivers IMA AB Rev. A 2011-06-2011 entitled: "*FMCW Radar Sensors—Application Notes*", an obstacle detection radar is described in a Fujitsu paper (FUJITSU TEN TECH. M. NO. 15 (2000)) by T. Yamawaki et al. entitled: "*Millimeter-Wave Obstacle detection Radar*", which are all incorporated in their entirety for all purposes as if fully set forth herein.

An example of a radar-based distance meter is the 94 GHz Industrial Distance Meter Model No. FMCW 94/10/x available from Elva-1—Millimeter Wave Division headquartered in Furulund, Sweden and described in a data sheet entitled: "*Industrial Distance Meter FMCW 94/10/x at 94 GHz*", downloaded on December 2014, which is incorporated in its entirety for all purposes as if fully set forth herein. Using radar-based distance meter for automotive applications is described in a paper by Dipl. Ing. Michael Klotz dated Januar 2002 entitled: "*An Automotive Short Range High Resolution Pulse Radar Network*", which is incorporated in its entirety for all purposes as if fully set forth herein.

ISM. The Industrial, Scientific and Medical (ISM) radio bands are radio bands (portions of the radio spectrum) reserved internationally for the use of radio frequency (RF) energy for industrial, scientific and medical purposes other than telecommunications. In general, communications equipment operating in these bands must tolerate any interference generated by ISM equipment, and users have no regulatory protection from ISM device operation. The ISM bands are defined by the ITU-R in 5.138, 5.150, and 5.280 of the Radio Regulations. Individual countries use of the bands designated in these sections may differ due to variations in national radio regulations. Because communication devices using the ISM bands must tolerate any interference from ISM equipment, unlicensed operations are typically permitted to use these bands, since unlicensed operation typically needs to be tolerant of interference from other devices anyway. The ISM bands share allocations with unlicensed and licensed operations; however, due to the high likelihood of harmful interference, licensed use of the bands is typically low. In the United States, uses of the ISM bands are governed by Part 18 of the Federal Communications Commission (FCC) rules, while Part 15 contains the rules for unlicensed communication devices, even those that share ISM frequencies. In Europe, the ETSI is responsible for governing ISM bands.

Commonly used ISM bands include a 2.45 GHz band (also known as 2.4 GHz band) that includes the frequency band between 2.400 GHz and 2.500 GHz, a 5.8 GHz band that includes the frequency band 5.725-5.875 GHz, a 24 GHz band that includes the frequency band 24.000-24.250 GHz, a 61 GHz band that includes the frequency band 61.000-61.500 GHz, a 122 GHz band that includes the frequency band 122.000-123.000 GHz, and a 244 GHz band that includes the frequency band 244.000-246.000 GHz.

TOF. In order to determine the propagation time of the signal, a Time-Of-Flight (TOF) method may be used, where the time between the emission and reception of a light pulse is determined, the time measurement being effected with the aid of the edge, the peak value or some other characteristic of the pulse shape. In this case, pulse shape may be a temporal light intensity profile of the reception signal, specifically of the received light pulse—detected by the photosensitive element. The point in time of transmission can be determined either with the aid of an electrical pulse for initiating the emission, with the aid of the actuating signal applied to the transmitter, or with the aid of a reference signal mentioned above.

A pulsed Time-of-Flight (TOF) method is based on the phenomenon that the distance between two points can be determined by measuring the propagation time of a wave travelling between those two points. When used in an electro-optical based distance meter (such as the meter $22b$), a pulse of light, usually emitted from a laser source (such as the laser diode $24aa$) is transmitted to a target (such as the point $23$ as part of the surface $28$), and a portion of the light pulse reflected from the target is collected at the source location (such as by the photo-diode $24ba$). The round trip transit time of the light pulse (made of the lines $26a$ and $26b$) is measured, and the distance from the distance meter to the target is d=ct/2, where d is the distance, 'c' is the speed of light (in the propagation medium), 't' is the round trip transit time, and the factor of two accounts for the distance having to be traversed two times by the light pulse. The time measurement may be the time interval between a rising edge of the transmitted pulse and a rising edge of the reflected signal, between a trailing edge of the transmitted pulse and a trailing edge of the reflected signal, or any combination thereof. The speed of light, as well as the speed of sound, is a constant for a specific propagation medium. For example, the speed of light in a vacuum is approximately 300,000,000 meters per second, and in water, it is about ¾ of the speed in vacuum. Hence, assuming that a signal is travelling partly in air and partly in water (such as in a human body), the in-water and in-air traveled distance may be estimated based on the travel time.

An example of a pulsed TOF-based correlator $29a$ is shown as part of the distance meter $22b$ shown in FIG. $2b$. Upon a start command input (such as from a user of from a control circuitry), a pulse generator $29aa$, sends a pulse to the input of the driver $27a$ that serves as a constant current source to the transmitting element (such as the laser diode $24aa$). A receiving element (such as the photo diode $24ba$) is positioned to receive light reflected (or backscattered) back from the point $23$ of the target surface A $28$. The output from the receiving element $24ba$ is coupled to the receiver $27b$. A timer $29ab$ measures the time of flight, triggered to start time counting upon receiving the pulse from the pulse generator $29aa$ at a 'START' input terminal, and stopping the time counting upon receiving the signal from the receiver $27b$ output at a 'STOP' input terminal. The measured time of flight indicates the distance of the device $22b$ from the surface A $28$ at the reflection point (or area) $23$.

Laser-based pulsed TOF based distance meters are described in application notes by Acam-messelectronic GMBH (of Stutensee-Blankenloch, Germany) Application Note No. 1 (downloaded January 2016) entitled: "*Laser distance measurement with TDC's*", and by OSRAM Opto Semiconductors Gmbh (of Regensburg, Germany) (dated Sep. 10, 2004) entitled: "*Range Finding Using Pulse Lasers*", which are both incorporated in their entirety for all purposes as if fully set forth herein.

There are variations on the basic pulse TOF architecture. For example, one type of architecture teaches how the capacitor voltage can be downward sloping as the capacitor is discharged with a constant current source between the start and stop pulses. Instead of generating a voltage ramp, another type of architecture describes how a high-speed digital counter can be continuously incremented with a high frequency clocking signal after the start pulse occurs, and then terminates when the stop pulse occurs. This eliminates the need for an A/D converter as the output of the counter is already in a digital format. However, this counter approach has quantization errors, which is remedied by random dithering or interpolation methods. The counter or pulse TOF methods can be used for coarse range estimates, while phase measuring TOF, discussed below, is used for more precise range estimates. Alternately, a series of N pulses could be transmitted, in which a subsequent pulse is transmitted after the previous one is received, and the total time for these N pulses to be sent and received is measured. Thereafter, the time is divided by N to obtain a more precise estimate of a round trip transit time. A pulse train of a predetermined timing sequence could be used. An electronic correlation function is used to compare the delayed transmit sequence to the received sequence, and when correlation is found the delay has the round trip transit time of the pulse sequence.

To obtain an accurate distance estimate, the pulses must either be extremely short, or as is usually the case, must have fast low-high and high-low transitions. To obtain accuracies approximately 0.1", electronic bandwidths on the order of 1.0 gigahertz, or greater, are required in the transmission electronics, including the laser, as well as in the receive electronics, including the photodiode. Such broadband electronic components are expensive, and drive up the overall cost of the system. Furthermore, the distance signal processing is a two-stage affair. First, the distance information is encoded into a capacitor's voltage, and then secondly this voltage is converted into digital format for subsequent processing. A circuit that offers a single stage of processing is likely to be simpler, lower cost, and less error prone than a multi-stage system.

A high bandwidth (~1 GHz) TOF (time-of-flight) laser range finder techniques for industrial measurement applications in the measurement range of zero to a few dozen meters to diffusely reflecting targets, used to improve single-shot precision to mm-level in order to shorten the measurement result acquisition time, is described in a paper by Ari Kilpela (of the Department of Electrical and Information Engineering, University of Oulu) published 2004 (ISBN 951-42-7261-7) by the University of Oulu, Finland, entitled: "*Pulsed time-of-flight laser range finder techniques for fast, high precision measurement applications*", which is incorporated in its entirety for all purposes as if fully set forth herein.

A method for ascertaining the distance on the basis of the travel-time of high-frequency measuring signals, wherein at least one periodic, pulsed, transmission signal having a pulse repetition frequency is transmitted and at least one reflected measuring signal is received, is described in U.S. Patent Application Publication No. 2009/0212997 to Michalski entitled: "Method for Measuring a Distance Running Time", which is incorporated in its entirety for all purposes as if fully set forth herein. The transmission signal and the reflected measuring signal are transformed by means of a sampling signal produced with a sampling frequency into a time-expanded, intermediate-frequency signal having an intermediate-frequency. The time-expanded, intermediate-frequency signal is filtered by means of at least one filter and a filtered, intermediate-frequency signal is produced, wherein the intermediate-frequency is matched to a limit frequency and/or a center frequency of the filter. The matching of the filter to the intermediate-frequency of the time-expanded measuring signal results, reducing production costs.

Phase detection. In using a phase measuring principle, which the signal propagation time is determined by comparison of the phase angle of the amplitude modulation of the transmitted and received signals. In phase measuring rangefinding, a periodic modulation signal, usually a sinusoid, is transmitted to the target, and an echo is received and amplified. The phase of the received signal is delayed when compared to the phase of the transmitted signal because of the round trip transit time of the signal. A simplified schematic diagram of a phase measuring based correlator 29b is shown as part of the distance meter 22c in FIG. 2c. The emitter 24a is fed with a sinewave generator 23, so that the amplitude of the transmitted wave 26a and the reflected (or backscattered) wave 29ba is sinewave modulated. A phase detector 29bb measure the phase difference between the transmitted and received signals, which is proportional to the time delay and thus to the measured distance. The phase difference between the two signals is directly proportional to the distance to the target, according to the expression $d=\varphi\lambda/4\pi$, where d is the distance from the rangefinder to the target, and $\lambda$ is the wavelength of the modulating sinusoid (e.g., is 15 meters for a 20 MHz signal), and $\varphi$ is the phase difference in radians. A range ambiguity arises every $\lambda/2$ meters of distance, in which the phase of the modulating signal is identical every $N\lambda/2$ meters. Since the modulation occurs in a continuous-wave fashion, the average power of the carrier must be high in order to be able to obtain a significant received signal for large target distances. Further, undesirable phase delay changes of the electronic circuitry with changes in ambient environmental conditions, especially temperature, may cause an error. In addition, gain changes in AGC (Automatic-Gain-Control) circuitry will cause changes in phase as well, and these changes cannot be reliably calibrated and subtracted out with commonly used on-board reference methods. The measurement result in the case of one transmission frequency may have ambiguities in units of the transmission frequency period duration, thus necessitating further measures for resolving these ambiguities. Two technologies are typically used in phase measuring based rangefinders, namely homodyne and heterodyne.

While exampled regarding using a sinewave signal generated by the sinewave generator 29ba, any periodic signal generator may be used. Further, the repetitive signal may be a non-sinusoidal wave such as a square wave, a triangle wave, or a saw-tooth wave.

Heterodyne. A heterodyne demodulator is one in which a high frequency signal is mixed with a signal of a different frequency, and the resulting signal has components of the sum and the difference of the two frequencies. Typically, the frequency difference between the two mixed signals is a constant known frequency, and the resulting higher frequency, corresponding to the sum of the frequencies, is usually ignored and removed through filtering. The lower frequency signal is amplified in a bandpass amplifier resulting in a signal that has a good signal to noise ratio owing to the fact that all out of band noise is filtered by the bandpass amplifier. This amplified signal is mixed yet again with another signal, this time having the same frequency, and low pass filtered, resulting in a low-noise DC component whose amplitude is proportional to the phase of the received signal. Alternately, if the target is moving, the DC signal will not be present, but instead a low frequency AC signal will be present, and the frequency of this signal is proportional to the velocity of the target because of the Doppler shift. A functional block diagram of a heterodyning phase-measuring rangefinder is shown and explained in FIG. 2 and the associated description in U.S. Pat. No. 7,202,941.

Homodyne. A similar demodulation method utilizes homodyne electronic processing, in which the received signal is mixed with a signal having the same frequency. This is different from the heterodyne system described above where the received signal is first mixed with a signal having a different frequency. The result of homodyne mixing is that the first mixing stage results directly in the phase or low frequency AC signal for distance or velocity estimation. The second heterodyne mixing is eliminated, meaning less electronic components are utilized which translates into a cost savings, but typically the SNR is somewhat poorer than heterodyne-based distance and velocity measurement. The homodyne phase measuring rangefinder has the same drawbacks of the heterodyning rangefinder, especially as related to nonlinearities within the electronic functions, particularly the phase splitter and the mixers, as well as the imprecision at distances proportional to nit phase difference, and gain and delay drifts with changes in environmental conditions. Their mixer's outputs are also a function of the input signal amplitudes, and suffer from the same problems as discussed previously.

Other phase measuring include a phase measuring distance-measuring system that uses light as the modulation carrier. A homodyne mixer can be used for electronic signal processing, while still incorporating an optical modulation carrier. Multiple modulation frequencies can be used to resolve the ambiguity problem and to improve the accuracy of the distance estimate. Heterodyne electronic signal processing methods can also be used in conjunction with two or more modulation frequencies.

Coherent Burst. Coherent burst technology is a significant improvement over the phase measuring and pulse-TOF distance measuring methods. Specifically, the coherent burst modulation waveform allows the maximum range to be increased without compromising eye safety, and since the modulation is bandlimited, the resulting low cost circuitry and measurement accuracy is similar to that of the phase measuring methods. Coherent burst technology accomplishes this by combining the best of the phase-measuring and pulse-TOF methods, wherein a short series of bursts of amplitude modulated light is transmitted to the target. FIG. 4 in U.S. Pat. No. 7,202,941 illustrates the envelope of the coherent burst emission waveform, and FIG. 5 in U.S. Pat. No. 7,202,941 presents a magnified, and abbreviated, diagram of the coherent burst emission. The short bursts have pulse-like properties, in that they have a starting edge and a trailing edge, and a burst transmission can be used to start a counter or voltage ramp, and its reception from the target can be used to stop the counter or the voltage ramp, as described in the pulse TOF prior art discussion, above. This method can be used to provide a coarse estimate of the range, and therefore resolve the range ambiguity problem associated with phase measuring methods.

The coherent burst, being a short duration burst of amplitude modulated light, will also work with phase measuring methods, if the electronics comprising these phase measuring methods can respond and settle within the duration of a burst. Increasing the amplitude modulation frequency of a burst allows for increased measurement accuracy. Furthermore, by spacing the coherent bursts in time, high burst powers can be realized while maintaining an eye-safe average power, and long distances can be measured. An illustrative functional diagram for a conventional embodiment of the coherent burst distance measuring method is presented in FIG. 3 in U.S. Pat. No. 7,202,941.

An FMCW distance measurement process is described in U.S. Pat. No. 6,040,898 to Mrosik et al. entitled: "FMCW Distance Measurement Process", which is incorporated in its entirety for all purposes as if fully set forth herein. In an FMCW distance measurement process, a wave train of carrier frequency f0 is modulated with a time function f(t) and subdivided into a transmission signal and into a reference signal in deterministic phase relationship with the transmission signal; the transmission signal is sent on a transmission section to be measured and the reference signal is supplied to a phase difference-forming arrangement; the signal reflected in the transmission section with a delay that corresponds to propagation time τ is also supplied as a reception signal to the phase difference-forming arrangement that forms the time difference function θ(t) between the phases of reference and reception signals; the phase difference function θ(t) is separately evaluated in a continuous fraction θ=that corresponds to the carrier frequency f0 and in an alternating fraction θ-(t) that corresponds to the modulation time function f(t); and the propagation time τ proportional to the distance is finally determined by evaluating together both phase difference information.

High speed and high precision phase measuring techniques for improving the dynamic measurement accuracy of phase-shift laser range finder are described in an article by Pengcheng Hu et al. published in The 10th International Symposium of Measurement Technology and Intelligent Instruments (June 29-Jul. 2, 2011) entitled: *"Phase-shift laser range finder based on high speed and high precision phase-measuring techniques"*, which is incorporated in its entirety for all purposes as if fully set forth herein.

A technique for improving the performance of laser phase-shift range finders by phase measurement that use a method to extract the phase-shift data from the peak of received and transmitted intermediate frequency signal amplitudes is described in a paper downloaded January 2016 by Shahram Mohammad Nejad and Kiazand Fasihi (both from Department of Electrical Engineering, Iran University of Science and Technology (IUST), Tehran, Iran) entitled: *"A new design of laser phase-shift range finder independent of environmental conditions and thermal drift"*, which is incorporated in its entirety for all purposes as if fully set forth herein.

Beat signal. A distance measurement by radar comprising a frequency modulated radar-transmitter and -receiver by which a radar beam is guided onto an object to be measured and which, by mixing of the transmitted frequency with the received frequency, delivers a beat signal; frequency modulating means, by which the transmitted frequency of the radar signal of the Doppler signal device is periodically variable in a saw-tooth shaped way and wherein the frequency of the beat signal, due to the travel time of the radar beam reflected by the object, is a measure for the distance of the object, and a signal processing circuit generating a measured value from the beat signal obtained. In the radar-transmitter and -receiver mixing takes place of the transmitted and the received signal. The signal received has passed the distance to and from the object, thereby has been transmitted at an earlier instant and thereby has, due to the saw-tooth modulation, a frequency, which is a bit different from the frequency of the signal, which is emitted at the moment of reception. Thereby a beat frequency occurs that is proportional to the travel time to the object and thereby to the distance from the object to the radar-transmitter and -receiver.

A portable range finder including a laser device is described in Patent Cooperation Treaty (PCT) International Publication Number WO 2004/036246 by Peter STEVRIN entitled: "Mobile Phone with Laser Range Finder", which is incorporated in its entirety for all purposes as if fully set forth herein. The portable range finder is preferably of LADER type (Laser Detection and Ranging), which can be compressed to take up only a very little space, for instance an integrated circuit, through which the range finder can be integrated with or connected to a portable handheld device, such as a mobile or handheld computer (PDA, Personal Digital Assistant) and use a display and keyboard at the mentioned portable handheld device for interaction between the user and the range finder.

A portable instrument or apparatus that includes a portable device and a rangefinder module is described in U.S. Patent Application Publication No. 2013/0335559 to Van Toorenburg et al. entitled: "Mobile Measurement Devices, Instruments and Methods", which is incorporated in its entirety for all purposes as if fully set forth herein. The rangefinder module can be attached to the portable device, which may be any suitable smartphone, tablet or other consumer electronics device having a camera. By suitable alignment of the rangefinder and camera, the device is capable of capturing accurate data over significant ranges, including for example an image of a target together with position information concerning the target.

A wireless communication device includes a range finder, and is configured to obtain distance measurements via the range finder for processing by the device, is described in U.S. Patent Application Publication No. 2007/0030348 to Snyder entitled: "Wireless Communication Device with Range Finding Functions", which is incorporated in its entirety for all purposes as if fully set forth herein. Such processing may comprise, by way of example, storing distance measurement information, outputting distance measurement information on a display screen of the wireless communication device, transmitting distance information to a wireless communication network, or outputting tones, pulses, or vibrations as a function of the distance measurement information. The wireless communication device may include a camera, and the range finder may be aligned with the camera, such that related distance information may be obtained for objects imaged by the camera.

A camera that receives light from a field of view, produces signals representative of the received light, and intermittently reads the signals to create a photographic image is described in U.S. Pat. No. 5,189,463 to Axelrod et al. entitled: "Camera Aiming Mechanism and Method", which is incorporated in its entirety for all purposes as if fully set forth herein. The intermittent reading results in intermissions between readings. The invention also includes a radiant energy source that works with the camera. The radiant energy source produces a beam of radiant energy and projects the beam during intermissions between readings. The beam produces a light pattern on an object within or near the camera's field of view, thereby identifying at least a part of the field of view. The radiant energy source is often a laser and the radiant energy beam is often a laser beam. A detection mechanism that detects the intermissions and produces a signal that causes the radiant energy source to project the radiant energy beam. The detection mechanism is typically an electrical circuit including a retriggerable multivibrator or other functionally similar component.

AC/DC Power Supply. A power supply is an electronic device that supplies electric energy to an electrical load, where the primary function of a power supply is to convert one form of electrical energy to another and, as a result, power supplies are sometimes referred to as electric power converters. Some power supplies are discrete, stand-alone devices, whereas others are built into larger devices along with their loads. Examples of the latter include power supplies found in desktop computers and consumer electronics devices. Every power supply must obtain the energy it supplies to its load, as well as any energy it consumes while performing that task, from an energy source. Depending on its design, a power supply may obtain energy from various types of energy sources, including electrical energy transmission systems, energy storage devices such as a batteries and fuel cells, electromechanical systems such as generators and alternators, solar power converters, or another power supply. All power supplies have a power input, which receives energy from the energy source, and a power output that delivers energy to the load. In most power supplies, the power input and the power output consist of electrical connectors or hardwired circuit connections, though some power supplies employ wireless energy transfer in lieu of galvanic connections for the power input or output.

Some power supplies have other types of inputs and outputs as well, for functions such as external monitoring and control. Power supplies are categorized in various ways, including by functional features. For example, a regulated power supply is one that maintains constant output voltage or current despite variations in load current or input voltage. Conversely, the output of an unregulated power supply can change significantly when its input voltage or load current changes. Adjustable power supplies allow the output voltage or current to be programmed by mechanical controls (e.g., knobs on the power supply front panel), or by means of a control input, or both. An adjustable regulated power supply is one that is both adjustable and regulated. An isolated power supply has a power output that is electrically independent of its power input; this is in contrast to other power supplies that share a common connection between power input and output.

AC-to-DC (AC/DC) power supply uses AC mains electricity as an energy source, and typically employs a transformer to convert the input voltage to a higher, or commonly lower AC voltage. A rectifier is used to convert the transformer output voltage to a varying DC voltage, which in turn is passed through an electronic filter to convert it to an unregulated DC voltage. The filter removes most, but not all of the AC voltage variations; the remaining voltage variations are known as a ripple. The electric load tolerance of ripple dictates the minimum amount of filtering that must be provided by a power supply. In some applications, high ripple is tolerated and therefore no filtering is required. For example, in some battery charging applications, it is possible to implement a mains-powered DC power supply with nothing more than a transformer and a single rectifier diode, with a resistor in series with the output to limit charging current.

The function of a linear voltage regulator is to convert a varying AC or DC voltage to a constant, often specific, lower DC voltage. In addition, they often provide a current limiting function to protect the power supply and load from overcurrent (excessive, potentially destructive current). A constant output voltage is required in many power supply applications, but the voltage provided by many energy sources will vary with changes in load impedance. Furthermore, when an unregulated DC power supply is the energy source, its output voltage will also vary with changing input voltage. To circumvent this, some power supplies use a linear voltage regulator to maintain the output voltage at a steady value, independent of fluctuations in input voltage and load impedance. Linear regulators can also reduce the magnitude of ripple and noise present appearing on the output voltage.

In a Switched-Mode Power Supply (SMPS), the AC mains input is directly rectified and then filtered to obtain a DC voltage, which is then switched "on" and "off" at a high frequency by electronic switching circuitry, thus producing an AC current that will pass through a high-frequency transformer or inductor. Switching occurs at a very high frequency (typically 10 kHz-1 MHz), thereby enabling the use of transformers and filter capacitors that are much smaller, lighter, and less expensive than those found in linear power supplies operating at mains frequency. After the inductor or transformer secondary, the high frequency AC is rectified and filtered to produce the DC output voltage. If the SMPS uses an adequately insulated high-frequency transformer, the output will be electrically isolated from the mains; this feature is often essential for safety. Switched-mode power supplies are usually regulated, and to keep the output voltage constant, the power supply employs a feedback controller that monitors current drawn by the load. SMPSs often include safety features such as current limiting or a crowbar circuit to help protect the device and the user from harm. In the event that an abnormally high-current power draw is detected, the switched-mode supply can assume this is a direct short and will shut itself down before damage is done. PC power supplies often provide a power good signal to the motherboard; the absence of this signal prevents operation when abnormal supply voltages are present.

Power supplies are described in Agilent Technologies Application Note 90B dated Oct. 1, 2000 (5925-4020) entitled: "*DC Power Supply Handbook*" and in Application Note 1554 dated Feb. 4, 2005 (5989-2291EN) entitled: "*Understanding Linear Power Supply Operation*", and in On Semiconductor® Reference Manual Rev. 4 dated April 2014 (SMPSRM/D) entitled: "*Switch-Mode Power Supply*", which are all incorporated in their entirety for all purposes as if fully set forth herein.

Battery. A battery may be a primary battery or cell, in which an irreversible chemical reaction generates the electricity, and thus the cell is disposable and cannot be recharged, and need to be replaced after the battery is drained. Such battery replacement may be expensive and cumbersome. Alternatively or in addition, a rechargeable (secondary) battery may be used, such as a nickel-cadmium based battery. In such a case, a battery charger is employed for charging the battery while it is in use or not in use. Various types of such battery chargers are known in the art, such as trickle chargers, pulse chargers and the like. The battery charger may be integrated with the field unit or be external to it. The battery may be a primary or a rechargeable (secondary) type, may include a single or few batteries, and may use various chemicals for the electro-chemical cells, such as lithium, alkaline and nickel-cadmium. Common batteries are manufactured in pre-defined standard output voltages (1.5, 3, 4.5, 9 Volts, for example), as well as defined standard mechanical enclosures (usually defined by letters such as "A", "AA", "B", "C" sizes), and 'coin' or 'button' type. In one embodiment, the battery (or batteries) is held in a battery holder or compartment, and thus can be easily replaced.

A battery may be a 'watch battery' (a.k.a. 'coin cell' or 'button cell'), which is a small single cell battery shaped as a squat cylinder typically 5 to 25 mm in diameter and 1 to 6 mm high. Button cells are typically used to power small portable electronics devices such as wrist watches, pocket calculators, artificial cardiac pacemakers, implantable cardiac defibrillators, and hearing aids. Most button cells have low self-discharge and hold their charge for a long time if not used. Higher-power devices such as hearing aids may use zinc-air cells that have much higher capacity for a given size, but discharge over a few weeks even if not used. Button cells are single cells, usually disposable primary cells. Common anode materials are zinc or lithium, and common cathode materials are manganese dioxide, silver oxide, carbon monofluoride, cupric oxide or oxygen from the air. A metal can forms the bottom body and positive terminal of the cell, where the insulated top cap is the negative terminal.

An example of a 'coin cell' is designated by the International Electrotechnical Commission (IEC) in the IEC 60086-3 standard (Primary batteries, part 3 Watch batteries) as LR44 type, which is an alkaline 1.5 volt button cell. The letter 'L' indicates the electrochemical system used: a zinc negative electrode, manganese dioxide depolarizer and positive electrode, and an alkaline electrolyte. R44 indicates a round cell 11.4±0.2 mm diameter and 5.2±0.2 mm height as defined by the IEC standard 60086. An example of LR44 type battery is Energizer A76 battery, available from Energizer Holdings, Inc., and described in a product datasheet Form No. EBC—4407cp-Z (downloaded from the Internet 3/2016) entitled: "*Energizer A 76 ZEROMERCURY Miniature Alkaline*", which is incorporated in its entirety for all purposes as if fully set forth herein. Another example of a 'coin cell' is a CR2032 battery, which is a button cell lithium battery rated at 3.0 volts. Nominal diameter is 20 mm, nominal height is 3.2 mm. CR2032 indicates a round cell 19.7-20 mm diameter and 2.9-3.2 mm height as defined by the IEC standard 60086. The battery weight typically ranges from 2.8 g to 3.9 g. The BR2032 battery has the same dimensions, a slightly lower nominal voltage and capacity, and an extended temperature range compared with the CR2032. It is rated for a temperature range of −30° C. to 85° C., while the CR2032 is specified over the range −20° C. to 70° C. BR2032 also has a much lower self-discharge rate. An example of CR2032 type battery is Energizer CR2032 Lithium Coin battery, available from Energizer Holdings, Inc., and described in a product datasheet Form No. EBC—4120M (downloaded from the Internet 3/2016) entitled: "*Energizer CR2032—Lithium Coin*", which is incorporated in its entirety for all purposes as if fully set forth herein.

Wireless. Any embodiment herein may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (RTM), Global Positioning System (GPS), Wi-Fi, Wi-Max, Zig-Bee™, Ultra-Wideband (UWB), Global System for Mobile communication (GSM), 2G, 2.5G, 3G, 3.5G, Enhanced Data rates for GSM Evolution (EDGE), or the like. Any wireless network or wireless connection herein may be operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards. Further, a network element (or a device) herein may consist of, be part of, or include, a cellular radio-telephone communication system, a cellular telephone, a wireless telephone, a Personal Communication Systems (PCS) device, a PDA device that incorporates a wireless communication device, or a mobile/portable Global Positioning System (GPS) device. Further, a wireless communication may be based on wireless technologies that are described in Chapter 20: "Wireless Technologies" of the publication number 1-587005-001-3 by Cisco Systems, Inc. (7/99) entitled: "Internetworking Technologies Handbook", which is incorporated in its entirety for all purposes as if fully set forth herein. Wireless technologies and networks are further described in a book published 2005 by Pearson Education, Inc. William Stallings [ISBN: 0-13-191835-4] entitled: "Wireless Communications and Networks—second Edition", which is incorporated in its entirety for all purposes as if fully set forth herein.

Wireless networking typically employs an antenna (a.k.a. aerial), which is an electrical device that converts electric power into radio waves, and vice versa, connected to a wireless radio transceiver. In transmission, a radio transmitter supplies an electric current oscillating at radio frequency to the antenna terminals, and the antenna radiates the energy from the current as electromagnetic waves (radio waves). In reception, an antenna intercepts some of the power of an electromagnetic wave in order to produce a low voltage at its terminals that is applied to a receiver to be amplified. Typically an antenna consists of an arrangement of metallic conductors (elements), electrically connected (often through a transmission line) to the receiver or transmitter. An oscillating current of electrons forced through the antenna by a transmitter will create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming radio wave exert force on the electrons in the antenna elements, causing them to move back and forth, creating oscillating currents in the antenna. Antennas can be designed to transmit and receive radio waves in all horizontal directions equally (omnidirectional antennas), or preferentially in a particular direction (directional or high gain antennas). In the latter case, an antenna may also include additional elements or surfaces with no electrical connection to the transmitter or receiver, such as parasitic elements, parabolic reflectors or horns, which serve to direct the radio waves into a beam or other desired radiation pattern.

LPD433. LPD433 (Low Power Device 433 MHz) is a UHF band in which license-free communication devices are allowed to operate in Europe and other countries over the world. The frequencies correspond with the ITU region 1 ISM band of 433.050 MHz to 434.790 MHz, and operation is mainly limited to CEPT countries. The frequencies used are within the 70-centimeter band, which is traditionally reserved for higher power amateur radio operations in most nations worldwide. LPD hand-held radios are authorized for license-free voice communications used in most of Europe using analog frequency modulation (FM) as part of short-range device regulations, with 25 kHz channel spacing, for a total of 69 channels. In some countries, LPD devices may only be used with the integral and non-removable antenna with a maximum legal power output of 10 mW. LPD433 is also commonly used by wireless instruments and digital devices such as car keylocks.

Zigbee. ZigBee is a standard for a suite of high-level communication protocols using small, low-power digital radios based on an IEEE 802 standard for Personal Area Network (PAN). Applications include wireless light switches, electrical meters with in-home displays, and other consumer and industrial equipment that require a short-range wireless transfer of data at relatively low rates. The technology defined by the ZigBee specification is intended to be simpler and less expensive than other WPANs, such as Bluetooth. ZigBee is targeted at Radio-Frequency (RF) applications that require a low data rate, long battery life, and secure networking. ZigBee has a defined rate of 250 kbps suited for periodic or intermittent data or a single signal transmission from a sensor or input device.

ZigBee builds upon the physical layer and medium access control defined in IEEE standard 802.15.4 (2003 version) for low-rate WPANs. The specification further discloses four main components: network layer, application layer, ZigBee Device Objects (ZDOs), and manufacturer-defined application objects, which allow for customization and favor total integration. The ZDOs are responsible for a number of tasks, which include keeping of device roles, management of requests to join a network, device discovery, and security. Because ZigBee nodes can go from a sleep to active mode in 30 ms or less, the latency can be low and devices can be responsive, particularly compared to Bluetooth wake-up delays, which are typically around three seconds. ZigBee nodes can sleep most of the time, thus an average power consumption can be lower, resulting in longer battery life.

There are three defined types of ZigBee devices: ZigBee Coordinator (ZC), ZigBee Router (ZR), and ZigBee End Device (ZED). ZigBee Coordinator (ZC) is the most capable device, forms the root of the network tree, and might bridge to other networks. There is exactly one defined ZigBee coordinator in each network, and it is the device that started the network originally. It is able to store information about the network, including acting as the Trust Center & repository for security keys. ZigBee Router (ZR) may be running an application function as well as can acting as an intermediate router, passing on data from other devices. ZigBee End Device (ZED) contains functionality to talk to a parent node (either the coordinator or a router). This relationship allows the node to be asleep a significant amount of the time, thereby giving long battery life. A ZED requires the least amount of memory, and therefore can be less expensive to manufacture than a ZR or ZC.

The protocols build on recent algorithmic research (Ad-hoc On-demand Distance Vector, neuRFon) to automatically construct a low-speed ad-hoc network of nodes. In most large network instances, the network will be a cluster of clusters. It can also form a mesh or a single cluster. The current ZigBee protocols support beacon and non-beacon enabled networks. In non-beacon-enabled networks, an unslotted CSMA/CA channel access mechanism is used. In this type of network, ZigBee Routers typically have their receivers continuously active, requiring a more robust power supply. However, this allows for heterogeneous networks in which some devices receive continuously, while others only transmit when an external stimulus is detected.

In beacon-enabled networks, the special network nodes called ZigBee Routers transmit periodic beacons to confirm their presence to other network nodes. Nodes may sleep between the beacons, thus lowering their duty cycle and extending their battery life. Beacon intervals depend on the data rate; they may range from 15.36 milliseconds to 251.65824 seconds at 250 Kbit/s, from 24 milliseconds to 393.216 seconds at 40 Kbit/s, and from 48 milliseconds to 786.432 seconds at 20 Kbit/s. In general, the ZigBee protocols minimize the time the radio is on to reduce power consumption. In beaconing networks, nodes only need to be active while a beacon is being transmitted. In non-beacon-enabled networks, power consumption is decidedly asymmetrical: some devices are always active, while others spend most of their time sleeping.

Except for the Smart Energy Profile 2.0, current ZigBee devices conform to the IEEE 802.15.4-2003 Low-Rate Wireless Personal Area Network (LR-WPAN) standard. The standard specifies the lower protocol layers—the PHYsical layer (PHY), and the Media Access Control (MAC) portion of the Data Link Layer (DLL). The basic channel access mode is "Carrier Sense, Multiple Access/Collision Avoidance" (CSMA/CA), that is, the nodes talk in the same way that people converse; they briefly check to see that no one is talking before they start. There are three notable exceptions to the use of CSMA. Beacons are sent on a fixed time schedule, and do not use CSMA. Message acknowledgments also do not use CSMA. Finally, devices in Beacon Oriented networks that have low latency real-time requirements may also use Guaranteed Time Slots (GTS), which by definition do not use CSMA.

Z-Wave. Z-Wave is a wireless communications protocol by the Z-Wave Alliance (http://www.z-wave.com) designed for home automation, specifically for remote control applications in residential and light commercial environments. The technology uses a low-power RF radio embedded or retrofitted into home electronics devices and systems, such as lighting, home access control, entertainment systems and household appliances. Z-Wave communicates using a low-power wireless technology designed specifically for remote control applications. Z-Wave operates in the sub-gigahertz frequency range, around 900 MHz. This band competes with some cordless telephones and other consumer electronics devices, but avoids interference with WiFi and other systems that operate on the crowded 2.4 GHz band. Z-Wave is designed to be easily embedded in consumer electronics products, including battery-operated devices such as remote controls, smoke alarms and security sensors.

Z-Wave is a mesh networking technology where each node or device on the network is capable of sending and receiving control commands through walls or floors, and use intermediate nodes to route around household obstacles or radio dead spots that might occur in the home. Z-Wave devices can work individually or in groups, and can be programmed into scenes or events that trigger multiple devices, automatically or via remote control. The Z-wave radio specifications include bandwidth of 9,600 bit/s or 40 Kbit/s, fully interoperable, GFSK modulation, and a range of approximately 100 feet (or 30 meters) assuming "open air" conditions, with reduced range indoors depending on building materials, etc. The Z-Wave radio uses the 900 MHz ISM band: 908.42 MHz (United States); 868.42 MHz (Europe); 919.82 MHz (Hong Kong); and 921.42 MHz (Australia/New Zealand).

Z-Wave uses a source-routed mesh network topology and has one or more master controllers that control routing and security. The devices can communicate to another by using intermediate nodes to actively route around, and circumvent household obstacles or radio dead spots that might occur. A message from node A to node C can be successfully delivered even if the two nodes are not within range, providing that a third node B can communicate with nodes A and C. If the preferred route is unavailable, the message originator will attempt other routes until a path is found to the "C" node. Therefore, a Z-Wave network can span much farther than the radio range of a single unit; however, with several of these hops, a delay may be introduced between the control command and the desired result. In order for Z-Wave units to be able to route unsolicited messages, they cannot be in sleep mode. Therefore, most battery-operated devices are not designed as repeater units. A Z-Wave network can consist of up to 232 devices with the option of bridging networks if more devices are required.

WWAN. Any wireless network herein may be a Wireless Wide Area Network (WWAN) such as a wireless broadband network, and the WWAN port may be an antenna and the WWAN transceiver may be a wireless modem. The wireless network may be a satellite network, the antenna may be a satellite antenna, and the wireless modem may be a satellite modem. The wireless network may be a WiMAX network such as according to, compatible with, or based on, IEEE 802.16-2009, the antenna may be a WiMAX antenna, and the wireless modem may be a WiMAX modem. The wireless network may be a cellular telephone network, the antenna may be a cellular antenna, and the wireless modem may be a cellular modem. The cellular telephone network may be a Third Generation (3G) network, and may use UMTS W-CDMA, UMTS HSPA, UMTS TDD, CDMA2000 1xRTT, CDMA2000 EV-DO, or GSM EDGE-Evolution. The cellular telephone network may be a Fourth Generation (4G) network and may use or be compatible with HSPA+, Mobile WiMAX, LTE, LTE-Advanced, MBWA, or may be compatible with, or based on, IEEE 802.20-2008.

WLAN. Wireless Local Area Network (WLAN), is a popular wireless technology that makes use of the Industrial, Scientific and Medical (ISM) frequency spectrum. In the US, three of the bands within the ISM spectrum are the A band, 902-928 MHz; the B band, 2.4-2.484 GHz (a.k.a. 2.4 GHz); and the C band, 5.725-5.875 GHz (a.k.a. 5 GHz). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wi-fi.org). IEEE 802.11b describes a communication using the 2.4 GHz frequency band and supporting communication rate of 11 Mb/s, IEEE 802.11a uses the 5 GHz frequency band to carry 54 MB/s and IEEE 802.11g uses the 2.4 GHz band to support 54 Mb/s. The WiFi technology is further described in a publication entitled: "*WiFi Technology*" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game, because the setup is easy and an access point is not required.

A node/client with a WLAN interface is commonly referred to as STA (Wireless Station/Wireless client). The STA functionality may be embedded as part of the data unit, or alternatively be a dedicated unit, referred to as bridge, coupled to the data unit. While STAs may communicate without any additional hardware (ad-hoc mode), such network usually involves Wireless Access Point (a.k.a. WAP or AP) as a mediation device. The WAP implements the Basic Stations Set (BSS) and/or ad-hoc mode based on Independent BSS (IBSS). STA, client, bridge and WAP will be collectively referred to hereon as WLAN unit. Bandwidth allocation for IEEE 802.11g wireless in the U.S. allows multiple communication sessions to take place simultaneously, where eleven overlapping channels are defined spaced 5 MHz apart, spanning from 2412 MHz as the center frequency for channel number 1, via channel 2 centered at 2417 MHz and 2457 MHz as the center frequency for channel number 10, up to channel 11 centered at 2462 MHz. Each channel bandwidth is 22 MHz, symmetrically (+/−11 MHz) located around the center frequency. In the transmission path, first the baseband signal (IF) is generated based on the data to be transmitted, using 256 QAM (Quadrature Amplitude Modulation) based OFDM (Orthogonal Frequency Division Multiplexing) modulation technique, resulting a 22 MHz (single channel wide) frequency band signal. The signal is then up converted to the 2.4 GHz (RF) and placed in the center frequency of required channel, and transmitted to the air via the antenna. Similarly, the receiving path comprises a received channel in the RF spectrum, down converted to the baseband (IF) wherein the data is then extracted.

In order to support multiple devices and using a permanent solution, a Wireless Access Point (WAP) is typically used. A Wireless Access Point (WAP, or Access Point—AP) is a device that allows wireless devices to connect to a wired network using Wi-Fi, or related standards. The WAP usually connects to a router (via a wired network) as a standalone device, but can also be an integral component of the router itself. Using Wireless Access Point (AP) allows users to add devices that access the network with little or no cables. A WAP normally connects directly to a wired Ethernet connection, and the AP then provides wireless connections using radio frequency links for other devices to utilize that wired connection. Most APs support the connection of multiple wireless devices to one wired connection. Wireless access typically involves special security considerations, since any device within a range of the WAP can attach to the network. The most common solution is wireless traffic encryption. Modern access points come with built-in encryption such as Wired Equivalent Privacy (WEP) and Wi-Fi Protected Access (WPA), typically used with a password or a passphrase. Authentication in general, and a WAP authentication in particular, is used as the basis for authorization, which determines whether a privilege may be granted to a particular user or process, privacy, which keeps information from becoming known to non-participants, and non-repudiation, which is the inability to deny having done something that was authorized to be done based on the authentication. An authentication in general, and a WAP authentication in particular, may use an authentication server, that provides a network service that applications may use to authenticate the credentials, usually account names and passwords of their users. When a client submits a valid set of credentials, it receives a cryptographic ticket that it can subsequently be used to access various services. Authentication algorithms include passwords, Kerberos, and public key encryption.

Prior art technologies for data networking may be based on single carrier modulation techniques, such as AM (Amplitude Modulation), FM (Frequency Modulation), and PM (Phase Modulation), as well as bit encoding techniques such as QAM (Quadrature Amplitude Modulation) and QPSK (Quadrature Phase Shift Keying). Spread spectrum technologies, to include both DSSS (Direct Sequence Spread Spectrum) and FHSS (Frequency Hopping Spread Spectrum) are known in the art. Spread spectrum commonly employs Multi-Carrier Modulation (MCM) such as OFDM (Orthogonal Frequency Division Multiplexing). OFDM and other spread spectrum are commonly used in wireless communication systems, particularly in WLAN networks.

BAN. A wireless network may be a Body Area Network (BAN) according to, compatible with, or based on, IEEE 802.15.6 standard, and communicating devices may comprise a BAN interface that may include a BAN port and a BAN transceiver. The BAN may be a Wireless BAN (WBAN), and the BAN port may be an antenna and the BAN transceiver may be a WBAN modem.

Bluetooth. Bluetooth is a wireless technology standard for exchanging data over short distances (using short-wavelength UHF radio waves in the ISM band from 2.4 to 2.485 GHz) from fixed and mobile devices, and building personal area networks (PANs). It can connect several devices, overcoming problems of synchronization. A Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein.

Bluetooth operates at frequencies between 2402 and 2480 MHz, or 2400 and 2483.5 MHz including guard bands 2 MHz wide at the bottom end and 3.5 MHz wide at the top. This is in the globally unlicensed (but not unregulated) Industrial, Scientific and Medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of 1 MHz. It usually performs 800 hops per second, with Adaptive Frequency-Hopping (AFH) enabled. Bluetooth low energy uses 2 MHz spacing, which accommodates 40 channels. Bluetooth is a packet-based protocol with a master-slave structure. One master may communicate with up to seven slaves in a piconet. All devices share the master's clock. Packet exchange is based on the basic clock, defined by the master, which ticks at 312.5 µs intervals. Two clock ticks make up a slot of 625 µs, and two slots make up a slot pair of 1250 µs. In the simple case of single-slot packets, the master transmits in even slots and receives in odd slots. The slave, conversely, receives in even slots and transmits in odd slots. Packets may be 1, 3 or 5 slots long, but in all cases the master's transmission begins in even slots and the slave's in odd slots.

A master Bluetooth device can communicate with a maximum of seven devices in a piconet (an ad-hoc computer network using Bluetooth technology), though not all devices reach this maximum. The devices can switch roles, by agreement, and the slave can become the master (for example, a headset initiating a connection to a phone necessarily begins as master—as initiator of the connection—but may subsequently operate as slave). The Bluetooth Core Specification provides for the connection of two or more piconets to form a scatternet, in which certain devices simultaneously play the master role in one piconet and the slave role in another. At any given time, data can be transferred between the master and one other device (except for the little-used broadcast mode). The master chooses which slave device to address; typically, it switches rapidly from one device to another in a round-robin fashion. Since it is the master that chooses which slave to address, whereas a slave is supposed to listen in each receive slot, being a master is a lighter burden than being a slave. Being a master of seven slaves is possible; being a slave of more than one master is difficult.

Bluetooth Low Energy. Bluetooth low energy (Bluetooth LE, BLE, marketed as Bluetooth Smart) is a wireless personal area network technology designed and marketed by the Bluetooth Special Interest Group (SIG) aimed at novel applications in the healthcare, fitness, beacons, security, and home entertainment industries. Compared to Classic Bluetooth, Bluetooth Smart is intended to provide considerably reduced power consumption and cost while maintaining a similar communication range. Bluetooth low energy is described in a Bluetooth SIG published Dec. 2, 2014 standard Covered Core Package version: 4.2, entitled: *"Master Table of Contents & Compliance Requirements—Specification Volume 0"*, and in an article published 2012 in Sensors [ISSN 1424-8220] by Carles Gomez et al. [Sensors 2012, 12, 11734-11753; doi:10.3390/s120211734] entitled: *"Overview and Evaluation of Bluetooth Low Energy: An Emerging Low-Power Wireless Technology"*, which are both incorporated in their entirety for all purposes as if fully set forth herein.

Bluetooth Smart technology operates in the same spectrum range (the 2.400 GHz-2.4835 GHz ISM band) as Classic Bluetooth technology, but uses a different set of channels. Instead of the Classic Bluetooth 79 1-MHz channels, Bluetooth Smart has 40 2-MHz channels. Within a channel, data is transmitted using Gaussian frequency shift modulation, similar to Classic Bluetooth's Basic Rate scheme. The bit rate is 1 Mbit/s, and the maximum transmit power is 10 mW. Bluetooth Smart uses frequency hopping to counteract narrowband interference problems. Classic Bluetooth also uses frequency hopping but the details are different; as a result, while both FCC and ETSI classify Bluetooth technology as an FHSS scheme, Bluetooth Smart is classified as a system using digital modulation techniques or a direct-sequence spread spectrum. All Bluetooth Smart devices use the Generic Attribute Profile (GATT). The application programming interface offered by a Bluetooth Smart aware operating system will typically be based around GATT concepts.

BLE provides proximity sensing, where the relevant application profiles include FMP—the "find me" profile, that allows one device to issue an alert on a second misplaced device, and PXP—the proximity profile, that allows a proximity monitor to detect whether a proximity reporter is within a close range. Physical proximity can be estimated using the radio receiver's RSSI value, although this does not have absolute calibration of distances. Typically, an alarm may be sounded when the distance between the devices exceeds a set threshold.

NFC. Any wireless communication herein may be partly or in full in accordance with, compatible with, or based on, short-range communication such as Near Field Communication (NFC), having a theoretical working distance of 20 centimeters and a practical working distance of about 4 centimeters, and commonly used with mobile devices, such as smartphones. The NFC typically operates at 13.56 MHz as defined in ISO/IEC 18000-3 air interface, and at data rates ranging from 106 Kbit/s to 424 Kbit/s. NFC commonly involves an initiator and a target; the initiator actively generates an RF field that may power a passive target. NFC peer-to-peer communication is possible, provided both devices are powered.

The NFC typically supports passive and active modes of operation. In passive communication mode, the initiator device provides a carrier field and the target device answers by modulating the existing field, and the target device may draw its operating power from the initiator-provided electromagnetic field, thus making the target device a transponder. In active communication mode, both devices typically have power supplies, and both initiator and target devices communicate by alternately generating their own fields, where a device deactivates its RF field while it is waiting for data. NFC typically uses Amplitude-Shift Keying (ASK), and employs two different schemes to transfer data. At the data transfer rate of 106 Kbit/s, a modified Miller coding with 100% modulation is used, while in all other cases Manchester coding is used with a modulation ratio of 10%.

The NFC communication may be partly or in full in accordance with, compatible with, or based on, NFC standards ISO/IEC 18092 or ECMA-340 entitled: "Near Field Communication Interface and Protocol-1 (NFCIP-1)", and ISO/IEC 21481 or ECMA-352 standards entitled: *"Near Field Communication Interface and Protocol-2 (NFCIP-2)"*. The NFC technology is described in ECMA International white paper Ecma/TC32-TG19/2005/012 entitled: *"Near Field Communication—White paper"*, in Rohde & Schwarz White Paper 1MA182_4e entitled: *"Near Field Communication (NFC) Technology and Measurements White Paper"*, and in Jan Kremer Consulting Services (JKCS) white paper entitled: *"NFC—Near Field Communication—White paper"*, which are all incorporated in their entirety for all purposes as if fully set forth herein.

Cellular. Cellular telephone network may be according to, compatible with, or may be based on, a Third Generation (3G) network that uses UMTS W-CDMA, UMTS HSPA, UMTS TDD, CDMA2000 1×RTT, CDMA2000 EV-DO, GSM EDGE-Evolution, the cellular telephone network may be a Fourth Generation (4G) network that uses HSPA+, Mobile WiMAX, LTE, LTE-Advanced, MBWA, or may be based on or compatible with IEEE 802.20-2008.

Signal strength. In telecommunications, particularly in radio frequency, signal strength (also referred to as field strength) refers to the transmitter power output as received by a reference antenna at a distance from the transmitting antenna. High-powered transmissions, such as those used in broadcasting, are expressed in dB-millivolts per meter (dBmV/m). For very low-power systems, such as mobile phones, signal strength is usually expressed in dB-microvolts per meter (dB μV/m) or in decibels above a reference level of one milliwatt (dBm). In broadcasting terminology, 1 mV/m is 1000 V/m or 60 dB (often written dBu).

RSSI. A Received Signal Strength Indicator (RSSI) is a measurement of the power present in a received radio signal. RSSI is usually invisible to a user of a receiving device. However, because signal strength can vary greatly and affect functionality in wireless networking, IEEE 802.11 devices often make the measurement available to users. RSSI is often done in the Intermediate Frequency (IF) stage before the IF amplifier. In zero-IF systems, it is done in the baseband signal chain, before the baseband amplifier. RSSI output is often a DC analog level, and it can also be sampled by an internal ADC and the resulting codes available directly or via peripheral or internal processor bus. RSSI is described in an Application Note published February 2004 by MaxStream, Inc. (document number—XST-ANO12a) entitled: *"Received Signal Strength Indication"*, and in Texas Instruments Incorporated 2010 published Design Note DN505 (Document number SWRA114D) by Siri Johnsrud and Tarjei Aaberge entitled: *"RSSI Interpretation and Timing"*, which are both incorporated in their entirety for all purposes as if fully set forth herein.

Using RSSI in Bluetooth network for estimating distance and for localization is described in an article published 2008 by Charalampos Papamanthou, Franco P. Preparata, and Roberto Tamassia (of the Department of Computer Science and Center for Geometric Computing, Brown University) [S. Fekete (Ed.): ALGOSENSORS 2008, LNCS 5389, pp. 72-86, 2008] entitled: "*Algorithms for Location Estimation Based on RSSI Sampling*", in an article published 2013 in Radioengineering Journal [ISSN: 1210-2512] by Miroslav BOTTA and Milan SIMEK (both of Dept. of Telecommunication, Faculty of Electrical Engineering and Communication, Brno University of Technology, Brno, Czech Republic) entitled: "*Adaptive Distance Estimation Based on RSSI in 802.15.4 Network*", in an article published August 2010 in Wireless Sensor Network [2010, 2, 606-611 doi:10.4236/wsn.2010.28072] by Jiuqiang Xu, Wei Liu, Fenggao Lang, and Yuanyuan Zhang, Chenglong Wang, entitled: "*Distance Measurement Model Based on RSSI in WSN*", in an article published 2008 in International Journal on Smart Sensing and Intelligent Systems, VOL. 1, NO. 2, JUNE 2008 by Erin-Ee-Lin Lau, Boon-Giin Lee, Seung-Chul Lee, and Wan-Young Chung entitled: "*User Location Tracking System for Indoor and Outdoor Environments*", and in a Master of Computer Science Thesis by Anja Bekkelien of the University of Geneva submitted March 2012 entitled: "*Bluetooth Indoor Positioning*", which are all incorporated in their entirety for all purposes as if fully set forth herein.

Motion sensor. A motion sensor may include one or more accelerometers, which measures the absolute acceleration or the acceleration relative to freefall. For example, one single-axis accelerometer per axis may be used, requiring three such accelerometers for three-axis sensing. The motion sensor may be a single or multi-axis sensor, detecting the magnitude and direction of the acceleration as a vector quantity, and thus can be used to sense orientation, acceleration, vibration, shock and falling. The motion sensor output may be analog or digital signals, representing the measured values. The motion sensor may be based on a piezoelectric accelerometer that utilizes the piezoelectric effect of certain materials to measure dynamic changes in mechanical variables (e.g., acceleration, vibration, and mechanical shock). Piezoelectric accelerometers commonly rely on piezoceramics (e.g., lead zirconate titanate) or single crystals (e.g., Quartz, Tourmaline). A piezoelectric quartz accelerometer is disclosed in U.S. Pat. No. 7,716,985 to Zhang et al. entitled: "Piezoelectric Quartz Accelerometer", U.S. Pat. No. 5,578,755 to Offenberg entitled: "Accelerometer Sensor of Crystalline Material and Method for Manufacturing the Same" and U.S. Pat. No. 5,962,786 to Le Traon et al. entitled: "Monolithic Accelerometric Transducer", which are all incorporated in their entirety for all purposes as if fully set forth herein. Alternatively or in addition, the motion sensor may be based on the Micro Electro-Mechanical Systems (MEMS, a.k.a. Micro-mechanical electrical system) technology. A MEMS based motion sensor is disclosed in U.S. Pat. No. 7,617,729 to Axelrod et al. entitled: "Accelerometer", U.S. Pat. No. 6,670,212 to McNie et al. entitled: "Micro-Machining" and in U.S. Pat. No. 7,892,876 to Mehregany entitled: "Three-axis Accelerometers and Fabrication Methods", which are all incorporated in their entirety for all purposes as if fully set forth herein. An example of MEMS motion sensor is LIS302DL manufactured by STMicroelectronics NV and described in Datasheet LIS302DL STMicroelectronics NV, 'MEMS motion sensor 3-axis—±2 g/±8 g smart digital output "piccolo" accelerometer', Rev. 4, October 2008, which is incorporated in its entirety for all purposes as if fully set forth herein.

Alternatively or in addition, the motion sensor may be based on electrical tilt and vibration switch or any other electromechanical switch, such as the sensor described in U.S. Pat. No. 7,326,866 to Whitmore et al. entitled: "Omnidirectional Tilt and vibration sensor", which is incorporated in its entirety for all purposes as if fully set forth herein. An example of an electromechanical switch is SQ-SEN-200 available from SignalQuest, Inc. of Lebanon, N.H., USA, described in the data-sheet 'DATASHEET SQ-SEN-200 Omnidirectional Tilt and Vibration Sensor' Updated 2009 Aug. 3, which is incorporated in its entirety for all purposes as if fully set forth herein. Other types of motion sensors may be equally used, such as devices based on piezoelectric, piezo-resistive, and capacitive components, to convert the mechanical motion into an electrical signal. Using an accelerometer to control is disclosed in U.S. Pat. No. 7,774,155 to Sato et al. entitled: "Accelerometer-Based Controller", which is incorporated in its entirety for all purposes as if fully set forth herein.

IMU. The Inertial Measurement Unity (IMU) is an integrated sensor package that combines multiple accelerometers and gyros to produce a three dimensional measurement of both specific force and angular rate, with respect to an inertial reference frame, as for example the Earth-Centered Inertial (ECI) reference frame. Specific force is a measure of acceleration relative to free-fall. Subtracting the gravitational acceleration results in a measurement of actual coordinate acceleration. Angular rate is a measure of rate of rotation. Typically, IMU includes the combination of only a 3-axis accelerometer combined with a 3-axis gyro. An onboard processor, memory, and temperature sensor may be included to provide a digital interface, unit conversion and to apply a sensor calibration model. An IMU may include one or more motion sensors.

An Inertial Measurement Unit (IMU) further measures and reports a body's specific force, angular rate, and sometimes the magnetic field surrounding the body, using a combination of accelerometers and gyroscopes, sometimes also magnetometers. IMUs are typically used to maneuver aircraft, including unmanned aerial vehicles (UAVs), among many others, and spacecraft, including satellites and landers. The IMU is the main component of inertial navigation systems used in aircraft, spacecraft, watercraft, drones, UAV and guided missiles among others. In this capacity, the data collected from the IMU's sensors allows a computer to track a craft's position, using a method known as dead reckoning.

An inertial measurement unit works by detecting the current rate of acceleration using one or more accelerometers, and detects changes in rotational attributes like pitch, roll and yaw using one or more gyroscopes. Typical IMU also includes a magnetometer, mostly to assist calibration against orientation drift. Inertial navigation systems contain IMUs that have angular and linear accelerometers (for changes in position); some IMUs include a gyroscopic element (for maintaining an absolute angular reference). Angular accelerometers measure how the vehicle is rotating in space. Generally, there is at least one sensor for each of the three axes: pitch (nose up and down), yaw (nose left and right) and roll (clockwise or counter-clockwise from the cockpit). Linear accelerometers measure non-gravitational accelerations of the vehicle. Since it can move in three axes (up & down, left & right, forward & back), there is a linear accelerometer for each axis. The three gyroscopes are commonly placed in a similar orthogonal pattern, measuring rotational position in reference to an arbitrarily chosen coordinate system. A computer continually calculates the vehicle's current position. First, for each of the six degrees of freedom (x,y,z and $\theta x$, $\theta y$, and $\theta z$), it integrates over time the sensed acceleration, together with an estimate of gravity, to calculate the current velocity. Then it integrates the velocity to calculate the current position.

An example for an IMU is a module Part Number LSM9DS1 available from STMicroelectronics NV headquartered in Geneva, Switzerland and described in a datasheet published March 2015 and entitled: "*LSM9DS1— iNEMO inertial module: 3D accelerometer, 3D gyroscope, 3D magnetometer*", which is incorporated in its entirety for all purposes as if fully set forth herein. Another example for an IMU is unit Part Number STIM300 available from Sensonor AS, headquartered in Horten, Norway, and is described in a datasheet dated October 2015 [TS 1524 rev. 20] entitled: "*ButterflyGyro™—STIM300 Intertia Measurement Unit*", which is incorporated in its entirety for all purposes as if fully set forth herein. Using IMU for human motion or positioning is described in a Master's Thesis by Martin Veskrna of Masaryk University, Faculty of Informatics dated 2013, entitled: "*Positioning system for small devices using principles of inertial navigation system*", in an article by Sam Naghshineh, Golafsoun Ameri, Mazdak Zereshki & Dr. S. Krishnan, Dr. M. Abdoli-Eramaki (downloaded from the Internet 3/2016) entitled: "*Human Motion capture using Tri-Axial accelerometers*", and in a paper by Xiaoping Yun et al. published 2007 IEEE International Conference on Robotics and Automation (Rome, Italy, 10-14 Apr. 2007) entitled: "*Self-Contained Position Tracking of Human Movement Using Small Inertial/Magnetic Sensor Module*", which are all incorporated in their entirety for all purposes as if fully set forth herein.

Phase detection. In using a phase measuring principle, which the signal propagation time is determined by comparison of the phase angle of the amplitude modulation of the transmitted and received signals. In phase measuring rangefinding, a periodic modulation signal, usually a sinusoidal wave, is transmitted to the target, and an echo is received and amplified. The phase of the received signal is delayed when compared to the phase of the transmitted signal because of the round trip transit time of the signal. A simplified schematic diagram of a phase measuring based correlator 19b is shown as part of the distance meter 15b in FIG. 2a. The emitter 11 is fed with a sinewave generator 23, so that the amplitude of the transmitted wave 26a and the reflected (or backscattered) wave 26b is sinewave modulated. A phase detector 24 measure the phase difference between the transmitted and received signals, which is proportional to the time delay and thus to the measured distance. The phase difference between the two signals is directly proportional to the distance to the target, according to the expression $d=\varphi\lambda/4\pi$, where d is the distance from the rangefinder to the target, and $\lambda$ is the wavelength of the modulating sinusoid (e.g., is 15 meters for a 20 MHz signal), and $\varphi$ is the phase difference in radians. A range ambiguity arises every $\lambda/2$ meters of distance, in which the phase of the modulating signal is identical every $N\lambda/2$ meters. Since the modulation occurs in a continuous-wave fashion, the average power of the carrier must be high in order to be able to obtain a significant received signal for large target distances. Further, undesirable phase delay changes of the electronic circuitry with changes in ambient environmental conditions, especially temperature, may cause an error. In addition, gain changes in AGC (Automatic-Gain-Control) circuitry will cause changes in phase as well, and these changes cannot be reliably calibrated and subtracted out with commonly used on-board reference methods. The measurement result in the case of one transmission frequency may have ambiguities in units of the transmission frequency period duration, thus necessitating further measures for resolving these ambiguities. Two technologies are typically used in phase measuring based rangefinders, namely homodyne and heterodyne.

While exampled regarding using a sinewave signal generated by the sinewave generator 23, any periodic signal generator may be used. Further, the repetitive signal may be a non-sinusoidal wave such as a square wave, a triangle wave, or a saw-tooth wave.

An FMCW distance measurement process is described in U.S. Pat. No. 6,040,898 to Mrosik et al. entitled: "FMCW Distance Measurement Process", which is incorporated in its entirety for all purposes as if fully set forth herein. In an FMCW distance measurement process, a wave train of carrier frequency f0 is modulated with a time function f(t) and subdivided into a transmission signal and into a reference signal in deterministic phase relationship with the transmission signal; the transmission signal is sent on a transmission section to be measured and the reference signal is supplied to a phase difference-forming arrangement; the signal reflected in the transmission section with a delay that corresponds to propagation time $\tau$ is also supplied as a reception signal to the phase difference-forming arrangement that forms the time difference function $\theta(t)$ between the phases of reference and reception signals; the phase difference function $\theta(t)$ is separately evaluated in a continuous fraction $\theta$=that corresponds to the carrier frequency f0 and in an alternating fraction $\theta$-(t) that corresponds to the modulation time function f(t); and the propagation time $\tau$ proportional to the distance is finally determined by evaluating together both phase difference information.

High speed and high precision phase measuring techniques for improving the dynamic measurement accuracy of phase-shift laser range finder are described in an article by Pengcheng Hu et al. published in The $10^{th}$ International Symposium of Measurement Technology and Intelligent Instruments (June 29-Jul. 2, 2011) entitled: "*Phase-shift laser range finder based on high speed and high precision phase-measuring techniques*", which is incorporated in its entirety for all purposes as if fully set forth herein.

A technique for improving the performance of laser phase-shift range finders by phase measurement that use a method to extract the phase-shift data from the peak of received and transmitted intermediate frequency signal amplitudes is described in a paper downloaded January 2016 by Shahram Mohammad Nejad and Kiazand Fasihi (both from Department of Electrical Engineering, Iran University of Science and Technology (IUST), Tehran, Iran) entitled: "*A new design of laser phase-shift range finder independent of environmental conditions and thermal drift*", which is incorporated in its entirety for all purposes as if fully set forth herein.

Beat signal. A distance measurement by radar comprising a frequency modulated radar-transmitter and -receiver by which a radar beam is guided onto an object to be measured and which, by mixing of the transmitted frequency with the received frequency, delivers a beat signal; frequency modulating means, by which the transmitted frequency of the radar signal of the Doppler signal device is periodically variable in a saw-tooth shaped way and wherein the frequency of the beat signal, due to the travel time of the radar beam reflected by the object, is a measure for the distance of the object, and a signal processing circuit generating a measured value from the beat signal obtained. In the radar-transmitter and -receiver mixing takes place of the transmitted and the received signal. The signal received has passed the distance to and from the object, thereby has been transmitted at an earlier instant and thereby has, due to the saw-tooth modulation, a frequency, which is a bit different from the frequency of the signal, which is emitted at the moment of reception. Thereby a beat frequency occurs that is proportional to the travel time to the object and thereby to the distance from the object to the radar-transmitter and -receiver.

Phase detector. A phase detector (or phase comparator) is a frequency mixer, analog multiplier or logic circuit that generates a voltage signal, which represents the difference in phase between two signal inputs. It is an essential element of the Phase-Locked Loop (PLL). Phase detection may use an analog or digital phase detector. They typically produce an output that is proportional to the phase difference between the two signals. When the phase difference between the two incoming signals is steady, they produce a constant voltage. When there is a frequency difference between the two signals, they produce a varying voltage. The difference frequency product is the one used to give the phase difference. An example of a digital/analog phase detector is Phase Detector Model ADF4002 available from Analog Devices, Inc. (headquartered in Norwood, Mass., U.S.A.) and is described in an 2015 data sheet Rev. D (D06052-0-9/15(D)) entitled: "*Phase Detector/frequency Synthesizer—ADF4002*", which is incorporated in its entirety for all purposes as if fully set forth herein.

The analog phase detector needs to compute the phase difference of its two input signals. Let $\alpha$ be the phase of the first input and $\beta$ be the phase of the second. The actual input signals to the phase detector, however, are not $\alpha$ and $\beta$, but rather sinusoids such as $\sin(\alpha)$ and $\cos(\beta)$. In general, computing the phase difference would involve computing the arcsine and arccosine of each normalized input (to get an ever-increasing phase) and doing a subtraction. A simple form of an analog phase detector is diode ring mixer phase-detector and it can be synthesized from a diode ring mixer. The diode ring phase detector is a simple and effective form of phase detector that can be implemented using a standard diode ring module. An example of an analog phase detector is Phase Detector Model AD8302 available from Analog Devices, Inc. (headquartered in Norwood, Mass., U.S.A.) and is described in an 2002 data sheet Rev. A entitled: "*LF-2.7 GHz—RF/IF Gain and Phase Detector—AD8302*", which is incorporated in its entirety for all purposes as if fully set forth herein.

A digital phase detector suitable for square wave signals can be made from an exclusive-OR (XOR) logic gate. When the two signals being compared are completely in-phase, the XOR gate's output will have a constant level of zero. When the two signals differ in phase by 1°, the XOR gate's output will be high for 1/180th of each cycle—the fraction of a cycle during which the two signals differ in value. When the signals differ by 180°—that is, one signal is high when the other is low, and vice versa—the XOR gate output remains high throughout each cycle. The XOR detector compares well to the analog mixer in that it locks near a 90° phase difference and has a square-wave output at twice the reference frequency. The square-wave changes duty-cycle in proportion to the phase difference resulting. Applying the XOR gate's output to a low-pass filter results in an analog voltage that is proportional to the phase difference between the two signals. It requires inputs that are symmetrical square waves, or nearly so. The remainder of its characteristics are very similar to the analog mixer for capture range, lock time, reference spurious, and low-pass filter requirements. Digital phase detectors can also be based on a sample and hold circuit, a charge pump, or a logic circuit consisting of flip-flops. When a phase detector that is based on logic gates is used in a PLL, it can quickly force the VCO to synchronize with an input signal, even when the frequency of the input signal differs substantially from the initial frequency of the VCO. XOR-based phase detection is described in an article published in Advanced Computing: An International Journal (ACIJ), Vol. 2, No. 6, November 2011, by Delvadiya Harikrushna et al. entitled: "*Design, Implementation, and Characterization of XOR Phase Detector for DPLL in 45 nm CMOS Technology*", which is incorporated in its entirety for all purposes as if fully set forth herein.

A phase-frequency detector is an asynchronous sequential logic circuit originally made of four flip-flops (i.e., the phase-frequency detectors found in both the RCA CD4046 and the Motorola MC4344 ICs introduced in the 1970s). The logic determines which of the two signals has a zero-crossing earlier or more often. When used in a PLL application, lock can be achieved even when it is off frequency and is known as a Phase Frequency Detector. Such a detector has the advantage of producing an output even when the two signals being compared differ not only in phase but also in frequency. A phase frequency detector prevents a "false lock" condition in PLL applications, in which the PLL synchronizes with the wrong phase of the input signal or with the wrong frequency (e.g., a harmonic of the input signal). A bang-bang charge pump phase detector supplies current pulses with fixed total charge, either positive or negative, to the capacitor acting as an integrator. A phase detector for a bang-bang charge pump must always have a dead band where the phases of inputs are close enough that the detector fires either both or neither of the charge pumps, for no total effect. Bang-bang phase detectors are simple, but are associated with significant minimum peak-to-peak jitter, because of drift within the dead band.

A proportional phase detector employs a charge pump that supplies charge amounts in proportion to the phase error detected. Some have dead bands and some do not. Specifically, some designs produce both "up" and "down" control pulses even when the phase difference is zero. These pulses are small, nominally the same duration, and cause the charge pump to produce equal-charge positive and negative current pulses when the phase is perfectly matched. Phase detectors with this kind of control system do not exhibit a dead band and typically have lower minimum peak-to-peak jitter when used in PLLs. In PLL applications, it is frequently required to know when the loop is out of lock. The more complex digital phase-frequency detectors usually have an output that allows a reliable indication of an out of lock condition.

Smartphone. A mobile phone (also known as a cellular phone, cell phone, smartphone, or hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones are typically hand-held and may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

An example of a contemporary smartphone is model iPhone 6 available from Apple Inc., headquartered in Cupertino, Calif., U.S.A. and described in iPhone 6 technical specification (retrieved 10/2015 from www.apple.com/iphone-6/specs/), and in a User Guide dated 2015 (019-00155/2015-06) by Apple Inc. entitled: *"iPhone User Guide For iOS 8.4 Software"*, which are both incorporated in their entirety for all purposes as if fully set forth herein. Another example of a smartphone is Samsung Galaxy S6 available from Samsung Electronics headquartered in Suwon, South-Korea, described in the user manual numbered English (EU), 03/2015 (Rev. 1.0) entitled: *"SM-G925F SM-G925FQ SM-G925I User Manual"* and having features and specification described in *"Galaxy S6 Edge—Technical Specification"* (retrieved 10/2015 from www.samsung.com/us/explore/galaxy-s-6-features-and-specs), which are both incorporated in their entirety for all purposes as if fully set forth herein.

A mobile operating system (also referred to as mobile OS), is an operating system that operates a smartphone, tablet, PDA, or another mobile device. Modern mobile operating systems combine the features of a personal computer operating system with other features, including a touchscreen, cellular, Bluetooth, Wi-Fi, GPS mobile navigation, camera, video camera, speech recognition, voice recorder, music player, near field communication and infra-red blaster. Currently popular mobile OSs are Android, Symbian, Apple iOS, BlackBerry, MeeGo, Windows Phone, and Bada. Mobile devices with mobile communications capabilities (e.g. smartphones) typically contain two mobile operating systems—a main user-facing software platform is supplemented by a second low-level proprietary real-time operating system that operates the radio and other hardware.

Android is an open source and Linux-based mobile operating system (OS) based on the Linux kernel that is currently offered by Google. With a user interface based on direct manipulation, Android is designed primarily for touchscreen mobile devices such as smartphones and tablet computers, with specialized user interfaces for televisions (Android TV), cars (Android Auto), and wrist watches (Android Wear). The OS uses touch inputs that loosely correspond to real-world actions, such as swiping, tapping, pinching, and reverse pinching to manipulate on-screen objects, and a virtual keyboard. Despite being primarily designed for touchscreen input, it also has been used in game consoles, digital cameras, and other electronics. The response to user input is designed to be immediate and provides a fluid touch interface, often using the vibration capabilities of the device to provide haptic feedback to the user. Internal hardware such as accelerometers, gyroscopes and proximity sensors are used by some applications to respond to additional user actions, for example adjusting the screen from portrait to landscape depending on how the device is oriented, or allowing the user to steer a vehicle in a racing game by rotating the device by simulating control of a steering wheel.

Android devices boot to the homescreen, the primary navigation and information point on the device, which is similar to the desktop found on PCs. Android homescreens are typically made up of app icons and widgets; app icons launch the associated app, whereas widgets display live, auto-updating content such as the weather forecast, the user's email inbox, or a news ticker directly on the homescreen. A homescreen may be made up of several pages that the user can swipe back and forth between, though Android's homescreen interface is heavily customizable, allowing the user to adjust the look and feel of the device to their tastes. Third-party apps available on Google Play and other app stores can extensively re-theme the homescreen, and even mimic the look of other operating systems, such as Windows Phone. The Android OS is described in a publication entitled: *"Android Tutorial"*, downloaded from tutorialspoint.com on July 2014, which is incorporated in its entirety for all purposes as if fully set forth herein.

iOS (previously iPhone OS) from Apple Inc. (headquartered in Cupertino, Calif., U.S.A.) is a mobile operating system distributed exclusively for Apple hardware. The user interface of the iOS is based on the concept of direct manipulation, using multi-touch gestures. Interface control elements consist of sliders, switches, and buttons. Interaction with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command) or rotating it in three dimensions (one common result is switching from portrait to landscape mode). The iOS OS is described in a publication entitled: *"IOS Tutorial"*, downloaded from tutorialspoint.com on July 2014, which is incorporated in its entirety for all purposes as if fully set forth herein.

Vehicle. A vehicle is a mobile machine that transports people or cargo. Most often, vehicles are manufactured, such as wagons, bicycles, motor vehicles (motorcycles, cars, trucks, buses), railed vehicles (trains, trams), watercraft (ships, boats), aircraft and spacecraft. The vehicle may be designed for use on land, on or in fluids, or be airborne, such as bicycle, car, automobile, motorcycle, train, ship, boat, submarine, airplane, scooter, bus, subway, train, or spacecraft. A vehicle may be a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane. Further, a vehicle may be a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane.

A vehicle may be a land vehicle typically moving on the ground, using wheels, tracks, rails, or skies. The vehicle may be locomotion-based where the vehicle is towed by another vehicle or an animal. Propellers (as well as screws, fans, nozzles, or rotors) are used to move on or through a fluid or air, such as in watercrafts and aircrafts. The system described herein may be used to control, monitor or otherwise be part of, or communicate with, the vehicle motion system. Similarly, the system described herein may be used to control, monitor or otherwise be part of, or communicate with, the vehicle steering system. Commonly, wheeled vehicles steer by angling their front or rear (or both) wheels, while ships, boats, submarines, dirigibles, airplanes and other vehicles moving in or on fluid or air usually have a rudder for steering. The vehicle may be an automobile, defined as a wheeled passenger vehicle that carries its own motor, and primarily designed to run on roads, and have seating for one to six people. Typically, automobiles have four wheels, and are constructed to principally transport of people.

Human power may be used as a source of energy for the vehicle, such as in non-motorized bicycles. Further, energy may be extracted from the surrounding environment, such as solar powered car or aircraft, a street car, as well as by sailboats and land yachts using the wind energy. Alternatively or in addition, the vehicle may include energy storage, and the energy is converted to generate the vehicle motion. A common type of energy source is a fuel, and external or internal combustion engines are used to burn the fuel (such as gasoline, diesel, or ethanol) and create a pressure that is converted to a motion. Another common medium for storing energy are batteries or fuel cells, which store chemical energy used to power an electric motor, such as in motor vehicles, electric bicycles, electric scooters, small boats, subways, trains, trolleybuses, and trams.

Aircraft. An aircraft is a machine that is able to fly by gaining support from the air. It counters the force of gravity by using either static lift or by using the dynamic lift of an airfoil, or in a few cases the downward thrust from jet engines. The human activity that surrounds aircraft is called aviation. Crewed aircraft are flown by an onboard pilot, but unmanned aerial vehicles may be remotely controlled or self-controlled by onboard computers. Aircraft may be classified by different criteria, such as lift type, aircraft propulsion, usage and others.

Aerostats are lighter than air aircrafts use buoyancy to float in the air in much the same way that ships float on the water. They are characterized by one or more large gasbags or canopies, filled with a relatively low-density gas such as helium, hydrogen, or hot air, which is less dense than the surrounding air. When the weight of this is added to the weight of the aircraft structure, it adds up to the same weight as the air that the craft displaces. Heavier-than-air aircraft, such as airplanes, must find some way to push air or gas downwards, so that a reaction occurs (by Newton's laws of motion) to push the aircraft upwards. This dynamic movement through the air is the origin of the term aerodyne. There are two ways to produce dynamic upthrust: aerodynamic lift, and powered lift in the form of engine thrust.

Aerodynamic lift involving wings is the most common, with fixed-wing aircraft being kept in the air by the forward movement of wings, and rotorcraft by spinning wing-shaped rotors sometimes called rotary wings. A wing is a flat, horizontal surface, usually shaped in cross-section as an aerofoil. To fly, air must flow over the wing and generate lift. A flexible wing is a wing made of fabric or thin sheet material, often stretched over a rigid frame. A kite is tethered to the ground and relies on the speed of the wind over its wings, which may be flexible or rigid, fixed, or rotary.

Gliders are heavier-than-air aircraft that do not employ propulsion once airborne. Take-off may be by launching forward and downward from a high location, or by pulling into the air on a tow-line, either by a ground-based winch or vehicle, or by a powered "tug" aircraft. For a glider to maintain its forward air speed and lift, it must descend in relation to the air (but not necessarily in relation to the ground). Many gliders can 'soar'—gain height from updrafts such as thermal currents. Common examples of gliders are sailplanes, hang gliders and paragliders. Powered aircraft have one or more onboard sources of mechanical power, typically aircraft engines although rubber and manpower have also been used. Most aircraft engines are either lightweight piston engines or gas turbines. Engine fuel is stored in tanks, usually in the wings but larger aircraft also have additional fuel tanks in the fuselage.

A propeller aircraft use one or more propellers (airscrews) to create thrust in a forward direction. The propeller is usually mounted in front of the power source in tractor configuration but can be mounted behind in pusher configuration. Variations of propeller layout include contra-rotating propellers and ducted fans. A Jet aircraft use airbreathing jet engines, which take in air, burn fuel with it in a combustion chamber, and accelerate the exhaust rearwards to provide thrust. Turbojet and turbofan engines use a spinning turbine to drive one or more fans, which provide additional thrust. An afterburner may be used to inject extra fuel into the hot exhaust, especially on military "fast jets". Use of a turbine is not absolutely necessary: other designs include the pulse jet and ramjet. These mechanically simple designs cannot work when stationary, so the aircraft must be launched to flying speed by some other method. Some rotorcraft, such as helicopters, have a powered rotary wing or rotor, where the rotor disc can be angled slightly forward so that a proportion of its lift is directed forwards. The rotor may, like a propeller, be powered by a variety of methods such as a piston engine or turbine. Experiments have also used jet nozzles at the rotor blade tips.

A vehicle may include a hood (a.k.a. bonnet), which is the hinged cover over the engine of motor vehicles that allows access to the engine compartment (or trunk on rear-engine and some mid-engine vehicles) for maintenance and repair. A vehicle may include a bumper, which is a structure attached, or integrated to, the front and rear of an automobile to absorb impact in a minor collision, ideally minimizing repair costs. Bumpers also have two safety functions: minimizing height mismatches between vehicles, and protecting pedestrians from injury. A vehicle may include a cowling, which is the covering of a vehicle's engine, most often found on automobiles and aircraft. A vehicle may include a dashboard (also called dash, instrument panel, or fascia), which is a control panel placed in front of the driver of an automobile, housing instrumentation and controls for operation of the vehicle. A vehicle may include a fender that frames a wheel well (the fender underside). Its primary purpose is to prevent sand, mud, rocks, liquids, and other road spray from being thrown into the air by the rotating tire. Fenders are typically rigid and can be damaged by contact with the road surface. Instead, flexible mud flaps are used close to the ground where contact may be possible. A vehicle may include a quarter panel (a.k.a. rear wing), which is the body panel (exterior surface) of an automobile between a rear door (or only door on each side for two-door models) and the trunk (boot) and typically wraps around the wheel well. Quarter panels are typically made of sheet metal, but are sometimes made of fiberglass, carbon fiber, or fiber-reinforced plastic. A vehicle may include a rocker, which is the body section below the base of the door openings. A vehicle may include a spoiler, which is an automotive aerodynamic device whose intended design function is to 'spoil' unfavorable air movement across a body of a vehicle in motion, usually described as turbulence or drag. Spoilers on the front of a vehicle are often called air dams. Spoilers are often fitted to race and high-performance sports cars, although they have become common on passenger vehicles as well. Some spoilers are added to cars primarily for styling purposes and have either little aerodynamic benefit or even make the aerodynamics worse. The trunk (a.k.a. boot) of a car is the vehicle's main storage compartment. A vehicle door is a type of door, typically hinged, but sometimes attached by other mechanisms such as tracks, in front of an opening, which is used for entering and exiting a vehicle. A vehicle door can be opened to provide access to the opening, or closed to secure it. These doors can be opened manually, or powered electronically. Powered doors are usually found on minivans, high-end cars, or modified cars. Car glass includes windscreens, side and rear windows, and glass panel roofs on a vehicle. Side windows can be either fixed or be raised and lowered by depressing a button (power window) or switch or using a hand-turned crank.

The lighting system of a motor vehicle consists of lighting and signaling devices mounted or integrated to the front, rear, sides, and in some cases the top of a motor vehicle. This lights the roadway for the driver and increases the conspicuity of the vehicle, allowing other drivers and pedestrians to see a vehicle's presence, position, size, direction of travel, and the driver's intentions regarding direction and speed of travel. Emergency vehicles usually carry distinctive lighting equipment to warn drivers and indicate priority of movement in traffic. A headlamp is a lamp attached to the front of a vehicle to light the road ahead. A chassis consists of an internal framework that supports a manmade object in its construction and use. An example of a chassis is the underpart of a motor vehicle, consisting of the frame (on which the body is mounted).

Automotive electronics. Automotive electronics involves any electrically-generated systems used in vehicles, such as ground vehicles. Automotive electronics commonly involves multiple modular ECUs (Electronic Control Unit) connected over a network. Such as Engine Control Modules (ECM) or Transmission Control Modules (TCM). Automotive electronics or automotive embedded systems are distributed systems, and according to different domains in the automotive field, they can be classified into Engine electronics, Transmission electronics, Chassis electronics, Active safety, Driver assistance, Passenger comfort, and Entertainment (or infotainment) systems.

One of the most demanding electronic parts of an automobile is the Engine Control Unit. Engine controls demand one of the highest real time deadlines, as the engine itself is a very fast and complex part of the automobile. The computing power of the engine control unit is commonly the highest, typically a 32-bit processor, that typically controls in real-time in a diesel engine the Fuel injection rate, Emission control, NOx control, Regeneration of oxidation catalytic converter, Turbocharger control, Throttle control, and Cooling system control. In a gasoline engine the engine control typically involves Lambda control, OBD (On-Board Diagnostics), Cooling system control, Ignition system control, Lubrication system control, Fuel injection rate control, and Throttle control.

An engine ECU typically connects to, or includes, sensors that actively monitor in real-time engine parameters such as pressure, temperature, flow, engine speed, oxygen level and NOx level, plus other parameters at different points within the engine. All these sensor signals are analyzed by the ECU, which has the logic circuits to do the actual controlling. The ECU output is commonly connected to different actuators for the throttle valve, EGR valve, rack (in VGTs), fuel injector (using a pulse-width modulated signal), dosing injector and more.

Transmission electronics involves control of the transmission system, mainly the shifting of the gears for better shift comfort and to lower torque interrupt while shifting. Automatic transmissions use controls for their operation, and many semi-automatic transmissions having a fully automatic clutch or a semi-auto clutch (declutching only). The engine control unit and the transmission control typically exchange messages, sensor signals and control signals for their operation. Chassis electronics typically includes many sub-systems that monitor various parameters and are actively controlled, such as ABS—Anti-lock Braking System, TCS—Traction Control System, EBD—Electronic Brake Distribution, and ESP—Electronic Stability Program. Active safety systems involve modules that are ready-to-act when there is a collision in progress, or used to prevent it when it senses a dangerous situation, such as Air bags, Hill descent control, and Emergency brake assist system. Passenger comfort systems involve, for example, Automatic climate control, Electronic seat adjustment with memory, Automatic wipers, Automatic headlamps—adjusts beam automatically, and Automatic cooling—temperature adjustment. Infotainment systems include systems such as Navigation system, Vehicle audio, and Information access.

Automotive electric and electronic technologies and systems are described in a book published by Robert Bosch GmbH (5$^{th}$ Edition, July 2007) entitled: "*Bosch Automotive Electric and Automotive Electronics*" [ISBN—978-3-658-01783-5], which is incorporated in its entirety for all purposes as if fully set forth herein.

ADAS. Advanced Driver Assistance Systems, or ADAS, are automotive electronic systems to help the driver in the driving process, such as to increase car safety and more generally road safety using a safe Human-Machine Interface. Advanced driver assistance systems (ADAS) are developed to automate/adapt/enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/traffic warnings, connect to smartphones, alert driver to other cars or dangers, keep the driver in the correct lane, or show what is in blind spots.

There are many forms of ADAS available; some features are built into cars or are available as an add-on package. ADAS technology can be based upon, or use, vision/camera systems, sensor technology, car data networks, Vehicle-to-vehicle (V2V), or Vehicle-to-Infrastructure systems, and leverage wireless network connectivity to offer improved value by using car-to-car and car-to-infrastructure data. ADAS technologies or applications comprise: Adaptive Cruise Control (ACC), Adaptive High Beam, Glare-free high beam and pixel light, Adaptive light control such as swiveling curve lights, Automatic parking, Automotive navigation system with typically GPS and TMC for providing up-to-date traffic information, Automotive night vision, Automatic Emergency Braking (AEB), Backup assist, Blind Spot Monitoring (BSM), Blind Spot Warning (BSW), Brake light or traffic signal recognition, Collision avoidance system (such as Precrash system), Collision Imminent Braking (CIB), Cooperative Adaptive Cruise Control (CACC), Crosswind stabilization, Driver drowsiness detection, Driver Monitoring Systems (DMS), Do-Not-Pass Warning (DNPW), Electric vehicle warning sounds used in hybrids and plug-in electric vehicles, Emergency driver assistant, Emergency Electronic Brake Light (EEBL), Forward Collision Warning (FCW), Heads-Up Display (HUD), Intersection assistant, Hill descent control, Intelligent speed adaptation or Intelligent Speed Advice (ISA), Intelligent Speed Adaptation (ISA), Intersection Movement Assist (IMA), Lane Keeping Assist (LKA), Lane Departure Warning (LDW) (a.k.a. Line Change Warning—LCW), Lane change assistance, Left Turn Assist (LTA), Night Vision System (NVS), Parking Assistance (PA), Pedestrian Detection System (PDS), Pedestrian protection system, Pedestrian Detection (PED), Road Sign Recognition (RSR), Surround View Cameras (SVC), Traffic sign recognition, Traffic jam assist, Turning assistant, Vehicular communication systems, Autonomous Emergency Braking (AEB), Adaptive Front Lights (AFL), or Wrong-way driving warning.

ADAS is further described in Intel Corporation 2015 Technical White Paper (0115/MW/HBD/PDF 331817-001US) by Meiyuan Zhao of Security & Privacy Research, Intel Labs entitled: "*Advanced Driver Assistant System-Threats, Requirements, Security Solutions*", and in a PhD Thesis by Alexandre Dugarry submitted on June 2004 to the Cranfield University, School of Engineering, Applied Mathematics and Computing Group, entitled: "*Advanced Driver Assistance Systems-Information Management and Presentation*", which are both incorporated in their entirety for all purposes as if fully set forth herein.

EOR (Eyes-off-The-Road). Various naturalistic driving studies have shown that a driver's allocation of visual attention away from the road is a critical indicator of accident risk. Such work would suggest that a real-time estimation of driver's gaze could be coupled with an alerting system to enhance safety when the driver is overly distracted or inattentive. High precision eye tracking that includes an estimate of pupil orientation in the vehicle is costly and difficult. From an image processing perspective alone, difficulties involve the unpredictability of the environment, presence of sunglasses occluding the eye, rapid changes in ambient lighting including situations of extreme glare resulting from reflection, partial occlusion of the pupil due to squinting, vehicle vibration, and image blur.

Vehicles having the ability to monitor an operator of a vehicle and detect that the operator is not paying attention to the road scene allow for measures to prevent a vehicle collision due to the operator not paying attention. For instance, warning systems can be enabled to alert the driver that he or she is not paying attention. Further, automatic braking and automatic steering systems can be enabled to bring the vehicle to a stop if it is determined that the driver has not become attentive even after being warned. It is known to utilize driver-monitoring camera devices configured to monitor a driver and detect an Eyes-Off-the-Road (EOR) condition indicating that the driver's eyes are not on the road. However, real-time gaze tracking that includes a combination of head pose and eye gaze direction is challenging in the vehicular environment due to (1) different height and facial features of drivers making it difficult to calibrate a camera device for the head pose and gaze direction, (2) unknown illumination conditions leading to unreliable detection of the facial features and (3) abrupt changes in the driver's head pose being difficult to track in video streams contained in image data captured by the camera device.

For example, some vehicle systems use the gaze direction of a driver to determine if the driver is inattentive to road and to generate warning signals to the driver. In another example, some vehicle systems determine that the driver is looking in the direction of a particular control knob or switch of the vehicle and can control that particular element (e.g., turn it on, etc.) based on the determination. In each of the examples, the vehicle systems make a general determination of where the driver is looking and do not make a determination of what the driver is looking at (i.e. what is grasping the attention of the driver).

Examples of various EOR systems are described in an article Massachusetts Institute of Technology (MIT) published 1 Mar. 2016 [arXiv:1507.04760v2 [cs.CV] 1 Mar. 2016] by Lex Fridman, Philipp Langhans, Joonbum Lee, and Bryan Reimer entitled: "*Driver Gaze Region Estimation Without Using Eye Movement*", in an Elsevier Science Ltd. 2002 published paper in Real-Time Imaging 8, 357-377 (2002) [doi:10.1006/rtim.2002.0279] by Qiang Ji and Xiaojie Yang entitled: "*Real-Time Eye, Gaze, and Face Pose Tracking for Monitoring Driver Vigilance*", and in a paper presented in 2004 IEEE Intelligent Vehicles Symposium (Parma, Italy June 14-17,2004) by Luis M. Bergasa, Jesus Nuevo, Miguel A. Sotelo Manuel Vhzquez entitled: "*Real-Time System for Monitoring Driver Vigilance*", which are all incorporated in their entirety for all purposes as if fully set forth herein.

Examples of driver attention and gaze detection systems are described in U.S. Pat. No. 6,859,144 to Newman et al. entitled: "Vehicle Situation Alert System with Eye Gaze Controlled Alert Signal Generation", in U.S. Patent Application Publication No. 2014/0204193 to Zhang et al. entitled: "Driver Gaze Detection System", U.S. Patent Application Publication No. 2015/0091740 to Bai et al. entitled: "System and Method for Detection and Utilization of Driver Distraction Level", and in U.S. Pat. No. 9,189,692 to Konigsberg et al. entitled: "Methods and Systems for Detecting Driver Attention to Objects", which are all incorporated in their entirety for all purposes as if fully set forth herein.

The term 'Horizontal' herein refers to include a direction, line, surface, or plane that is parallel or substantially parallel to the plane of the horizon. The term 'substantially horizontal' includes a direction, line, surface, or plane that is forming an angle of less than 20°, 18°, 15°, 13°, 10°, 8°, 5°, 3°, 2°, 1°, 0.8°, 0.5°, 0.3°, 0.2°, or 0.1° from an ideal horizontal line. The term 'Vertical' herein refers to include a direction, line, surface, or plane that is an upright or parallel or at right angles to a horizontal plane. The term 'substantially vertical' includes a direction, line, surface, or plane that is forming an angle of less than 20°, 18°, 15°, 13°, 10°, 8°, 5°, 3°, 2°, 1°, 0.8°, 0.5°, 0.3°, 0.2°, or 0.1° from an ideal vertical.

iBeacon. iBeacon is a protocol developed by Apple Inc, and supported by various vendors iBeacon-compatible hardware transmitters—typically called beacons—a class of Bluetooth Low Energy (LE) devices that broadcast their identifier to nearby portable electronic devices. The technology enables smartphones, tablets and other devices to perform actions when in close proximity to an iBeacon. iBeacon uses Bluetooth low energy proximity sensing to transmit a universally unique identifier picked up by a compatible app or operating system. The identifier and several bytes sent with it can be used to determine the device's physical location, track customers, or trigger a location-based action on the device such as a check-in on social media or a push notification. One application is distributing messages at a specific Point of Interest, for example a store, a bus stop, a room or a more specific location like a piece of furniture or a vending machine. This is similar to previously used geopush technology based on GPS, but with a much reduced impact on battery life and much extended precision.

Another application is an indoor positioning system, which helps smartphones determine their approximate location or context. With the help of an iBeacon, a smartphone's software can approximately find its relative location to an iBeacon in a store. Brick and mortar retail stores use the beacons for mobile commerce, offering customers special deals through mobile marketing, and can enable mobile payments through point of sale systems. iBeacon differs from some other location-based technologies as the broadcasting device (beacon) is only a 1-way transmitter to the receiving smartphone or receiving device, and necessitates a specific app installed on the device to interact with the beacons. This ensures that only the installed app (not the iBeacon transmitter) can track users, potentially against their will, as they passively walk around the transmitters. iBeacon compatible transmitters come in a variety of form factors, including small coin cell devices, USB sticks, and generic Bluetooth 4.0 capable USB dongles.

An iBeacon deployment consists of one or more iBeacon devices that transmit their own unique identification number to the local area. Software on a receiving device may then look up the iBeacon and perform various functions, such as notifying the user. Receiving devices can also connect to the iBeacons to retrieve values from iBeacon's GATT (generic attribute profile) service. iBeacons do not push notifications to receiving devices (other than their own identity). However, mobile software can use signals received from iBeacons to trigger their own push notifications. Region monitoring is limited to 20 regions and can function in the background (of the listening device) and has different delegates to notify the listening app (and user) of entry/exit in the region—even if the app is in the background or the phone is locked. Region monitoring also allows for a small window in which iOS gives a closed app an opportunity to react to the entry of a region.

As opposed to monitoring, which enables users to detect movement in-and-out of range of the beacons, ranging provides a list of beacons detected in a given region, along with the estimated distance from the user's device to each beacon. Ranging works only in the foreground but will return (to the listening device) an array (unlimited) of all iBeacons found along with their properties (UUID, etc.). An iOS device receiving an iBeacon transmission can approximate the distance from the iBeacon. The distance (between transmitting iBeacon and receiving device) is categorized into 3 distinct ranges: Immediate: Within a few centimeters, Near: Within a couple of meters, and Far: Greater than 10 meters away, An iBeacon broadcast has the ability to approximate when a user has entered, exited, or lingered in region. Depending on a customer's proximity to a beacon, they are able to receive different levels of interaction at each of these three ranges. The maximum range of an iBeacon transmission will depend on the location and placement, obstructions in the environment and where the device is being stored (e.g. in a leather handbag or with a thick case). Standard beacons have an approximate range of 70 meters. Long range beacons can reach up to 450 meters.

The frequency of the iBeacon transmission depends on the configuration of the iBeacon and can be altered using device specific methods. Both the rate and the transmit power have an effect on the iBeacon battery life. iBeacons come with predefined settings and several of them can be changed by the developer. Amongst others the rate and the transmit power can be changed as well as the Major and Minor values. The Major and Minor values are settings which can be used to connect to specific iBeacons or to work with more than one iBeacon at the same time. Typically, multiple iBeacon deployment at a venue will share the same UUID, and use the major and minor pairs to segment and distinguish subspaces within the venue. For example, the Major values of all the iBeacons in a specific store can be set to the same value and the Minor value can be used to identify a specific iBeacon within the store. Bluetooth low energy devices can operate in an advertisement mode to notify nearby devices of their presence. At the most simple form, an iBeacon is a Bluetooth low energy device emitting advertisement following a strict format, that being an Apple defined iBeacon prefix, followed by a variable UUID, and a major, minor pair.

iBeacon is described in Gaia-Matrix published paper (downloaded 3-2016 from the Internet) by Andy Cavallini entitled: "*iBeacons Bible* 1.0", in VeriFone publication Oct. 23, 2013 by Erik Vlugt entitled: "*Bluetooth Low Energy, Beacons and Retail*", and in Apple Inc. developer guide Version 1.0 published Jun. 2, 2014, entitled: "*Getting Started with iBeacon*", which are all incorporated in their entirety for all purposes as if fully set forth herein.

Wearables. As used herein, the term "wearable device" (or "wearable") includes a body-borne device (or item) designed or intended to be worn by a human. Such devices are typically comfortably worn on, and are carried or transported by, the human body, and are commonly used to create constant, convenient, seamless, portable, and mostly hands-free access to electronics and computers. The wearable devices may be in direct contact with the human body (such as by touching, or attaching to, the body skin), or may be releasably attachable to clothes or other items intended or designed to be worn on the human body. In general, the goal of wearable technologies is to smoothly incorporate functional, portable electronics and computers into individuals' daily lives. Wearable devices may be releasably attached to the human body using attaching means such as straps, buckles, belts, or clasps. Alternatively or in addition, wearable devices may be shaped, structured, or having a form factor to be body releasably mountable or attachable, such as using eye-glass frames or headphones. Further, wearable devices may be worn under, with, or on top of, clothing.

Wearable devices may interact as sensors or actuators with an organ or part of the human body, such as a head mounted wearable device may include a screen suspended in front of a user's eye, without providing any aid to the user's vision. Examples of wearable devices include watches, glasses, contact lenses, pedometers, chest straps, wristbands, head bands, arm bands, belt, head wear, hats, glasses, watches, sneakers, clothing, pads, e-textiles and smart fabrics, headbands, beanies, and caps, as well as jewelry such as rings, bracelets, and hearing aid-like devices that are designed to look like earrings. A wearable device may be structured, designed, or have a form factor that is identical to, substantially similar to, or is at least in part substitute to, a traditional wearable item.

A wearable device may be a headwear that may be structured, designed, or have a form factor that is identical to, substantially similar to, or is at least in part substitute to, any headwear item. The headwear may be attached to, or be in contact with, a head part, such as a face, nose, right nostril, left nostril, right cheek, left cheek, right eye, left eye, right ear, or left ear, nose, mouth, lip, forehead, or chin. A wearable device may be structured, designed, or have a form factor that is identical to, substantially similar to, or is at least in part substitute to, a bonnet, a cap, a crown, a fillet, a hair cover, a hat, a helmet, a hood, a mask, a turban, a veil, or a wig.

A headwear device may be an eyewear that may be structured, designed, or have a form factor that is identical to, substantially similar to, or is at least in part substitute to, any eyewear item, such as glasses, sunglasses, a contact lens, a blindfold, or a goggle. A headwear device may be an earpiece that may be structured, designed, or have a form factor that is identical to, substantially similar to, or is at least in part substitute to, any earpiece item, such as a hearing aid, a headphone, a headset, or an earplug.

A wearable device may be releasably or permanently attach to, or be part of, a clothing article such as a tie, sweater, jacket, or hat. The attachment may use taping, gluing, pinning, enclosing, encapsulating, or any other method of attachment or integration known in the art. Furthermore, in some embodiments, there may be an attachment element such as a pin or a latch and hook system, of portion thereof (with the complementary element on the item to which it is to be affixed) or clip. In a non-limiting example, the attachment element has a clip-like design to allow attachment to pockets, belts, watches, bracelets, broaches, rings, shoes, hats, bike handles, necklaces, ties, spectacles, collars, socks, bags, purses, wallets, or cords.

A wearable device may be releasably or permanently attach to, or be part of, a top underwear such as a bra, camisole, or undershirt, a bottom underwear such as a diaper, panties, plastic pants, slip, thong, underpants, boxer briefs, boxer shorts, or briefs, or a full-body underwear such as bodysuit, long underwear, playsuit, or teddy. Similarly, a wearable device may be releasably or permanently attach to, or be part of, a headwear such as a Baseball cap, Beret, Cap, Fedora, hat, helmet, hood, knit cap, toque, turban, or veil. Similarly, a wearable device may be releasably or permanently attach to, or be part of, a footwear such as an athletic shoe, boot, court shoe, dress shoe, flip-flops, hosiery, sandal, shoe, spats, slipper, sock, or stocking. Further, a wearable device may be releasably or permanently attach to, or be part of, an accessory such as a bandana, belt, bow tie, coin purse, cufflink, cummerbund, gaiters, glasses, gloves, headband, handbag, handkerchief, jewelry, muff, necktie, pocket protector, pocketwatch, sash, scarf, sunglasses, suspenders, umbrella, wallet, or wristwatch.

A wearable device may be releasably or permanently attach to, or be part of, an outwear such as an apron, blazer, British warm, cagoule, cape, chesterfield, coat, covert coat, cut-off, duffle coat, flight jacket, gilet, goggle jacket, guards coat, Harrington jacket, hoodie, jacket, leather jacket, mess jacket, opera coat, overcoat, parka, paletot, pea coat, poncho, raincoat, robe, safari jacket, shawl, shrug, ski suit, sleeved blanket, smoking jacket, sport coat, trench coat, ulster coat, waistcoat, or windbreaker. Similarly, a wearable device may be releasably or permanently attach to, or be part of, a suit (or uniform) such as an academic dress, ball dress, black tie, boilersuit, cleanroom suit, clerical clothing, court dress, gymslip, jumpsuit, kasaya, lab coat, military uniform, morning dress, onesie, pantsuit, red sea rig, romper suit, school uniform, scrubs, stroller, tuxedo, or white tie. Further, a wearable device may be releasably or permanently attach to, or be part of, a dress such as a ball gown, bouffant gown, coatdress, cocktail dress, debutante dress, formal wear, frock, evening gown, gown, house dress, jumper, little black dress, princess line, sheath dress, shirtdress, slip dress, strapless dress, sundress, wedding dress, or wrap dress. Furthermore, a wearable device may be releasably or permanently attach to, or be part of, a skirt such as an A-line skirt, ballerina skirt, denim skirt, men's skirts, miniskirt, pencil skirt, prairie skirt, rah-rah skirt, sarong, Skort, tutu, or wrap. In one example, a wearable device may be releasably or permanently attach to, or be part of, a trousers (or shorts) such as bell-bottoms, bermuda shorts, bondage pants, capri pants, cargo pants, chaps, cycling shorts, dress pants, high water pants, lowrise pants, Jeans, jodhpurs, leggings, overall, Palazzo pants, parachute pants, pedal pushers, phat pants, shorts, slim-fit pants, sweatpants, windpants, or yoga pants. In one example, a wearable device may be releasably or permanently attach to, or be part of, a top such as a blouse, crop top, dress shirt, guayabera, guernsey, halterneck, henley shirt, hoodie, jersey, polo shirt, shirt, sleeveless shirt, sweater, sweater vest, t-shirt, tube top, turtleneck, or twinset.

A wearable device may be structured, designed, or have a form factor that is identical to, substantially similar to, or is at least in part substitute to, a fashion accessory. These accessories may be purely decorative, or have a utility beyond aesthetics. Examples of these accessories include, but are not limited to, rings, bracelets, necklaces, watches, watch bands, purses, wallets, earrings, body rings, headbands, glasses, belts, ties, tie bars, tie tacks, wallets, shoes, pendants, charms and bobbles. For example, wearable devices may also be incorporated into pockets, steering wheels, keyboards, pens, and bicycle handles.

In one example, the wearable device may be shaped as, or integrated with, a ring. The ring may comprise, consist essentially of or consist of a shank, which is the location that provides an opening for a finger, and a head, which comprises, consists essentially or consists of ornamental features of the ring and in some embodiments houses the signaling assembly of the present device. The head may be of any shape, e.g., a regular sphere, truncated sphere, cube, rectangular prism, cylinder, triangular prism, cone, pyramid, barrel, truncated cone, domed cylinder, truncated cylinder, ellipsoid, regular polygon prism or truncated three-dimensional polygon of e.g., 4-16 sides, such as a truncated pyramid (trapezoid), or combination thereof or it may be an irregular shape. Further, the head may comprise an upper face that contains and is configured to show one or more jewels and/or ornamental designs.

A mobile communication device that comprises a fashion accessory and a signaling assembly is described in U.S. Patent Application Publication No. 2015/0349556 to Mercando et al. entitled: "Mobile Communication Devices", which is incorporated in its entirety for all purposes as if fully set forth herein. The signaling assembly may be configured to provide sensory stimuli such as a flashing LED light and a vibration. These stimuli may vary depending on the signal received from a remote communication device or from gestures made by a user or from information stored in the mobile communication device.

A wearable fitness-monitoring device is described in U.S. Pat. No. 8,948,832 to Hong et al. entitled: "Wearable Heart Rate Monitor", which is incorporated in its entirety for all purposes as if fully set forth herein. The device including a motion sensor and a photoplethysmographic (PPG) sensor. The PPG sensor includes (i) a periodic light source, (ii) a photo detector, and (iii) circuitry determining a user's heart rate from an output of the photo detector. Some embodiments provide methods for operating a heart rate monitor of a wearable fitness-monitoring device to measure one or more characteristics of a heartbeat waveform. Some embodiments provide methods for operating the wearable fitness monitoring device in a low power state when the device determines that the device is not worn by a user. Some embodiments provide methods for operating the wearable fitness-monitoring device in a normal power state when the device determines that the device is worn by a user.

In one example, a wearable device may use, or may be based on, a processor or a microcontroller that is designed for wearable applications, such as the CC2650 SimpleLink™ Multistandard Wireless MCU available from Texas Instruments Incorporated (headquartered in Dallas, Tex., U.S.A.) and described in a Texas Instrument 2015 publication # SWRT022 entitled: "*SimpleLink™ Ultra-Low Power—Wireless Microcontroller Platform*", and in a Texas Instrument 2015 datasheet # SWRS158A (published February 2015, Revised October 2015) entitled: "*CC2650 SimpleLink™ Multistandard Wireless MCU*", which are both incorporated in their entirety for all purposes as if fully set forth herein.

dBm. dBm (sometimes referred to as dBmW or decibel-milliwatts) is an abbreviation for the power ratio in decibels (dB) of the measured power referenced to one milliwatt (mW). It is commonly used in radio, microwave and fiber optic networks as a convenient measure of absolute power because of its capability to express both very large and very small values in a short form. Similarly, dBW refers to a referenced to one watt (1000 mW).

Human body RF absorption. Microwave radiation is emitted by a wide variety of computing, communications and other technologies. In many transport, industrial and medical contexts, humans are placed in close proximity to several of these sources of emission in reflective, enclosed cavities. Pseudo-reverberant conditions are created, in which absorption by human bodies can form a significant, even the dominant loss mechanism. The amount of energy stored, and hence the field intensities in these environments depend on the nature of electromagnetic absorption by the human body, so quantifying human absorption at these frequencies is necessary for accurate modelling of both electromagnetic interference and communications path loss in such situations.

Human body RF absorption is described in a dissertation by Ling Wang submitted the Office of Graduate Studies of Texas A&M University (May 2008) entitled: *"Measuring Optical Absorption Coefficient of Pure Water in UV Using the Integrating Cavity Absorption Meter"*, and in an article by David J. Jefferies and Juan Fanals (both from School of Electronic Engineering—IT and Maths, University of Surrey, Surrey, England, UK) (downloaded 4/2016) Entitled: *"Microwave Absorption in Humans"*, which are both incorporated in their entirety for all purposes as if fully set forth herein.

The term "Penetration Depth" herein, also referred to as "Skin Depth", is the depth at which the amplitude of a penetrating wave is attenuated to 1/e of its initial value. A study to quantify absorption by the body, for the purpose of simulating its effect on the environments, is described in a thesis submitted for the Ph.D. degree submitted by Gregory Connor Richard Melia to The University of York Department of Electronics (August 2013) Entitled: *"Electromagnetic Absorption by the Human Body from 1 to 15 GHz"*, which is incorporated in its entirety for all purposes as if fully set forth herein. In this study, the absorption cross section of the human body is plotted and its behavior is compared to several biometric parameters, of which the body's surface area is found to have a dominant effect on absorption. The results are normalized out to provide an absorption efficiency of the skin, which is again compared to several biometric parameters; the strongest correlation is found to be with an estimate for average thickness of the subcutaneous fat layer. The penetration depth (where the signal strength is 1/e of its power) is described in a set of graphs 180 illustrated in FIG. 18, describing a logarithmic penetration depth 182 (in meters) versus a logarithmic frequency 181 (in Hertz), for a dry skin (graph 184), for an infiltrated fat (graph 183), and for a muscle tissue (graph 185). Accordingly, a penetration depth of 1.5 cm is obtained at 2.45 GHz, 1.7 cm at 2.4 GHz, 3 cm at 900 MHz, and 10 cm at 100 MHz.

The attenuative properties of a dielectric or medium may be described by a property known as the 'skin depth' δ. This is the depth at which the amplitude of a penetrating wave will be attenuated to lie of its initial value. The relative signal strength (or signal power) percentage after passing through a human body compared to the original strength (or power) for the following radiation frequencies:

| Depth | 2.4 GHz | 900 MHz | 100 MHz |
|---|---|---|---|
| 2 cm | 30.837% | 51.342% | 81.873% |
| 5 cm | 5.280% | 18.888% | 60.653% |
| 7 cm | 1.628% | 9.697% | 49.659% |
| 10 cm | 0.279% | 3.567% | 36.788% |

-continued

| Depth | 2.4 GHz | 900 MHz | 100 MHz |
|---|---|---|---|
| 15 cm | 0.015% | 0.674% | 22.313% |
| 17 cm | 0.005% | 0.346% | 18.268% |
| 20 cm | 0.001% | 0.127% | 13.534% |

These values are plotted in a set of graphs 190 shown in FIG. 19, illustrating a relative logarithmic received signal 191 versus a penetration depth 192 (in centimeters), for a frequency of 2.4 GHz (graph 193), 900 MHz (graph 184), and 100 MHz (graph 195).

In an experiment, a smartphone wirelessly streaming music was used, serving as a constant and continuous Bluetooth signal generator, wireless coupled to a Plantronics® Bluetooth headset model "Voyager Edge" as a receiver. An RF signal meter (model ED88T from Cornet® Micro Systems Inc.) was used to measure the received signal strength. A bottle of water approximately 10 cm in diameter was used as RF signal absorber. Without the bottle, or with an empty bottle, the signal received by the signal meter was measured to be at 40 mW/m². With the bottle filled with water, where the signal penetrated 10 cm of water, the signal strength was approximately 0.11 mW/m². Thus, the signal was attenuated to 0.275% of the original signal strength, fitting a prediction for 10 cm of water.

Empirical results of microwave absorption in humans provide an attenuation of −20 dB (±2 dB) at 800 MHz, −28 dB (±2 dB) at 900 MHz, −28 dB (±2 dB) at 1.0 GHz, −29 dB (±2 dB) at 1.1 GHz, −31 dB (±2 dB) at 1.2 GHz, −38 dB (±2 dB) at 1.3 GHz, −43 dB (±2 dB) at 1.4 GHz, and −47 dB (±2 dB) at 1.5 GHz. This data points may be best fitted by an empirical formula where the loss (in dB) for 30 cm average thickness of human body is given by: Loss(dB)= $(28\pm2)*[Frequency]^{1.2}$, where the Loss is in dB, and the Frequency is in GHz. As the speed of electromagnetic waves is proportional to the reciprocal value of the square root of the dielectric constant, the resulting wavelength in a human tissue can drop to a fraction of the wavelength in air; e.g. at 10 GHz the wavelength can drop from 3 cm to about 3.4 mm. When considering phase shift of a signal, it is noted that the signal phase changes upon the signal passing inside a medium having specific dielectric properties and then through a medium having a different dielectric properties (such as a signal flowing through a human body and then outside the human body).

Using human body RF absorption. One of the simplest ways to achieve meter-level accuracy in specific zones is by a proximity measurement. The measurement of distance using received signal strength is very accurate when within a meter or so of a transmitter because the signal strength decreases as the inverse square of the distance to the source, and there are rarely any signal obstructions. It is therefore easy to detect close proximity to a BLE device, and hence confidently trigger a location-based event. If we were to assume a modest measurement noise such as 3 dBm, this would result in a ranging uncertainty of the same order of magnitude as the distance to the source; within a meter of the transmitter a positioning uncertainty of only a few centimeters would be possible, however, at 10 m the ranging error would be around 5 m.

Using BLE for indoor positioning is described in an article by R. Faragher and R. Harle (both from University of Cambridge, UK) published in the Proceedings of the 27th International Technical Meeting of The Satellite Division of the Institute of Navigation (ION GNSS+2014), [Tampa, Fla., September 2014, pp. 201-210] entitled: "*An Analysis of the Accuracy of Bluetooth Low Energy for Indoor Positioning Applications*", which is incorporated in its entirety for all purposes as if fully set forth herein. The human body also attenuates 2.4 GHz radio signals, further complicating the range estimation. FIG. 1 shows the output from a short set of static tests moving away from a BLE beacon in an open environment. The experiment demonstrates that a ~10 dB reduction in RSS caused by this body effect will still result in a reasonable proximity measurement when within 10 cm of the transmitter (the receiver will still be estimated to be within a meter of the transmitter), whereas out at 1 meter the body effect can result in a range estimate of 5-10 meters. However, the ranging performance rapidly drops off with range, as shown in FIG. 1. At approximately 1 meter from source, the BLE signal strength is −58 dBm if obstructed by a human body, and −44 dBm if remain unobstructed.

Direction finding. Direction finding (DF), or radio direction finding (RDF), is the measurement of the direction from which a received signal was transmitted. This can refer to radio or other forms of wireless communication, including radar signals detection and monitoring (ELINT/ESM). By combining the direction information from two or more suitably spaced receivers (or a single mobile receiver), the source of a transmission may be located via triangulation. RDF systems can be used with any radio source, although very long wavelengths (low frequencies) require very large antennas, and are generally used only on ground-based systems. These wavelengths are nevertheless used for marine radio navigation as they can travel very long distances "over the horizon", which is valuable for ships when the line-of-sight may be only a few tens of kilometers. For aerial use, where the horizon may extend to hundreds of kilometers, higher frequencies can be used, allowing the use of much smaller antennas.

The three main techniques used in passive direction finding (DF) are Time Difference of Arrival (TDOA), amplitude comparison, and phase interferometry. All three methods of DF measure differences in the signals received at two or more separated antennas. The TDOA method measures the difference in arrival time of one signal at multiple antennas to calculate the Angle of Arrival (AoA) and range of the emitter. The degree of accuracy of the TDOA method depends on the distance between the antennas. The amplitude comparison method uses two directional antennas pointed in different directions that the ratio of the gains for the two antennas will be unique for each angle within the field of view. By comparing the amplitude ratio of the signals received by the two antennas to known gain patterns.

Direction finding is described in an article Submitted Oct. 10, 2012 by Daniel Guerin, Shane Jackson, and Jonathan Kelly to the faculty of Worcester Polytechnic Institute entitled: "*Passive Direction Finding—A Phase Interferometry Direction Finding System for an Airborne Platform*", in Rohde & Schwarz Radiomonitoring & Radiolocation Catalog 2011/2012 entitled: "*Introduction into Theory of Direction Finding*", and in Application Note AN-001 published 2008 by RDF Products [Rev B03/07-08/an001_apl_01] entitled: "*A User's Guide: How to Shop for a Radio Direction Finding System*", which are all incorporated in their entirety for all purposes as if fully set forth herein.

A computerized method for computing the photo quality of a captured image in an image acquisition system is described in Patent Cooperation Treaty (PCT) International Application (IA) Publication No. WO 2014/064690 to Sivan, entitled: "Real Time Assessment of Picture Quality" (hereinafter the '690 PCT Publication'), which is incorporated in its entirety for all purposes as if fully set forth herein. The method comprising on-board combining of a plurality of quality indicators computed from said captured image and its previous image frames quality indicators and a confidence level for at least one of said quality indicators; and using a processor to determine, based on said combining, whether photo quality is acceptable and taking differential action depending on whether quality is or is not acceptable. Each of the methods or steps herein, may consist of, include, be part of, or be based on, a part of, or the whole of, the functionalities or structure (such as software) described in the '690 PCT Publication. Further, each of the devices or elements herein may consist of, include, be part of, or be based on, a part of, or the whole of, the devices or elements described in the '690 PCT Publication.

A device that comprises a first digital camera having a first center line of sight and a second digital camera having a second center line of sight that is parallel and opposing the first camera system is described in Patent Cooperation Treaty (PCT) International Application (IA) Publication No. WO 2015/162605 to Sivan, entitled: "System and Method for Controlling a Camera Based on Processing an Image Captured by Other Camera" (hereinafter the '605 PCT Publication'), which is incorporated in its entirety for all purposes as if fully set forth herein. A method for controlling the first camera based on estimating the angular deviation between a person gaze direction and the line of sight of the first digital camera. A human face is detected in an image captured as an image file by the second digital camera, using a face detection algorithm. An angular deviation a is estimated, defined between the second center line of sight and an imaginary line from the second camera to the detected human face based on the captured image, and an angular deviation 3 is estimated, defined between the imaginary line from the second camera to the detected face and the human face gaze direction based on the captured image. Each of the methods or steps herein, may consist of, include, be part of, or be based on, a part of, or the whole of, the functionalities or structure (such as software) described in the '605 PCT Publication. Further, each of the devices or elements herein may consist of, include, be part of, or be based on, a part of, or the whole of, the devices or elements described in the '605 PCT Publication.

A display method using a display operable to display an image to a viewer is described in Patent Cooperation Treaty (PCT) International Application (IA) Publication No. WO 2014/155072 to Bickerstaff et al. entitled: "Display", which is incorporated in its entirety for all purposes as if fully set forth herein. The method comprises detecting an initial position and/or orientation of the viewer's head; generating an image for display according to the detected position and/or orientation; detecting a current position and/or orientation of the viewer's head at a time at which the image is to be displayed; re-projecting the generated image according to any differences between the initial position and/or orientation and the current position and/or orientation of the viewer's head; and displaying the re-projected image using the display.

Techniques for providing an eye-controlled user interface for an electronic device are described in U.S. Patent Application Publication No. 2015/378431 to Donaldson entitled: "Image Analysis Applications Target Tracking or Detecting", which is incorporated in its entirety for all purposes as if fully set forth herein. In some examples, a process includes establishing a control link between a device and a visual control circuit, the visual control circuit having an image sensor and a visual feature disposed substantially proximate to the image sensor at a control point, receiving an image by the image sensor, evaluating the image to determine whether an eye is oriented substantially toward the control point, determining whether a control action is intended, and, if the control action is intended, deriving the control action, and using the control link to perform the control action.

An image obtained when a rare or valuable thing is found is shared between users each wearing an image display apparatus on the head or face is described in U.S. Patent Application Publication No. 2015/0355463 to Sako et al. entitled: "Image Display Apparatus, Image Display Method, and Image Display System", which is incorporated in its entirety for all purposes as if fully set forth herein. When a man finds a rare or valuable thing, the man feels like telling it to his/her surroundings. For example, when the man finds a planet such as Venus or shooting stars in the night sky, fish or a fresh water crab in a pond or a river, a bird, a cicada, a unicorn beetle, or the like on a tall tree in the woods, the man feels like saying "Look there!" An image display apparatus releases a captured image in a line-of-sight direction of the user to share a user's precious experience with other users.

Gaze detection technology that may be used to aim aimable optics on an imaging device is described in U.S. Patent Application Publication No. 2013/0258089 to Lyons et al. entitled: "Eye Gaze Based Image Capture", which is incorporated in its entirety for all purposes as if fully set forth herein. As a result, the user need not do anything more to direct the camera's line of sight than to look at something. In some embodiments, the camera may then adjust the focus and exposure based on the gaze target. In addition, the camera may keep track of how long the user looks at a given area within a scene and, if a time threshold is exceeded, the camera may zoom in to that gaze target.

A computing device is described in U.S. Patent Application Publication No. 2015/0193658 to Miller et al. entitled: "Enhanced Photo And Video Taking Using Gaze Tracking", which is incorporated in its entirety for all purposes as if fully set forth herein. When a user takes a photograph or video of a scene with an image capture device, such as computing device having a camera, a point of interest in the scene is determined. The computing device includes an eye tracker to output a gaze vector of a user's eye viewing the scene through a view finder that indicates a point of interest in the scene. Selected operation may then be performed based on the determined point of interest in the scene. An amount of exposure used to capture the image may be selected based on the point of interest. Zooming or adjusting the field of view through a view finder may be anchored at the point of interest, and the image through the view finder may be zoomed about the point of interest, before the image is captured. Image enhancing effects may be performed about the point of interest.

A utility model that provides embedded eye-movement auxiliary equipment based on STM32 is described in Chinese Publication No. CN 204406324 entitled: "Embedded Eye-Movement Auxiliary Equipment Based on STM32", which is incorporated in its entirety for all purposes as if fully set forth herein. The equipment comprises an image import module for acquiring eye-movement video images, an STM32 master control module for tracking eye-movement according to the eye-movement video images, a Bluetooth module for transmitting an eye-movement tracking signal to a mobile terminal, a USB interface circuit used for supplying power to the STM32 master control module by the mobile terminal, and the mobile terminal for supplying power to the STM32 master control module and generating different control commands according to the eye-movement tracking signal. The equipment provided by the utility model can correspondingly control the mobile terminal according to the gazing direction of a user, is small in size and low in practical demand for the user, and has the functions of automatically controlling the mobile terminal to roll the pages, turn the pages, and close the pages, so that the hands of the user are free to the greatest extent, and moreover, the overall equipment is small in size and package and convenient for use of the mobile equipment. Data is transmitted by using the Bluetooth module, so that the embedded eye-movement auxiliary equipment provided by the utility model has the advantages of being high in transmission speed, low in energy consumption, stable in communication and the like.

Methods and systems for capturing an image are provided in U.S. Patent Application Publication No. 2013/0222638 to Wheeler et al. entitled: "Image Capture Based on Gaze Detection", which is incorporated in its entirety for all purposes as if fully set forth herein. In one example, a head-mounted device (HMD) having an image capturing device, a viewfinder, a gaze acquisition system, and a controller may be configured to capture an image. The image capturing device may be configured to have an imaging field of view including at least a portion of a field of view provided by the viewfinder. The gaze acquisition system may be configured to acquire a gaze direction of a wearer. The controller may be configured to determine whether the acquired gaze direction is through the viewfinder and generate an image capture instruction based on a determination that the acquired gaze direction indicates a gaze through the viewfinder. The controller may further be configured to cause the image capturing device to capture an image.

An image capturing and displaying apparatus is disclosed in U.S. Patent Application Publication No. 2008/0062297 to Sako et al. entitled: "Image Capturing and Displaying Apparatus and Image Capturing and Displaying Method", which is incorporated in its entirety for all purposes as if fully set forth herein. The image capturing and displaying apparatus includes an image capturing section, a display section, a user's information obtaining section, and a control section. The image capturing section captures an image such that a direction in which a user sees a subject is a direction of the subject. The display section is disposed in front of eyes of the user and displays the image captured by the image capturing section. The user's information obtaining section obtains information about a motion and a physical situation of the user. The control section controls an operation of the image capturing section or an operation of the display section corresponding to information obtained by the user's information obtaining section.

Methods and systems for capturing and storing an image are provided in U.S. Pat. No. 8,941,561 to Starner entitled: "Image Capture", which is incorporated in its entirety for all purposes as if fully set forth herein. In one example, eye-movement data associated with a head-mountable device (HMD) may be received. The HMD may include an image-capture device arranged to capture image data corresponding to a wearer-view associated with the HMD. In one case, the received eye-movement data may indicate sustained gaze. In this case, a location of the sustained gaze may be determined, and an image including a view of the location of the sustained gaze may be captured. At least one indication of a context of the captured image, such as time and/or geographic location of the HMD when the image was captured may be determined and stored in a data-item attribute database as part of a record of the captured image. In a further example, movements associated with the HMD may also be determined and based on to determine sustained gaze and the location of the sustained gaze.

An eye-gaze tracking device, which detects a gaze direction of a user based on an electro-oculogram, is described in U.S. Pat. No. 8,434,868 to Sato et al. entitled: "Eye-Gaze Tracking Device, Eye-Gaze Tracking Method, Electro-Oculography Measuring Device, Wearable Camera, Head-Mounted Display, Electronic Eyeglasses, and Ophthalmological Diagnosis Device", which is incorporated in its entirety for all purposes as if fully set forth herein. The device includes: a drift estimating unit which estimates drift noise included in a set of observation voltages among observation voltages that are electro-oculograms generated in a living body and observed at the plurality of electrodes, based on a component outside an electro-oculography subspace that is an assembly of sets of electro-oculograms theoretically observed at a plurality of electrodes; and an eye-gaze tracking unit which detects the gaze direction of the user, based on a signal generated by removing, from the observation voltages, the drift noise estimated by the drift estimating unit.

A mobile device for monitoring a user's reaction to one or more stimuli and providing feedback to the user related to the stimuli is described in Patent Cooperation Treaty (PCT) International Application (IA) Publication No. WO 2014/116826 to Jangraw et al. entitled: "Mobile, Neurally-Assisted Personal Assistant", which is incorporated in its entirety for all purposes as if fully set forth herein. The mobile system has an electroencephalograph, configured to be worn in proximity to the user's head, sense brain activity of the user, and generate corresponding brain activity information. A processing arrangement can receive brain activity information, compare such information to stimuli information, and generate feedback information for the user.

A head wearing type eye control system based on pupil recognition positioning is disclosed in Chinese Publication No. CN 103838378 entitled: "Head Wearing Type Eye Control System Based on Pupil Recognition Positioning", which is incorporated in its entirety for all purposes as if fully set forth herein. The head wearing type eye control system is a special control system for a physically-challenged person with the sound eyes. The control system comprises the following steps that firstly, a computer outputs a user interface comprising a character display frame and a simple keyboard, the user interface is projected to a head wearing type displayer, the physically-challenged person observes different keys on the keyboard in a display screen, and the center positions of the eyeballs can be changed; secondly, a camera captures images of the eyeballs and transmits image information to a PC through a USB interface or a Bluetooth interface, and then the obtained eyeball images are utilized; thirdly, the image preprocessing and pupil positioning algorithm is adopted to calculate the direction of a sight line based on an eyeball mapping model according to the relation, between the user eye characteristics and the content displayed in the equipment display screen, established in the early correcting process, and the keys watched by the user on the keyboard can be judged; fourthly, information corresponding to the keys of the keyboard is output to the character display frame or the keyboard interface state is changed. The head wearing type eye control system is not affected by an external light source, can rapidly and accurately track the movement of the eyeballs and accurately display the key information selected by the user in real time.

A multi-channel camera system for capture of still or video images is disclosed in U.S. Patent Application Publication No. 2010/0328471 to Boland et al. entitled: "Wearable Multi-Channel Camera", which is incorporated in its entirety for all purposes as if fully set forth herein. The camera system includes multiple fixed focal length lenses and multiple digital sensors in a compact package. A preferred embodiment of the invention is wearable, and is intended to be head-mounted near a user's eye to capture, in real time, the user's perspective view of a scene. The multi-channel lens system sub-assembly preferably includes three fixed focal length lenses—a wide-angle lens, a standard lens, and a telephoto lens—each providing a different field of view. Lens elements are arranged in a monolithic integrated structure, and optionally separated from each other by light-absorbing baffles to minimize cross-talk between the channels. The camera system includes circuitry to select one or more lenses, capture and compress a series of images, and transfer the images for storage on a remote device. Standard communication protocols may be used for wireless image data transfer.

A fully automatic, head mounted, hand and eye free camera System and photography are disclosed in U.S. Pat. No. 7,542,665 to Lei entitled: "Fully Automatic, Head Mounted, Hand and Eye Free Camera System and Photography", which is incorporated in its entirety for all purposes as if fully set forth herein. The fully automatic, head mounted, hand and eye free camera System consist of three components: A) a head mounted camera header, B) a portable personal computer, and C) a hand hold controller. The component A (head mounted camera header) is composed of two set of eye ball trackers/range finder/digital camera headers. The component B (portable personal computer) control eye ball tracker and the range finder to determine the direction of eye sight and the distance between the eye and the target, and adjusts the lens of the digital camera header to aim at and focus on target to take pictures or record video and to save the pictures or video to the storage of the portable personal computer. The user control whole system by pressing the buttons at component C (hand hold controller). The aiming, focusing, and the capturing procedure is automatic, continuous, and in the real time, and is a true process of "What you see is what you get (photo or video)".

Motion signals from head and body motion detectors are combined to measure motion of a user's head with respect to his body, as disclosed in U.S. Patent Application Publication No. 2004/0089814 to Cheatle entitled: "Image Capture System and Method", which is incorporated in its entirety for all purposes as if fully set forth herein. A field of view of an image capture device is moved based on the measured motion of the user's head with respect to his body.

Obtaining a remote control camera capable of exactly tracking a subject seen with an eye and designated by a finger in the center of a frame and photographing it is disclosed in Japanese Publication No. JP7306467A to TAKASHI et al. entitled: "REMOTE CONTROL CAMERA", which is incorporated in its entirety for all purposes as if fully set forth herein. A photographer wears a ringlike designating unit on his finger and points at the subject, so that an optical pattern signal is outputted. The signal is received by an angle measuring and communication unit on a camera side and an angle measuring and communication unit on an eye side attached to the temple of a pair of spectacles worn by the photographer so as to see the subject, and a solid angle to the unit is measured, and their solid angles are measured each other according to mutual light emitting signals. The unit on the eye side arithmetically calculates the angle of the units and transmits it to the camera side according to an encoding light emitting signal. The unit on the camera side receives the calculated angle and forms a triangle from the solid angles to the units. The three-dimensional bearing of the subject is arithmetically specified by a triangulation method, whereby a universal head is driven to change the direction of the camera.

A head mountable display (HMD) system is disclosed in U.S. Patent Application Publication No. 2014/0362446 to Bickerstaff et al. entitled: "Electronic Correction Based on Eye Tracking", which is incorporated in its entirety for all purposes as if fully set forth herein. The head mountable display (HMD) system comprises an eye position detector comprising one or more cameras configured to detect the position of each of the HMD user's eyes; a dominant eye detector configured to detect a dominant eye of the HMD user; and an image generator configured to generate images for display by the HMD in dependence upon the HMD user's eye positions, the image generator being configured to apply a greater weight to the detected position of the dominant eye than to the detected position of the non-dominant eye.

Methods and systems are described that involve a head-mountable display (HMD) or an associated device determining the orientation of a person's head relative to their body, are described in U.S. Pat. No. 9,268,136 to Patrick et al. entitled: "Use of Comparative Sensor Data to Determine Orientation of Head Relative to Body", which is incorporated in its entirety for all purposes as if fully set forth herein. To do so, example methods and systems may compare sensor data from the HMD to corresponding sensor data from a tracking device that is expected to move in a manner that follows the wearer's body, such a mobile phone that is located in the HMD wearer's pocket.

A head mountable display (HMD) system in which images are generated for display to the user is described in Patent Cooperation Treaty (PCT) International Application (IA) Publication No. WO 2014/199155 to Ashforth et al. entitled: "Head-Mountable Apparatus and Systems", which is incorporated in its entirety for all purposes as if fully set forth herein. The head mountable display (HMD) system comprises a detector configured to detect the eye position and/or orientation and/or the head orientation of the HMD wearer, and a controller configured to control the generation of images for display, at least in part, according to the detection of the eye position and/or orientation and/or the head orientation of the HMD wearer; in which the controller is configured to change the display of one or more image features according to whether or not the user is currently looking at those image features, the image features are menu items or information items, by rendering an image feature so as to be more prominent on the display if the user is looking at it, such that the image feature is enlarged, moved from a peripheral display position, replaced by a larger image feature and/or brought forward in a 3D display space if the user is looking at it.

A method of transmitting radiofrequency identification (RFID) interrogation signals is disclosed in U.S. Pat. No. 8,890,657 to Lin et al. entitled: "System and Method for Operating an RFID System with Head Tracking", which is incorporated in its entirety for all purposes as if fully set forth herein. The method comprises detecting a first movement of a user in a first direction, determining a command from the first movement, and transmitting a RFID interrogation signal in response to the command.

An eyewear device that includes eyeglass lenses and an eyewear frame configured to hold the eyeglass lenses is disclosed in U.S. Patent Application Publication No. 2013/0265169 to Mates entitled: "Eyewear Device Configured To Track Head Movement", which is incorporated in its entirety for all purposes as if fully set forth herein. According to one example, the eyeglass frame may include a number of sensors configured to determine a position of the eyewear frame. The eyewear device may also include a transceiver configured to receive periodic radio frequency (RF) signals from a remote device and to transmit corresponding RF feedback signals to the remote device responsive to the received periodic RF signal and at least one operation indicator configured to initiate operation when the eyewear frame is moved outside of a predetermined position.

A method for tracking a head of an occupant of a vehicle is described in European Patent Application EP 2613572 to Hess et al. entitled: "Head Tracking System", which is incorporated in its entirety for all purposes as if fully set forth herein. According to the method, a reference signal is sent from a predetermined location with respect to the vehicle. The reference signal is received at a headphone worn by the occupant. A receive direction of the reference signal is determined with respect to the headphone. A direction, in which the head of the occupant is directed, is determined based on the receive direction and the predetermined location. The predetermined location, from where the reference signal is sent, is a passenger compartment illumination device of the vehicle.

Tracking apparatus and a method of tracking an object, e.g. a helmet of an aircraft pilot, relative to a given space such as an aircraft cockpit are described in Patent Cooperation Treaty (PCT) International Application (IA) Publication No. WO 2012/127220 to COURT et al. entitled: "Object Tracking", which is incorporated in its entirety for all purposes as if fully set forth herein. The object is moveable within the space and the apparatus comprises one or more transmitters for transmitting electromagnetic radiation into the space; a number of structures, adapted to reflect, scatter, or absorb and re-radiate electromagnetic radiation incident on the structures. Each structure has a substantially fixed position relative to the object and one or more receivers are provided for receiving the reflected, scattered, and/or re-radiated electromagnetic radiation. A processor, adapted to determine a location and/or orientation of the object in the space, is also provided which uses data corresponding to the received electromagnetic radiation to determine position and/or orientation of the object.

A headset for a brain wave game used to enable a user to play a game by using brain waves and moving his/her head is described in Korean Publication No. KR20120056954 to CHUL entitled: "A Headset for Brain Wave Game by Brain Waves and Head Tilt Sensor", which is incorporated in its entirety for all purposes as if fully set forth herein. The headset for a brain wave game comprises a detection unit, a transmission signal processing unit, a controller, an RF transmitter, an RF receiver, a received signal processor, a data unit, and an output unit. The detection unit detects a moving direction signal by using the strength of a brain wave signal and a head tilt sensor. The transmission signal processing unit processes the detected signal into a signal that can be analyzed and transmitted. The controller generates an analysis and transmission control signal of the processed signal from the transmission signal-processing unit. The RF transmitter processes the transmission and reception of the signal outputted from the controller. The RF receiver receives the signal from the RF transmitter.

A tracking system that determines the orientation of an object is described in U.S. Patent Application Publication No. 2009/0058606 to Munch et al. entitled: "Tracking System Using Radio Frequency Identification Technology", which is incorporated in its entirety for all purposes as if fully set forth herein. A transceiver transmits a signal and detects responses from multiple transponders. A processing unit determines an orientation parameter of the object by comparing the responses from the multiple transponders.

A head gatch alarm system that reduces medical risk for aspirational pneumonia when an angle of the head gatch section is outside a predetermined range is described in U.S. Pat. No. 8,063,785 to Sacchetti entitled: "Head Gatch Alarm System", which is incorporated in its entirety for all purposes as if fully set forth herein. The system includes an inclinometer and a pump. The inclinometer is attached to the head gatch section for sensing an angle of the head gatch section. The inclinometer includes an RF receiver and RF transmitter for sending and receiving signals to a pump. An alarm or other means for alerting a medical professional is in communication with the inclinometer or the pump. The pump includes an RF transmitter and RF receiver for two-way RF communication between the pump and the inclinometer. In operation, the alarm is triggered and the pump is turned off when the head gatch section is positioned outside a predetermined range.

A binaural technology method is described in U.S. Patent Application Publication No. 2009/0052703 to Hammershoi entitled: "System and Method Tracking the Position of a Listener and Transmitting Binaural Audio Data to the Listener", which is incorporated in its entirety for all purposes as if fully set forth herein. The method includes: determining positions related to position of both ears of a listener, receiving a wireless RF signal including binaural audio data is received, and presenting the binaural audio data to the listener By determining ear positions of a listener e.g. in 3D, information of the listener's position e.g. in a virtual environment is known, and further by wireless transmitting binaural audio signals to the listener, it becomes possible to transmit 3D audio data matching the listener's position and movements accordingly. Further, since the position of both ears is known, it is possible to individually match the binaural audio data to the listener, since it is possible to derive from the ear positions a distance between the listener's ears, and hereby a valuable parameter is known that can be used to generate binaural signals that individually fits the listener. Thus, the listener can be provided with a better 3D audio experience. Especially, the determined positions may correspond to ear canal reference points for the binaural audio data. The positions in the ears may be derived based on RF signals, e.g. by using earphones, e.g. in-the-ear type earphones, that are also used to wirelessly receive and reproduce the binaural audio data to the listener. The ear phones may be arranged to wirelessly transmit the determined position data to a remote processor that generates the binaural audio data accordingly. The method may be used for applications such as binaural synthesis, binaural capturing, inverse binaural filtering, Virtual Reality, Mixed Reality, teleconferencing, inter-com, exhibition/museum, and traffic signals.

A human-machine interface that can detect when a user's ear is pulled back to initiate a plurality of procedures is described in U.S. Patent Application Publication No. 2005/0238194 to Chornenky entitled: "Ear associated machine-human interface", which is incorporated in its entirety for all purposes as if fully set forth herein. Such procedures include turning on a TV using a laser attached to the user, starting an additional procedure by speaking a command, communicating with other users in environments, which have high ambient noise, and interacting with the internet. Head position sensors are used to detect the position of the head of a user and to either initiate a procedure if a characteristic of the head position or positions meets a certain criteria, or to pass the head position information to another device.

A method for controlling a zoom mode function of a portable imaging device equipped with multiple camera modules based on the size of an identified user's face or based on at least one of the user's facial features is described in U.S. Patent Application Publication No. 2014/0184854 to Musatenko, entitled: "Front Camera Face Detection for Rear Camera Zoom Function", methods and apparatus for image capturing based on a first camera mounted on a rear side of a mobile terminal and a second camera mounted on the front side of the mobile terminal are described in U.S. Patent Application Publication No. 2014/0139667 to KANG, entitled: "Image Capturing Control Apparatus and Method", a method and device for capturing accurate composition of an intended image/self-image/self-image with surrounding objects, with desired quality or high resolution and quality of the image achieved by using motion sensor/direction sensor/position sensor and by matching minimum number of contrast points are described in PCT International Application Publication No. WO 2015/022700 to RAMSUNDAR SHANDILYA et al., entitled: "A Method for Capturing an Accurately Composed High Quality Self-Image Using a Multi Camera Device", a method and computer program product for remotely controlling a first image capturing unit in a portable electronic device including a first and second image capturing unit, and the device detects and tracks an object via the second capturing unit and detects changes in an area of the object are described in U.S. Patent Application Publication No. 2008/0212831 to Hope, entitled: "Remote Control of an Image Capturing Unit in a Portable Electronic Device", methods and devices for camera aided motion direction and speed estimation of a mobile device based on capturing a plurality of images that represent views from the mobile device and adjusting perspectives of the plurality of images are described in U.S. Patent Application Publication No. 2014/0226864 to Subramaniam Venkatraman et al., entitled: "Camera Aided Motion Direction and Speed Estimation", and a smart mobile phone with a front camera and a back camera where the position coordinates of pupil centers in the front camera reference system, when the mobile device holder watches a visual focus on a display screen are collected through the front camera, is described in the Abstract of Chinese Patent Application Publication No. CN 103747183 Huang Hedong, entitled: "Mobile Phone Shooting Focusing Method", which are all incorporated in their entirety for all purposes as if fully set forth herein.

Electronic circuits and components are described in a book by Wikipedia entitled: "*Electronics*" downloaded from en.wikibooks.org dated Mar. 15, 2015, which is incorporated in its entirety for all purposes as if fully set forth herein.

Each of the methods or steps herein, may consist of, include, be part of, be integrated with, or be based on, a part of, or the whole of, the steps, functionalities, or structure (such as software) described in the publications that are incorporated in their entirety herein. Further, each of the components, devices, or elements herein may consist of, integrated with, include, be part of, or be based on, a part of, or the whole of, the components, systems, devices or elements described in the publications that are incorporated in their entirety herein.

In consideration of the foregoing, it would be an advancement in the art to provide methods and systems for estimating head pose or eye gaze of a person, or to use the estimation for controlling a camera operation, that are simple, intuitive, small, secure, cost-effective, reliable, provide lower power consumption, provide lower CPU and/or memory usage, easy to use, reduce latency, faster, has a minimum part count, minimum hardware, and/or uses existing and available components, protocols, programs and applications for providing better quality of service, better or optimal resources allocation, and provides a better user experience.

SUMMARY

A system may be used for controlling or activating a component in response to estimated head pose of a person. The system may comprise first, second, and third devices. The first device may comprise a first antenna for transmitting a first Radio-Frequency (RF) signal over the air; a first wireless transmitter coupled to the first antenna for producing the first RF signal; a first power source for electrically powering the first wireless transmitted; and a first enclosure housing the first power source and the first wireless transmitter. The second device may comprise a second antenna for transmitting a second Radio-Frequency (RF) signal over the air; a second wireless transmitter coupled to the second antenna for producing the second RF signal; a second power source for electrically powering the second wireless transmitted; and a second enclosure housing the second power source and the second wireless transmitter. The third device may comprise a third antenna for receiving the first and second Radio-Frequency (RF) signals over the air; a wireless receiver coupled to the third antenna for receiving first and second RF signals corresponding to the transmitted first and second Radio-Frequency (RF) signals; a comparator for comparing the received first and second RF signals; the component; a third power source for electrically powering the wireless receiver and the comparator; and a third enclosure housing the wireless receiver, the comparator, the component, and the third power source. The system may control the component in response to comparing the received first and second RF signals, and the first and second devices may be wearable devices.

Any device, component, or apparatus herein, such as the third device, may further comprise a memory or a non-transitory tangible computer readable storage media for storing computer executable instructions, and a processor for executing the instructions. Any processor herein may be coupled to control any wireless receiver, any comparator, or any component. Any device, component, or apparatus herein, such as the first device or the second device, may further comprise a memory or a non-transitory tangible computer readable storage media for storing computer executable instructions, and a processor for executing the instructions, and the processor is coupled to respectively control the first or second wireless transmitter.

The third device may further comprise in the third enclosure a fourth antenna for receiving the first RF signal, and the system may control the component further in response to comparing the received first RF signals by the third and fourth antennas. The third device may further comprise in the third enclosure an additional comparator coupled to third and fourth antennas for comparing the received first RF signals by the third and fourth antennas. The additional comparator may be operative for estimating or calculating an angle using, or based on, a passive Direction Finding (DF) that may uses, or may be based on, Time Difference of Arrival (TDOA), amplitude comparison, or phase interferometry. The system may control the component further in response to the value of the angle.

The first enclosure and the second enclose may be distinct enclosures or the same enclosure. The first and second power sources may be distinct or the same power source. The component may be controlled to be activated, initiated, stopped, operated, or inhibited from operation, in response to a comparison between the received first and second RF signals. The first device may be distinct from, or identical to, the second device. The first RF signal may be distinct from, or identical to, the second RF signal. The first antenna may be distinct from, or identical to, the second antenna. The first and second RF signals may use the same frequency, the same modulation, or the same physical later, or may be according to same protocol or standard.

Any device, component, or apparatus herein, may be a wearable device. The first device may be wearable on a left side of a person and the second device may be wearable on the right side of the person. Further, the first device may be wearable on a left side of the person head and the second device may be wearable on the right side of the person head. Any system, device, component, or apparatus herein may further be operative to estimate or calculate the person head pose by using, or based on, the comparing of the received first and second RF signals.

Any system herein may further comprise at least one additional antenna for transmitting at least one additional Radio-Frequency (RF) signal over the air, and the system may control the component in response to comparing the received first, second and the at least one additional RF signals. Any system herein may further comprise at least one additional wireless transmitter respectively coupled to the at least one additional antenna for producing the at least one additional RF signal. Any system herein may further comprise at least one additional power source for electrically powering the respective at least one additional wireless transmitter. Any system herein may further comprise at least one additional enclosure for respectively housing the at least one additional power source and the at least one additional wireless transmitter, and the at least one additional enclosure may be wearable.

Any system herein may further comprise an additional antenna for transmitting an additional Radio-Frequency (RF) signal over the air, and the may system control the component in response to comparing the received first, second and the additional RF signals. Any system herein may further comprise an additional wireless transmitter respectively coupled to the additional antenna for producing the additional RF signal. Any system herein may further comprise an additional power source for electrically powering the additional wireless transmitter. Any system herein may further comprise an additional enclosure for respectively housing the additional power source and the additional wireless transmitter, and the additional enclosure may be wearable, so that when worn by a person, the additional antenna is located between the first and second antennas.

The first device may wearable on an organ on the left side of the person head and the second device may be wearable on an organ on the right side of the person head, and the organ may be eye, ear, face, cheek, nose, mouth, lip, forehead, or chin. Alternatively or in addition, each of the first enclosure and the second enclosure may be constructed to have a form substantially similar to, may be constructed to have a shape allowing mounting or wearing identical or similar to, or may be constructed to have a form to at least in part substitute for, headwear, eyewear, or earpiece. Any headwear herein may consist of, may be structured as, or may comprise, a bonnet, a headband, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug.

Any enclosure herein, such as each of the first enclosure and the second enclosure may be permanently or releasably attachable to, or may be part of, a clothing piece of a person. The attaching may use taping, gluing, pinning, enclosing, encapsulating, a pin, or a latch and hook clip, and the clothing piece may be a top, bottom, or full-body underwear, or a headwear, a footwear, an accessory, an outwear, a suit, a dress, a skirt, or a top.

Any enclosure herein, such as the third enclosure, may be a portable or a hand-held enclosure. Any power source herein, such as the third power source, may be a primary or rechargeable battery.

Any device, component, or apparatus herein, such as the third device or the component, may consist of, or may comprise, a notebook, a laptop computer, a media player, a cellular phone, a smartphone, a Personal Digital Assistant (PDA), and may comprise a memory for storing software, and a processor for executing the software. Any smartphone herein may consist of, may be based on, or may comprise, an Apple iPhone 6 or a Samsung Galaxy S6. Any software herein may comprise an operating system that may be a mobile operating system, which may comprise, may use, or may be based on, Android version 2.2 (Froyo), Android version 2.3 (Gingerbread), Android version 4.0 (Ice Cream Sandwich), Android Version 4.2 (Jelly Bean), Android version 4.4 (KitKat)), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

Any system, device, component, or apparatus herein, such as the third device, may consist of, or may comprise, a digital camera. Any digital camera herein may consist of, or may comprise, a Digital Still Camera (DSC) that may be controlled to capture an image or may be inhibited from capturing an image in response to any comparing herein, such as the comparting of the received first and second RF signals. Alternatively or in addition, any digital camera herein may consist of, or may comprise, a Digital Video Camera (DVC) that may be controlled to start or stop video recording, or may be inhibited from video recording in response to any comparing herein, such as the comparing of the received first and second RF signals. Alternatively or in addition, any controlling of any digital camera herein may include changing a setting of the digital camera, such as the aperture size, exposure time, focal length, or exposure index of the digital camera.

Any digital camera herein may comprise an optical lens for focusing received light, the lens may be mechanically oriented to guide the captured images; a photosensitive image sensor array that may be disposed approximately at an image focal point plane of the optical lens for capturing the image and producing an analog signal representing the image; and an analog-to-digital (A/D) converter that may be coupled to the image sensor array for converting the analog signal to a digital data representation of the captured image.

The image sensor array may be operative to respond to visible or non-visible light, such as infrared, ultraviolet, X-rays, or gamma rays. The image sensor array may use, or may be based on, semiconductor elements that may use the photoelectric or photovoltaic effect. The image sensor array may use, may comprise, or may be based on, Charge-Coupled Devices (CCD) or Complementary Metal-Oxide-Semiconductor Devices (CMOS) elements.

Any digital camera herein may further comprise an image processor that may be coupled to the image sensor array for providing a digital video data signal according to a digital video format, the digital video signal may be carrying digital data video that may comprise, may be compatible with, or may be based on, the captured images. Any digital video format herein may use, may be compatible with, or may be based on TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), or DPOF (Digital Print Order Format) standards. Any digital camera herein may further comprise a video compressor coupled to the image sensor array for compressing the digital data video, and the video compressor may perform a compression scheme that may use, or may be based on, intraframe or interframe compression. The compression scheme may be lossy or non-lossy, and may use, may be compatible with, or may be based on, JPEG (Joint Photographic Experts Group) and MPEG (Moving Picture Experts Group), ITU-T H.261, ITU-T H.263, ITU-T H.264, or ITU-T CCIR 601.

Any system, device, component, or apparatus herein may be used with a wireless network. The first, second, and third devices may respectively comprise a first, second, and third wireless transceivers and may communicate over the wireless network respectively using the first, second, and third wireless transceivers. The first wireless transmitter may be part of the first wireless transceiver, the second wireless transmitter may be part of the second wireless transceiver, and the wireless receiver may be part of the third wireless transceiver.

The wireless network may be a Wireless Personal Area Network (WPAN), any of the wireless transceivers herein may be a WPAN transceiver, and any of the antennas herein may be a WPAN antenna. The WPAN may be according to, may be compatible with, or may be based on, Bluetooth™ or IEEE 802.15.1-2005 standards. Alternatively or in addition, the WPAN may be a wireless control network that may be according to, or may be based on, Zigbee™, IEEE 802.15.4-2003, or Z-Wave™ standards. Alternatively or in addition, the WPAN may be according to, may be compatible with, or may be based on, Bluetooth Low-Energy (BLE).

Alternatively or in addition, the wireless network may be a Body Area Network (BAN) that may be according to, may be compatible with, or may be based on, IEEE 802.15.6 standard, and any of the wireless transceivers herein may be a BAN transceiver, and any of the antennas herein may be a BAN antenna. Alternatively or in addition, the wireless network may be a Wireless Local Area Network (WLAN), any of the wireless transceivers herein may be a WLAN transceiver, and any of the antennas herein may be a WLAN antenna. The WLAN may be according to, may be compatible with, or may be based on, IEEE 802.11-2012, IEEE 802.11a, IEEE 802.11b, IEEE 802.11g, IEEE 802.11n, or IEEE 802.11ac.

Alternatively or in addition, the wireless network may be a Wireless Wide Area Network (WWAN), any of the wireless transceivers herein may be a WWAN transceiver, and any of the antennas herein may be a WWAN antenna. The WWAN may be according to, may be compatible with, or may be based on, WiMAX network that is according to, compatible with, or based on, IEEE 802.16-2009.

Alternatively or in addition, the wireless network may be a cellular telephone network, any of the wireless transceivers herein may be a cellular modem, and any of the antennas herein may be a cellular antenna. The cellular telephone network may be a Third Generation (3G) network that may use, may be compatible with, or may be based on, UMTS W-CDMA, UMTS HSPA, UMTS TDD, CDMA2000 1×RTT, CDMA2000 EV-DO, or GSM EDGE-Evolution. Alternatively or in addition, the cellular telephone network may be a Fourth Generation (4G) network that may use, may be compatible with, or may be based on, HSPA+, Mobile WiMAX, LTE, LTE-Advanced, MBWA, or is based on IEEE 802.20-2008. Any wireless network herein may be over a licensed or unlicensed radio frequency band, and the unlicensed radio frequency band may be an Industrial, Scientific and Medical (ISM) radio band.

Any wireless receiver herein may be operative to extract or measure a parameter, feature, or a characteristic from each of the received first and second RF signals. Any comparison herein may be based on comparing the extracted parameters, features, or characteristics. Any extracted or measured parameters, features, or characteristics herein may be responsive to any propagation paths, such as from the respective first and second antenna to the third antenna. The extracted or measured parameters, features, or characteristics may be responsive to the length of the propagation paths, to the relative direction of the propagation paths, or to a RF energy-absorbing element along the propagation paths. Any comparing herein may comprise calculating the difference between the extracted or measured parameters, features, or characteristics of the received first and second RF signals. Any system, device, component, or apparatus herein may be used with a minimum or maximum threshold, and any device, component, or apparatus herein may be controlled in response to comparing the difference to the minimum or maximum threshold. Any system, device, component, or apparatus herein may be used with a time interval, and the respective system, device, component, or apparatus may be controlled in response to the difference being above the minimum threshold or below the maximum threshold during the time interval, which may be equal to, above than, or lower than, 0.1, 0.2, 0.5, 0.8, 1.0, 1.2, 1.5, 1.8, 2, 2.5, 3, 3.5, 4, 4.5, 5, 6, 7, 8, 9, or 10 seconds.

Any extracted or measured parameters, features, or characteristics herein may comprise, or may be responsive to, signal strengths of the received first and second RF signals, and any of the signal strengths herein may be using, or may be based on, the respective Received Signal Strength Indicator (RSSI). Any system, device, component, or apparatus herein may further be operative to estimate the distance between the first or second device to third device using the signal strengths of the received first and second RF signals. The RF signals may be using, or may be based on, Bluetooth Low-Energy (BLE), and any system, device, component, or apparatus herein may be further operative to measure the signal strength by using, or based on, Apple iBeacon. Alternatively or in addition, any comparing herein may comprise calculating the difference between the signal strengths of the received first and second RF signals, and may be used with a minimum or maximum threshold, and any system, device, component, or apparatus herein may be controlled in response to comparing the difference to the minimum or maximum threshold, such as controlled to start, stop, or inhibit the operation when the calculated difference is above the minimum threshold or is below the maximum threshold. The minimum or maximum threshold may be equal to, may be lower than, or may be higher than, 1 dB, 2 dB, 3 dB, 5 dB, 7 dB, 10 dB, 15 dB, 20 dB, 25 dB, 30 dB, 35 dB, or 40 dB. Alternatively or in addition, any extracted or measured parameters, features, or characteristics herein may comprise, or may be responsive to, the difference of absorption and propagation speed of the RF signals when passing through different mediums, such as over the air versus in water (e.g., in human body such as inside the head).

Alternatively or in addition, any extracted or measured parameters, features, or characteristics may comprise, or may be responsive to, relative phase difference between the received first and second RF signals, and any system, device, component, or apparatus herein, such as the third device, may further comprise a phase detector, and may be further used with a minimum or maximum threshold, and may be controlled in response to comparing the phase difference to the minimum or maximum threshold, such as controlled to start, stop, or inhibit the operation when the calculated difference is above the minimum threshold or is below the maximum threshold. The minimum or maximum threshold may be equal to, may be lower than, or may be higher than, 90°, 80°, 70°, 60°, 50°, 40°, 30°, 20°, 18°, 15°, 13°, 10°, 8°, 5°, 3°, 2°, 1°, 0.8°, 0.5°, 0.3°, 0.2°, or 0.1°.

Any of the devices herein, such as the first and second devices, may be wearable on a respective right and left part of a person, or be built to, or enclosed with, an hairband, a headband, or otherwise head wearable shaped enclosure, and when worn by the person, any of the extracted or measured parameters, features, or characteristics may be used by any of the devices herein, such as by the third device, to estimate or measure a relative angle between the person head pose and the person direction to the third device. Any device, component, or apparatus herein may be controlled in response to comparing the estimated or measured angle to the minimum or maximum threshold, and the minimum or maximum threshold may be equal to, may be lower than, or may be higher than, 1°, 2°, 5°, 7°, 10°, 12°, 15°, 20°, 25°, 30°, 35°, 40°, 45°, or 50°.

Any system, device, component, or apparatus herein may be used with a minimum or maximum threshold, and the comparing may comprise estimating or calculating the difference between extracted or measured parameters, features, or characteristics of the received first and second RF signals, and any system, device, component, or apparatus herein may be controlled in response to comparing the difference to the minimum or maximum threshold. Any system, device, component, or apparatus herein may be electrically powered, and may convert electrical power to affects or produce a physical phenomenon.

Any system, device, component, or apparatus control herein may comprise powering or stopping power to the respective system, device, component, or apparatus component, such as being powered or being stopped from being powered, such as when the calculated or estimated difference is above the minimum threshold or is below the maximum threshold. Any component herein may be connected to be powered from any system, device, component, or apparatus herein, such as from the third power source. Any power source herein, such as the third power source, may be an Alternating Current (AC) or a Direct Current (DC) power source, and may be a primary or a rechargeable battery. Any system, device, component, or apparatus herein, such as the third device, may further comprise a battery compartment for housing the battery. Alternatively or in addition, any power source herein may be a domestic AC power that may be nominally 120 VAC/60 Hz or 230 VAC/50 Hz, and any system, device, component, or apparatus herein may further comprise an AC power plug for connecting to the domestic AC power. Any system, device, component, or apparatus herein may further comprise an AC/DC adapter connected to the AC power plug for being powered from the domestic AC power and the AC/DC adapter may comprise a step-down transformer and an AC/DC converter for DC powering the actuator or the component.

Any device, component, or apparatus herein, such as the third device, may further comprise an electrically-controlled switch connected between the third power source and the component, and the switch is controlled by the comparator output, that switch has a 'close' and an 'open' states, so that when the switch is in 'close' state electrical current is passed from the third power source to the component, the switch is in the 'open' state electrical current is stopped from the third power source to the component. Any switch herein may be in the 'close' state when the calculated or estimated difference is above the minimum threshold or is below the maximum threshold. Alternatively or in addition, any switch herein may be in the 'open' state when the calculated or estimated difference is above the minimum threshold or is below the maximum threshold. Alternatively or in addition, any switch herein may be in the 'open' state when the calculated or estimated difference is above the minimum threshold or is below the maximum threshold. Alternatively or in addition, any switch herein may be in the 'close' state when the calculated or estimated difference is above the minimum threshold or is below the maximum threshold.

Any system or device herein may be used with a minimum or maximum threshold. Any comparing herein may comprise estimating or calculating the difference between extracted or measured parameters, features, or characteristics of the received first and second RF signals. Any system, device, component, or apparatus herein may further comprise a user notifier coupled to the comparator for being powered or activated in response to comparing the difference to the minimum or maximum threshold.

Any notifier herein may be powered or activated when the calculated or estimated difference is above the minimum threshold or is below the maximum threshold. Any notifier may be housed in the third enclosure and may be powered from the third power source. Alternatively or in addition, any notifier herein may be housed in the first enclosure and may be powered from the first power source. Alternatively or in addition, any notifier herein may be housed in the second enclosure and may be powered from the second power source. Any notifier herein may be operative to notify the user using auditory, visual, or haptic stimuli.

Any notifier herein may consist of, may use, or may comprise, an audible annunciator that comprises an audible signaling component for emitting a sound coupled to the control port for activating or controlling the audible annunciator. The audible signaling component may comprise electromechanical or piezoelectric sounder, a buzzer, a chime or a ringer. Alternatively or in addition, the audible signaling component comprises a loudspeaker and the device further comprising a digital to analog converter coupled to the loudspeaker, and may be operative to generate a single or multiple tones or a human voice talking a syllable, a word, a phrase, a sentence, a short story or a long story.

Alternatively or in addition, any notifier herein may consist of, may use, or may comprise, a visual annunciator comprising a visual signaling component, which may be a visible light emitter such as a semiconductor device, an incandescent lamp or fluorescent lamp. Alternatively or in addition, any notifier herein may consist of, may use, or may comprise, a vibrator for providing haptic or tactile stimuli, and the vibrator may consist of, may use, or may comprise, a vibration motor, a linear actuator, or an off-center motor. Alternatively or in addition, the notifier may be part of a smartphone.

Any system, device, component, or apparatus herein may be used with a vehicle operative to travel in a travel direction under control of a driver. Any system, device, component, or apparatus herein may be mountable on, attachable to, or part of, the vehicle. The third antenna or any antenna, the third device or any device herein, or any other element herein may be mountable on, attachable to, or part of, the vehicle, and may be located along the travel direction or along a line of sight to the road of the driver. Any component, device, or apparatus herein may consist of, may comprise, may be integrated with, may be connectable to, or may be part of, an Electronic Control Unit (ECU), which may be an Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, or a control module.

Any vehicle herein may be a ground vehicle adapted to travel on land, such as a bicycle, a car, a motorcycle, a train, an electric scooter, a subway, a train, a trolleybus, and a tram. Alternatively or in addition, any vehicle herein may be a buoyant or submerged watercraft adapted to travel on or in water, such as a ship, a boat, a hovercraft, a sailboat, a yacht, and a submarine. Alternatively or in addition, any vehicle herein may be an aircraft adapted to fly in air; the aircraft may be a fixed wing or a rotorcraft aircraft, such as an airplane, a spacecraft, or a glider.

Any vehicle herein may further comprise an Advanced Driver Assistance Systems (ADAS) functionality, system, or scheme, and any device, system, component, or apparatus herein, such as the third device, may be part of, integrated with, communicating with, or coupled to, the ADAS functionality, system, or scheme. The ADAS functionality, system, or scheme may consist of, may comprise, or may use, Adaptive Cruise Control (ACC), Adaptive High Beam, Glare-free high beam and pixel light, Adaptive light control such as swiveling curve lights, Automatic parking, Automotive navigation system with typically GPS and TMC for providing up-to-date traffic information, Automotive night vision, Automatic Emergency Braking (AEB), Backup assist, Blind Spot Monitoring (BSM), Blind Spot Warning (BSW), Brake light or traffic signal recognition, Collision avoidance system, Pre-crash system, Collision Imminent Braking (CIB), Cooperative Adaptive Cruise Control (CACC), Crosswind stabilization, Driver drowsiness detection, Driver Monitoring Systems (DMS), Do-Not-Pass Warning (DNPW), Electric vehicle warning sounds used in hybrids and plug-in electric vehicles, Emergency driver assistant, Emergency Electronic Brake Light (EEBL), Forward Collision Warning (FCW), Heads-Up Display (HUD), Intersection assistant, Hill descent control, Intelligent speed adaptation or Intelligent Speed Advice (ISA), Intelligent Speed Adaptation (ISA), Intersection Movement Assist (IMA), Lane Keeping Assist (LKA), Lane Departure Warning (LDW) (a.k.a. Line Change Warning—LCW), Lane change assistance, Left Turn Assist (LTA), Night Vision System (NVS), Parking Assistance (PA), Pedestrian Detection System (PDS), Pedestrian protection system, Pedestrian Detection (PED), Road Sign Recognition (RSR), Surround View Cameras (SVC), Traffic sign recognition, Traffic jam assist, Turning assistant, Vehicular communication systems, Autonomous Emergency Braking (AEB), Adaptive Front Lights (AFL), or Wrong-way driving warning.

Any wireless receiver herein may be operative to extract or measure a parameter, feature, or a characteristic from each of the received first and second RF signals that may be responsive to respective propagation paths from the respective first and second antenna to the third antenna. Any system or device herein may be operative to calculate or estimate an angle or distance value that may be based on, or may be using, the extracted or measured parameters, features, or characteristics. Any device or component herein may be controlled in response to comparing the value to a minimum or a maximum threshold, such as operative to start, stop, or inhibit the component operation upon the value being above the minimum threshold or upon the value being below the maximum threshold. Any system or device herein may further be operative to estimate, measure, of calculate a first angle $\alpha$ between a center-line extending between the first and second antennas and a line connecting a center point between the first and second antennas extending to the third antenna. Any value herein may be the value of the first angle $\alpha$ or manipulation thereof.

Any system or device herein may be used with an estimated or measured second distance (d2) between the first antenna, the second antenna, or any combination or manipulation thereof, and the third antenna. Any value herein may be calculated or estimated based on, or using, a combination or manipulation of the value of the first angle $\alpha$ and the second distance d2, such as being calculated or estimated based on, or using, $d2*\sin(\alpha)$, or any manipulation thereof. Any system or device herein may further be operative to measure, estimate, or calculate the second distance (d2), and the second distance (d2) may be estimated or calculated using the signal strengths or the RSSI of the received first and second RF signals. The RF signals may be using, or may be based on, Bluetooth Low-Energy (BLE), and any system or device herein may further be operative to measure the signal strength by using, or based on, Apple iBeacon.

Any system or device herein may be used with an estimated or measured second angle ($\beta$) formed between a line from an object to the third device, the third antenna, or the component, and a line from the object to the first or second antennas, or the first or second devices Any value herein may be calculated or estimated based on, or using, a combination or manipulation of the value of the first angle $\alpha$ and the second angle $\beta$, such as being calculated or estimated based on, or using, $\sin(\beta)/\sin(\alpha)$, or any manipulation thereof. Any system or device herein may further be operative to measure, estimate, or calculate the second angle ($\beta$). The third device, the component, the system, or any device or apparatus herein may further comprise a first inertial sensor that may comprise one or more accelerometers, one or more gyroscopes, or one or more magnetometers, or an IMU, for measuring a first spatial direction of the respective third enclosure or component. An IMU may support measurements of 3 Degrees Of Freedom (DOF), 6 DPF, 8 DOF, 9 DOF (such as 3D accelerometer, 3D Gyroscope, and 3D compass), or 10 DOF (9 DOF plus barometer).

The second angle ($\beta$) may be estimated or calculated based on, or using, the first spatial direction. The first or the second device, or any other device, component, or apparatus herein, may further comprise a second inertial sensor that may comprise one or more accelerometers, one or more gyroscopes, or one or more magnetometers, or an IMU, for measuring a second spatial direction of the respective third enclosure or component. The second angle ($\beta$) may be estimated or calculated based on, or using, the first and second spatial directions.

Any system or device herein may be used with an estimated or measured first distance (d1) between the third device or the component and an object. Any value herein may be calculated or estimated based on, or using, a combination or manipulation of the value of the first angle $\alpha$ and the first distance d1, such as calculated or estimated based on, or using, $d1/\sin(\alpha)$, or any manipulation thereof. The third device, the component, or any device or apparatus herein may further be operative to measure, estimate, or calculate the second distance (d1), and may comprise or use any distance meter for measuring the first distance (d1).

Any system or device herein may be used with an estimated or measured second angle ($\beta$) formed between a line from an object to the third device, the third antenna, or the component, and a line from the object to the first or second antennas, or the first or second devices, and may further be used with an estimated or measured second distance (d2) between the first antenna, the second antenna, or any combination or manipulation thereof, and the third antenna. Any value herein may be calculated or estimated based on, or using, a combination or manipulation of the first angle $\alpha$, the second angle $\beta$, the first distance d1, and the second distance d2, such as based on calculating or estimating a substantial satisfaction (or approximation) of the equation $d1/\sin(\alpha)=d2/\sin(\beta)$, or based on calculating or estimating $d2*\sin(\alpha)/\sin(\beta)$, $d1*\sin(\beta)/\sin(\alpha)$, $\arcsin(d1*\sin(\beta)/d2)$, or $\arcsin(d2*\sin(\alpha)/d1)$.

Any system, device, component, or apparatus herein may comprise a distance meter. The distance meter may consist of, may use, or may comprise, an optical-based non-contact distance meter that may comprise a light emitter (such as a LED) for emitting a light signal substantially along a line, a photosensor for receiving a reflected light signal from a surface, and a correlator for measuring a correlation between the light signal emitted by the light emitter and the reflected light signal received by the photosensor. Alternatively or in addition, the distance meter may consist of, may use, or may comprise, an acoustics-based non-contact distance meter that may comprise a sound emitter for emitting a sound signal substantially along a line, a sound sensor for receiving a reflected sound signal from a surface, and a correlator for measuring a correlation between the sound signal emitted by the sound emitter and the reflected sound signal received by the sound sensor. Alternatively or in addition, the distance meter may consist of, may use, or may comprise, a radar-based non-contact distance meter that comprises an antenna for radiating a millimeter wave or microwave signal substantially along a first line and for receiving a reflected millimeter wave or microwave signal from a surface, and a correlator for measuring a correlation between the millimeter wave or microwave signal radiated by the antenna and the reflected millimeter wave or microwave signal received by the antenna.

Any device herein may further include a visual annunciator comprising a visual signaling component that may be a visible light emitter such as a semiconductor device, an incandescent lamp or fluorescent lamp, and the taking an action may comprise activating or controlling the visual annunciator. The visible light emitter may be adapted for a steady illumination and for blinking in response to the value of the estimated angular deviation, or any other numerical value. Alternatively or in addition, the illumination level, location, type, color, or steadiness of the visible light emitter may be in response to the value of the estimated angular deviation p, the multi-image numerical value, or any other numerical value. Alternatively or in addition, the visible light emitter may be a numerical or an alphanumerical display emitter that may be based on LCD (Liquid Crystal Display), TFT (Thin-Film Transistor), FED (Field Emission Display) or CRT (Cathode Ray Tube), for displaying a value corresponding to the value of the estimated angular deviation φ, the multi-image numerical value, or any other numerical value.

The device may further include an audible annunciator comprising an audible signaling component comprising an electromechanical or a piezoelectric sounder, for emitting a sound, and the taking an action may comprise activating or controlling the audible annunciator. The audible signaling component may comprise a buzzer, a chime or a ringer, or may comprise a loudspeaker and a digital to analog converter coupled to the loudspeaker.

The audible signaling component may be operative to generate a single or multiple tones, and the sound emitted from the audible signaling component may be in response to the value of the estimated angular deviation, or any other numerical value. The volume, type, steadiness, pitch, rhythm, dynamics, timbre, or texture of the sound emitted from the audible signaling component is in response to the value of the estimated angular deviation cp, the multi-image numerical value, or any other numerical value. Alternatively or in addition, the sound emitted from the audible signaling component may be a human voice talking, and the sound may be a syllable, a word, a phrase, a sentence, a short story or a long story in response to the value of estimated angular deviation, or any other numerical value.

Any apparatus or device herein may further comprise a digital still or video camera for capturing images along of, or centered at, an optical axis, and the digital camera may comprise an optical lens for focusing received light, the lens being mechanically oriented to guide the captured images; a photosensitive image sensor array disposed approximately at an image focal point plane of the optical lens for capturing the image and producing an analog signal representing the image; and an analog-to-digital (A/D) converter coupled to the image sensor array for converting the analog signal to a digital data representation of the captured image. The image sensor array may respond to visible or non-visible light, such as infrared, ultraviolet, X-rays, or gamma rays. The image sensor array may use, or may be based on, semiconductor elements that use the photoelectric or photovoltaic effect, such as Charge-Coupled Devices (CCD) or Complementary Metal-Oxide-Semiconductor Devices (CMOS) elements.

Any apparatus or device herein may comprise an image processor coupled to the image sensor array for providing a digital video data signal according to a digital video format, the digital video signal may carry digital data video that may comprise, or may be based on, the captured images, and the digital video format may use, may be compatible with, or may be based on, TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), or DPOF (Digital Print Order Format) standard. Any apparatus or device herein may comprise a video compressor coupled to the image sensor array for compressing the digital data video, the compression may use, or may be based on, intraframe or interframe compression, and the compression may be lossy or non-lossy. Further, the compression may use, may be compatible with, or may be based on, a standard compression algorithm that may be JPEG (Joint Photographic Experts Group) and MPEG (Moving Picture Experts Group), ITU-T H.261, ITU-T H.263, ITU-T H.264, or ITU-T CCIR 601.

Any apparatus or device herein may be further comprise an actuator that converts electrical energy to affects or produce a physical phenomenon, the actuator may be coupled to be operated, controlled, or activated by the processor in response to a value of the first distance, the second distance, the first angle, or any combination, manipulation, or function thereof. The actuator may be housed in the single enclosure.

Any apparatus or device herein may further comprise a signal conditioning circuit coupled between the processor and the actuator. The signal conditioning circuit may be operative for attenuating, delaying, filtering, amplifying, digitizing, comparing, or manipulating a signal from the processor, and may comprise an amplifier, a voltage or current limiter, an attenuator, a delay line or circuit, a level translator, a galvanic isolator, an impedance transformer, a linearization circuit, a calibrator, a passive filter, an active filter, an adaptive filter, an integrator, a deviator, an equalizer, a spectrum analyzer, a compressor or a de-compressor, a coder, a decoder, a modulator, a demodulator, a pattern recognizer, a smoother, a noise remover, an average circuit, a Digital-to-Analog (A/D) converter, or an RMS circuit.

Any actuator or component herein may be electrically powered from a power source, and may convert electrical power from the power source to affects or produce the physical phenomenon. Each of the actuator or component, the signal conditioning circuit, and power source may be housed in, or may be external to, the single enclosure. The power source may be an Alternating Current (AC) or a Direct Current (DC) power source, and may be a primary or a rechargeable battery, housed in a battery compartment.

Alternatively or in addition, the power source may be a domestic AC power, such as nominally 120 VAC/60 Hz or 230 VAC/50 Hz, and the apparatus or device may further comprise an AC power plug for connecting to the domestic AC power. Any apparatus or device herein may further comprise an AC/DC adapter connected to the AC power plug for being powered from the domestic AC power and the AC/DC adapter may comprise a step-down transformer and an AC/DC converter for DC powering the actuator. Any apparatus or device herein may further comprise a switch coupled between the power source and the actuator, and the switch may be coupled to be controlled by the processor.

Any switch herein may be an electrically-controlled AC power Single-Pole-Double-Throw (SPDT) switch, and may be used for switching AC power from the power source to the actuator. Any switch herein may comprise, may be based on, may be part of, or may consist of, a relay. Alternatively or in addition, any switch herein may be based on, may comprises, or may consist of, an electrical circuit that comprises an open collector transistor, an open drain transistor, a thyristor, a TRIAC, or an opto-isolator. Any relay herein may be a solenoid-based, an electromagnetic relay, a reed relay, an AC Solid State Relay (SSR), or a semiconductor-based relay.

Any actuator herein may comprise, or may be part of, a water heater, HVAC device, air conditioner, heater, washing machine, clothes dryer, vacuum cleaner, microwave oven, electric mixer, stove, oven, refrigerator, freezer, food processor, dishwasher, food blender, beverage maker, coffeemaker, answering machine, telephone set, home cinema device, HiFi device, CD or DVD player, induction cooker, electric furnace, trash compactor, electric shutter, or dehumidifier. Further, any actuator herein may comprise, may be part of, or may be integrated in part, or entirely, in an appliance.

Any method herein may further comprise the step of transmitting, over a digital network, by a transmitter, the image file, the numerical value (such as the multi-image numerical value), or both. The digital network may be a wireless network, and the transmitter may be a wireless transmitter. The wireless network may be an in-building or in-vehicle network that is a Wireless Personal Area Network (PAN), and the wireless transmitter may be part of a WPAN transceiver, and the WPAN may be according to, or may be based on, Bluetooth™ or IEEE 802.15.1-2005 standards, or the WPAN may be a wireless control network that is according to, or based on, Zigbee™, IEEE 802.15.4-2003, or Z-Wave™. Alternatively or in addition, the wireless network may be a Wireless LAN (WLAN) and the wireless transmitter may be part of a WLAN transceiver, and the WLAN is according to, or based on, IEEE 802.11-2012, IEEE 802.11a, IEEE 802.11b, IEEE 802.11g, IEEE 802.11n, or IEEE 802.11ac. Alternatively or in addition, the wireless network may be a cellular telephone network and the wireless transmitter may be part of a cellular telephone network transceiver, and the cellular telephone network may be according to, or may be based on, a Third Generation (3G) network that uses UMTS W-CDMA, UMTS HSPA, UMTS TDD, CDMA2000 1×RTT, CDMA2000 EV-DO, GSM EDGE-Evolution, the cellular telephone network may be a Fourth Generation (4G) network that uses HSPA+, Mobile WiMAX, LTE, LTE-Advanced, MBWA, or may be based on IEEE 802.20-2008.

A non-transitory tangible computer readable storage media may comprise a code to perform the steps of the method. Alternatively or in addition, a device in a single enclosure may comprise the digital camera, a memory for storing computer-executable instructions, and a processor for executing the instructions, and the processor may be configured by the memory to perform acts comprising the method. The single enclosure may be a portable or a hand-held enclosure and the apparatus may be battery-operated, such as a notebook, a laptop computer, a media player, a cellular phone, a Personal Digital Assistant (PDA), or an image processing device.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein. A non-transitory computer readable medium containing computer instructions that, when executed by a computer processor, cause the processor to perform at least part of the steps described herein.

The above summary is not an exhaustive list of all aspects of the present invention. Indeed, it is contemplated that the invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments and are not therefore to be considered limiting in scope:

FIG. 3a depicts schematically a top view of a prior-art digital camera;

FIG. 10a depicts pictorially a perspective view of a person head wearing an RF transmitter structured as hearing aid;

FIG. 14b depicts pictorially a top view of a person and a smartphone looking at a plant;

DETAILED DESCRIPTION

Figure 1:
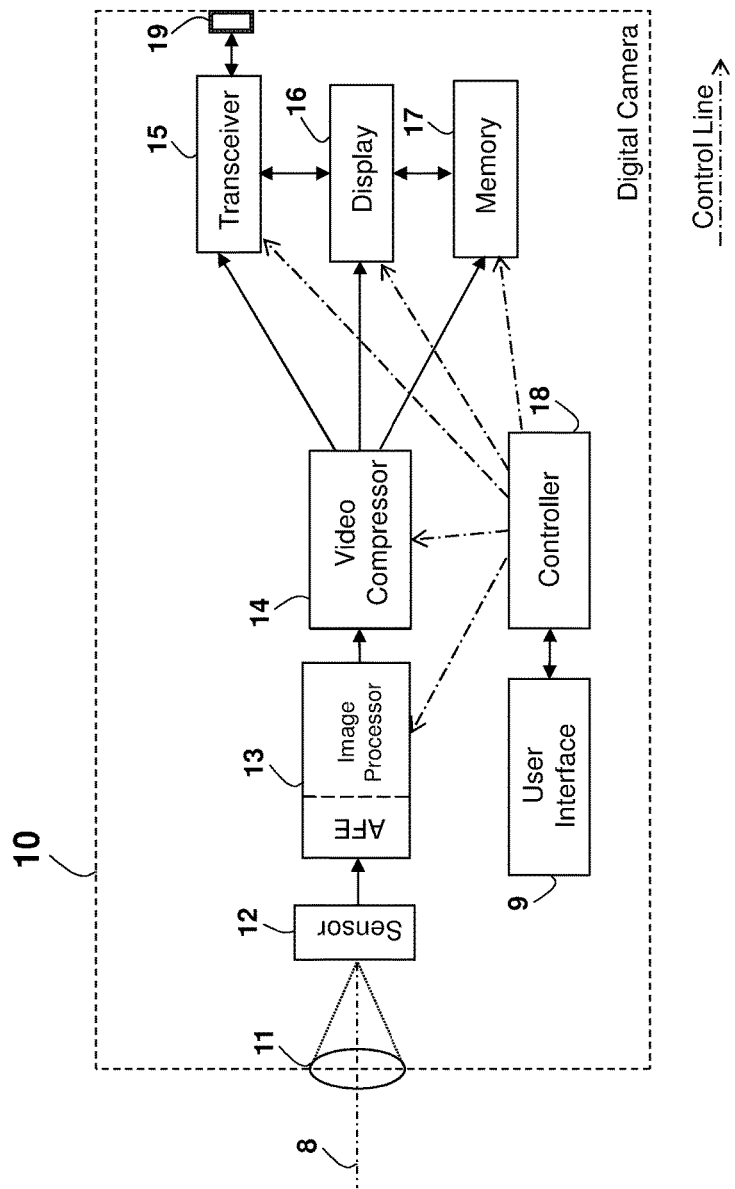
FIG. 1 illustrates a simplified schematic block diagram of a prior-art digital camera.

The principles and operation of an apparatus or a method according to the present invention may be understood with reference to the figures and the accompanying description wherein identical or similar components (either hardware or software) appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (in some cases, even in the case of using different suffix, such as 5, 5a, 5b and 5c) refer to functions or actual devices that are either identical, substantially similar, similar, or having similar functionality. It is readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms "a", "an", and "the" herein include plural referents unless the context clearly dictates otherwise. Thus, for example, a reference to "a component surface" includes a reference to one or more of such surfaces. By the term "substantially" it is meant that the recited characteristic, parameter, feature, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

All directional references used herein (e.g., upper, lower, upwards, downwards, left, right, leftward, rightward, top, bottom, above, below, vertical, horizontal, clockwise, and counterclockwise, etc.) are only used for identification purposes to aid the reader's understanding of the present invention, and do not create limitations, particularly as to the position, orientation, or use of the invention. Spatially relative terms, such as "inner," "outer," "beneath", "below", "right", "left", "upper", "lower", "above", "front", "rear", "left", "right" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Traditional operation of a digital camera involves looking at the digital camera viewfinder (such as the display 38) and pushing a 'shutter' button (such as the button 38). Such two activities in parallel require full attention of the user, and reduces the user ability to attend to other activities or to enjoy in full the scene or image that is being captured by the camera. Hence, an automatic image capturing by a digital camera that obviates the need for looking at the viewfinder of a digital camera or the need to push any buttons therein eases the camera operation and improves the uses experience. Further, most digital cameras are portable and powered by a battery, while the display 38, serving as the viewfinder, commonly consumes a large portion of the total digital camera power consumption. Thus reducing the need to activate the display 38 allows for lower power consumption, and provides increased period of using the battery before the need arises to replace the battery (in case of primary battery) or to recharge the battery (in case of rechargeable battery). Furthermore, the physical size of the digital camera 30 is substantially affected by the display 38, and obviating the need for such viewfinder may allow for a much smaller size digital camera. In addition, obviating the need for the display 38 may allow for a reduced complexity and associated costs of a digital camera.

Figure 1A:
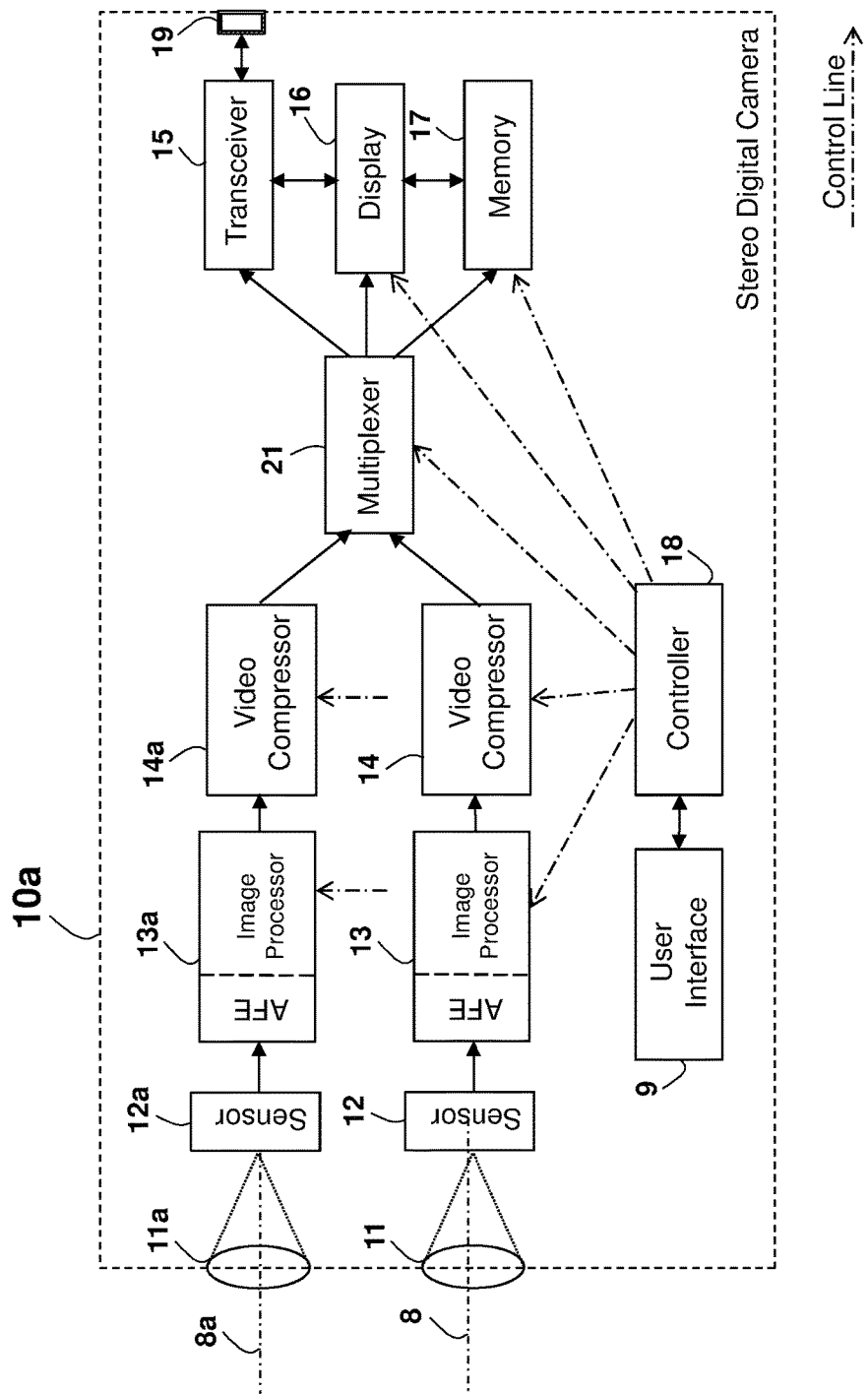
FIG. 1a illustrates a simplified schematic block diagram of a prior-art stereo digital camera.
Figure 2:
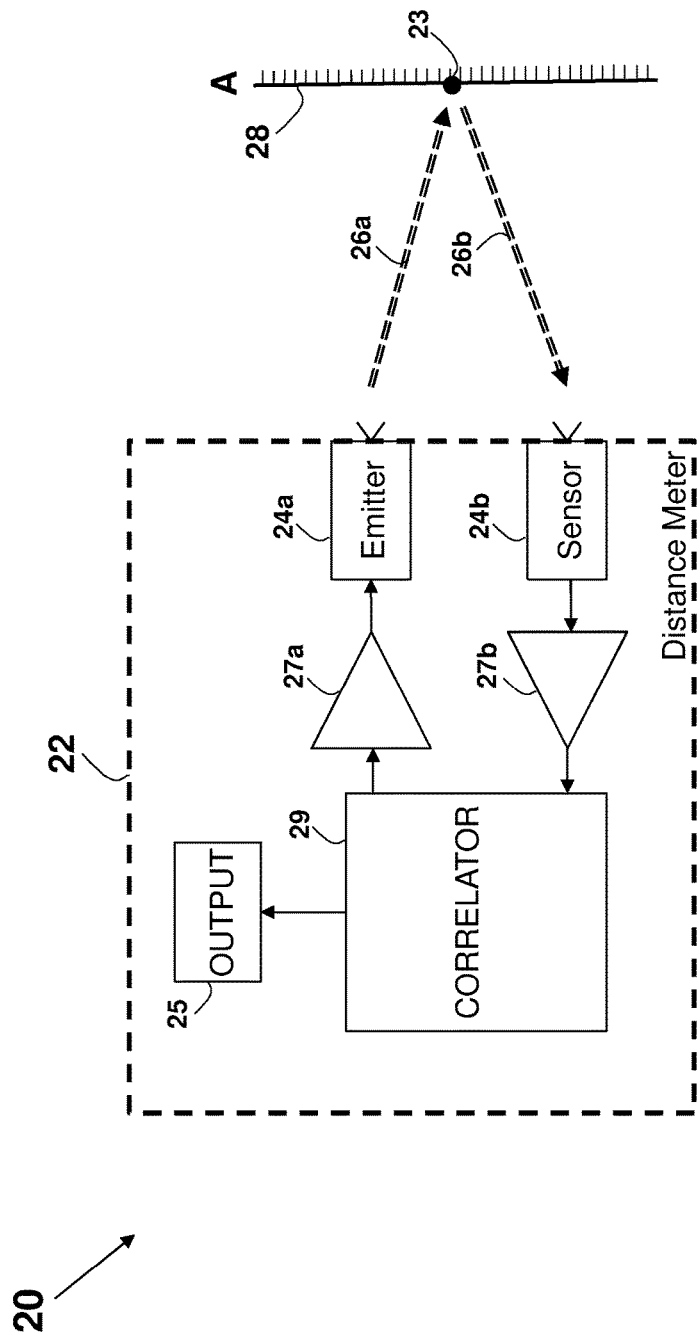
FIG. 2 illustrates a simplified schematic block diagram of a prior-art non-contact distance meter.
Figure 2A:
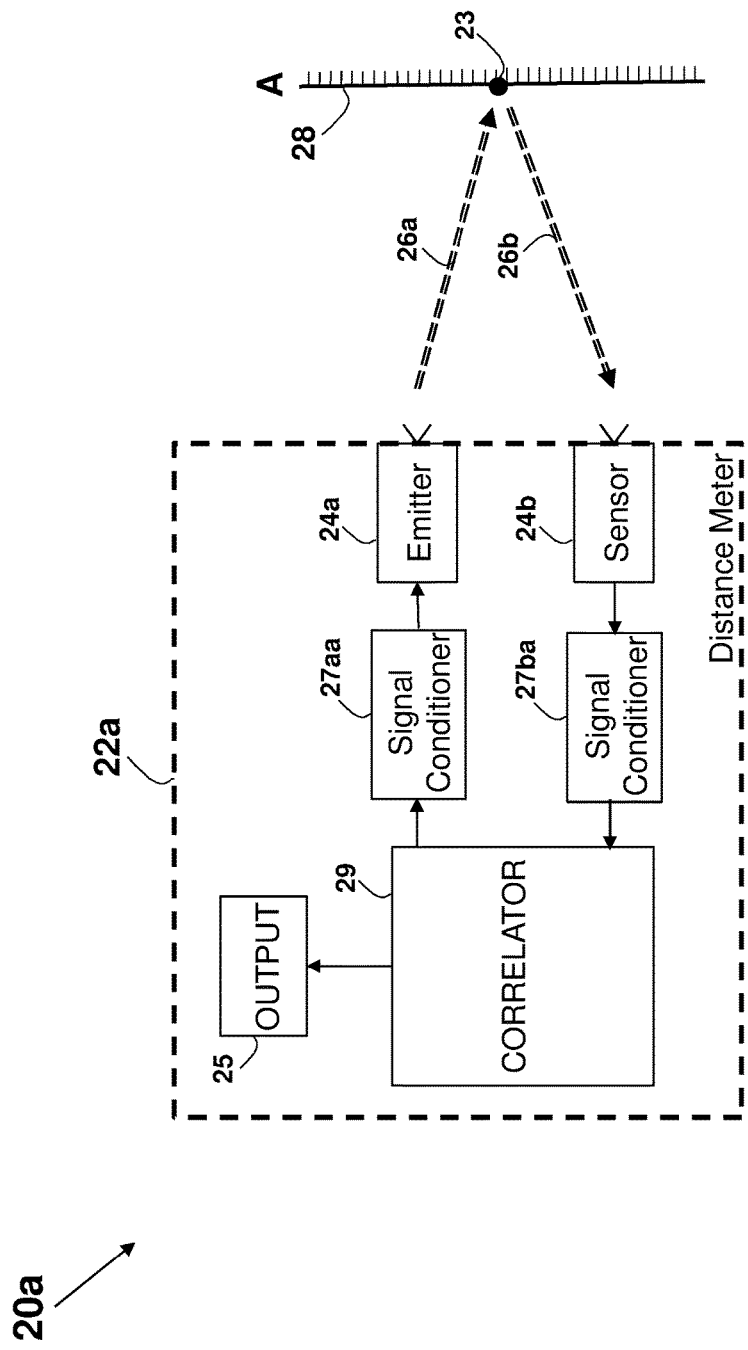
FIG. 2a illustrates a simplified schematic block diagram of a prior-art distance meter having a signal conditioning circuits.
Figure 2B:
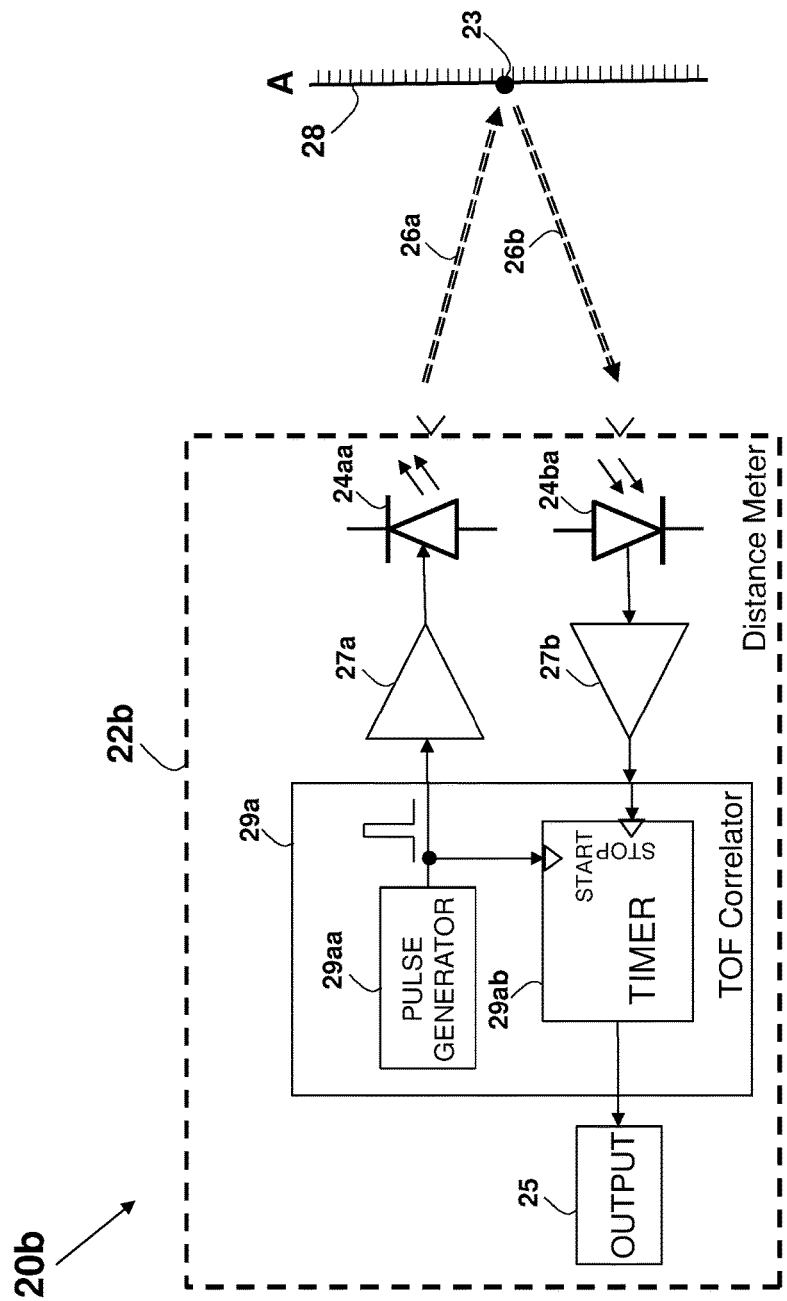
FIG. 2b illustrates a simplified schematic block diagram of a prior-art optical-based distance meter using TOF.
Figure 2C:
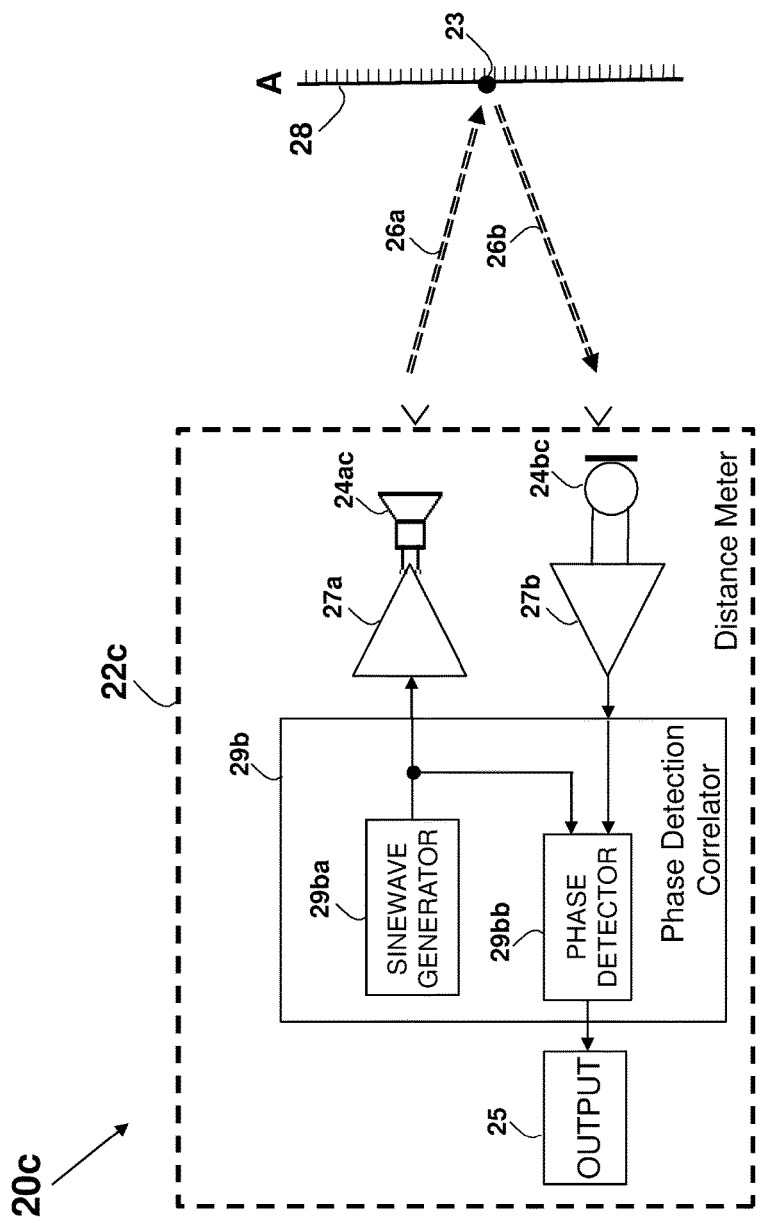
FIG. 2c illustrates a simplified schematic block diagram of an acoustical-based prior-art distance meter using phase detection.
Figure 3:
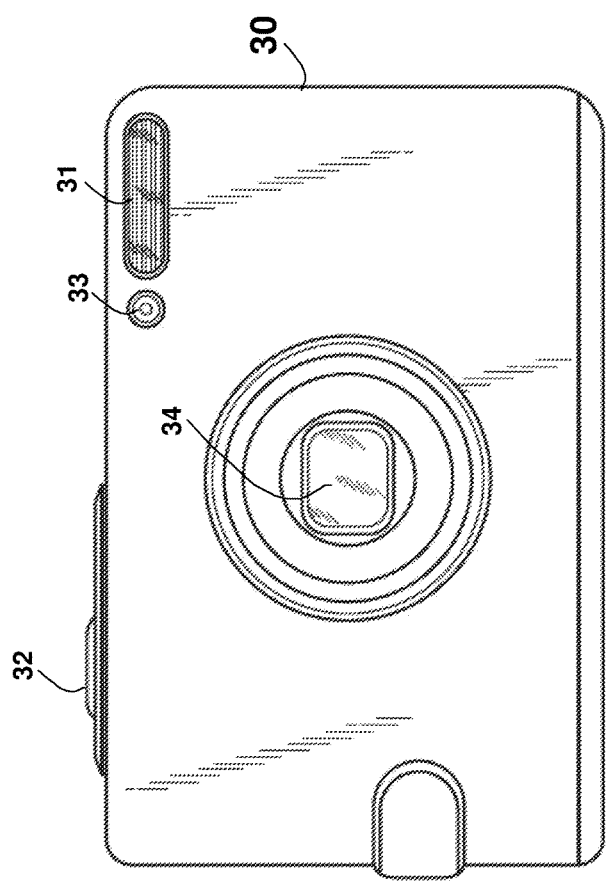
FIG. 3 depicts pictorially a front view of a prior-art digital camera.
Figure 3B:
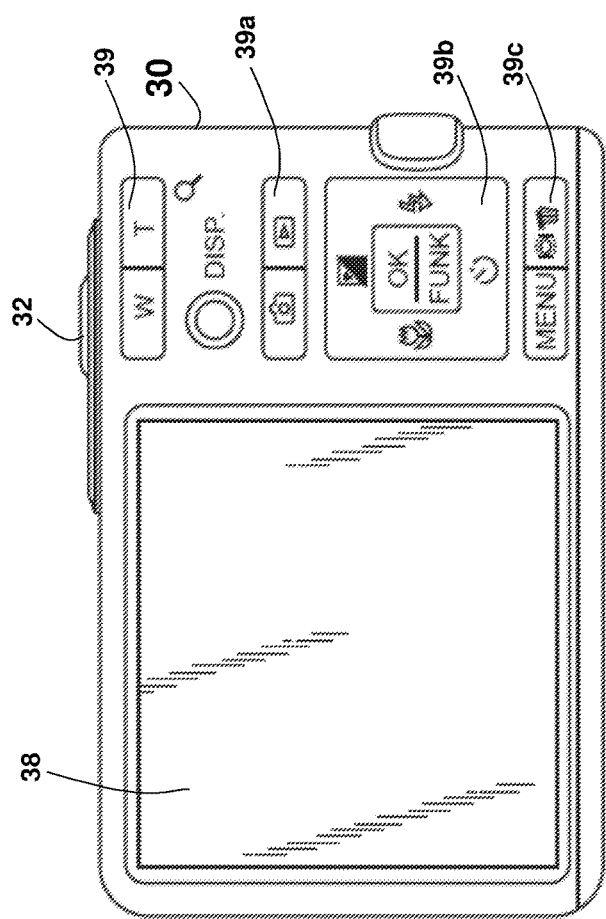
FIG. 3b depicts pictorially a rear view of a prior-art digital camera.
Figure 3C:
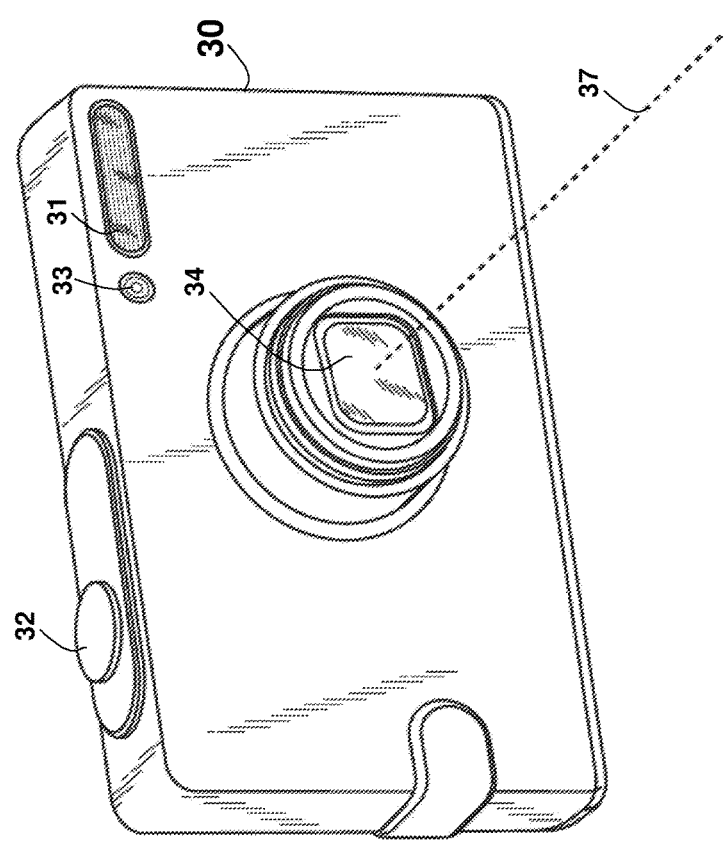
FIG. 3c depicts pictorially a perspective view of a prior-art digital camera.
Figure 4:
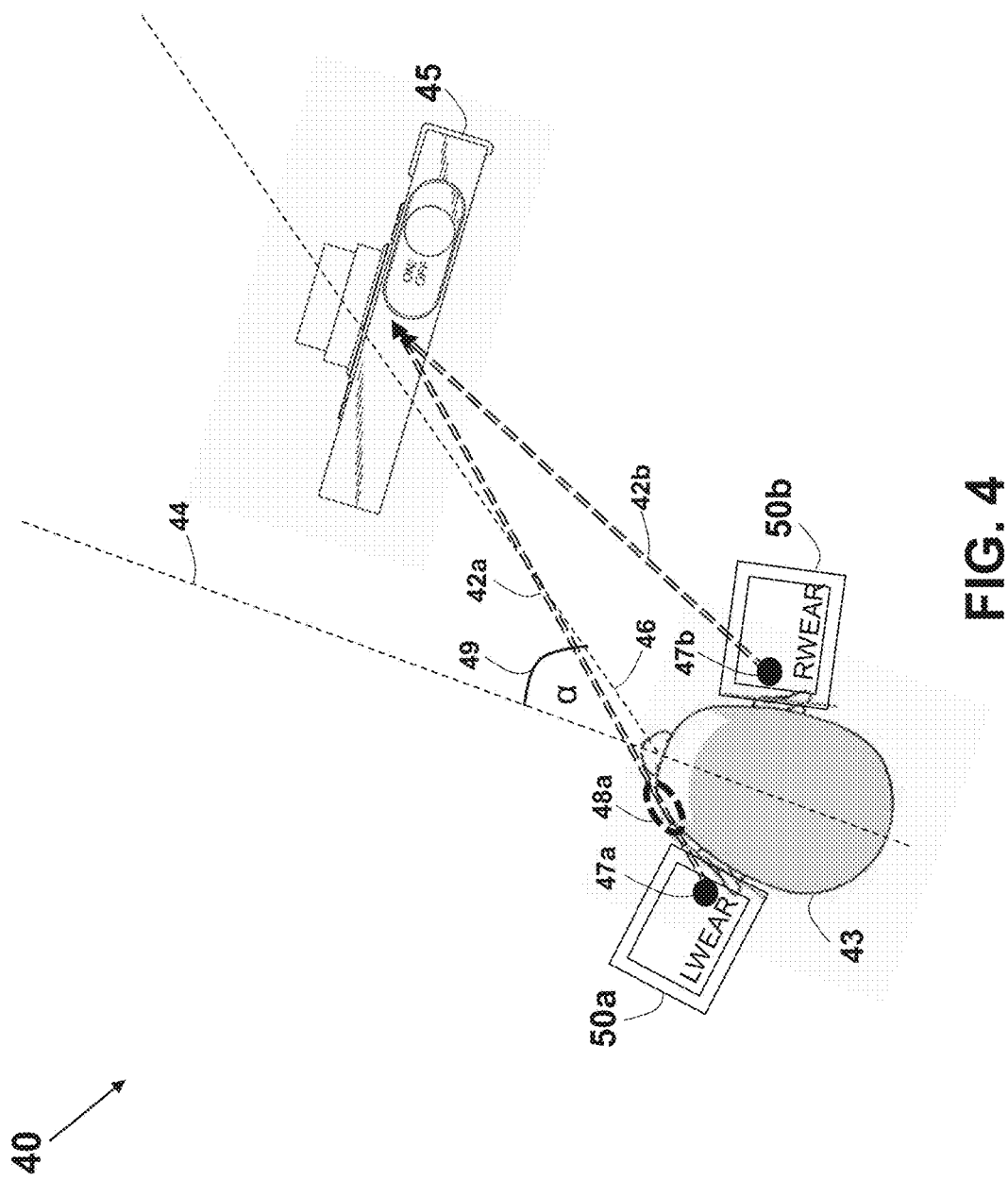
FIG. 4 depicts pictorially a top view of a relative angle between a person line of sight and a direction to a camera device.

In one example, the head pose of a person, which commonly corresponds to the person gaze direction, is measured or estimated using two wearable devices, serving as RF beacons, worn on the right and left sides of the person. An exemplary arrangement 40 of such a scheme is shown in FIG. 4, pictorially depicting a top view of a hand 43 of a person that wishes to operate, activate, or control of an improved digital camera 45. The improved digital camera 45 may be a still or video camera (or both), and may include part of, or whole of, the digital camera 10 shown in FIG. 1, or the digital camera 10a shown in FIG. 1a, or any combination thereof, and may be structured similar to, based on, or corresponding to, the digital camera 30 shown in FIGS. 3-3c.

A left wearable device LWEAR 50a is attached to, or worn on, the left part of the body of the person head 43. Similarly, a right wearable device RWEAR 50b is attached to, or worn on, the right part of the body of the person head 43. The person head 43 pose is in along the line-of-sight direction denoted by a dashed line 44, approximated to initiate from the point in the middle of the person eyes. The improved digital camera 45 is located relative to the head 43 along the line-of-sight 46, forming a deviation angle α 49 with the head 43 pose (gaze) direction line 44. The LWEAR device 50a comprises an antenna 47a (denoted by a black filled circle) that transmits an RF signal propagating along a line 42a. Similarly, the RWEAR device 50b comprises an antenna 47b (denoted by a black filled circle) that transmits an RF signal propagating along a line 42b. The improved digital camera 45 received both RF signals along lines 42a and 42b, respectively from the LWEAR device 50a and the RWEAR device 50b, and by analyzing the signals, such as by comparing the two signal, estimates the deviation angle α 49. In one scenario, shown as an arrangement 40a in FIG. 4a, the person is looking directly at the improved camera 45, hence the person line-of-sight 44 aligns with the direction to the camera 45 line 44, resulting in the deviation angle α 49 having a zero value. In another scenario, shown as an arrangement 40a in FIG. 4a, the person is looking further away from the improved camera 45, hence the person line-of-sight 44 forms a larger deviation angle α' 49' (α'>α) with the direction to the camera 45 line 44. The value of the estimated angle α 49 may be used to activate, control, or otherwise affect, the improved digital camera 45.

Figure 5:
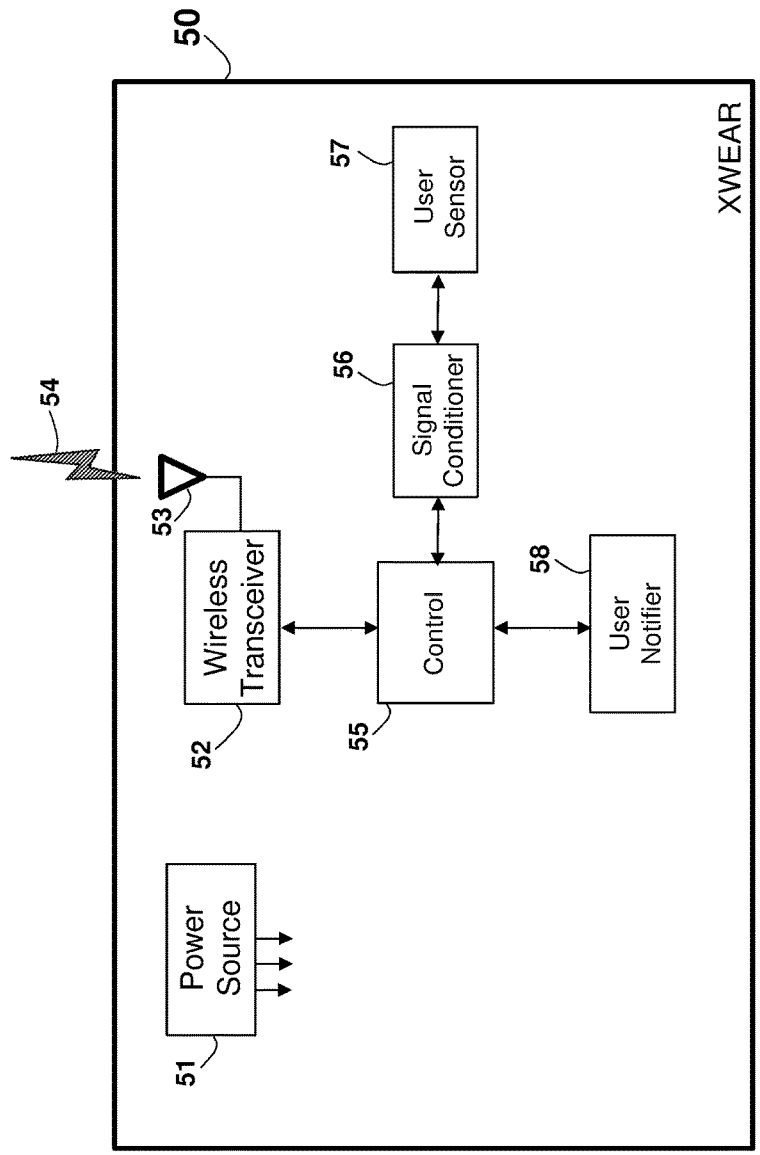
FIG. 5 illustrates a simplified schematic block diagram of a wearable device having an RF transmitter.

Each of the LWEAR device 50a and the RWEAR device 50b may consist of, may comprise, or may be based on, part or all of a generic XWEAR device 50 shown in FIG. 5. In one example, the LWEAR device 50a and the RWEAR device 50b are identical or substantially identical, such as being constructed according to the same production file or scheme. In one example, the LWEAR device 50a and the RWEAR device 50b are identical or similar in structure, except for being configured for attached to, or being worn on, the respective left and right parts of a human body.

A controller 55, located within the XWEAR device 50, controls and monitors the device operation, such as initialization, configuration, interface, and commands. The controller 55 may be based on a discrete logic or an integrated device, such as a processor, microprocessor or microcomputer, and may include a general-purpose device or may be a special purpose-processing device, such as an ASIC, PAL, PLA, PLD, Field Programmable Gate Array (FPGA), Gate Array, or other customized or programmable device. In the case of a programmable device as well as in other implementations, a memory is required. The controller 55 commonly includes a memory that may include a static RAM (random Access Memory), dynamic RAM, flash memory, ROM (Read Only Memory), or any other data storage medium. The memory may include data, programs, and/or instructions and any other software or firmware executable by the processor. Control logic can be implemented in hardware or in software, such as a firmware stored in the memory.

The XWEAR device 50 is electrically powered by a power source 51 that may be a primary or rechargeable battery, or may comprise a power supply that may contain a DC/DC converter or AC/DC converter. The power supply may be an AC/DC power supply that is power fed from the AC power supply via AC plug and a cord, and thus may include an AC/DC converter, for converting the AC power (commonly 115 VAC/60 Hz or 220 VAC/50 Hz) into the required DC voltage or voltages. Such power supplies are known in the art and typically involves converting 120 or 240 volt AC supplied by a power utility company to a well-regulated lower voltage DC for electronic devices. In one embodiment, the power supply is integrated into a single device or circuit, in order to share common circuits. Further, the power supply may include a boost converter, such as a buck boost converter, charge pump, inverter and regulators as known in the art, as required for conversion of one form of electrical power to another desired form and voltage. While the power supply (either separated or integrated) can be an integral part and housed within the XWEAR 50 enclosure, it may be enclosed as a separate housing connected via cable to the XWEAR device 50 assembly. For example, a small outlet plug-in step-down transformer shape can be used (also known as wall-wart, "power brick", "plug pack", "plug-in adapter", "adapter block", "domestic mains adapter", "power adapter", or AC adapter). Further, the power supply may be a linear or switching type.

Alternatively or in addition, the power source 51 may comprise a primary battery or cell, in which an irreversible chemical reaction generates the electricity, and thus the cell is disposable and cannot be recharged, and need to be replaced after the battery is drained. Such battery replacement may be expensive and cumbersome. Alternatively or in addition, a rechargeable (secondary) battery may be used, such as a nickel-cadmium based battery. In such a case, a battery charger is employed for charging the battery while it is in use or not in use. Various types of such battery chargers are known in the art, such as trickle chargers, pulse chargers and the like. The battery charger may be integrated with the field unit or be external to it. The battery may be a primary or a rechargeable (secondary) type, may include a single or few batteries, and may use various chemicals for the electrochemical cells, such as lithium, alkaline and nickel-cadmium. Common batteries are manufactured in pre-defined standard output voltages (1.5, 3, 4.5, 9 Volts, for example), as well as defined standard mechanical enclosures (usually defined by letters such as "A", "AA", "B", "C" sizes), and 'coin' type. In one embodiment, the battery (or batteries) is held in a battery holder or compartment, and thus can be easily replaced.

The XWEAR device 50 comprises a wireless transceiver (transmitter+receiver) 52, for transmitting (and for receiving) the RF signal (denoted as 54), controlled by the control block 55, along the propagation lines 42a or 42b, via an antenna 53, which corresponds to items 47a or 47b in the arrangement 40. In the case where the XWEAR device 50 only functions as an RF beacon, the wireless transceiver 52 may include only a transmitter functionality. Alternatively or in addition, a standard wireless protocol is used, and the XWEAR device 50 function as a standard node or client device in a standard wireless network.

In one example, the wireless network may be using, may be according to, may be compatible with, or may be based on, a Body Area Network (BAN) that may be according to, or based on, IEEE 802.15.6 standard, the wireless transceiver 52 may be a BAN modem, and the antenna 53 may be a BAN antenna. Alternatively or in addition, the wireless network may be using, may be according to, may be compatible with, or may be based on, an Near Field Communication (NFC) using passive or active communication mode, may use the 13.56 MHz frequency band, data rate may be 106Kb/s, 212Kb/s, or 424 Kb/s, the modulation may be Amplitude-Shift-Keying (ASK), and may further be according to, compatible with, or based on, ISO/IEC 18092, ECMA-340, ISO/IEC 21481, or ECMA-352. In this scenario, the wireless transceiver 52 may be an NFC modem or transceiver, and the antenna 53 may be an NFC antenna. Alternatively or in addition, the wireless network may be using, may be according to, may be compatible with, or may be based on, a Personal Area Network (PAN) that may be according to, or based on, Bluetooth™ or IEEE 802.15.1-2005 standards that may be, the wireless transceiver 52 may be a PAN modem, and the antenna 53 may be a PAN antenna. In one example, the Bluetooth is a Bluetooth Low-Energy (BLE) standard. Further, the PAN may be a wireless control network according to, or based on, Zigbee™ or Z-Wave™ standards, such as IEEE 802.15.4-2003. Alternatively or in addition, the wireless network may be using, may be according to, may be compatible with, or may be based on, an analog Frequency Modulation (FM) over license-free band such as the LPD433 standard that uses frequencies with the ITU region 1 ISM band of 433.050 MHz to 434.790 MHz, the wireless transceiver 52 may be an LPD433 modem, and the antenna 53 may be an LPD433 antenna.

Alternatively or in addition, the wireless network may be using, may be according to, may be compatible with, or may be based on, a Wireless Local Area Network (WLAN) that may be according to, or based on, IEEE 802.11a, IEEE 802.11b, IEEE 802.11g, IEEE 802.11n, or IEEE 802.11ac standards, the wireless transceiver 52 may be a WLAN modem, and the antenna 53 may be a WLAN antenna.

Alternatively or in addition, the wireless network may be using, may be according to, may be compatible with, or may be based on, a wireless broadband network or a Wireless Wide Area Network (WWAN), the wireless transceiver 52 may be a WWAN modem, and the antenna 53 may be a WWAN antenna. The WWAN may be a WiMAX network such as according to, or based on, IEEE 802.16-2009, the wireless transceiver 52 may be a WiMAX modem, and the antenna 53 may be a WiMAX antenna. Alternatively or in addition, the WWAN may be a cellular telephone network, the wireless transceiver 52 may be a cellular modem, and the antenna 53 may be a cellular antenna. The WWAN may be a Third Generation (3G) network and may use UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network and may use HSPA+, Mobile WiMAX, LTE, LTE-Advanced, MBWA, or may be based on IEEE 802.20-2008. Alternatively or in addition, the wireless network may be using, may be using licensed or an unlicensed radio frequency band, such as the Industrial, Scientific and Medical (ISM) radio band.

The XWEAR device 50 may comprise a user notifier 58, which may be used to notify an event or in response to a parameter or a feature to wearer of the XWEAR device 50, such as by using a tactile, an auditory, or a visual stimuli. In one example, the notifying may be based on information received wirelessly by the wireless transceiver 52 via the wireless link 54.

Using visual stimuli, the user notifier 58 may comprise a visual signaling device. In one example, the device illuminates a visible light, such as a Light-Emitting-Diode (LED), or uses a Liquid Crystal Display (LCD) that uses changes in the reflectivity in an applied electric field. The LED may be a multi-color LED, such as LED Part No. 08L5015RGBC available from RSR Electronics, Inc. from NJ, U.S.A., described in data-sheet Multi Color LED Part No.

08L5015RGBC, which is incorporated in its entirety for all purposes as if fully set forth herein.

However, any type of visible electric light emitter such as a flashlight, an incandescent lamp, and compact fluorescent lamps can be used. Multiple light emitters may be used, and the illumination may be steady, blinking or flashing. Further, a single-state visual indicator may be used to provide multiple indications, such as by using different colors (of the same visual indicator), different intensity levels, variable duty-cycle and so forth. Further, the visual signaling may be associated with a parameter, feature, or function. Such conceptual relationships may include, for example, the light emitters' brightness, appearance, location, type, color and steadiness that are influenced by the estimated value.

In one example, the operation is based on a numerical digital display that provides readings in the form of numbers of the estimated value of any value derived thereof. For example, the notifier 58 may use the quadruple digits, seven-segments, LED display Part No. LTC-3610G available from Lite-On Electronics, Inc., and described in Lite-On Electronics, Inc., Publication BNS-OD-C131/A4 downloaded March 2011, which is incorporated in its entirety for all purposes as if fully set forth herein. Similarly, the notifier 58 may be based on an alphanumerical digital display that provides readings in the form of characters, including numbers, letters or symbols. For example, the notifier 58 may use the quadruple digits, seven-segments, LED display Part No.: LTM-8647AC available from Lite-On Electronics, Inc., and described in Lite-On Electronics, Inc., Publication BNS-OD-C131/A4 downloaded March 2011, which is incorporated in its entirety for all purposes as if fully set forth herein.

Similarly, word messages may be displayed in a variety of fashions and formats, such as scrolling, static, bold, and flashing. The device may further display visual display material beyond words and characters, such as arrows, symbols, ASCII and non-ASCII characters, still images such as pictures and video. The notifier 58 may comprise may use any electronic display or any other output device used for the presentation of visual information. The display may be a digital or analog video display, and may use technologies such as LCD (Liquid Crystal Display), TFT (Thin-Film Transistor), FED (Field Emission Display), CRT (Cathode Ray Tube) or any other electronic screen technology that visually shows information such as graphics or text.

Using auditory stimuli, the user notifier 58 may comprise an electroacoustic actuator, such as a sounder, which converts electrical energy to sound waves transmitted through the air, an elastic solid material, or a liquid, usually by means of a vibrating or moving ribbon or diaphragm. The sound may be audio or audible, having frequencies in the approximate range of 20 to 20,000 hertz, capable of being detected by human organs of hearing. Alternatively or in addition, the sounder may be used to emit inaudible frequencies, such as ultrasonic (a.k.a. ultrasound) acoustic frequencies that are above the range audible to the human ear, or above approximately 20,000 Hz. A sounder may be omnidirectional, unidirectional, bidirectional, or provide other directionality or polar patterns.

A loudspeaker (a.k.a. speaker) is a sounder that produces sound in response to an electrical audio signal input, typically audible sound. The most common form of loudspeaker is the electromagnetic (or dynamic) type, uses a paper cone supporting a moving voice coil electromagnet acting on a permanent magnet. Where accurate reproduction of sound is required, multiple loudspeakers may be used, each reproducing a part of the audible frequency range. A loudspeaker is commonly optimized for middle frequencies; tweeters for high frequencies; and sometimes supertweeter is used which is optimized for the highest audible frequencies.

A loudspeaker may be a piezo (or piezoelectric) speaker contains a piezoelectric crystal coupled to a mechanical diaphragm and is based on the piezoelectric effect. An audio signal is applied to the crystal, which responds by flexing in proportion to the voltage applied across the crystal surfaces, thus converting electrical energy into mechanical. Piezoelectric speakers are frequently used as beepers in watches and other electronic devices, and are sometimes used as tweeters in less-expensive speaker systems, such as computer speakers and portable radios. A loudspeaker may be a magnetostrictive transducers, based on magnetostriction, have been predominantly used as sonar ultrasonic sound wave radiators, but their usage has spread also to audio speaker systems.

A loudspeaker may be an electrostatic loudspeaker (ESL), in which sound is generated by the force exerted on a membrane suspended in an electrostatic field. Such speakers use a thin flat diaphragm usually consisting of a plastic sheet coated with a conductive material such as graphite sandwiched between two electrically conductive grids, with a small air gap between the diaphragm and grids. The diaphragm is usually made from a polyester film (thickness 2-20 m) with exceptional mechanical properties, such as PET film. By means of the conductive coating and an external high voltage supply, the diaphragm is held at a DC potential of several kilovolts with respect to the grids. The grids are driven by the audio signal; and the front and rear grids are driven in antiphase. As a result a uniform electrostatic field proportional to the audio signal is produced between both grids. This causes a force to be exerted on the charged diaphragm, and its resulting movement drives the air on either side of it.

A loudspeaker may be a magnetic loudspeaker, and may be a ribbon or planar type, is based on a magnetic field. A ribbon speaker consists of a thin metal-film ribbon suspended in a magnetic field. The electrical signal is applied to the ribbon, which moves with it to create the sound. Planar magnetic speakers are speakers with roughly rectangular flat surfaces that radiate in a bipolar (i.e., front and back) manner, and may be having printed or embedded conductors on a flat diaphragm. Planar magnetic speakers consist of a flexible membrane with a voice coil printed or mounted on it. The current flowing through the coil interacts with the magnetic field of carefully placed magnets on either side of the diaphragm, causing the membrane to vibrate more uniformly and without much bending or wrinkling. A loudspeaker may be a bending wave loudspeaker, which uses a diaphragm that is intentionally flexible.

A sounder may an electromechanical type, such as an electric bell, which may be based on an electromagnet, causing a metal ball to clap on cup or half-sphere bell. A sounder may be a buzzer (or beeper), a chime, a whistle or a ringer. Buzzers may be either electromechanical or ceramic-based piezoelectric sounders that make a high-pitch noise, and may be used for alerting. The sounder may emit a single or multiple tones, and can be in continuous or intermittent operation.

In one example, the sounder is used to play a stored digital audio. The digital audio content can be stored in the sounder, the actuator unit, the router, the control server, or any combination thereof. Further, few files may be stored (e.g., representing different announcements or songs), selected by the control logic. Alternatively or in addition, the digital audio data may be received by the sounder, the actuator unit, the router, the control server, or any combination thereof, from external sources via the above networks. Furthermore, the source of the digital audio may a microphone serving as a sensor, either after processing, storing, delaying, or any other manipulation, or as originally received resulting 'doorphone' or 'intercom' functionality between a microphone and a sounder in the building.

In another example, the sounder simulates the voice of a human being or generates music, typically by using an electronic circuit having a memory for storing the sounds (e.g., music, song, voice message, etc.), a digital to analog converter to reconstruct the electrical representation of the sound, and a driver for driving a loudspeaker, which is an electro-acoustic transducer that converts an electrical signal to sound. An example of a greeting card providing music and mechanical movement is disclosed in U.S. Patent Application No. 2007/0256337 to Segan entitled: "User Interactive Greeting Card", which is incorporated in its entirety for all purposes as if fully set forth herein.

In one example, the system is used for sound or music generation. For example, the sound produced can emulate the sounds of a conventional acoustical music instrument, such as a piano, tuba, harp, violin, flute, guitar and so forth. In one example, the sounder is an audible signaling device, emitting audible sounds that can be heard (having frequency components in the 20-20,000 Hz band). In one example the sound generated is music or song. The elements of the music such as pitch (which governs melody and harmony), rhythm (and its associated concepts tempo, meter, and articulation), dynamics, and the sonic qualities of timbre and texture, may be associated with the shape theme. For example, if a musical instrument shown in the picture, the music generated by that instrument will be played, e.g., drumming sound of drums and playing of a flute or guitar. In one example, a talking human voice is played by the sounder. The sound may be a syllable, a word, a phrase, a sentence, a short story or a long story, and can be based on speech synthesis or pre-recorded. Male or female voice can be used, further being young or old.

Some examples of toys that include generation of an audio signal such as music are disclosed in U.S. Pat. No. 4,496,149 to Schwartzberg entitled: "Game Apparatus Utilizing Controllable Audio Signals", in U.S. Pat. No. 4,516,260 to Breedlove et al. entitled: "Electronic Learning Aid or Game having Synthesized Speech", in U.S. Pat. No. 7,414,186 to Scarpa et al. entitled: "System and Method for Teaching Musical Notes", in U.S. Pat. No. 4,968,255 to Lee et al., entitled: "Electronic Instructional Apparatus", in U.S. Pat. No. 4,248,123 to Bunger et al., entitled: "Electronic Piano" and in U.S. Pat. No. 4,796,891 to Milner entitled: "Musical Puzzle Using Sliding Tiles", and toys with means for synthesizing human voice are disclosed in U.S. Pat. No. 6,527,611 to Cummings entitled: "Place and Find Toy", and in U.S. Pat. No. 4,840,602 to Rose entitled: "Talking Doll Responsive to External Signal", which are all incorporated in their entirety for all purposes as if fully set forth herein. A music toy kit combining music toy instrument with a set of construction toy blocks is disclosed in U.S. Pat. No. 6,132,281 to Klitsner et al. entitled: "Music Toy Kit" and in U.S. Pat. No. 5,349,129 to Wisniewski et al. entitled: "Electronic Sound Generating Toy", which are incorporated in their entirety for all purposes as if fully set forth herein.

A speech synthesizer used to produce natural and intelligible artificial human speech may be implemented in hardware, in software, or combination thereof. A speech synthesizer may be Text-To-Speech (TTS) based, that converts normal language text to speech, or alternatively (or in addition) may be based on rendering symbolic linguistic representation like phonetic transcription. A TTS typically involves two steps, the front-end where the raw input text is pre-processed to fully write-out words replacing numbers and abbreviations, followed by assigning phonetic transcriptions to each word (text-to-phoneme), and the back-end (or synthesizer) where the symbolic linguistic representation is converted to output sound.

The generating of synthetic speech waveform typically uses a concatenative or formant synthesis. The concatenative synthesis commonly produces the most natural-sounding synthesized speech, and is based on the concatenation (or stringing together) of segments of recorded speech. There are three main types of concatenative synthesis: Unit selection, diphone synthesis, and domain-specific synthesis. Unit selection synthesis is based on large databases of recorded speech including individual phones, diphones, half-phones, syllables, morphemes, words, phrases, and sentences, indexed based on the segmentation and acoustic parameters like the fundamental frequency (pitch), duration, position in the syllable, and neighboring phones. At run time, the desired target utterance is created by determining (typically using a specially weighted decision tree) the best chain of candidate units from the database (unit selection). Diphone synthesis uses a minimal speech database containing all the diphones (sound-to-sound transitions) occurring in a language, and at runtime, the target prosody of a sentence is superimposed on these minimal units by means of digital signal processing techniques such as linear predictive coding. Domain-specific synthesis is used where the output is limited to a particular domain, using concatenates prerecorded words and phrases to create complete utterances. In formant synthesis the synthesized speech output is created using additive synthesis and an acoustic model (physical modeling synthesis), rather than on using human speech samples. Parameters (or features) such as fundamental frequency, voicing, and noise levels are varied over time to create a waveform of artificial speech. The synthesis may further be based on articulatory synthesis where computational techniques for synthesizing speech are based on models of the human vocal tract and the articulation processes occurring there, or may be HMM-based synthesis which is based on hidden Markov models, where the frequency spectrum (vocal tract), fundamental frequency (vocal source), and duration (prosody) of speech are modeled simultaneously by HMMs and generated based on the maximum likelihood criterion. The speech synthesizer may further be based on the book entitled: "*Development in Speech Synthesis*", by Mark Tatham and Katherine Morton, published 2005 by John Wiley & Sons Ltd., ISBN: 0-470-85538-X, and on the book entitled: "*Speech Synthesis and Recognition*" by John Holmes and Wendy Holmes, $2^{nd}$ Edition, published 2001 ISBN: 0-7484-0856-8, which are both incorporated in their entirety for all purposes as if fully set forth herein.

A speech synthesizer may be software based such as Apple VoiceOver utility, which uses speech synthesis for accessibility, and is part of the Apple iOS operating system used on the iPhone, iPad and iPod Touch. Similarly, Microsoft uses SAPI 4.0 and SAPI 5.0 as part of Windows operating system. Similarly, hardware may be used, and may be based on an IC. A tone, voice, melody, or song hardware-based sounder typically contains a memory storing a digital representation of the pre-recorder or synthesized voice or music, a Digital to Analog (D/A) converter for creating an analog signal, a speaker and a driver for feeding the speaker. A sounder may be based on Holtek HT3834 CMOS VLSI Integrated Circuit (IC) named '36 Melody Music Generator' available from Holtek Semiconductor Inc., headquartered in Hsinchu, Taiwan, and described with application circuits in a data sheet Rev. 1.00 dated Nov. 2, 2006, on EPSON 7910 series 'Multi-Melody IC' available from Seiko-Epson Corporation, Electronic Devices Marketing Division located in Tokyo, Japan, and described with application circuits in a data sheet PF226-04 dated 1998, on Magnevation SpeakJet chip available from Magnevation LLC and described in 'Natural Speech & Complex Sound Synthesizer', described in User's Manual Revision 1.0 Jul. 27, 2004, on Sensory Inc. NLP-5x described in the Data sheet *"Natural Language Processor with Motor, Sensor and Display Control"*, P/N 80-0317-K, published 2010 by Sensory, Inc. of Santa-Clara, Calif., U.S.A., or on OPTi 82C931 'Plug and Play Integrated Audio Controller' described in Data Book 912-3000-035 Revision: 2.1 published on Aug. 1, 1997, which are all incorporated herein in their entirety for all purposes as if fully set forth herein. Similarly, a music synthesizer may be based on YMF721 OPL4-ML2 FM+Wavetable Synthesizer LSI available from Yamaha Corporation described in YMF721 Catalog No. LSI-4MF721A20, which is incorporated in its entirety for all purposes as if fully set forth herein.

Using tactile (or haptic) stimuli, the user notifier 58 may is configured to generate a tactile sensation, preferably the device comprises a motor, e.g., a vibration motor such as a pancake vibration motor or linear actuator or off-center motor. The motor may, for example, be configured to generate a single type of vibration or pulsation or to generate a plurality of types of vibrations and/or pulsations that vary based on pattern and/or intensity or other parameter or features. Other types of tactile stimulation that the signaling assembly may be configured to generate include, but are not limited to, pressure by causing a blunt or other element to extend through the housing when activated.

The XWEAR device 50 may further comprise a sensor, such as a user sensor 57, for receiving commands from the wearer. Any element capable of measuring or responding to a physical phenomenon may be used as the sensor 57. An appropriate sensor may be adapted for a specific physical phenomenon, such as a sensor responsive to temperature, humidity, pressure, audio, vibration, light, motion, sound, proximity, flow rate, electrical voltage, and electrical current. The sensor output signal may be conditioned by a signal conditioning circuit, such as a signal conditioner 56 that may involve time, frequency, or magnitude related manipulations. The signal conditioner 56 may be linear or non-linear, and may include an operation or an instrument amplifier, a multiplexer, a frequency converter, a frequency-to-voltage converter, a voltage-to-frequency converter, a current-to-voltage converter, a current loop converter, a charge converter, an attenuator, a sample-and-hold circuit, a peak-detector, a voltage or current limiter, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a de-compressor, a coder (or decoder), a modulator (or demodulator), a pattern recognizer, a smoother, a noise remover, an average or RMS circuit, or any combination thereof. In the case of analog sensor, an analog to digital (A/D) converter may be used to convert the conditioned sensor output signal to a digital sensor data.

The sensor 57 may serve as a detector, notifying only the presence of a phenomenon, such as by a switch, and may use a fixed or settable threshold level. The sensor may measure time-dependent or space-dependent parameters of a phenomenon. The sensor 57 may measure time-dependencies or a phenomenon such as the rate of change, time-integrated or time-average, duty-cycle, frequency or time period between events. The sensor 57 may be a passive sensor, or an active sensor requiring an external source of excitation. The sensor 57 may be semiconductor-based, and may be based on MEMS technology. Further, the sensor 57 may measure the amount of a property or of a physical quantity, or the magnitude relating to a physical phenomenon, body, or substance. Alternatively or in addition, the sensor 57 may be used to measure the time derivative thereof, such as the rate of change of the amount, the quantity or the magnitude. In the case of space related quantity or magnitude, a sensor may measure the linear density, surface density, or volume density, relating to the amount of property per volume. Alternatively or in addition, the sensor 57 may measure the flux (or flow) of a property through a cross-section or surface boundary, the flux density, or the current. In the case of a scalar field, a sensor may measure the quantity gradient.

The sensor 57 may be a photoelectric sensor that may respond to a visible or an invisible light, the invisible light may be infrared, ultraviolet, X-rays, or gamma rays, and the photoelectric sensor may be based on the photoelectric or photovoltaic effect, and may consist of, or may comprise, a semiconductor component that may consist of, or may comprise, a photodiode, or a phototransistor that may be based on Charge-Coupled Device (CCD) or a Complementary Metal-Oxide Semiconductor (CMOS) component.

Alternatively or in addition, the sensor 57 may be a tactile sensor, being sensitive to force or pressure, or being sensitive to a touch by an object, typically a human touch. A tactile sensor is commonly based on piezoresistive, piezoelectric, capacitive, or elastoresistive sensor. Further, a tactile sensor may be based on a conductive rubber, a lead zirconate titanate (PZT) material, a polyvinylidene fluoride (PVDF) material, or a metallic capacitive element. A sensor may include an array of tactile sensor elements, and may provide an 'image' of a contact surface, distribution of pressures, or pattern of forces. A tactile sensor may be a tactile switch where the touch sensing is used to trigger a switch, which may be a capacitance touch switch, where the human body capacitance increases a sensed capacitance, or may be a resistance touch switch, where the human body part such as a finger (or any other conductive object) conductivity is sensed between two conductors (e.g., two pieces of metal). Examples of touch switches are disclosed in PCT International Publication No. WO 2014/076695 to Ziv entitled: "Modular Touch Switch", and in PCT International Publication No. WO 2012/083380 to Juhasz et al., entitled: "Touch Switch", which are both incorporated in their entirety for all purposes as if fully set forth herein.

The sensor 57 may be a piezoelectric sensor, where the piezoelectric effect is used to measure pressure, acceleration, strain or force, and may use transverse, longitudinal, or shear effect mode. A thin membrane may be used to transfer and measure pressure, while mass may be used for acceleration measurement. A piezoelectric sensor element material may be a piezoelectric ceramics (such as PZT ceramic) or a single crystal material. A single crystal material may be gallium phosphate, quartz, tourmaline, or Lead Magnesium Niobate-Lead Titanate (PMN-PT).

The sensor 57 may be a motion sensor, and may include one or more accelerometers, which measure the absolute acceleration or the acceleration relative to freefall. The accelerometer may be piezoelectric, piezoresistive, capacitive, MEMS, or electromechanical switch accelerometer, measuring the magnitude and the direction the device acceleration in a single-axis, 2-axis or 3-axis (omnidirectional). Alternatively or in addition, the motion sensor may be based on electrical tilt and vibration switch or any other electromechanical switch.

The sensor 57 may be an electroacoustic sensor that responds to sound waves (which are essentially vibrations transmitted through an elastic solid or a liquid or gas), such as a microphone, which converts sound into electrical energy, usually by means of a ribbon or diaphragm set into motion by the sound waves. The sound may be audio or audible, having frequencies in the approximate range of 20 to 20,000 hertz, capable of being detected by human organs of hearing. Alternatively or in addition, the microphone may be used to sense inaudible frequencies, such as ultrasonic (a.k.a. ultrasound) acoustic frequencies that are above the range audible to the human ear, or above approximately 20,000 Hz. A microphone may be a condenser microphone (a.k.a. capacitor or electrostatic microphone) where the diaphragm acts as one plate of a two plates capacitor, and the vibrations changes the distance between plates, hence changing the capacitance.

An electret microphone is a capacitor microphone based on a permanent charge of an electret or a polarized ferroelectric material. A dynamic microphone is commonly based on electromagnetic induction, using a diaphragm attached to a small movable induction coil that is positioned in a magnetic field of a permanent magnet. The incident sound waves cause the diaphragm to vibrate, and the coil to move in the magnetic field, producing a current. Similarly, a ribbon microphone uses a thin, usually corrugated metal ribbon suspended in a magnetic field, and its vibration within the magnetic field generates the electrical signal. A loudspeaker is commonly constructed similar to a dynamic microphone, and thus may be used as a microphone as well. In a carbon microphone, the diaphragm vibrations apply varying pressure to a carbon, thus changing its electrical resistance. A piezoelectric microphone (a.k.a. crystal or piezo microphone) is based on the phenomenon of piezoelectricity in piezoelectric crystals such as potassium sodium tartrate. A microphone may be omnidirectional, unidirectional, bidirectional, or provide other directionality or polar patterns.

Figure 5A:
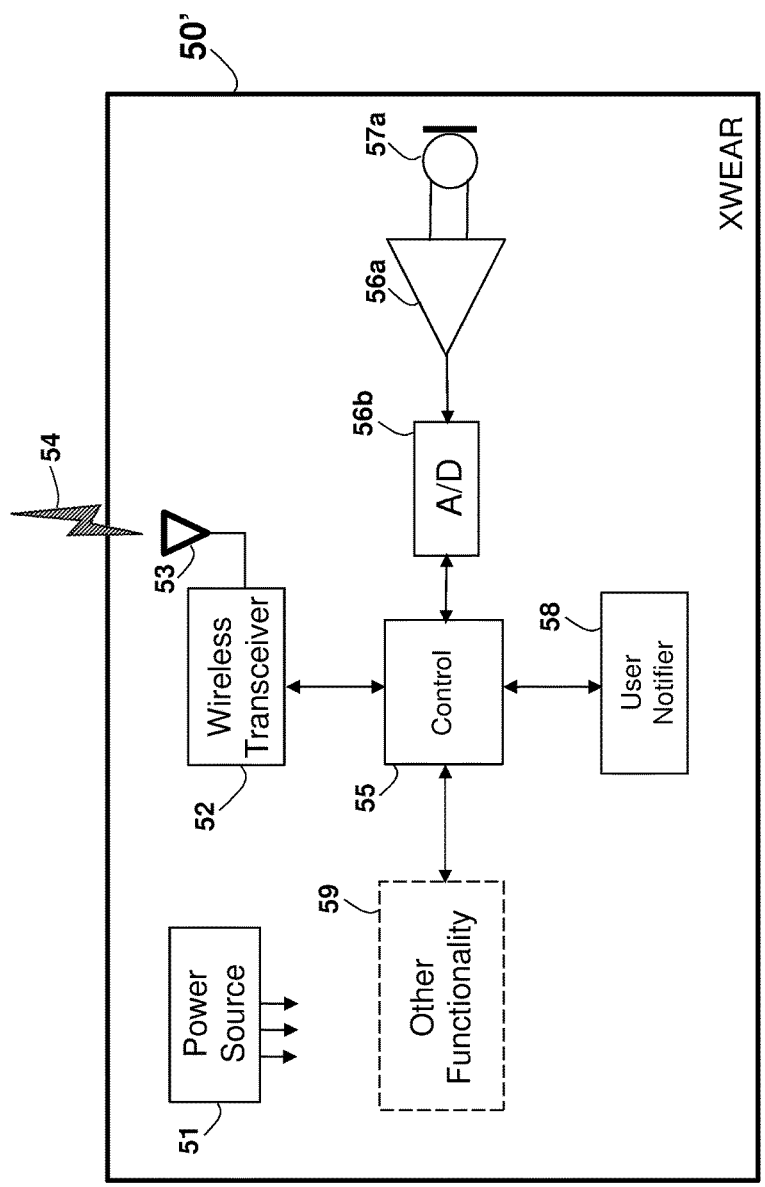
FIG. 5a illustrates a simplified schematic block diagram of a wearable device having an RF transmitter and integrated with other functionality.

An example of a microphone 57*a* as a user sensor 57 is shown in a XWEAR device 50' shown in FIG. 5*a*. The signal conditioner 56 is exampled as implemented by a preamplifier 56*a* and an Analog-to-Digital (A/D) converter 56*b*. Using various speech-processing algorithms, the XWEAR device 50' may response to vocal commands by the wearer.

In one example, the XWEAR device 50 is used only for serving as an RF beacon, for estimating or measuring the head pose of the wearer. In such a case, the wireless transceiver 52 may consists of a wireless transmitter. Alternatively or in addition, the XWEAR device may be integrated with another wearable device. The integration with the other device may involve sharing a component such as housing in the same enclosure, sharing the same power source, sharing the same processor, mounting onto the same surface, or any other type of hardware or software integration. Such integration is exampled in the XWEAR device 50', where the enclosure, the power source 51, and the control functionality are shared with another functionality 59 that may independent and distinct from the RF beaconing functionality.

Figure 5B:
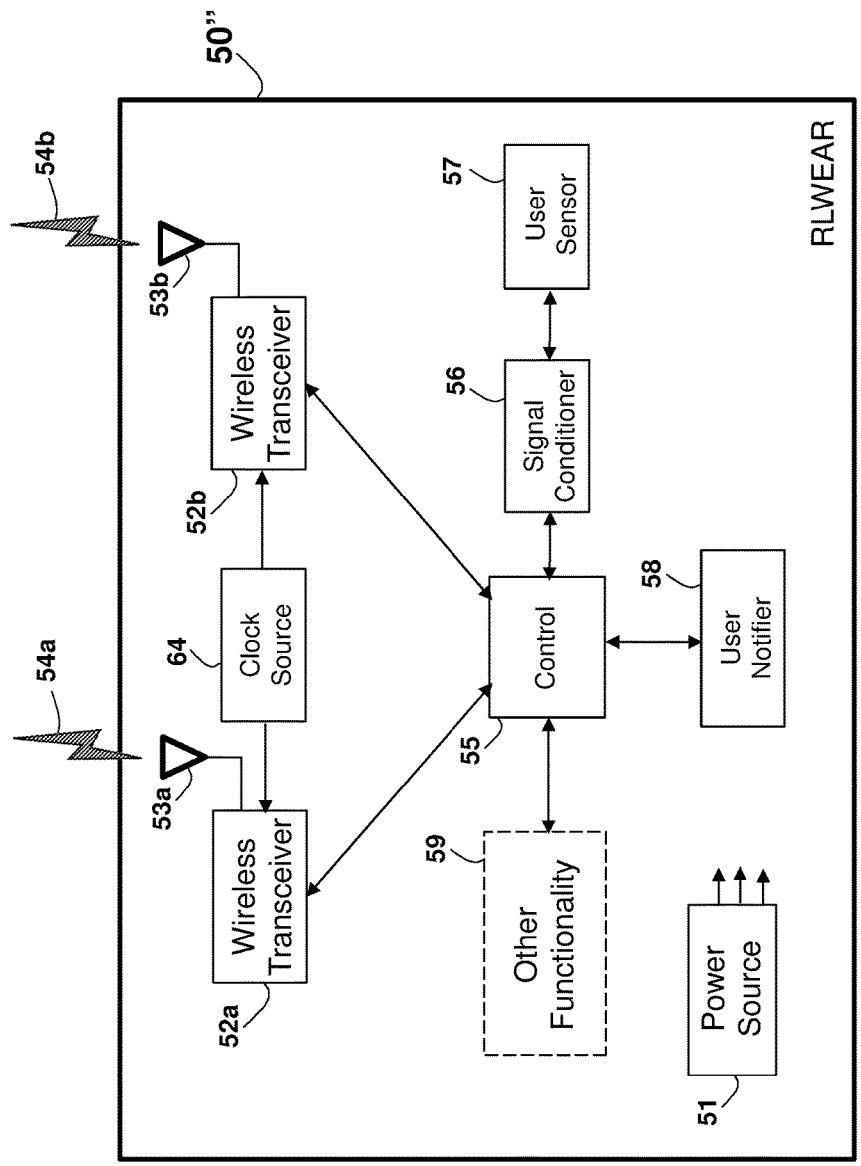
FIG. 5b illustrates a simplified schematic block diagram of a wearable device having two RF transmitters and integrated with other functionality.

In one example, the LWEAR device 50*a* and the RWEAR device 50*b* are integrated, as exampled by a RLWEAR device 50" shown in FIG. 5*b*. The common elements and functionalities, such as the power source 51, the enclosure, the user sensor 57, the control block 55, and the user notifier 58 are shared and used by both devices functionalities. The basic beaconing functionality of the LWEAR device 50*a*, which includes a wireless transceiver 52*a* and an antenna 53*a* (emitting an RF signal 54*a*) and the specific functionality of the RWEAR device 50*b*, which includes a wireless transceiver 52*b* and an antenna 53*b* (emitting an RF signal 54*b*), are not shared, allowing for providing the same functionalities as in the case of separate devices. Preferably, the enclosure of the RLWEAR device 50" is worn so that the antenna 53*b* is located on, or attached to, the right side of the wearer, while the antenna 53*a* is located on, or attached to, the left side of the wearer. In one example, the same timing reference source is used for generating both RF signals 54*a* and 54*b* by the respective wireless transceivers 52*a* and 52*b*. For example, a single clock source 64 may be used, and assuming that the wireless transceivers 52*a* and 52*b* are substantially similar or identical, the RF signals 54*a* and 54*b* are time synchronized, such as having the same phase, along for direction finding using phase difference detection as known in the art. In such a case, the comparator 62 may comprise a phase detector.

Figure 5C:
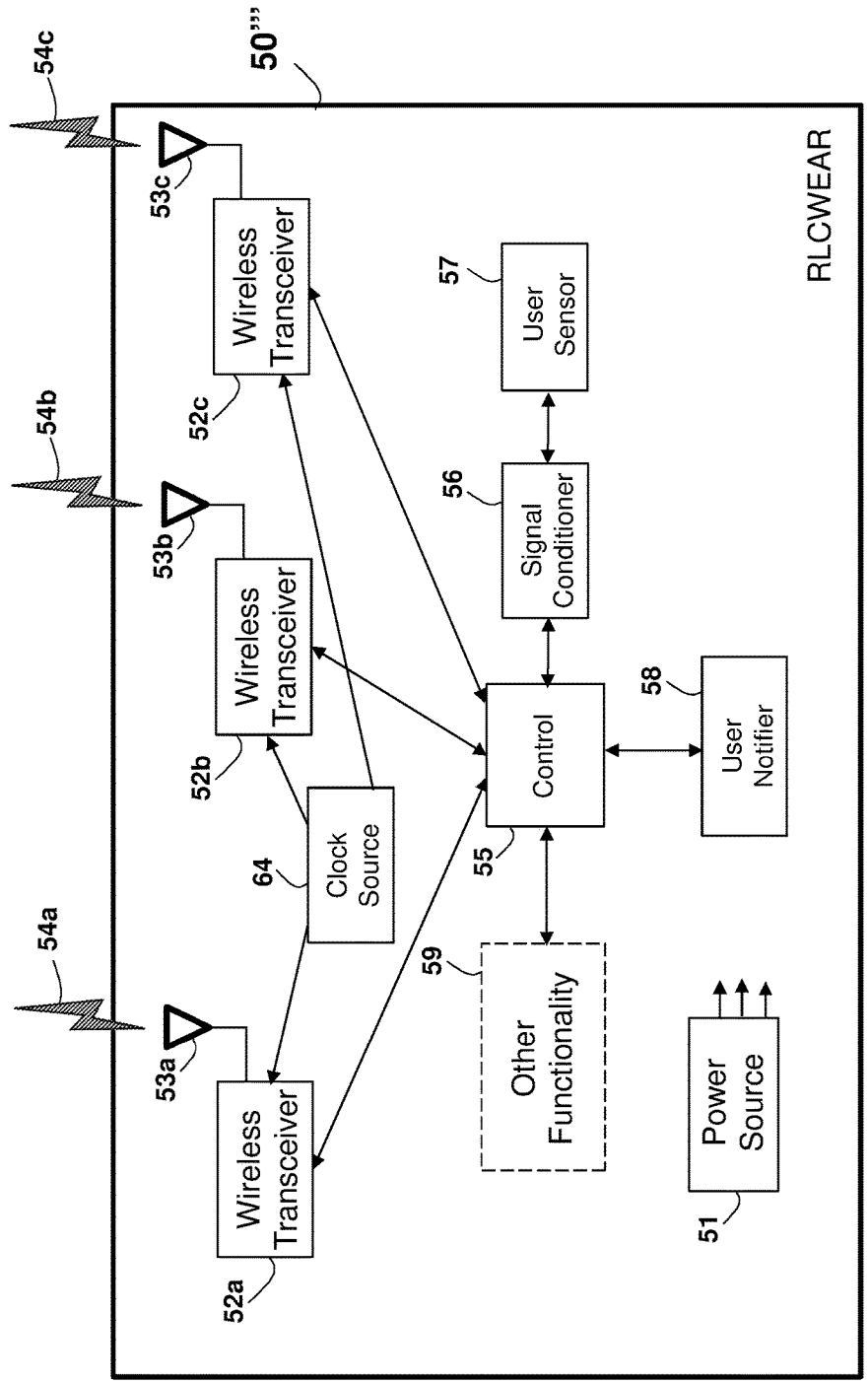
FIG. 5c illustrates a simplified schematic block diagram of a wearable device having three RF transmitters and integrated with other functionality.

While the RLWEAR device 50" was exampled regarding the two antennas 53*a* and 53*b*, three or more antennas (and related wireless transceivers) may be equally used, as illustrated in a block diagram 50''' of an RLCWEAR device shown in FIG. 5*c*. An additional third RF signal 54*c* is generated by an additional wireless transceiver 52*c* connected to an additional antenna 53*c*.

Figure 6:
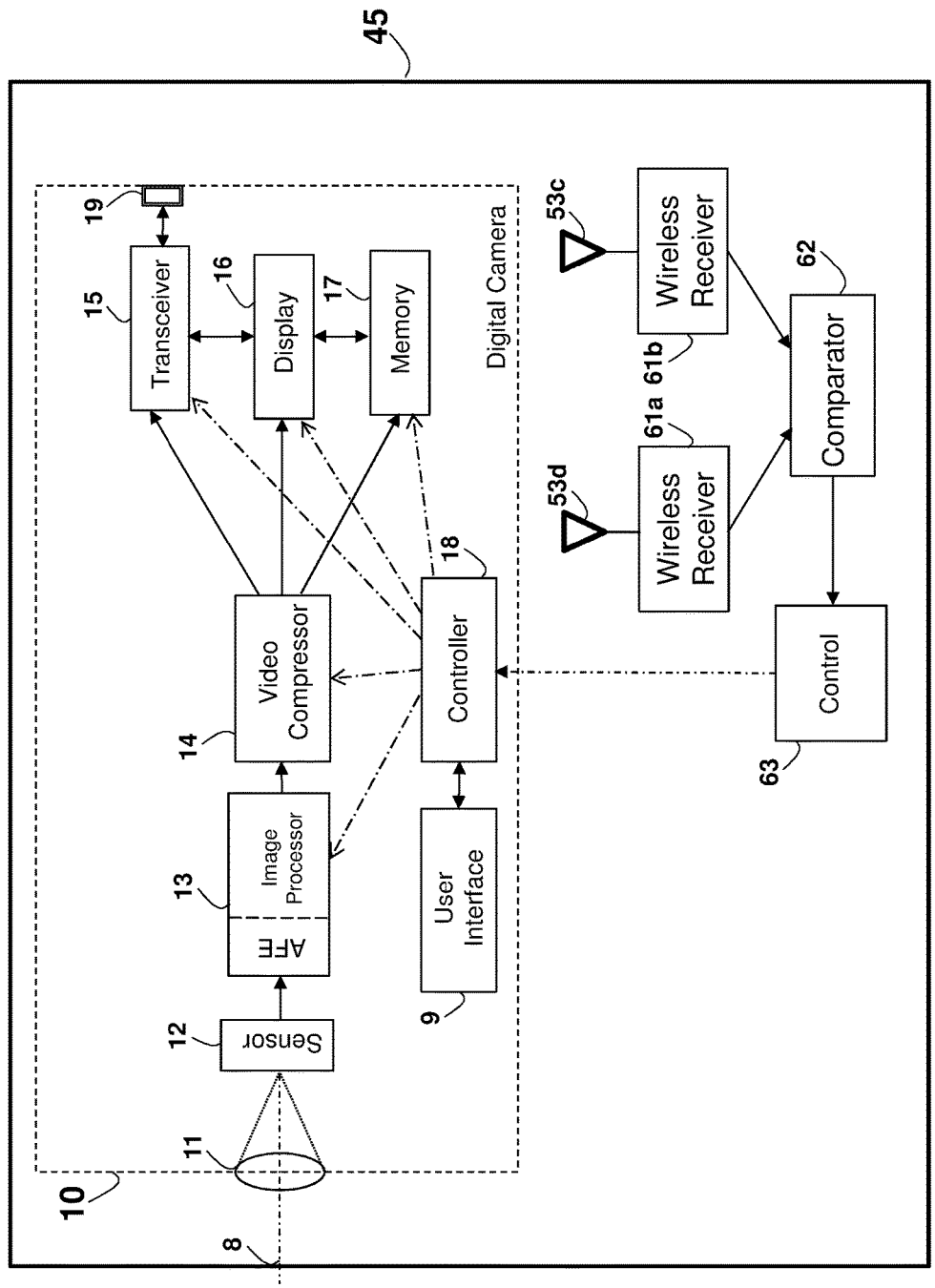
FIG. 6 illustrates a simplified schematic block diagram of a head pose controlled digital camera using two RF receivers.

A simplified block diagram of the improved digital camera 45 is shown in FIG. 6. The improved digital camera 45 comprises part of, or whole of, the digital camera 10 structure or functionalities. Alternatively or in addition, the improved digital camera 45 comprises part of, or whole of, the stereo digital camera 10*a* structure or functionalities. Alternatively or in addition, the improved digital camera 45 is integrated with the digital camera 10 (or the digital camera 10*a*), such as by sharing the same enclosure, the same power source, the same user interface 9, the same memory 17, the same display 16, or the same controller 18. The improved digital camera 45 comprises a wireless receiver 61*a* coupled to an antenna 53*c*, optimized and arranged to receive the RF signal 54*a* propagating over the path 42*a* from the antenna 47*a* in the LWEAR device 50*a*, or optimized and arranged to the receive the RF signal 54*a* from the antenna 53*a* in the RLWEAR device 50". Similarly, the improved digital camera 45 comprises a wireless receiver 61*a* coupled to an antenna 53*c*, optimized and arranged to receive the RF signal 54*b* propagating over the path 42*b* from the antenna 47*b* in the RWEAR device 50*b*, or optimized and arranged to the receive the RF signal 54*b* from the antenna 53*b* in the RLWEAR device 50". The wireless receivers 61*a* and 61*b* respectively extract or measure parameters, features, or characteristics of the respective received RF signals 54*a* and 54*b*, such as signal strength (such as RSSI), signal phase, or frequency. The extracted or measured parameters are provided for comparison by a comparator 62. The operation of the components, such as the receivers 61*a* and 61*b*, and the comparator 62, is controlled and managed by a control block 63. The comparator 62 may be implemented in hardware, in software, or as a combination thereof. In case of software, the processing may be performed by the processor in the control block 63. The comparison results are provided by the comparator 62 to the control block 63, which in turn may use the results to activate, control, or inhibit operation of the digital camera 10 by commanding the controller 18 in the digital camera 10.

The control block 63, located within the improved digital camera device 45, may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. The controller 63 commonly includes a memory that may include a static RAM (random Access Memory), dynamic RAM, flash memory, ROM (Read Only Memory), or any other data storage medium. The memory may include data, programs, and/or instructions and any other software or firmware executable by the processor. Control logic can be implemented in hardware or in software, such as a firmware stored in the memory. The controller 63 controls and monitors the part of, or whole of, the device operation, such as initialization, configuration, interface, and commands.

Figure 6A:
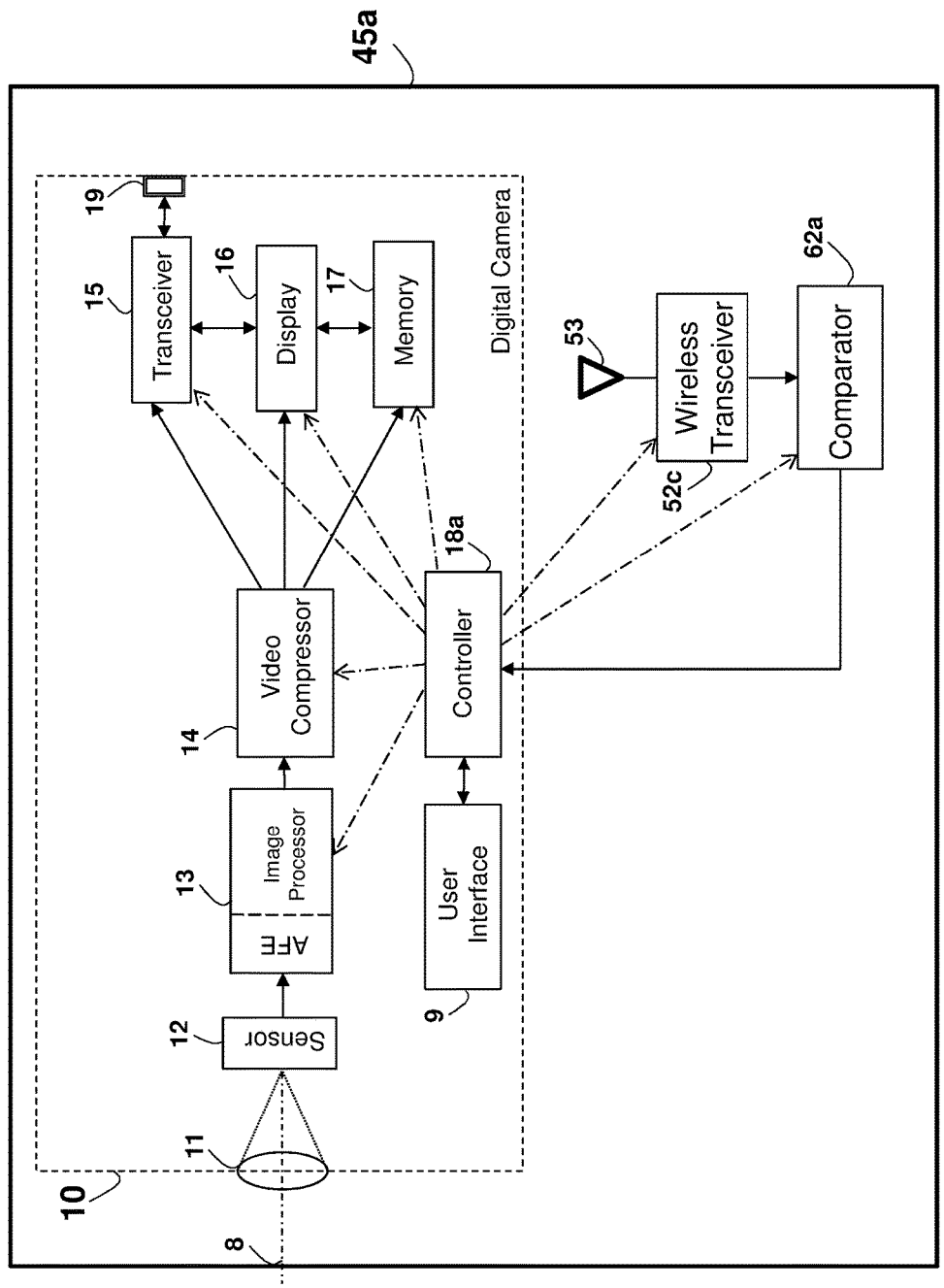
FIG. 6a illustrates a simplified schematic block diagram of a head pose controlled digital camera using a single RF receiver.

In one example, the functionalities by the control block 63 and the functionalities of the controller 18 are integrated and are performed by a single controller 18a, as described in a block diagram 45a in FIG. 6a. Further, a single antenna 53 and a single wireless transceiver 52c may be used, to receive, decode, measure, and extract parameters, characteristics, and features transmitted by both the LWEAR device 50a and the REWAR device 50b (or the combined device RLWEAR 50").

Figure 7:
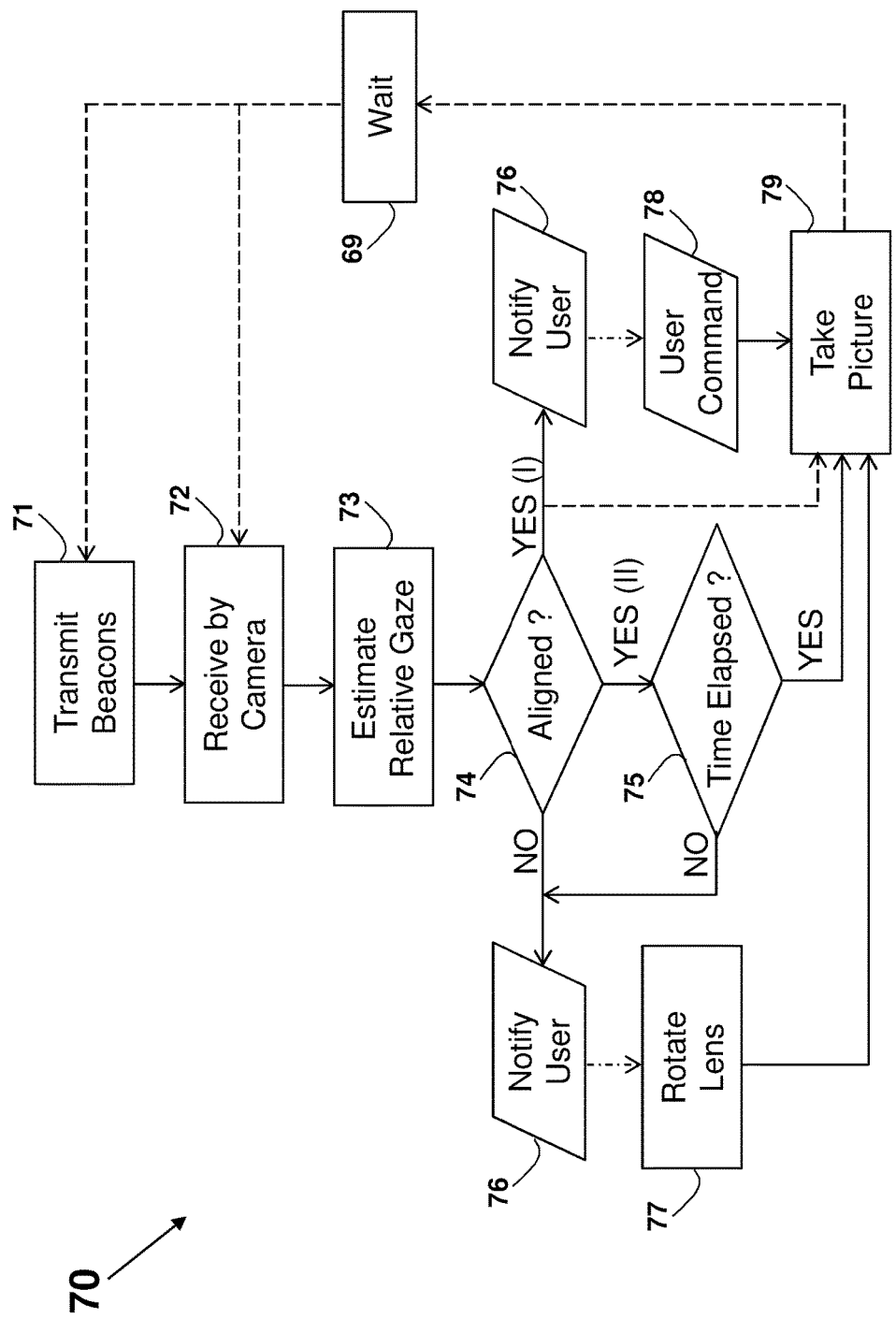
FIG. 7 illustrates schematically a simplified flow diagram of controlling a digital camera based on estimated relative angle between a person line of sight and a direction to a camera device.

The system operation is exampled in a flow chart 70 shown in FIG. 7. The operation starts at a "Transmit Beacons" step 71, where the LWEAR device 50a and the RWEAR device 50b transmits RF signals. The LWEAR device 50a transmits an RF signal 54a produced by its wireless transmitter or transceiver 52 (or the wireless transceiver 52a in the RLWEAR device 50") via its antenna 47a (that may correspond to antenna 53 of the XWEAR device) so that the RF signal 54a propagates along the line-of-sight 42a. Simultaneously, or alternately, The RWEAR device 50b transmits an RF signal 54b produced by its wireless transmitter or transceiver 52 (or the wireless transceiver 52b in the RLWEAR device 50") via its antenna 47b (that may correspond to antenna 53 of the XWEAR device) so that the RF signal 54b propagates along the line-of-sight 42b. As part of a "Receive by Camera" step 72, the improved digital camera 45 receives the transmitted RF signals. The RF signal 54a transmitted by the LWEAR device 50a may be received by the wireless receiver or transceiver 61a via the antenna 53d (or by the wireless transceiver 52c in the improved digital camera 45a), and the RF signal 54b transmitted by the RWEAR device 50b may be received by the wireless receiver or transceiver 61b via the antenna 53c (or by the wireless transceiver 52c in the improved digital camera 45a).

The wireless receivers or transceivers 61a and 61b (or the wireless receiver or transceiver 52c in the improved digital camera 45a) receive and analyze, such as extract various parameters, features, or characteristics of the received RF signals. The extracted parameters, features, or characteristics are compared by the comparator 62 (which may implemented by hardware, software, or any combination thereof) for estimating the relative angle α 49 between the head pose direction 44 and the line-of-sight 46 from the person 43 to the improved digital camera 45, as part of an "Estimate Relative Gaze" step 73.

The RF signals 54a and 54b, respectively transmitted by the LWEAR device 50a and the RWEAR device 50b, may be distinct from each other, such as by using different frequency, modulation, or polarization. Preferably, in such a case two distinct antennas and receivers may be used, such as the antennas 53d and 53c coupled to the receivers 61a and 61b. Preferably, the same frequency, modulation, and polarization are used.

In order to estimate the relative angle α 49, the comparison between the two received RF signals 54a and 54b may use, or may be based on, the difference in the RF signals propagation paths 42a and 42b. When the person 43 is looking at the improved camera 45, as exampled in the arrangement 40a shown in FIG. 4a, so that the relative angle α 49 is of low value or where α=0°, the length of the propagation paths 42a and 42b is similar or the same. However, in the case where the person 43 is not looking at the improved digital camera 45 (high value of the relative angle α 49), as exampled in the arrangement 40b shown in FIG. 4b, the propagation path 42a of the RF signal 54a from the LWEAR device 50a is longer than the propagation path 42b of the RF signal 54b from the RWEAR device 50b. As such, the signal strength of the RF signal 54a (that may be measured by the received RSSI) received from the LWEAR device 50a is lower that the signal strength of the RF signal 54b (that may be measured by the received RSSI) received from the RWEAR device 50b, hence the comparison of the two received RF signals indicates that the person 43 is looking to the left from the improved camera 45, and the signal strengths difference may be used as an estimation of the value of the relative angle α 49.

Figure 4A:
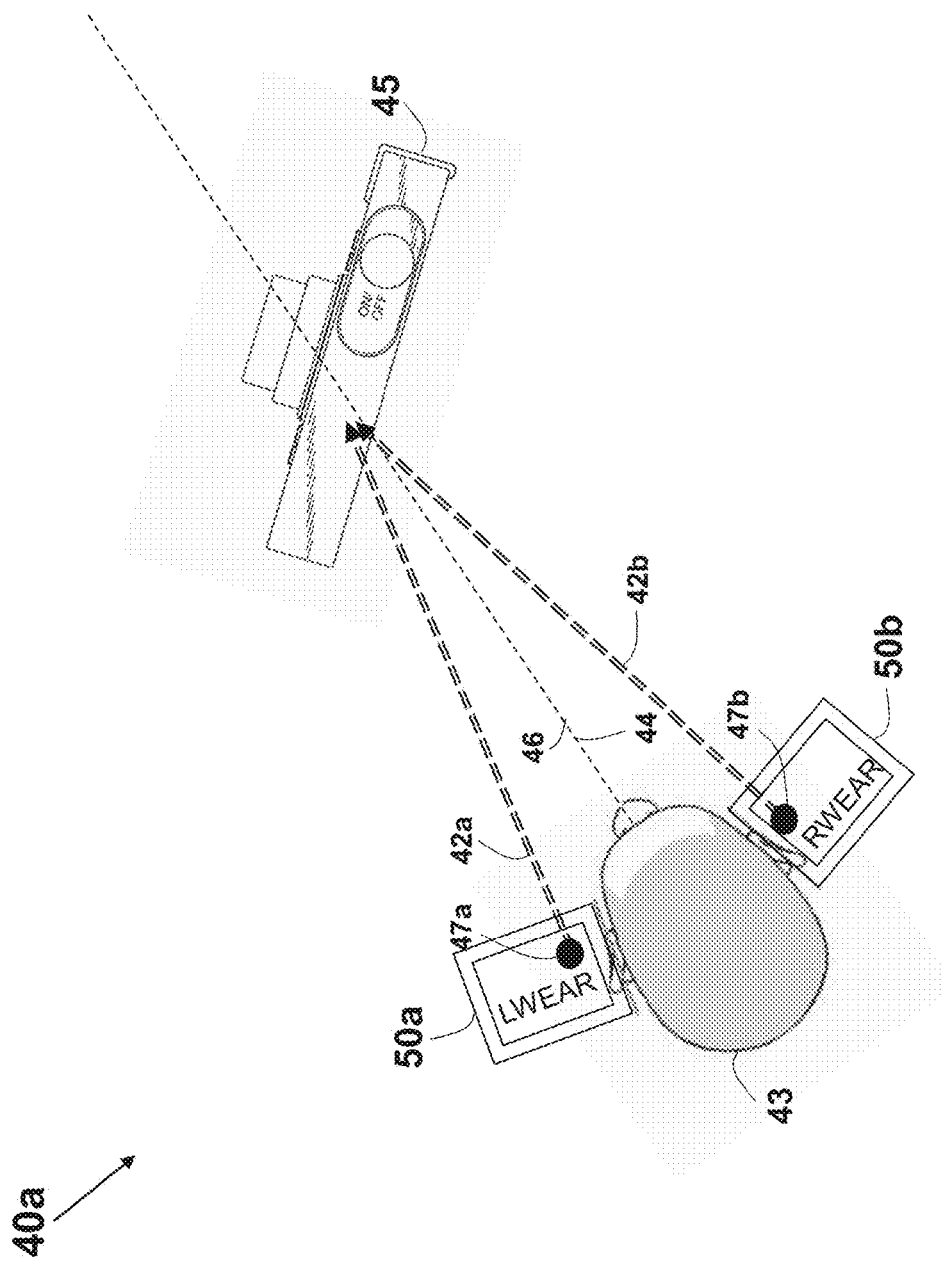
FIG. 4a depicts pictorially a top view of a person looking directly at a camera device.
Figure 4B:
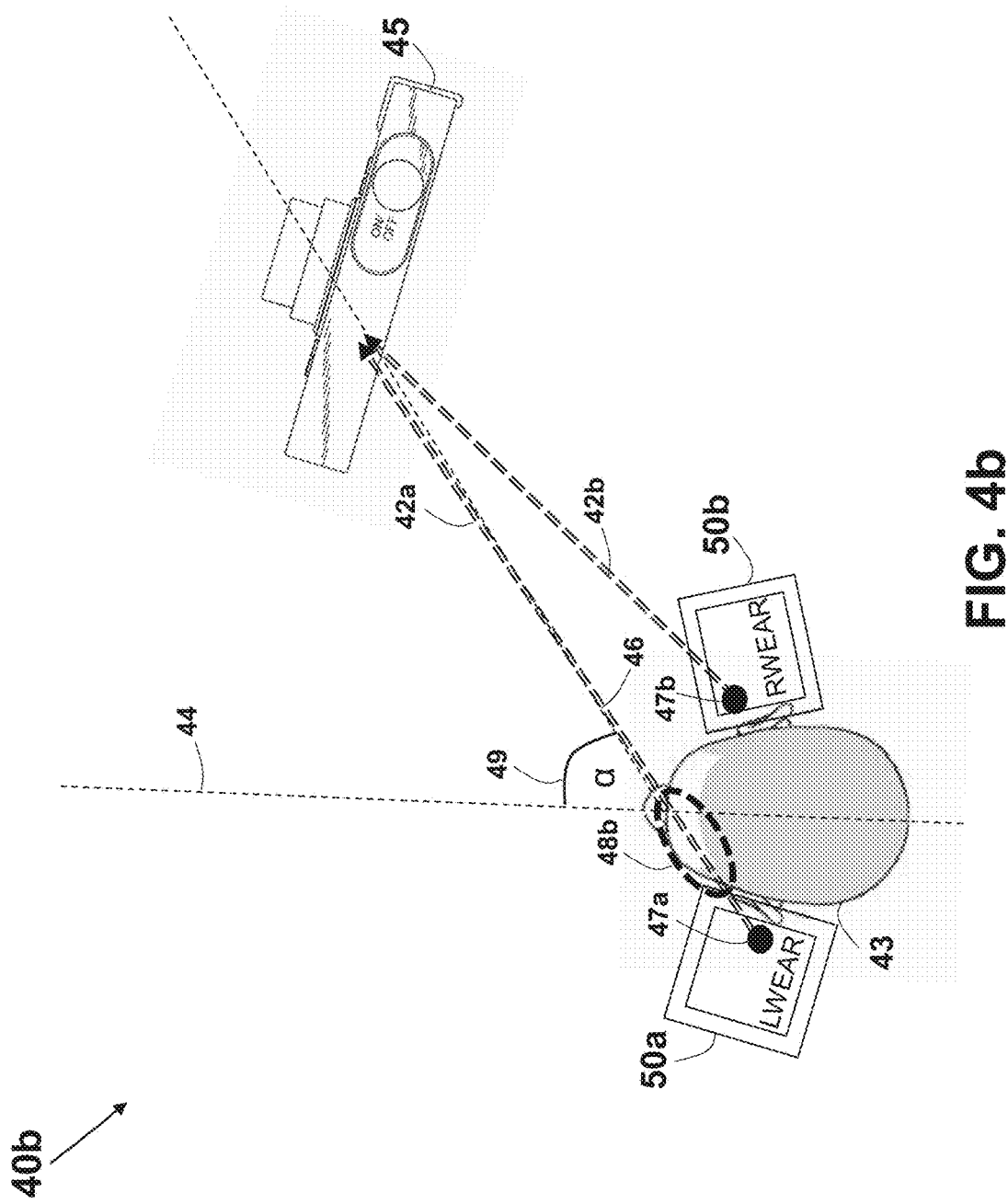
FIG. 4b depicts pictorially a top view of a person looking away from a camera device wearing two transmitting antennas.
Figure 4C:
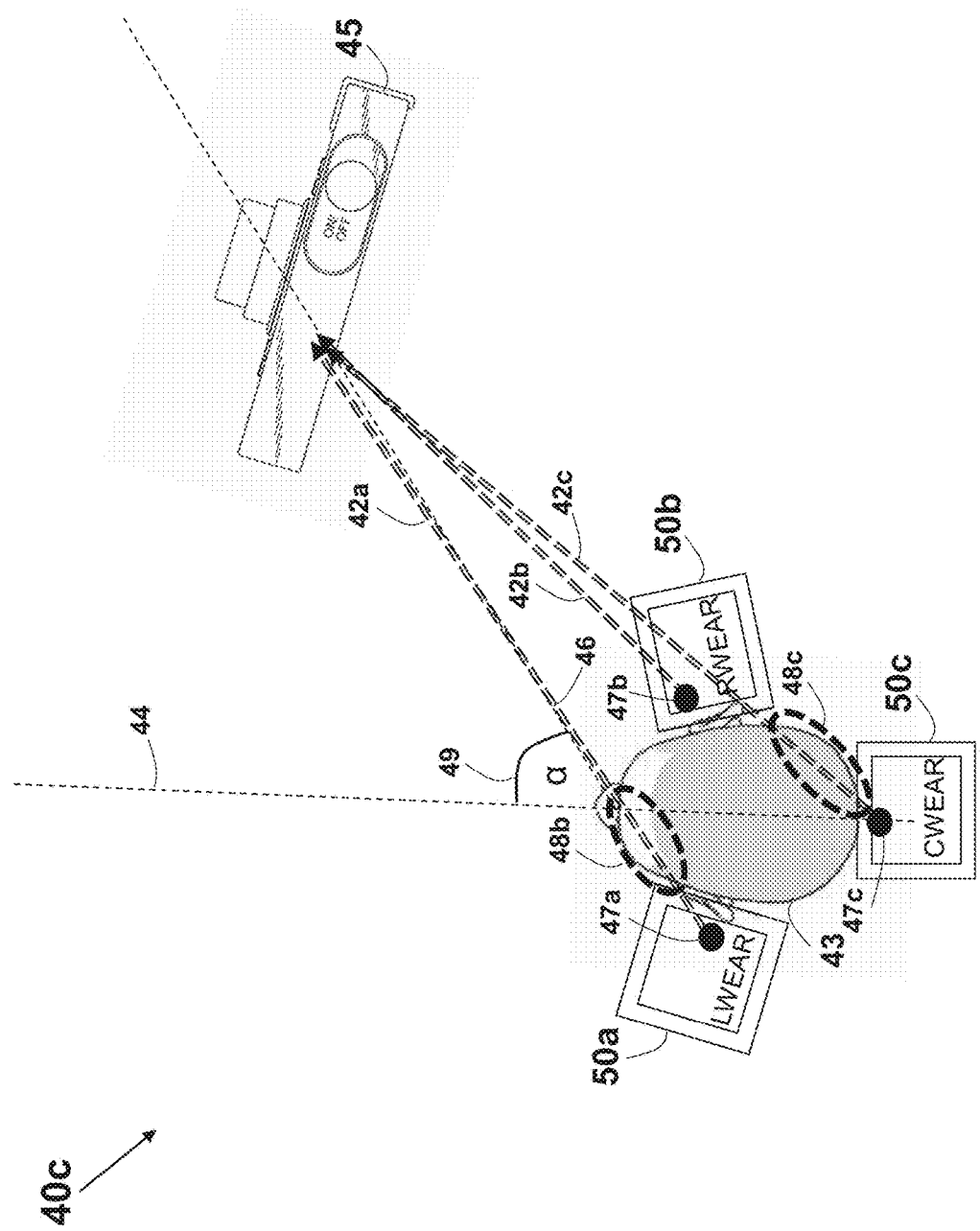
FIG. 4c depicts pictorially a top view of a person looking away from a camera device wearing three transmitting antennas.

While the views 40a and 40b respective shown in FIGS. 4a and 4b illustrate the usage of the two wearable devices 50a and 50b, three, four, five, or any other number wearable devices may equally be used. In an exemplary view 40c shown in FIG. 4c, three wearable devices are shown, where an additional wearable device CWEAR 50c having an antenna 47c that transits to the digital camera 45 over a propagation line 42c, and where the propagation path 42c includes a part of propagation path 48c inside the head 43. In one example, the third wearable device CWEAR 50c (or the antenna 47) is physically located between the RWEAR device 50b and the LWEAR device 50a. For example, the third wearable device CWEAR 50c may be located or worn in or around the center of, or having equal or similar distances to, the two wearable devices 50a and 50b. Using five wearable devices is described in an exemplary view 40d shown in FIG. 4d, where an additional antenna 47d (that may be part of an additional distinct wearable device) is located between the LWEAR device 50a and the CWEAR device 50c (or the associated antenna 47c) and transmits over a propagation line 42d, and an additional antenna 47e (that may be part of an additional distinct wearable device) is located between the RWEAR device 50b and the CWEAR device 50c (or the associated antenna 47c) and transmits over a propagation line 42e. Using additional wearable devices allows for higher accuracy measurements and for redundancy.

In addition to the different signal attenuations induced by the different lengths of the propagation paths 42a and 42b of the RF signals 54a and 54b, additional attenuation may be affected due to obstacles that absorb part of the RF signal propagating energy. As exampled in the arrangement 40 shown in FIG. 4, part of the propagation path 42a in through the person head 43, shown by an ellipsis 48a. Since the human body in general, and the head 43 in particular, are known to attenuate RF signals, the attenuation along the propagation path 42*a* of the transmitted RF signal 54*a* is expected to be substantially higher than the propagation path 42*b* of the transmitted RF signal 54*b*. When the user 43 is looking further away from the improved digital camera 45, such as shown in the arrangement 40*b* in FIG. 4*b* (associated with higher value of the relative angle α 49), the 'path' of the RF signal through the human head 43, shown by an ellipsis 48*b*, is much longer, hence higher attenuation of the propagating RF signal is affected. In the case where the head 43 pose is directly at the improved digital camera 45 (small value of the relative angle α 49 or where α=0°) as shown in the arrangement 40*b* in FIG. 4*b*, the RF signals are not passing through the head 43, hence not impacted by a human body attenuation. Thus, the relative angle α 49 may be estimated by measuring the received signal strength at a respective receiver, by comparing the signal strength of the two received RF signals, or by using both schemes.

A propagation path that includes a part inside the human head 43 has an effect on both the signal speed (the speed of light inside water is approximately ¾ the speed of light in a vacuum or air) or on the signal strength. Any RF signal in the microwave domain, such as Wi-Fi or Bluetooth signals, degrades significantly while traveling inside water (such as in the user head 43). These factors (signal travel speed and signal strength) may be used in approximating the distance, relative position, and direction of the user head 43 direction or gaze, relative to a device direction or orientation.

Where a propagation path is passing through the human head 43, which is mostly water equivalent based from RF signal attenuation point of view, the signal strength is substantially attenuated relative to an over the air propagation. Using multiple antennas and multiple measurements (for example, by using a low pass filtering), the distance, direction, and location of the digital camera 45 may be estimated.

Alternatively or in addition, the transmitted RF signals 54*a* and 54*b* along the respective propagation paths 42*a* and 42*b* may be synchronized (such as being transmitted with no phase difference), and when the length of the distinct paths 42*a* and 42*b* is different, this difference may be estimated or measured by the phase difference induced due to the different lengths traveled. Other techniques such as triangulation for estimating or measuring the relative angle α 49 by using the two RF signals may equally be used.

The relative angle α 49 may be used to estimate whether the person 43 is looking at the improved digital camera 45 so that the person 43 line of sight 44 aligns with the improved digital camera 45 relative position along the line 46, and in response to take various actions. The decision is made as part of an "Aligned ?" step 74, and may involve a pre-set threshold. In the case the (absolute) value of the estimated relative angle α 49 is below the pre-set threshold value, the person 43 line of sight 44 is determined to be aligned ('aligned') with the line 46 to the improved digital camera 45. In the case the (absolute) value of the estimated relative angle α 49 is above the pre-set threshold value, the person 43 line of sight 44 is determined not to be aligned ('non-alignment') with the line 46 to the improved digital camera 45.

The pre-set threshold may be equal to, higher than, or lower than 1°, 2°, 5°, 7°, 10°, 12°, 15°, 20°, 25°, 30°, 35°, 40°, 45°, or 50°. Alternatively or in addition, in the case where the comparison is based on comparing signal strength (such as RSSI), the difference between the signal strength may be used as aligning criterion, where the lines are determined as aligned when the difference is lower than a pre-set threshold value. For example, the pre-set threshold may be equal to, higher than, or lower than, 1 dB, 2 dB, 3 dB, 5 dB, 7 dB, 10 dB, 15 dB, 20 dB, 25 dB, 30 dB, 35 dB, or 40 dB. In one example, the phase difference between the two received RF signals is measured by the comparator 62 using a phase detector, and the pre-set threshold for the detected phase difference may be equal to, higher than, or lower than, 90°, 80°, 70°, 60°, 50°, 40°, 30°, 20°, 18°, 15°, 13°, 10°, 8°, 5°, 3°, 2°, 1°, 0.8°, 0.5°, 0.3°, 0.20, or 0.10°.

Figure 4D:
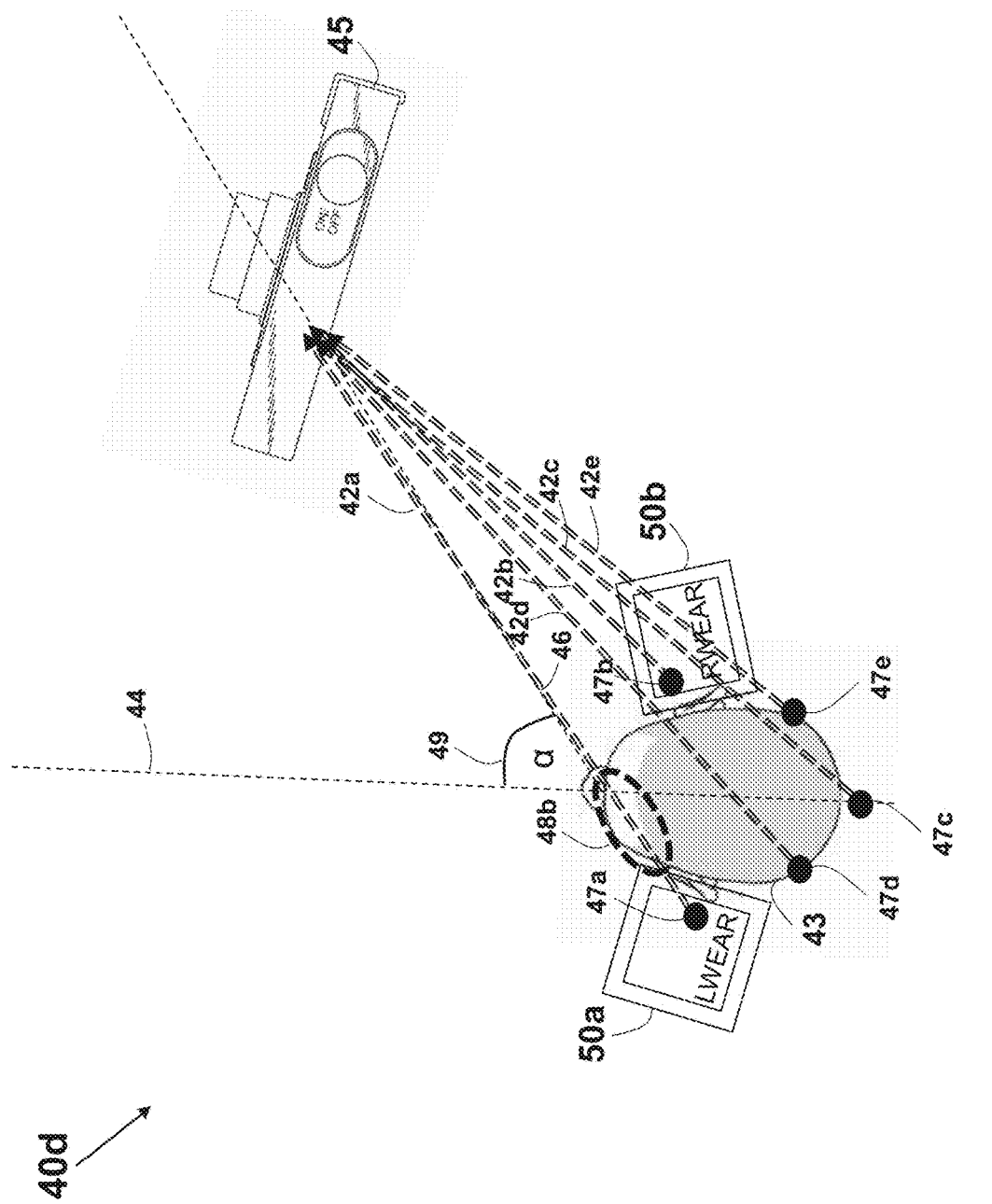
FIG. 4d depicts pictorially a top view of a person looking away from a camera device wearing five transmitting antennas.

In the arrangement 40*d* shown in FIG. 4*d*, the antennas 47*a*, 47*b*, 47*c*, 47*d*, and 47*e* transmit to the digital camera device 45 (or another object). Assuming a distance of 40 cm to the digital camera 45 from the antenna 47*b* (in centimeter), and an angle α 49 around 45°, it is assumed that no in-head 43 attenuation is affected along the propagation paths 42*b* and 42*e*, while maximum attenuation is assumed along the propagation path 42*d* from the antenna 47*d* to the digital camera 45. The estimated total distances for each of the propagation paths and the inside head and head external parts (in centimeters) are detailed in Table 1:

TABLE 1

| Path (Antenna) | Outside head (cm) | Inside head (cm) | Total distance (cm) |
| --- | --- | --- | --- |
| 42b (47b) | 40 | 0 | 40 |
| 42e (47e) | 45 | 3 | 48 |
| 42c (47c) | 46 | 8 | 54 |
| 42d (47d) | 39 | 17 | 56 |
| 42a (47a) | 38 | 16 | 54 |

When assuming angle α 49 around 25°-30°, and assuming a distance of 40 cm from the antenna 47*b* to the digital camera device 45, the estimated total distances for each of the propagation paths, and the inside head and head external parts (in centimeters) are detailed in Table 2.

TABLE 2

| Path (Antenna) | Outside head (cm) | Inside head (cm) | Total distance (cm) |
| --- | --- | --- | --- |
| 42b (47b) | 40 | 0 | 40 |
| 42e (47e) | 40 | 7 | 47 |
| 42c (47c) | 36 | 16.5 | 52.5 |
| 42d (47d) | 33 | 20 | 53 |
| 42a (47a) | 33 | 16 | 49 |

The longer the path part inside the human head 43, higher attenuation is affected. Further, a distance measurement is affected by the in-head 43 traveled part due to the reduced speed of light when travelling via water or humid medium.

In an experiment, a Plantronics® Bluetooth headset, model "Voyager Edge" was used as the wearable device (substituting the wearable devices 50*a* and 50*b*), and the digital camera device 45 was simulated by smartphone, which streams music to the headset using Bluetooth. The signal strength was measured using an RF signal meter model ED88T from Cornet® Micro systems Inc, Corresponding to Table 1 above, a distance of about 40 cm to the digital camera 45 from the antenna 47*b* (in centimeter), and an angle α 49 around 45°, and at a the plane of the antennas around the head, a signal level of 0.2 (data in mW/m$^2$) was received from the antenna 47*b*, a level of 0.07 was received from the antenna 47*e*, a level of 0.035 was received from the antenna 47*c*, a level of 0.01 was received from the antenna 47*d*, and a level of 0.01 was received from the antenna 47*a*. Possibly some of the signal is noise or reflection, especially true for last 2 readings, 47*a* & 47*d*. This noise or reflection should to be taken into account. In one example, we can assume the noise is 0.01 (signal traveling 17 cm inside water/head will degrade to practically 0.01% in 2.4 GHz), and subtract that from all readings. Using these tables with and similar tables with multiple antennas (connected or part of transceiver or receiver), a better estimation of distance, direction, or location may be obtained by using a best fit method, thus eliminating the inaccuracies and noises associated with the various (like RSSI) measurements.

In a case where no alignment is determined as part of the "Aligned ?" step 74, the user may be notified of the non-alignment as part of a "Notify User" step 76. Such notification may be by visual, auditory, or tactile stimuli produced by the user notifier 58, which may be part of the LWEAR device 50*a*, the RWEAR device 50*b*, or both, or part of the RLWEAR device 50". In a case where the improved digital camera 45 includes lens rotating functionality, the lens may rotate to the required direction of the estimated object as part of a "Rotate Lens" step 77.

In one example, the system operation is automatic (shown as a dashed line in the flow chart 70), whereby the determination of 'aligned' triggers activation (such as starting, stopping, or any other control) of the improved digital camera 45. In a case where the improved digital camera is a still camera, an image may be captured, stored, and may further be transmitted, upon such 'aligned' event determination, as part of a "Take Picture" step 79. Alternatively or in addition, in a case where the improved digital camera is a video camera, a video recording operation (such as capturing, storing, and transmitting) may start, continue, or stop in response to such 'aligned' event determination, as part of the "Take Picture" step 79. Preferably, the video recording starts or continues upon an 'aligned' state determination, and stops upon a 'non-alignment' status, so that the video recording is automatically triggered when the user 43 is looking at the improved digital camera 45, and stops upon sensing that the person 43 is looking away from the improved digital camera 45. Such mechanism allows the person 43 to control the still or video capturing simply by looking at the improved camera 45, obviating the need to push any button (such as the 'shutter' button) or take any other action for such activation or control.

The person 43 may unintentionally or briefly look at the direction of the improved digital camera 45, such as when browsing a view or an area. Such an unintentional or brief look may be identified as an 'aligned' state and mistakenly used for commanding or controlling the improved digital camera 45. In order to avoid such scenario, a timer is used for measuring the time period associated with the 'aligned' state before taking any action in response to that state. The timing of the 'aligned' status is measured by a timer as part of a "Time Elapsed ?" step 75, and is compared to a time interval threshold. The action taken in the "Take Picture" step 79 is performed only in case the 'aligned' state exists more than the time interval threshold value. If the system moves to 'non-alignment' state before the time interval timer expires, then non-action is taken and the user is notified as part of the "Notify User" step 76.

In a semi-automatic mode (I), capturing an image or recording a video as part of the "Take Picture" step 79 is further dependent upon a user command. Upon determining an 'aligned' state as part of the "Notify User" step 76, the user 43 is notified. Such notification may be by visual, auditory, or tactile stimuli produced by the user notifier 58, which may be part of the LWEAR device 50*a*, the RWEAR device 50*b*, or both, or part of the RLWEAR device 50". The user 43 may then control or command the improved digital camera 45 to take action as part of a "User Command" step 78, such as to capture an image or to start/stop video recording as part of the "Take Picture" step 79. In such a case, the system may be may be inhibited from taking pictures (or any other action) even in case of the user 43 command until the 'aligned' state is determined. The user 43 command may be received by the improved digital camera 43 device, such as pushing the 'shutter' button, or any other control by locally affecting the improved digital camera 43 device. Preferably, the user 43 commands are obtained using the user sensor 57 that may be a part of the RWEAR device 50*b*, or both, or part of the RLWEAR device 50".

The system operation shown in the flow chart 70 in FIG. 7 may be performed once, for example when triggered by a person (such as the user 43) or by sensing any external triggering. In one example, the system operation is continuous, and after taking the action as part of the "Take Picture" step 79, such as the starting or stopping video recording in a video camera of the capturing an image in a still camera, the system resumes to the "Transmit Beacons" step 71, to start over the flow chart 70, as shown by a dashed line in FIG. 7. In the case where the RF beacons (such as the transceivers 52, 52*a*, or 52*b*) are continuously operating and beaconing, the system may resume to the "Receive by Camera" step 72 and may start from this step. Alternatively or in addition, the system is periodically operated having a set cycle time, whereby after taking the action as part of the "Take Picture" step 79, the system freezes and wait for a time period as part of a "Wait" step 69 using an hardware or software based timer. The time interval of waiting in the "Wait" step 69 may be less than, or higher than, 0.1, 0.2, 0.5, 0.8, 1.0, 1.2, 1.5, 1.8, 2, 2.5, 3, 3.5, 4, 4.5, 5, 6, 7, 8, 9, or 10 seconds.

Figure 7A:
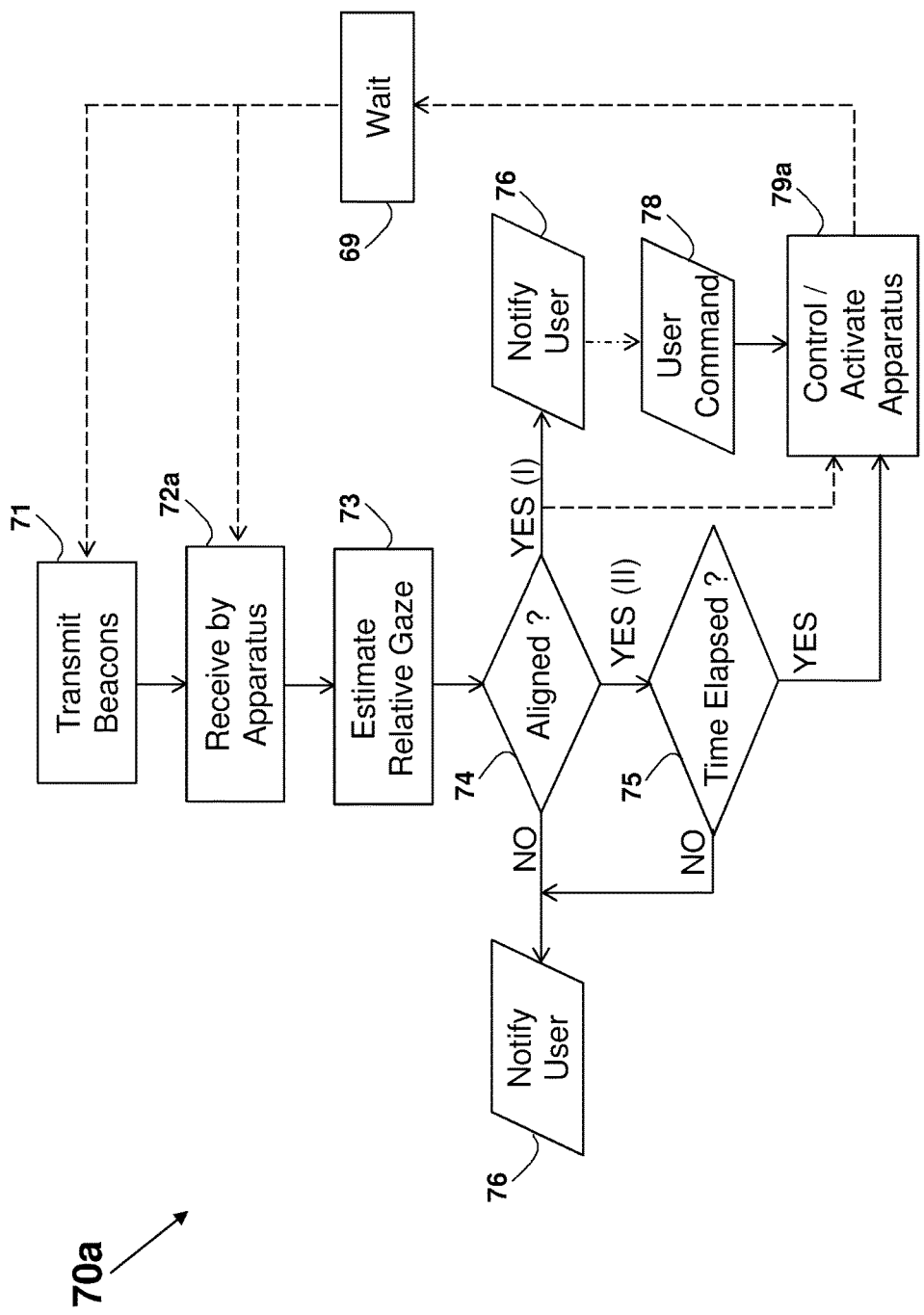
FIG. 7a illustrates schematically a simplified flow diagram of controlling an apparatus based on estimated relative angle between a person line of sight and a direction to the apparatus.
Figure 8:
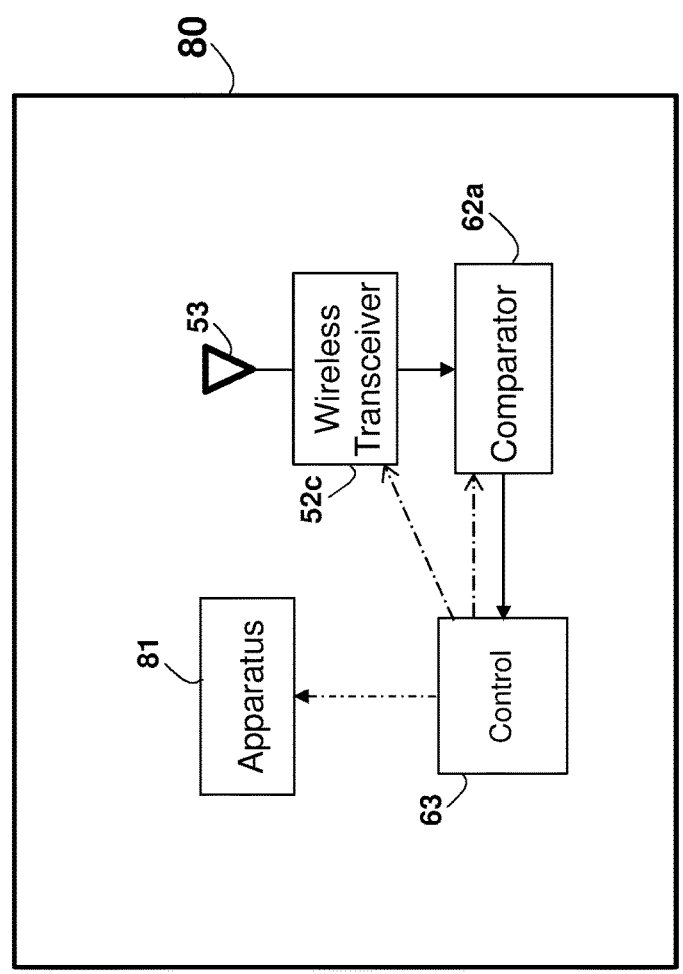
FIG. 8 illustrates a simplified schematic block diagram of a head pose controlled apparatus.

While exampled above regarding controlling, activating, or otherwise affecting, the operation of a digital camera such as the improved digital camera 45, the principles may equally apply to controlling, activating, or otherwise affecting any apparatus, as exampled in a relative angle controlled device 80 shown in FIG. 8. As an alternative or in addition to the digital camera component 10 that was part of the improved digital camera 45, the controlled or activated component in the device 80 is a general apparatus (or actuator) 81. Hence, the apparatus 81 may be controlled, activated, or otherwise affected by the estimated relative angle α 49 or otherwise by the comparison of the received two RF signals from the LWEAR device 50*a* and the RWEAR device 50*b*, or from the RLWEAR device 50". A flow chart 70*a* shown in FIG. 7*a* may be used for controlling the general apparatus (or actuator) 81. Rather than being received by the improved digital camera 45, the transmitted RF signals 54*a* and 54*b* are received by the apparatus as part of a "Receive by Apparatus" step 72*a*, and the apparatus 81 is controlled or activated as part of a "Control/Activate Apparatus" step 79*a*.

In one example, the apparatus 81 is an actuator. Any device, component, or element designed for, or capable of, directly or indirectly affecting, changing, producing, or creating a physical phenomenon under an electric signal control may be used as the actuator 81. An appropriate actuator may be adapted for a specific physical phenomenon, such as an actuator affecting temperature, humidity, pressure, audio, vibration, light, motion, sound, proximity, flow rate, electrical voltage, and electrical current. An actuator unit 81 may include one or more actuators, each affecting or generating a physical phenomenon in response to an electrical command, which can be an electrical signal (such as voltage or current), or by changing a characteristic (such as resistance or impedance) of an element. The actuators may be identical, similar or different from each other, and may affect or generate the same or different phenomena. Two or more actuators may be connected in series or in parallel.

The actuator 81 may be an analog actuator having an analog signal input such as analog voltage or current, or may have continuously variable impedance. Alternatively, on in addition, the actuator 81 may have a digital signal input. The actuator 81 may affect time-dependent or space-dependent parameters of a phenomenon. Alternatively on in addition, the actuator 81 may affect time-dependencies or a phenomenon such as the rate of change, time-integrated or time-average, duty-cycle, frequency or time period between events. The actuator 81 may be semiconductor-based, and may be based on MEMS technology.

The actuator 81 may affect the amount of a property or of a physical quantity or the magnitude relating to a physical phenomenon, body or substance. Alternatively or in addition, the actuator 81 may be used to affect the time derivative thereof, such as the rate of change of the amount, the quantity or the magnitude. In the case of space related quantity or magnitude, an actuator may affect the linear density, surface density, or volume density, relating to the amount of property per volume. Alternatively or in addition, the actuator 811 may affect the flux (or flow) of a property through a cross-section or surface boundary, the flux density, or the current. In the case of a scalar field, an actuator may affect the quantity gradient. Alternatively on in addition, the actuator 811 may affect the amount of property per unit mass or per mole of substance. A single actuator 811 may be used to affect two or more phenomena.

Figure 8A:
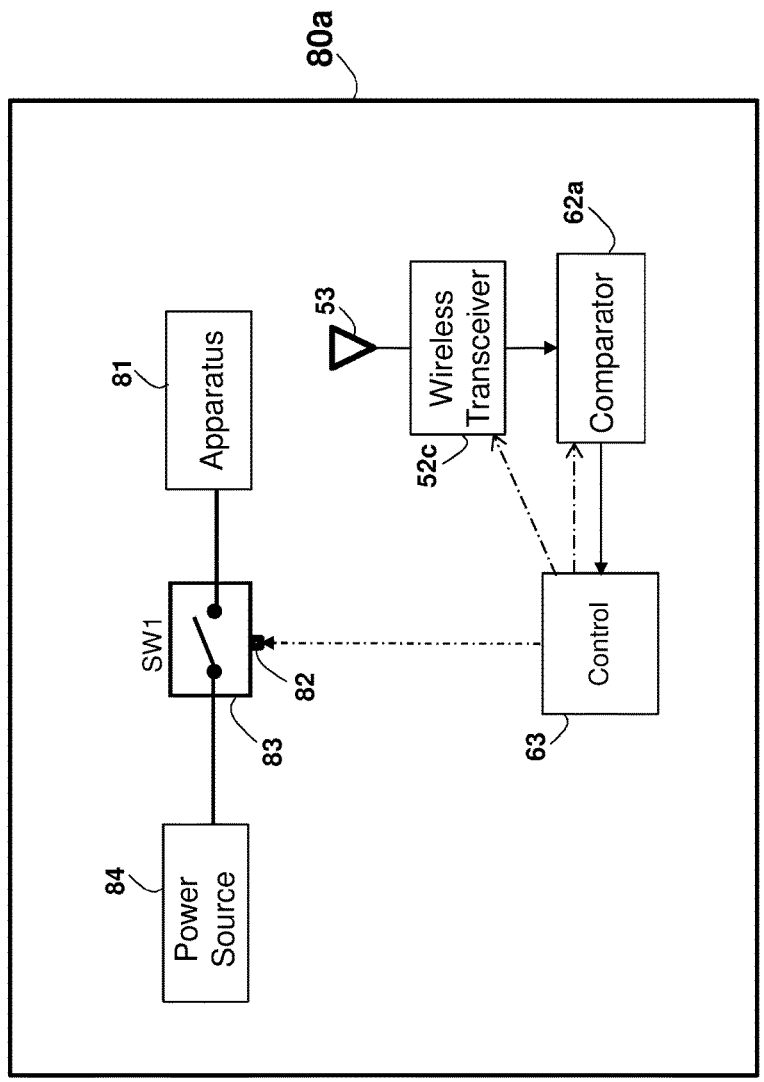
FIG. 8a illustrates a simplified schematic block diagram of a head pose controlled switch that switches power to an apparatus.

In one example, the apparatus or actuator 81 may be operative in a single operating state, and may be activated to be in the single state by powering it. In such a scheme, controlling the apparatus or actuator 81 the may consists of, may comprise, or may use a controlled switch SW1 83 as shown in an arrangement 80*a* in FIG. 8*a*. The switch 83 may be controlled to be in an 'opened' or 'closed' state, respectively disconnecting or connecting electrical power to the apparatus or actuator 81, in response to, or based on, any one (or more) measured, estimated, or calculated values. In one example, a threshold mechanism is used, so that when a value (that may represent measured, calculated, or estimated) that may relate to any distance, angle, speed, or timing herein is above a set threshold, or below the set threshold, the apparatus or actuator 81 is activated, controlled, or otherwise affected, such as by switching power to the actuator 81 via the switch 83.

The controlled switch SW1 83 may have a control port 82 (that may be a digital level or digital interface) that is controlled by a control or command signal received via a connection to the control block 63. In an apparatus or actuator 81 'off' state, a command from the control block 63 is sent over the control connection, and the controlled switch SW1 83 is controlled by the respective control signal to be in an 'open' state, thus no current is flowing from a power source 84 to the apparatus or actuator 81. The apparatus or actuator 81 may be switched to the 'on' state by the control signals controlling the switch SW1 83 control port 82 to be in a 'close' state, allowing an electrical power to flow from the power source 84 to the apparatus or actuator 81. For example, the apparatus or actuator 81 may be a lamp that may be in a not-illuminated state when no power is flowing there-through, or may illuminate as a response to a current flow. Similarly, the apparatus or actuator 81 may be an electric motor that rotates upon being powered when the switch SW1 83 is closed, or may be static when no current is flowing when the switch SW1 83 is controlled to be in the 'open' state.

The power source 84 may be a power source (or a connection to a power source) that is dedicated for powering the actuator. Alternatively or in addition, the power source 84 may be the same power source that powers the control block 63, or the all of, or part of, electrical circuits that are part of any one of the systems, devices, modules, or functionalities described herein.

In one example, the power source 84 is housed in the apparatus or device enclosure, and may be a battery. The battery may be a primary battery or cell, in which an irreversible chemical reaction generates the electricity, and thus the cell is disposable and cannot be recharged, and need to be replaced after the battery is drained. Such battery replacement may be expensive and cumbersome. Alternatively or in addition, a rechargeable (secondary) battery may be used, such as a nickel-cadmium based battery. In such a case, a battery charger is employed for charging the battery while it is in use or not in use. Various types of such battery chargers are known in the art, such as trickle chargers, pulse chargers and the like. The battery charger may be integrated with the field unit or be external to it. The battery may be a primary or a rechargeable (secondary) type, may include a single or few batteries, and may use various chemicals for the electro-chemical cells, such as lithium, alkaline and nickel-cadmium. Common batteries are manufactured in pre-defined standard output voltages (1.5, 3, 4.5, 9 Volts, for example), as well as defined standard mechanical enclosures (usually defined by letters such as "A", "AA", "B", "C" sizes), and 'coin' type. In one embodiment, the battery (or batteries) is held in a battery holder or compartment, and thus can be easily replaced.

Alternatively or in addition, the electrical power for powering the apparatus or actuator 81 (and/or the control block 63) may be provided from a power source external to the apparatus or device enclosure. In one example, the AC power (mains) grid commonly used in a building, such as in a domestic, commercial, or industrial environment, may be used. The AC power grid typically provides Alternating-Current (AC, a.k.a. Line power, AC power, grid power, and household electricity) that is 120 VAC/60 Hz in North America (or 115 VAC) and 230 VAC/50 Hz (or 220 VAC) in most of Europe. The AC power typically consists of a sine wave (or sinusoid) waveform, where the voltage relates to an RMS amplitude value (120 or 230), and having a frequency measured in Hertz, relating to the number of cycles (or oscillations) per second. Commonly single-phase infrastructure exists, and a wiring in the building commonly uses three wires, known as a line wire (also known as phase, hot, or active) that carry the alternating current, a neutral wire (also known as zero or return) which completes the electrical circuit by providing a return current path, and an earth or ground wire, typically connected to the chassis of any AC-powered equipment that serves as a safety means against electric shocks.

Figure 8B:
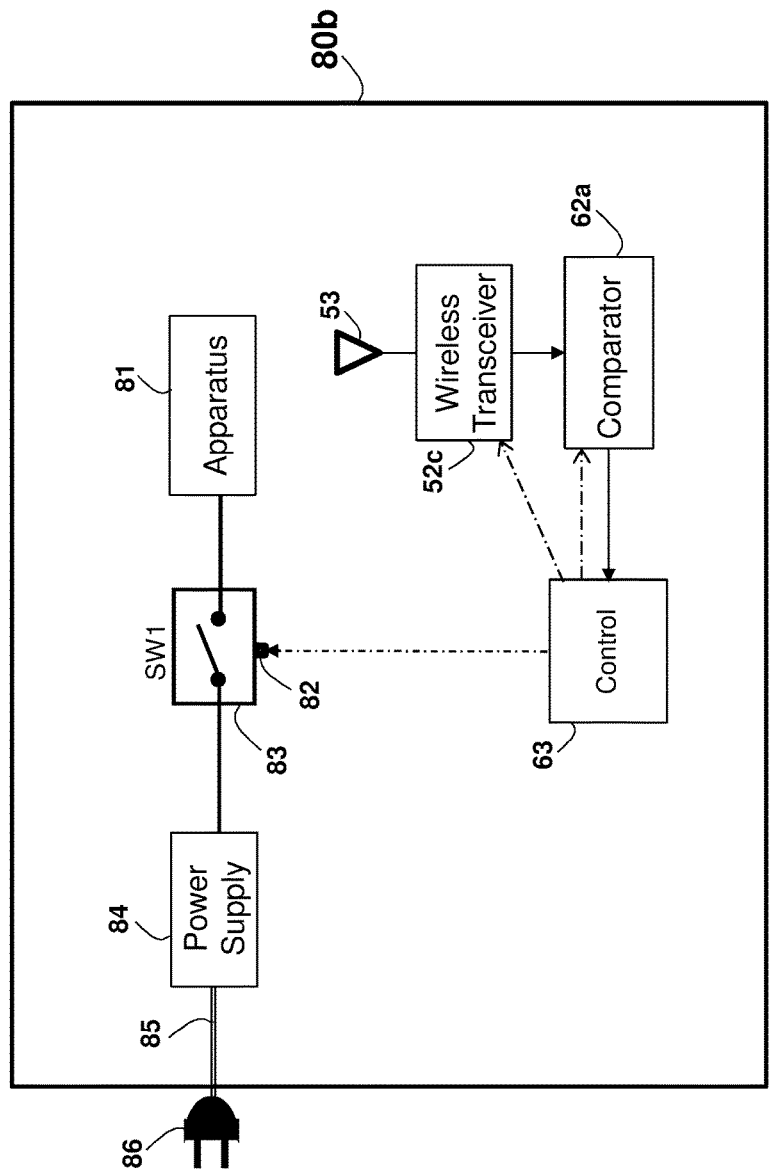
FIG. 8b illustrates a simplified schematic block diagram of a head pose controlled switch that switches AC power to an apparatus.

An example of an AC-powered arrangement 80*b* is shown in FIG. 8*b*. The connection to the AC power typically uses an AC plug 86 connected via an AC cord 85. In one example, a power supply 84 that may be an AC/DC power supply is used in order to adapt the AC power to the voltage level and type that can be used by the apparatus or actuator 81.

Alternatively or in addition, an AC-powered actuator 81 is used, which is adapted to be directly powered by the AC power from the AC power grid, and thus the need for the power supply 84 may be obviated. In such a scheme, the switch SW1 83 is an AC power switch that is capable of switching the AC power received from the AC power grid via the AC plug 86 and the AC power cord 85 to the AC-powered apparatus or actuator 81.

The apparatus or actuator 81, or any appliance or device herein, may be integrated, in part or in whole, in an appliance such as a home appliance. In such a case, the actuator of the appliance, may serve as the apparatus or actuator 81, and handled as described herein. Home appliances are electrical and mechanical devices using technology for household use, such as food handling, cleaning, clothes handling, or environmental control. Appliances are commonly used in household, institutional, commercial or industrial setting, for accomplishing routine housekeeping tasks, and are typically electrically powered. The appliance may be a major appliance, also known as "White Goods", which is commonly large, difficult to move, and generally to some extent fixed in place (usually on the floor or mounted on a wall or ceiling), and is electrically powered from the AC power (mains) grid. Non-limiting examples of major appliances are washing machines, clothes dryers, dehumidifiers, conventional ovens, stoves, refrigerators, freezers, air-conditioners, trash compactors, furnaces, dishwasher, water heaters, microwave ovens and induction cookers. The appliance may be a small appliance, also known as "Brown Goods", which is commonly a small home appliance that is portable or semi-portable, and is typically a tabletop or a coutertop type. Examples of small appliances are television sets, CD and DVD players, HiFi and home cinema systems, telephone sets and answering machines, and beverage making devices such as coffee-makers and iced-tea makers.

Some appliances main function is food storage, commonly refrigeration related appliances such as refrigerators and freezers. Other appliances main function is food preparation, such as conventional ovens (stoves) or microwave ovens, electric mixers, food processors, and electric food blenders, as well as beverage makers such as coffee-makers and iced-tea makers. Clothes cleaning appliances examples are washing/laundry machines and clothes dryers. A vacuum cleaner is an appliance used to suck up dust and dirt, usually from floors and other surfaces. Some appliances main function relates to temperature control, such as heating and cooling. Air conditioners and heaters, as well as HVAC (Heating, Ventilation and Air Conditioning) systems, are commonly used for climate control, usually for thermal comfort for occupants of buildings or other enclosures. Similarly, water heaters are used for heating water.

Any component that is designed to open (breaking, interrupting), close (making), or change one or more electrical circuits may serve as, or replace, the controlled switch SW1 83. In one example, the switch is an electromechanical device with one or more sets of electrical contacts having two or more states. The switch may be a 'normally open' type, requiring actuation for closing the contacts, may be 'normally closed' type, where actuation affects breaking the circuit, or may be a changeover switch, having both types of contacts arrangements. A changeover switch may be either a 'make-before-break' or a 'break-before-make' type. The switch contacts may have one or more poles and one or more throws. Common switch contacts arrangements include Single-Pole-Single-Throw (SPST), Single-Pole-Double-Throw (SPDT), Double-Pole-Double-Throw (DPDT), Double-Pole-Single-Throw (DPST), and Single-Pole-Changeover (SPCO). A switch may be electrically or mechanically actuated.

A relay is a non-limiting example of an electrically operated switch. A relay may be a latching relay, that has two relaxed states (bi-stable), and when the current is switched off, the relay remains in its last state. This is achieved with a solenoid operating a ratchet and cam mechanism, or by having two opposing coils with an over-center spring or permanent magnet to hold the armature and contacts in position while the coil is relaxed, or with a permanent core. A relay may be an electromagnetic relay, that typically consists of a coil of wire wrapped around a soft iron core, an iron yoke which provides a low reluctance path for magnetic flux, a movable iron armature, and one or more sets of contacts. The armature is hinged to the yoke and mechanically linked to one or more sets of moving contacts. It is held in place by a spring so that when the relay is de-energized there is an air gap in the magnetic circuit. In this condition, one of the two sets of contacts in the relay pictured is closed, and the other set is open. A reed relay is a reed switch enclosed in a solenoid, and the switch has a set of contacts inside an evacuated or inert gas-filled glass tube, which protects the contacts against atmospheric corrosion.

Alternatively or in addition, a relay may be a Solid State Relay (SSR), where a solid-state based component functioning as a relay, without having any moving parts. In one example, the SSR may be controlled by an optocoupler, such as a CPC1965Y AC Solid State Relay, available from IXYS Integrated Circuits Division (Headquartered in Milpitas, Calif., U.S.A.) which is an AC Solid State Relay (SSR) using waveguide coupling with dual power SCR outputs to produce an alternative to optocoupler and Triac circuits. The switches are robust enough to provide a blocking voltage of up to 600VP, and are tightly controlled zero-cross circuitry ensures switching of AC loads without the generation of transients. The input and output circuits are optically coupled to provide 3750 Vrms of isolation and noise immunity between control and load circuits. The CPC1965Y AC Solid State Relay is described in an IXYS Integrated Circuits Division specification DS-CPC 1965Y-R07 entitled: "*CPC*1965*YAC Solid State Relay*", which is incorporated in its entirety for all purposes as if fully set forth herein.

Alternatively or in addition, a switch may be implemented using an electrical circuit or component. For example, an open collector (or open drain) based circuit may be used. Further, an opto-isolator (a.k.a. optocoupler, photocoupler, or optical isolator) may be used to provide isolated power transfer. Further, a thyristor such as a Triode for Alternating Current (TRIAC) may be used for triggering the power. In one example, a switch such as the switch 83 may be based on, or consists of, a TRIAC Part Number BTA06 available from SGS-Thomson Microelectronics is used, described in the data sheet "*BTA06 T/D/S/A BTB06 T/D/S/A—Sensitive Gate Triacs*" published by SGS-Thomson Microelectronics march 1995, which is incorporated in its entirety for all purposes as if fully set forth herein.

In addition, the switch 83 may be based on a transistor. The transistor may be a Metal-Oxide-Semiconductor Field-Effect Transistor (MOSFET, MOS-FET, or MOS FET), commonly used for amplifying or switching electronic signals. The MOSFET transistor is a four-terminal component with source (S), gate (G), drain (D), and body (B) terminals, where the body (or substrate) of the MOSFET is often connected to the source terminal, making it a three-terminal component like other field-effect transistors. In an enhancement mode MOSFETs, a voltage drop across the oxide induces a conducting channel between the source and drain contacts via the field effect. The term "enhancement mode" refers to the increase of conductivity with an increase in oxide field that adds carriers to the channel, also referred to as the inversion layer. The channel can contain electrons (called an nMOSFET or nMOS), or holes (called a pMOSFET or pMOS), opposite in type to the substrate, so nMOS is made with a p-type substrate, and pMOS with an n-type substrate. In one example, a switch may be based on an N-channel enhancement mode standard level field-effect transistor that features very low on-state resistance. Such a transistor may be based on, or consists of, TrenchMOS transistor Part Number BUK7524-55 from Philips Semiconductors, described in the Product Specifications from Philips Semiconductors "*TrenchMOS*™ *transistor Standard level FET BUK7524-55*" Rev 1.000 dated January 1997, which is incorporated in its entirety for all purposes as if fully set forth herein.

The apparatus or actuator 81 may affect, create, or change a phenomenon associated with an object, and the object may be gas, air, liquid, or solid. The apparatus or actuator 81 may be controlled by a digital input, and may be electrical actuator powered by an electrical energy. The apparatus or actuator 81 may be operative to affect time-dependent characteristic such as a time-integrated, an average, an RMS (Root Mean Square) value, a frequency, a period, a duty-cycle, a time-integrated, or a time-derivative, of the affected or produced phenomenon. The apparatus or actuator 81 may be operative to affect or change space-dependent characteristic of the phenomenon, such as a pattern, a linear density, a surface density, a volume density, a flux density, a current, a direction, a rate of change in a direction, or a flow, of the sensed phenomenon. Further, the actuator 81 may be any actuator described in U.S. Patent Application Publication No. 2013/0201316 to Binder et al., entitled: "System and Method for Server Based Control", which is incorporated in its entirety for all purposes as if fully set forth herein.

Figure 9:
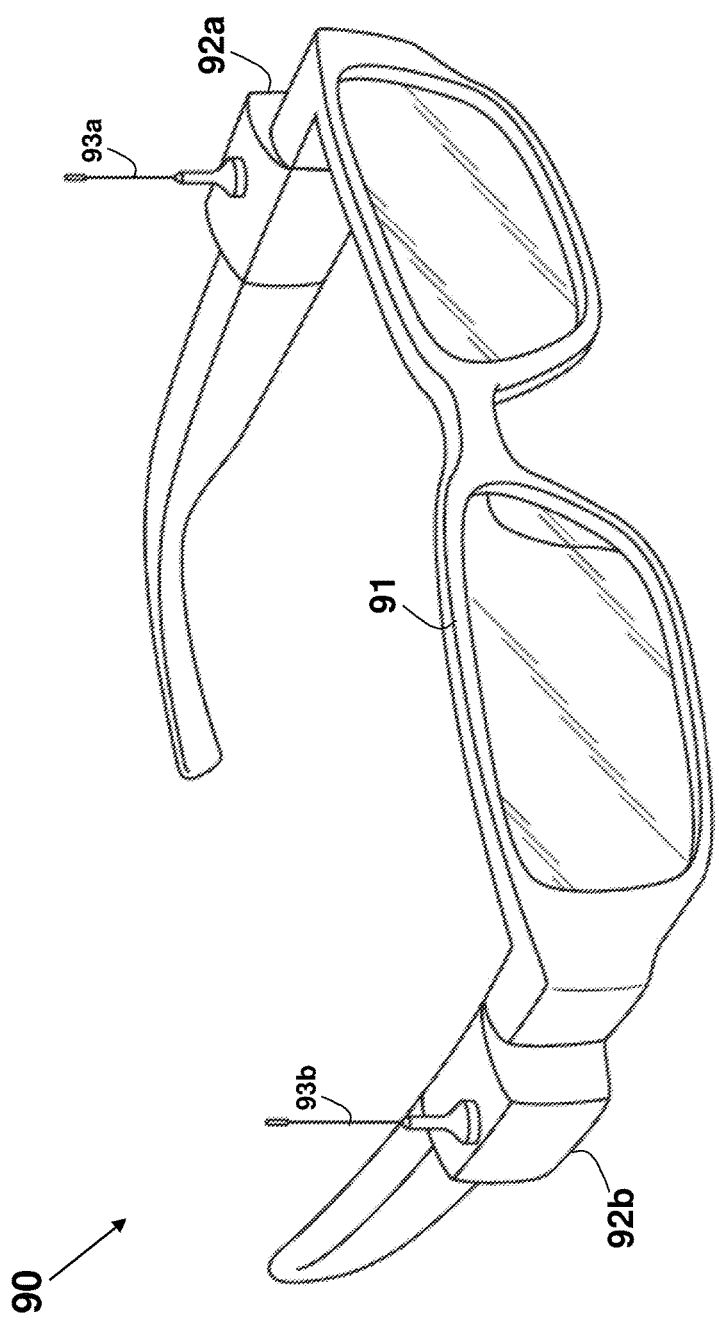
FIG. 9 depicts pictorially a perspective view of an enclosure of two RF transmitters structured as an eyewear.
Figure 9A:
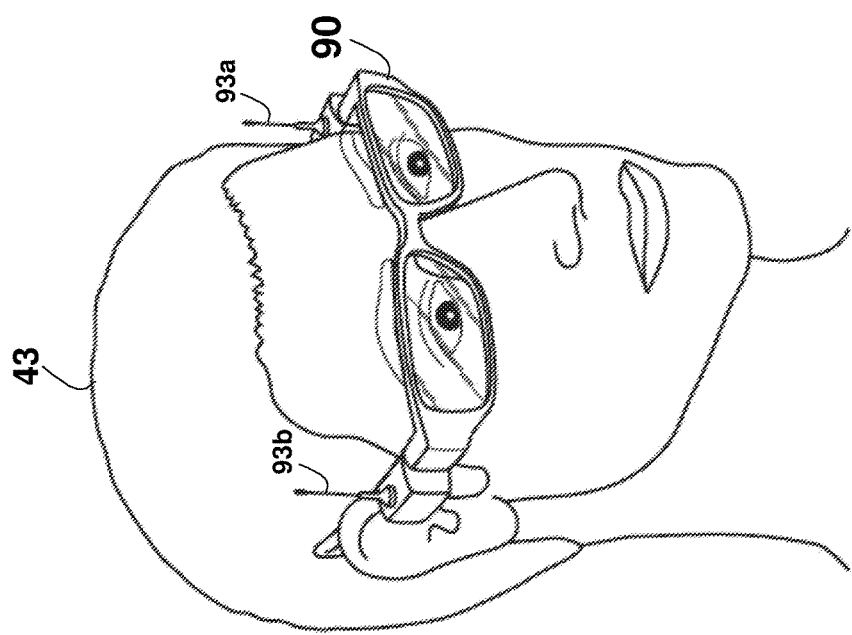
FIG. 9a depicts pictorially a perspective view of a person head wearing two RF transmitters that are part of an eyewear.
Figure 10:
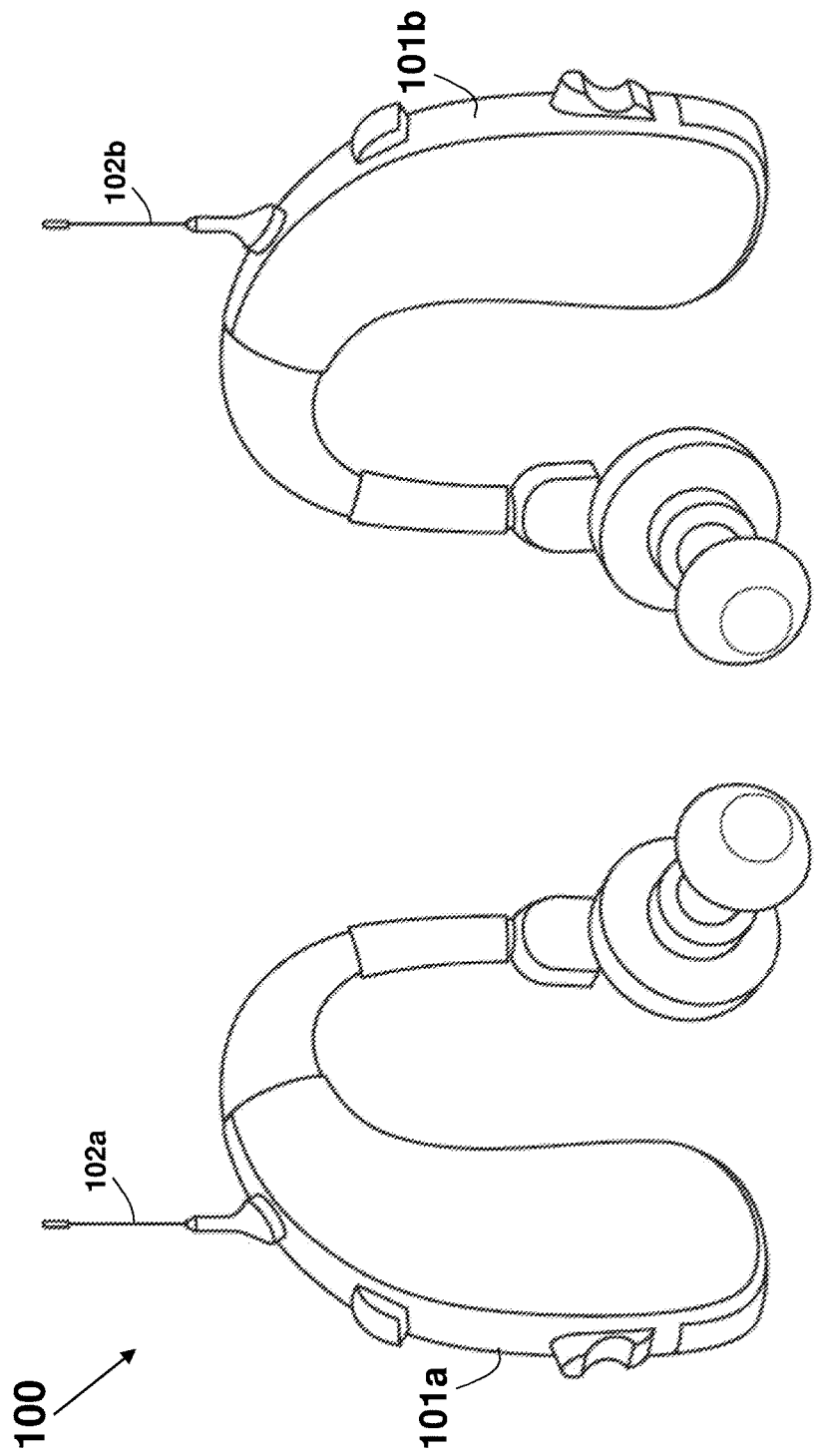
FIG. 10 depicts pictorially a perspective view of an enclosure of two RF transmitters structured as two earpieces.

An example of an eyewear 90 structured to house the LWEAR device 50*a* and the RWEAR device 50*b* is pictorially depicted in FIG. 9. The eyewear 90 comprises a frame 91, supporting an enclosure 92*b* that house the RWEAR device 50*b*, and supporting an enclosure 92*a* that house the LWEAR device 50*a*. An antenna 93*b* corresponds to the antenna 47*b* as part of the RWEAR device 50*b*, and an antenna 93*a* corresponds to the antenna 47*a* as part of the LWEAR device 50*a*. The eyewear 90 worn on the human head 43 is pictorially depicted a view 90*a* in FIG. 9*a*. An example of an earpiece set 100 structured similar to, or integrated with, hearing aids, and houses the LWEAR device 50*a* and the RWEAR device 50*b* is pictorially depicted in FIG. 10. The earpiece set 100 comprises a left ear wearable or attachable housing 101*a*, that house the LWEAR device 50*a*, and a left ear wearable or attachable housing 101*b*, that house the RWEAR device 50*a*. An antenna 102*b* corresponds to the antenna 47*b* as part of the RWEAR device 50*b*, and an antenna 102*a* corresponds to the antenna 47*a* as part of the LWEAR device 50*a*. The left earpiece 101*a* worn on the human head 43 is pictorially depicted a view 100*a* in FIG. 10*a*.

Figure 10B:
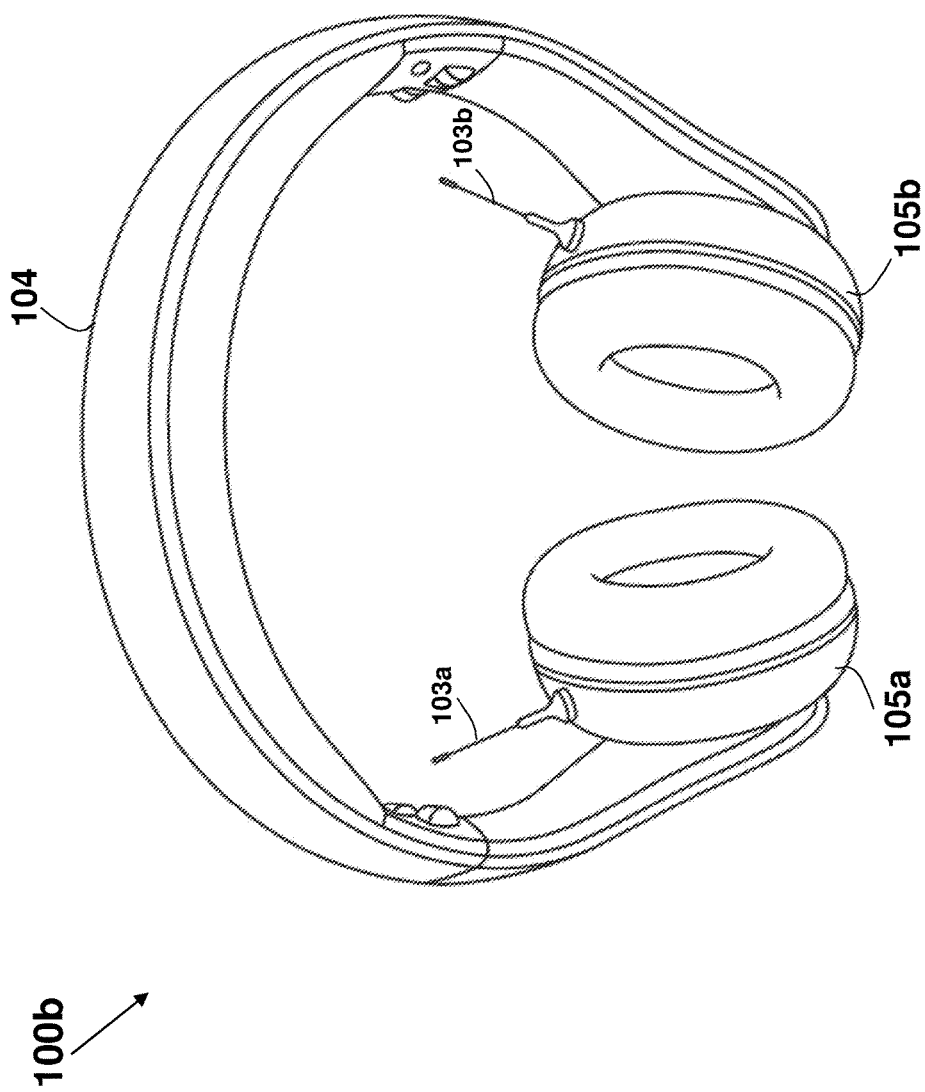
FIG. 10b depicts pictorially a perspective view of an enclosure of two RF transmitters structured as a headphone.

Another example of an earpiece 104 that is structured similar to, or integrated with, headphones, is pictorially depicted as part of a view 100*b* shown in FIG. 10*b*. An antenna 103*b* corresponds to the antenna 47*b* as part of the RWEAR device 50*b*, and an antenna 103*a* corresponds to the antenna 47*a* as part of the LWEAR device 50*a*. In one example, the XWEAR devices are separated, a left earbud 105*a* houses the LWEAR device 50*a* while a right earbud 105*b* houses the RWEAR device 50*b*. Alternatively or in addition, the headphone structured device 104 houses the RLWEAR device 50" shown in FIG. 5*b*.

Figure 10C:
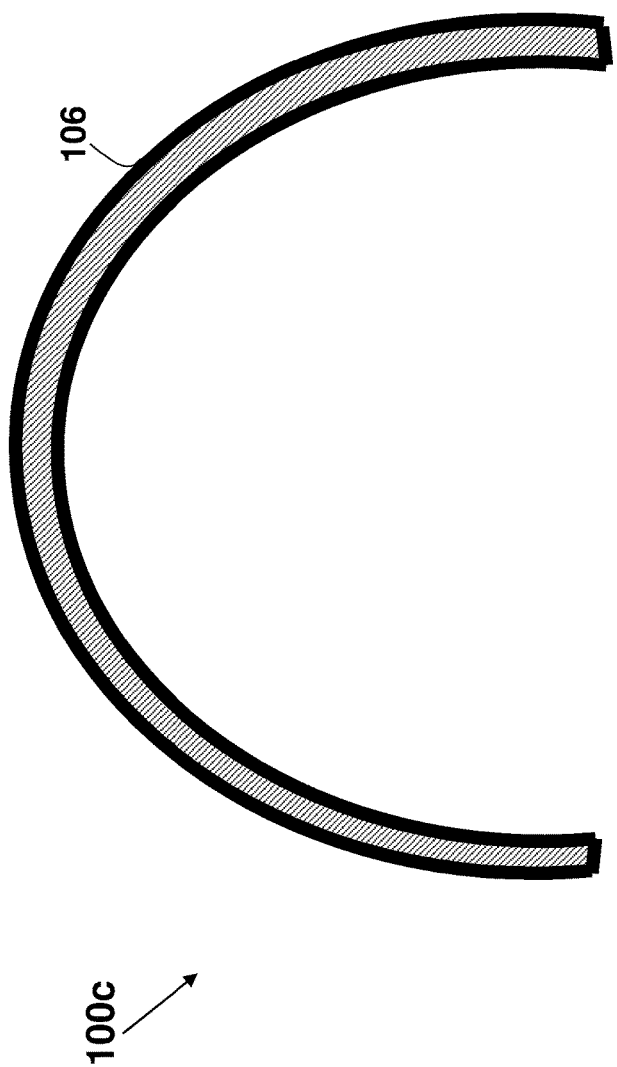
FIG. 10c depicts pictorially a top view of an enclosure of RF antennas structured as an arc-shaped headband.
Figure 10D:
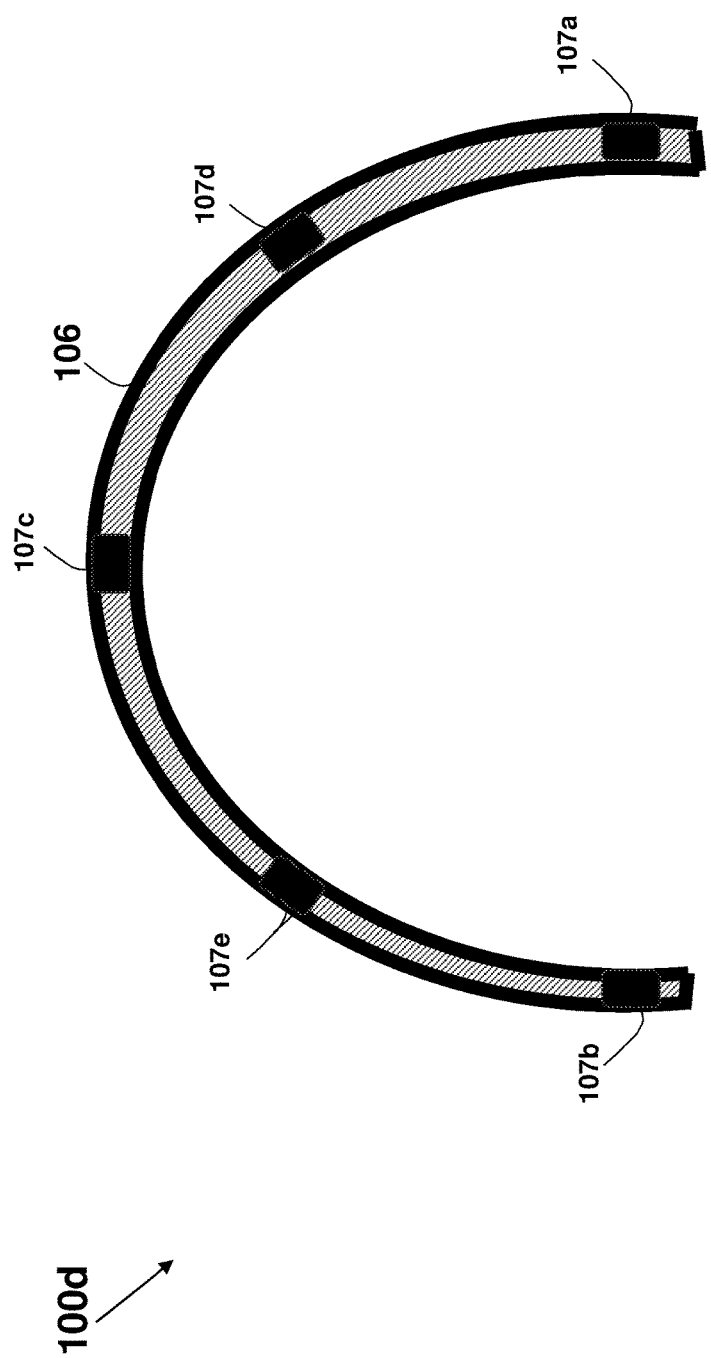
FIG. 10d depicts pictorially a top view of an enclosure of five RF antennas structured as an arc-shaped headband.
Figure 10E:
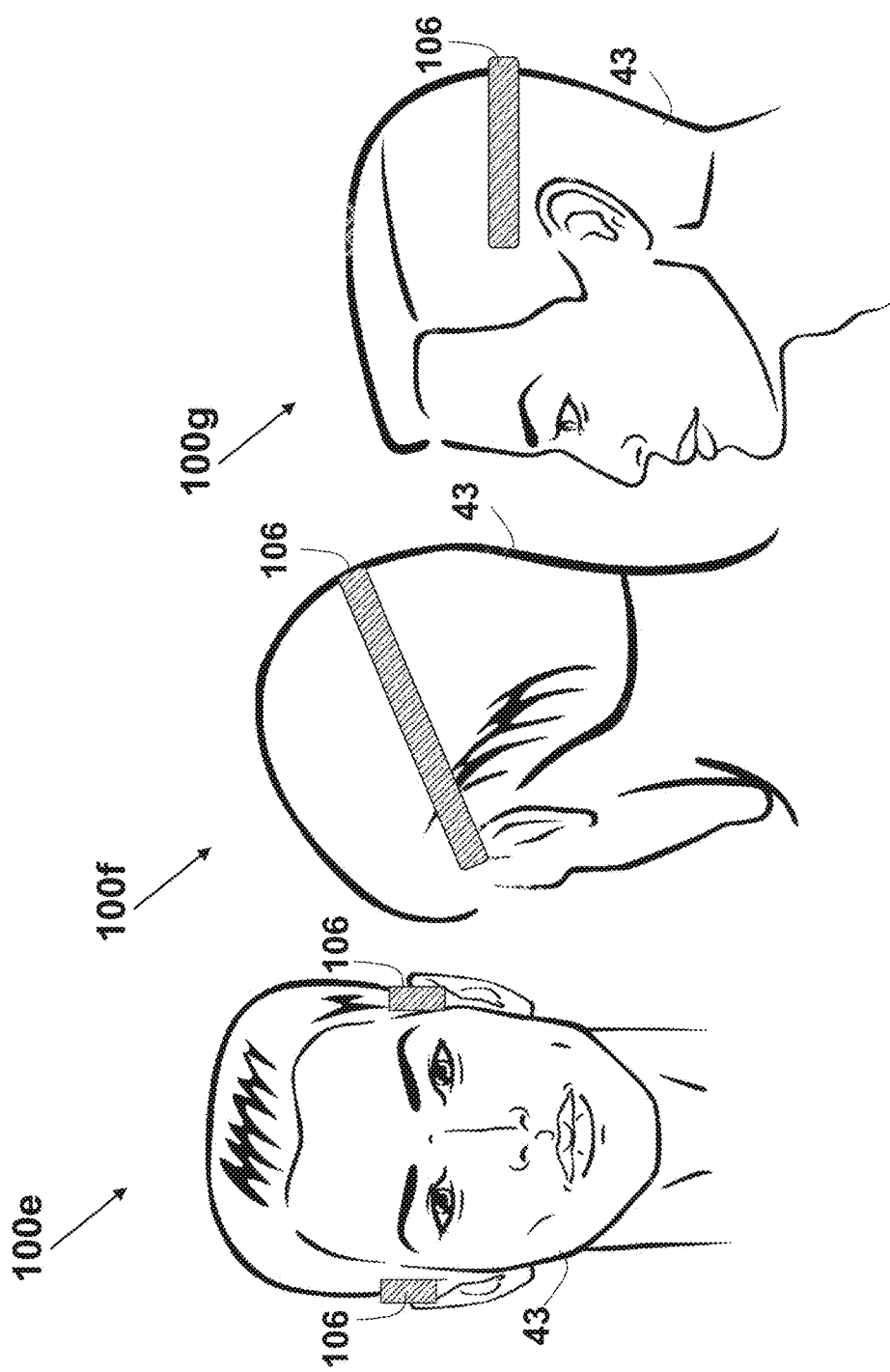
FIG. 10e depicts pictorially a front, side, and perspective rear views of a person head wearing RF transmitters structured as a arc-shaped headband.

Alternatively or in addition, the enclosure may be structured similar to, or integrated with, a flexible or rigid headband, to be worn in the hair or around the forehead or the skull. The headband may be arc, Horseshoe-shaped, or otherwise circular based. An example an arc-shaped headband 106 is pictorially depicted as part of a view 100*c* shown in FIG. 10*c*. In one example, the headband 106 may include five antennas, shown as antennas 107*a*, 107*b*, 107*c*, 107*d*, and 107*e*, which may respectively correspond to the antennas 47*a*, 47*b*, 47*c*, 47*d*, and 47*e* shown in the arrangement 40*d* in FIG. 4*d*. The headband 106 is shown worn on the head 43 in a front view 100*e* shown in FIG. 10*e*, in a side view 100*g* shown in FIG. 10*e*, and in a perspective rear view 100*f* shown in FIG. 10*e*.

Figure 12:
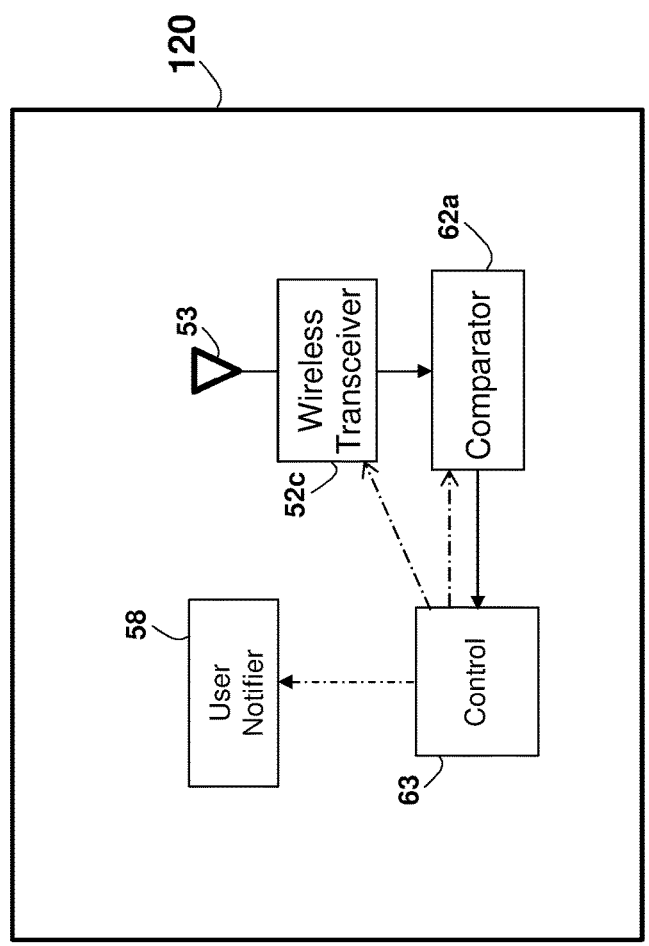
FIG. 12 illustrates a simplified schematic block diagram of a head pose alerting apparatus.

The system and method exampled above involved controlling a device based on an alignment between a person line of sight (estimated by the head pose) and the direction of the person head to the device, and the device was exampled to be a digital camera (such as in the flow chart 70 shown in FIG. 7) or a general apparatus (as described in the flow chart 70*a* shown in FIG. 7*a*). Hence, the device may be controlled in response to the person looking at it. Alternatively or in addition, the alignment estimating may be used for detecting and alerting when the person is not looking at the device. For example, a vehicle driver EOR (Eyes-Off-the-Road) state may be detected, by the driver wearing the LWEAR device 50*a* and RWEAR device 50*b* (or the combined RLWEAR device 50"), and the antenna 53 (such as of the improved camera device 45 or of any other controlled device) may be located along the required person line-of-sight, such as in front of a vehicle the driver is operating. In such a scheme, the system may be used to estimate the driver head pose relative to the front road view, and may alert the driver if the head pose is not directed as required for a pre-set time interval. In such a case, the apparatus 81 that is a part of the controlled device 80 may include, or may be substituted by, a user notifier 58*a*, that may be identical or similar to the user notifier 58, used for alerting the driver is case of EOR state, as exampled by a controlled device 120 shown in FIG. 12. The apparatus or device 120 may consists of, may be part of, may be attachable to, or otherwise mounted on, a vehicle or any part thereof.

Figure 11:
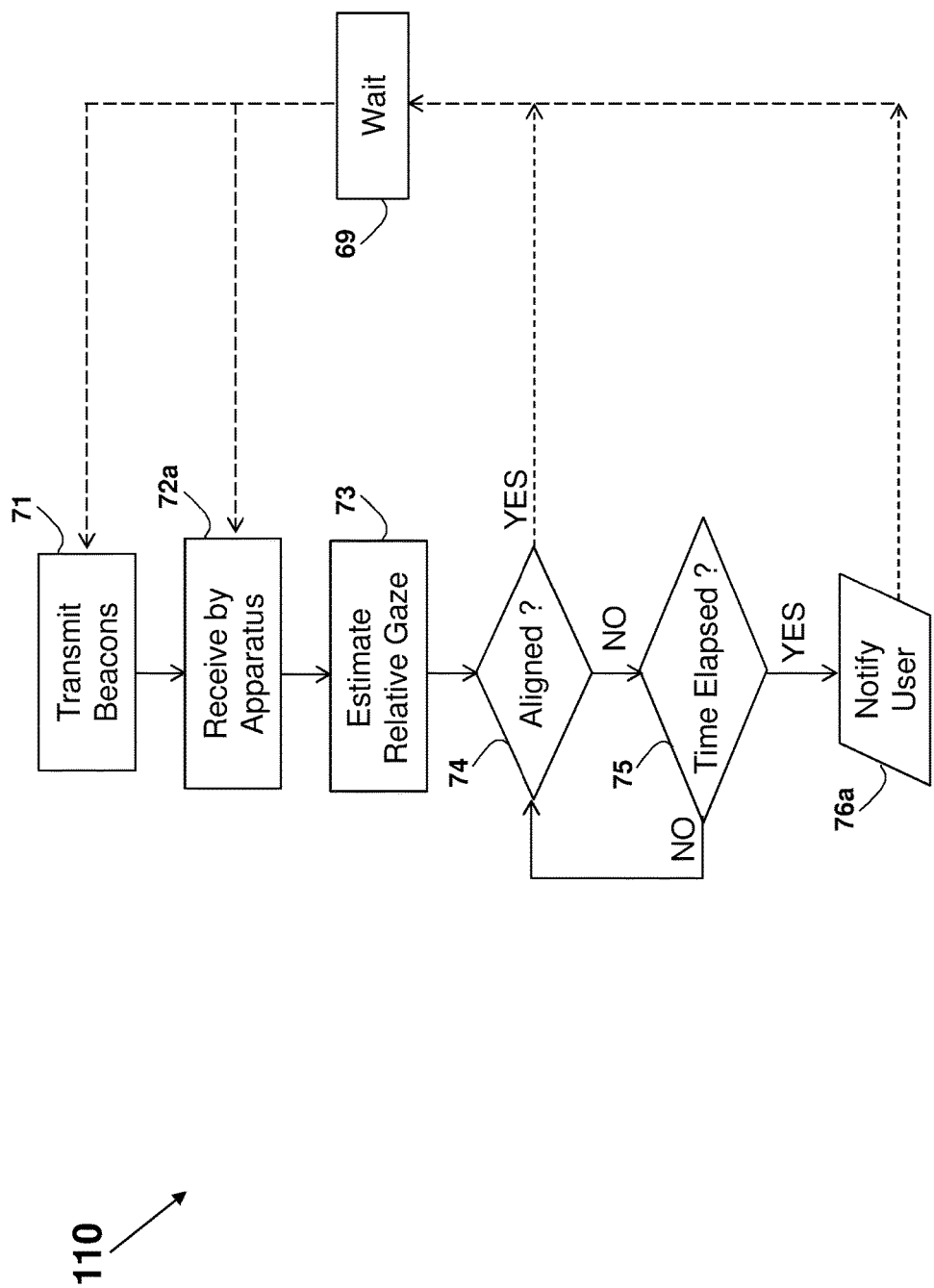
FIG. 11 illustrates schematically a simplified flow diagram of controlling an apparatus based on non-alignment between a person line of sight and a direction to the apparatus.

A flow chart 110 shown in FIG. 11 may be used in order to detect a head pose that is not directed to a required direction, set by the location of the antenna 53 in the controlled device 120. Similar to the flow chart 70 shown in FIG. 7, the head pose direction relative to the direction to the device 120 is estimated as part of the "Estimate Relative Gaze" step 73, and the estimated relative angle may be considered as aligned by applying a criterion (such as a threshold) as part of the "Aligned ?" step 74. In the case of alignment according to the pre-set criterion, then proper operation is assumed, such as the driver is indeed looking at the road and no EOR state is present, and the system may rest, or may resume operation immediately or after a set time interval as part of the "Wait" step 69.

As long as the driver EOR state is brief, this may be part of normal and safe vehicle driving, and no action needs to be taken. However, a long EOR state affect the driving safety. Thus, as part of the "Time Elapsed ?" step 75 the duration of the EOR state is measured versus a timing criterion. In a case where the EOR state is too long and exceeds the pre-set criterion, such as being in the EOR state more than 3 seconds, the driver is notified as part of a "Notify User" step 76*a*, that may be identical or similar to the "Notify User" step 76 in the flow chart 70. In addition to activating or affecting the user notifier 58 that is part of the XWEAR device 50, the user notifier 58 that is part of the apparatus or device 120 may be operated or activated as part of the "Notify User" step 76a. As part of the "Notify User" step 76a, output may be provided to other systems or apparatuses, such as to systems that control a vehicle speed or direction. For example, the output may be used to re-direct the vehicle to a correct lane when departing from one, in case the driver is detected as not looking ahead. The vehicle systems may include motion detection such as driver assistance systems that may be similar to Mobileye system available from Mobileye headquartered in the Netherlands and having R&D center in Jerusalem, Israel.

Figure 13:
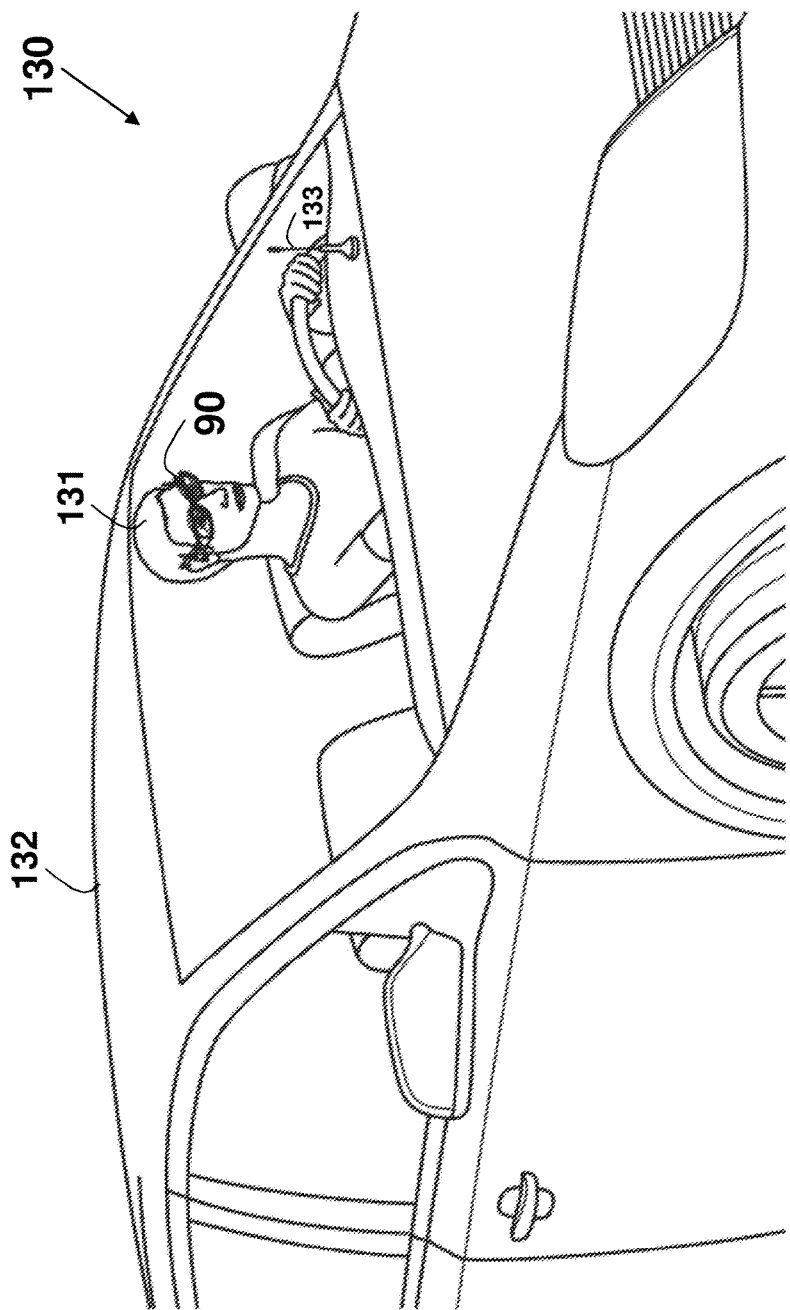
FIG. 13 depicts pictorially a passenger car and a driver looking at the road, and two RF transmitters that are part of an eyewear worn by the driver.
Figure 13A:
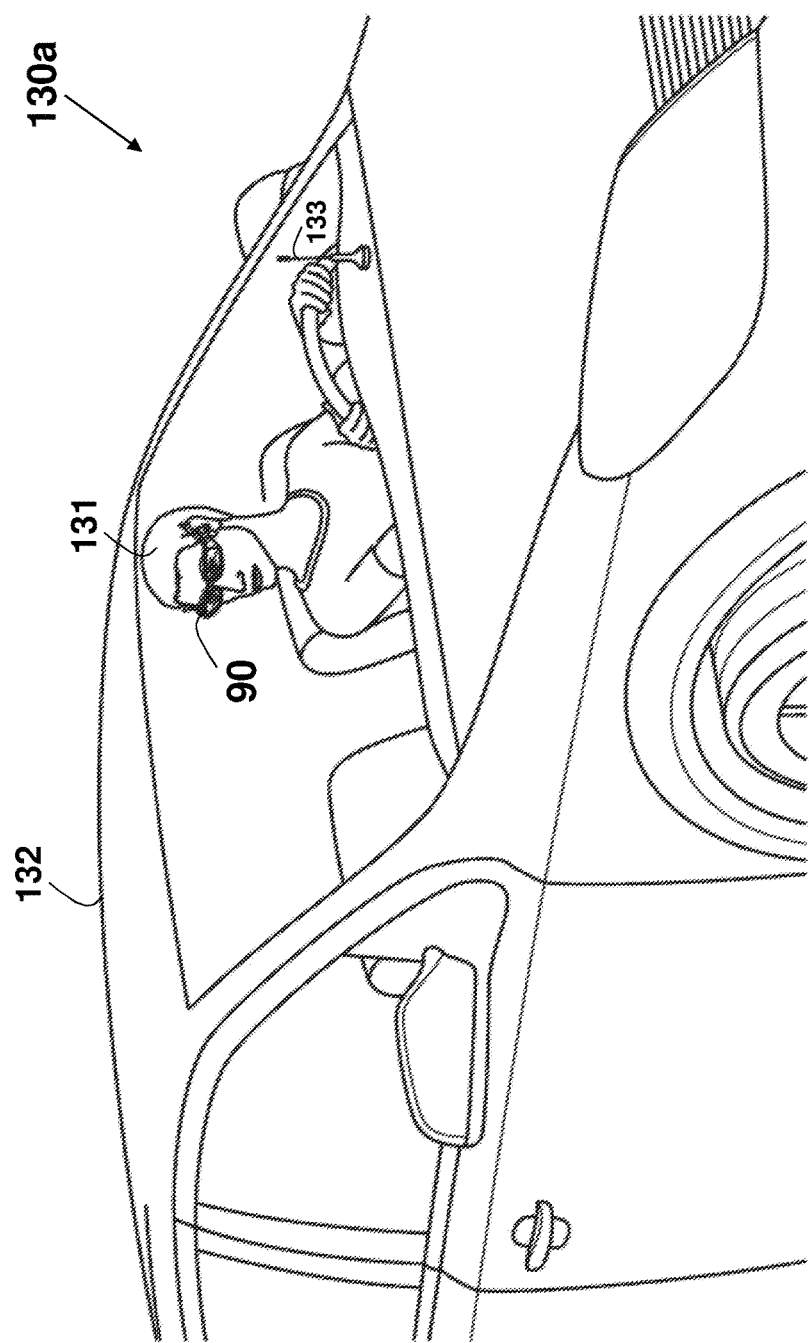
FIG. 13a depicts pictorially a passenger car and a driver looking away from the road (EOR), and two RF transmitters that are part of an eyewear worn by the driver.

An example of detecting EOR is pictorially illustrated in a view 130 shown in FIG. 13. A driver 131 wearing the eyewear 90 is driving a passenger car 132. On the dashboard, in front of the driver 131 position, an antenna 133 is located, which may correspond to the antenna 53 of the device or apparatus 120 or 80. In the view 130, the driver 131 is looking to the front, and the driver 131 head pose may be detected (versus the antenna 133 location) using any of the schemes or systems described herein. A pictorially illustrated view 130a shown in FIG. 13a illustrates an EOR state, where the driver is looking to his right direction. Such head-pose related EOR state may be detected or estimated, and acted upon, using any of the schemes or systems described herein.

A person that is interested in capturing an image of an object by using a digital camera, typically needs to look at the optical or screen-based viewfinder to ensure that indeed the object that is to be captured is indeed in the digital camera Field-of-View (FOV). Such an action is not intuitive, and requires the person attention and action. The user experience is enhanced by enabling capturing of an object by a digital camera merely by directly looking at it.

Figure 14:
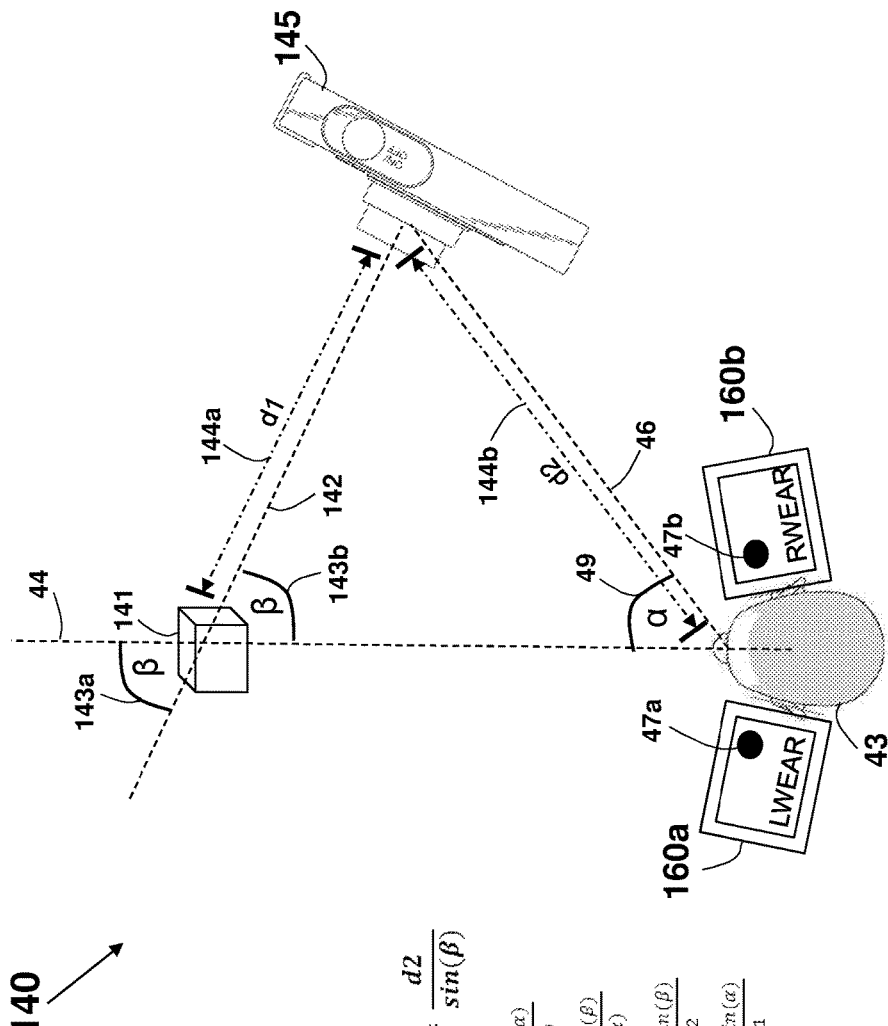
FIG. 14 depicts pictorially a top view of a triangle arrangement having a person head, a digital camera, and an object as the triangle vertices.

An arrangement 140 shown in FIG. 14 depicts the geometrical relations between the person 43, an improved digital camera 145, and an object 141 (exampled as a cube) to be captured. A LWEAR device 160a is a wearable device worn on the left side of the person head 43, and a RWEAR device 160b is a wearable device worn on the right side of the person head 43. The head pose is in the direction illustrated by the dashed line 44, and the direction to the digital camera 145 is illustrated by the dashed line 46. The relative angle α 49 is formed between the head 43 pose direction 44, assumed to be the person eye gaze direction (person 43 line-of-sight), and the direction 46 to the digital camera 145. The distance between the person head 43 and the digital camera 145 along the line 46 is designated as d2 144b. In a case where the digital camera 145 optical axis 142 (which is the center FOV and corresponds to the optical axis 8) is directed to the object 141, the distance between the digital camera 145 and the object 141 along the line 142 is designated as d1 144a. An angle β 143a (equal to a vertex angle β 143b) is spatially formed between the person line of sight 44 and the digital camera 145 optical axis 142. As shown in the arrangement 140, a triangle is formed having the three vertices of the person head 43, the digital camera 145, and the object 141. According to the law of sines (sine formula), the relation between the distances and angles in a triangle is according to $d1/\sin(\alpha)=d2/\sin(\beta)$.

Figure 14A:
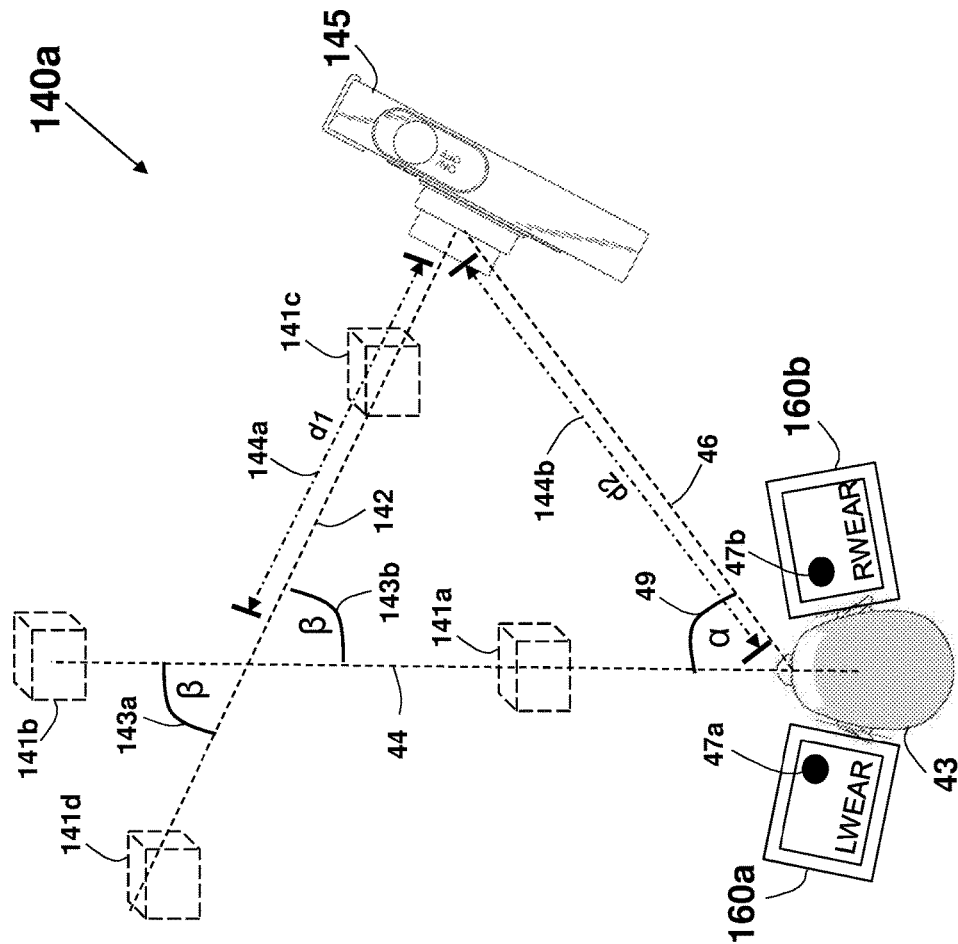
FIG. 14a depicts pictorially a top view of a non-triangle arrangement having a person head, a digital camera, and an object as vertices.

In a case where the object 141 is not located in the intersection of the head 43 pose direction 44 and the digital camera 145 line of sight 142, no triangle is formed, and the relation of $d1/\sin(\alpha)=d2/\sin(\beta)$ does not apply, so that $d1/\sin(\alpha)\neq d2/\sin(\beta)$. For example, as illustrated in an arrangement 140a shown in FIG. 14a, if the object 141 is located in a point 141a or 141b along the head 43 line of sight 44 but not along the digital camera 145 FOV center 142, no triangle is formed with the object 141. Similarly, if the object 141 is located in a point 141c or 141d along the digital camera 145 FOV center 142 but not along the head 43 line of sight 44, no triangle is formed with the object 141. Hence, by checking if the estimated or measured distances and angles conform (substantially or in full) to the relation $d1/\sin(\alpha)=d2/\sin(\beta)$, then it may be assumed that the same object 141 is looked at by both the head 43 and the digital camera 145. It is noted that a human FOV angle width (like other animals) is about 80°, and the cone of visual attention is assumed to be about 55°. Similarly, the digital camera 145 FOV angle width is commonly about 80°. As such, an accurate matching point may not be required for taking photos that may suffice the user.

Figure 14C:
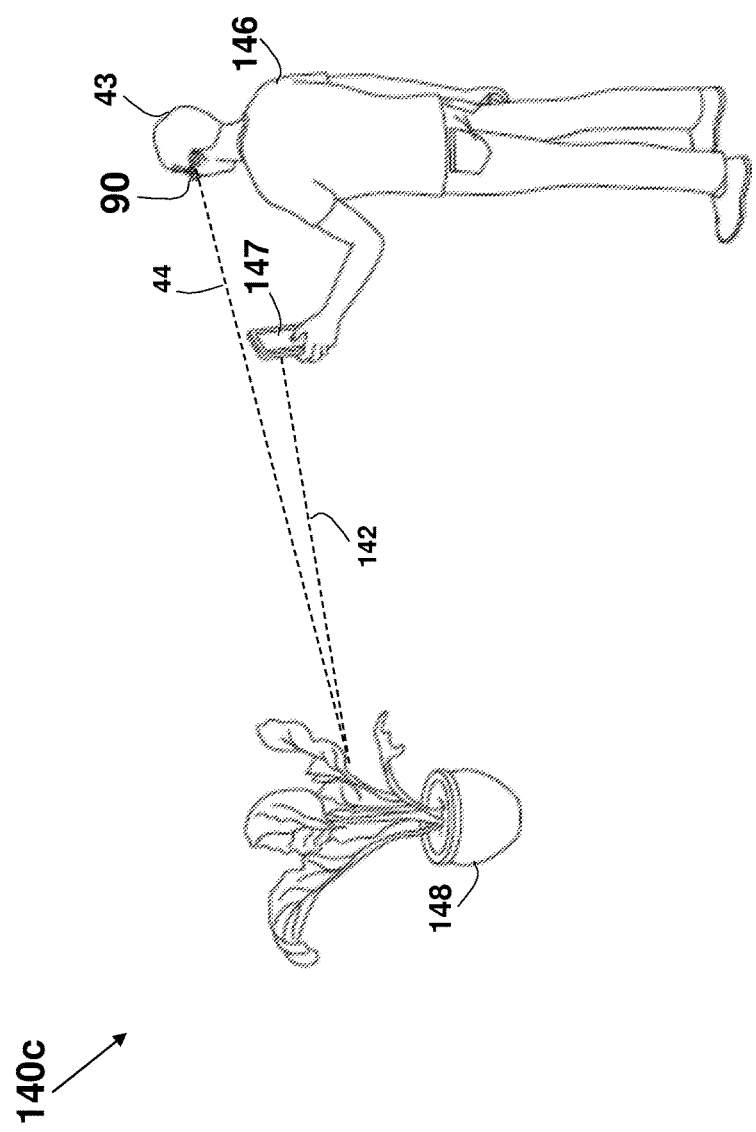
FIG. 14c depicts pictorially a perspective side view of a person and a smartphone looking at a plant.
Figure 14D:
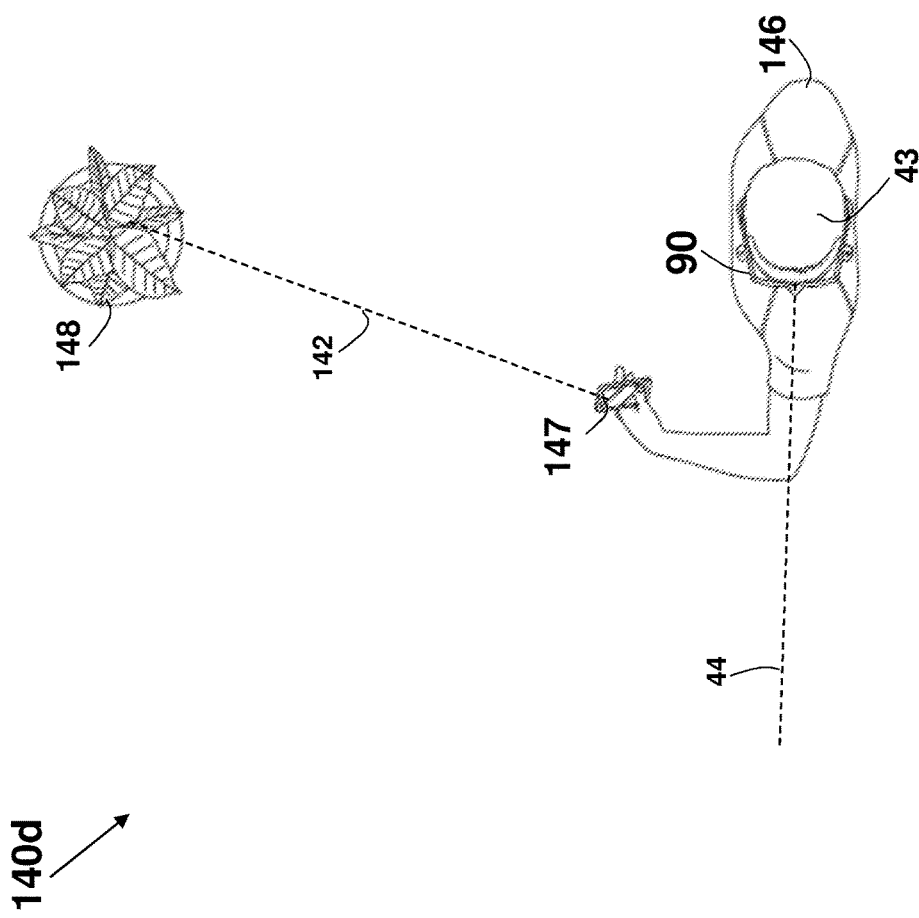
FIG. 14d depicts pictorially a top view of a smartphone looking at a plant and a person looking away from the plant.
Figure 14E:
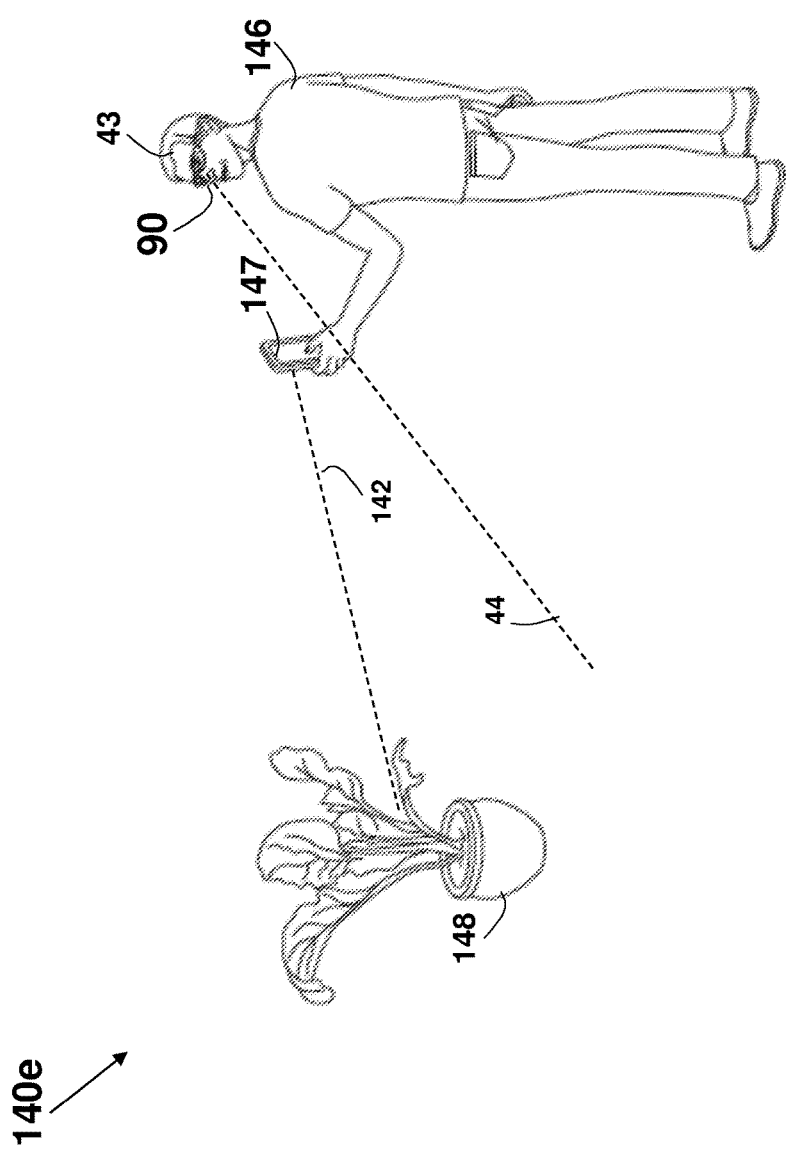
FIG. 14e depicts pictorially a perspective side view of a smartphone looking at a plant and a person looking away from the plant.
Figure 14F:
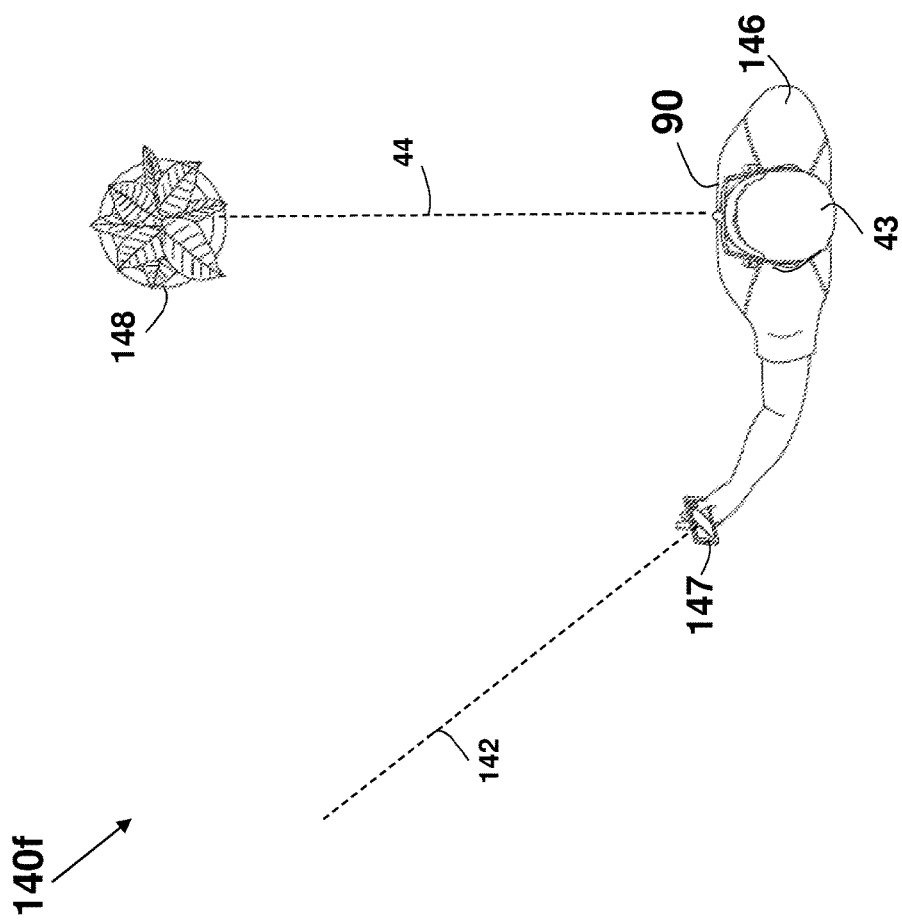
FIG. 14f depicts pictorially a top view of a person looking at a plant and a smartphone looking away from the plant.
Figure 14G:
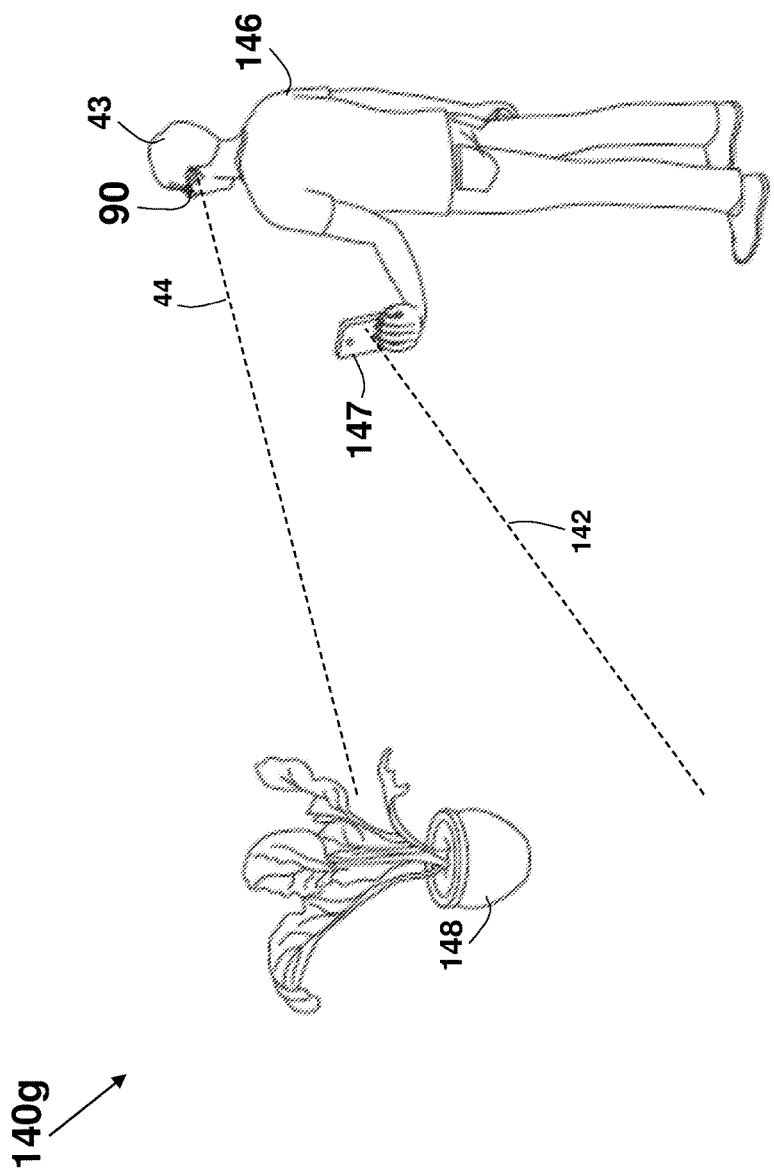
FIG. 14g depicts pictorially a perspective side view of a person looking at a plant and a smartphone looking away from the plant.

A top view 140b of an example of a person 146 wearing the eyewear 90 that embed two RF transmitters looking at a plant 148 is pictorially illustrated in FIG. 14b, and a perspective side view 140c is pictorially illustrated in FIG. 14c. The person 146 holds a smartphone 147, which may embed, comprises, or consist of, the improved digital camera 145, directed to capture the plant 148 along the optical axis 142. The head 43 pose of the person 146 is also directed along the line of sight 44 to the plant 148, which may be an example of the item 141. In is preferred that such scheme may be detected, enabling the smartphone 147 to capture the image of the plant 148, which is the object looked at by the person 146. A scheme where the lines of sights of the person 146 and the smartphone 147 are not aligned is pictorially shown in a top view 140d shown in FIG. 14d, and in a perspective side view 140e is pictorially illustrated in FIG. 14e. While the smartphone 147 is directed to capture the plant 148, the person 146 head pose direction 44 is towards the left side, and away from the plant 148. Similarly, another scheme where the lines of sights of the person 146 and the smartphone 147 are not aligned is pictorially shown in a top view 140f shown in FIG. 14f, and in a perspective side view 140g is pictorially illustrated in FIG. 14g. While the person 146 head pose direction 44 is directed towards the plant 148, the smartphone 147 direction 142 is towards the left side of the person 146 line of sight 44, and away from the plant 148. Preferably, in the case where the lines of sights of the person 146 and the smartphone 147 are not aligned towards the plant 148, the person 146 is notified and no image is captured by the smartphone 147.

Figure 15:
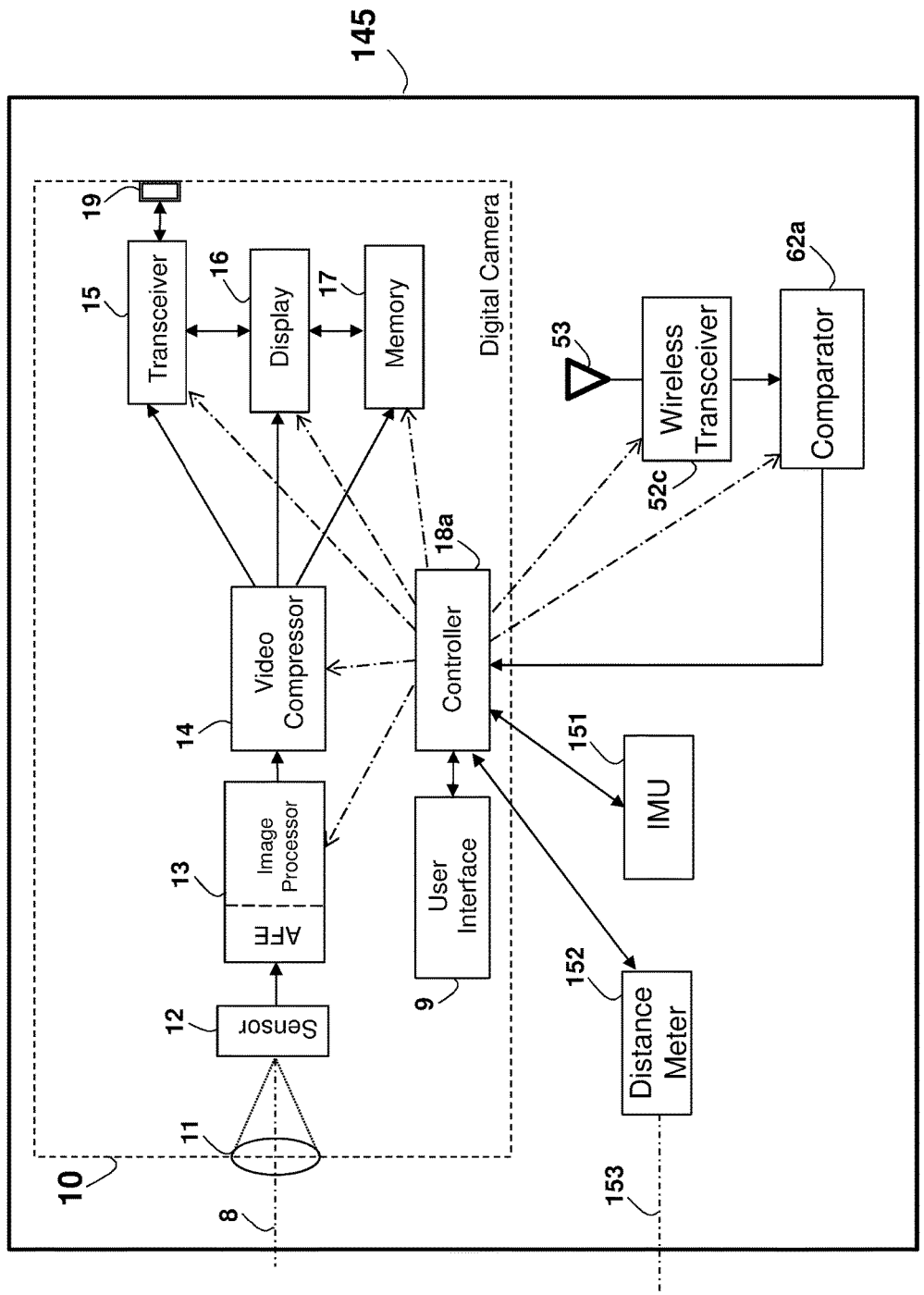
FIG. 15 illustrates a simplified schematic block diagram of a head pose controlled digital camera using an IMU and a distance meter.

An example of a block diagram of the improved digital camera 145 is shown in FIG. 15, based on the improved digital camera 45a shown in FIG. 6a. The improved digital camera 145 further comprises an IMU 151 for estimating or measuring the spatial horizontal, vertical (or both) direction, or the 3D direction, and a distance meter 152 for measuring a distance along the line-of-sight 153. Preferably, the line of sight 153 of the distance meter 152 is parallel (or substantially parallel), and is in close proximity, to the digital camera 10 optical axis 8, so that the distance meter 152 measures the distance d1 144a to the object 141 along the line of sight 142.

Figure 16:
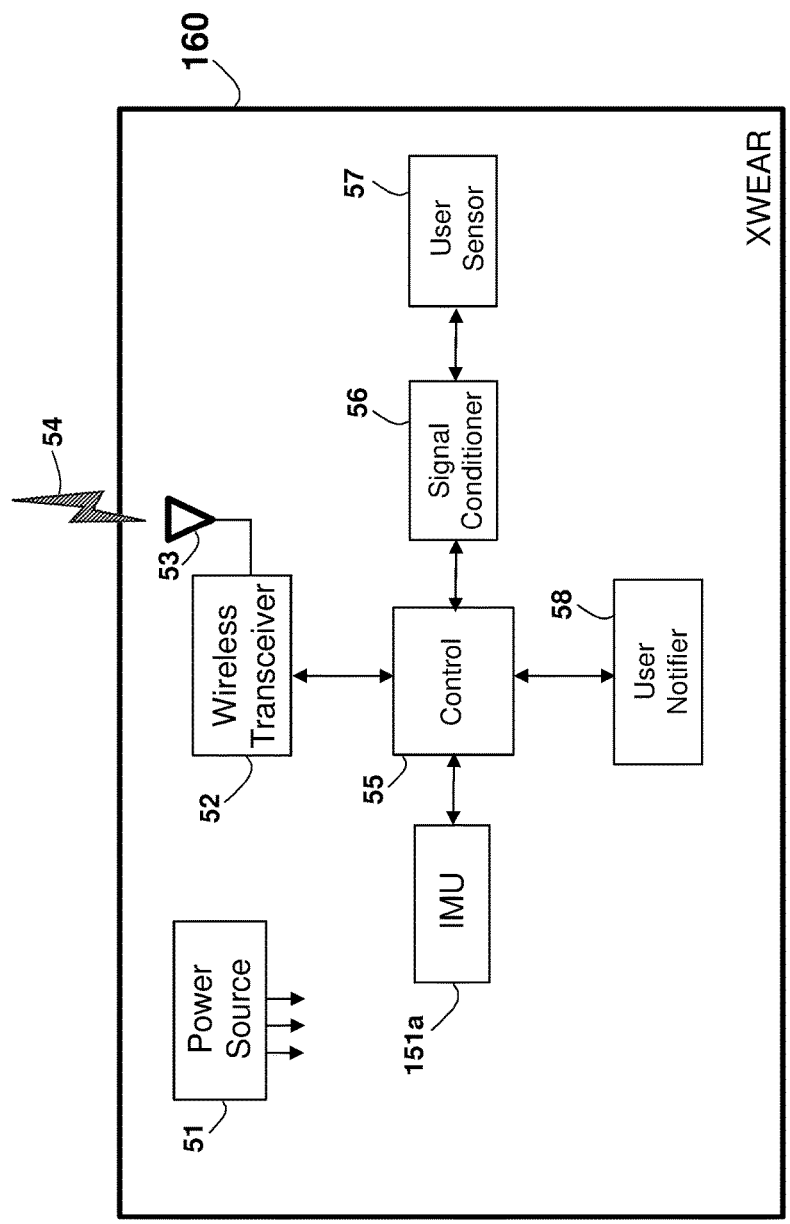
FIG. 16 illustrates a simplified schematic block diagram of a wearable device having an RF transmitter and an IMU.
Figure 16A:
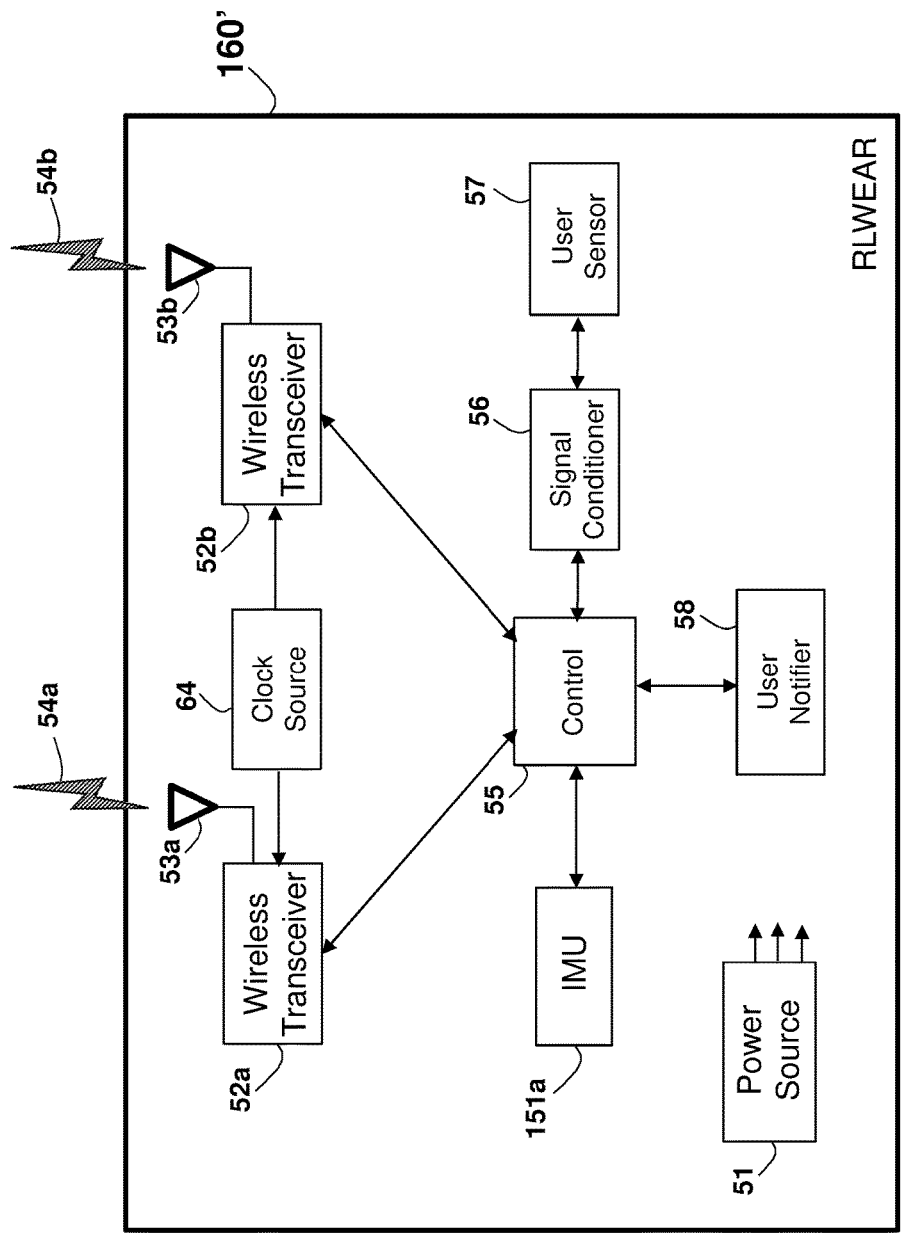
FIG. 16a illustrates a simplified schematic block diagram of a wearable device having two RF transmitters and an IMU.

The LWEAR device 160a, the RWEAR device 160b, or both, may be implemented according to the XWEAR block diagram 160 shown in FIG. 16, based on the XWEAR block diagram 50 shown in FIG. 5. The XWEAR device 160 further comprises an IMU 151a for estimating or measuring the spatial horizontal, vertical (or both), or 3D direction of the LWEAR device 160a, of the RWEAR device 160b, or both, and thus may provide measurement or estimation of the head 43 pose direction 44. Similarly, a combined RLWEAR device 160' may be used, based on the RLWEAR block diagram 50" shown in FIG. 5b, that comprises an IMU

151a for estimating or measuring the spatial horizontal or vertical (or both) direction (or 3D direction) of the device.

Any distance meter may be used as the distance meter 152. In one example, the distance meter 152 may be a non-contact distance meter that may comprise an emitter for emitting a signal substantially along the line 153, a sensor for receiving a reflected signal from the object 141 surface, and a correlator coupled for measuring a correlation between the signal emitted by the emitter and the reflected signal received by the sensor. The distance meter 152 may be an optical-based non-contact distance meter that may comprise a light emitter for emitting a light signal substantially along the line 153, a photosensor for receiving a reflected light signal from the surface of object 141, and a correlator for measuring a correlation between the light signal emitted by the light emitter and the reflected light signal received by the photosensor. Alternatively or in addition, the distance meter 152 may be an acoustics-based non-contact distance meter that may comprise a sound emitter for emitting a sound signal substantially along the line 153, a sound sensor for receiving a reflected sound signal from the object 141 surface, and a correlator for measuring a correlation between the sound signal emitted by the sound emitter and the reflected sound signal received by the sound sensor. Alternatively or in addition, the first distance meter 152 may be a radar-based non-contact distance meter that may comprise an antenna for radiating a millimeter wave or microwave signal substantially along the line 153 and for receiving a reflected millimeter wave or microwave signal from the object 141 surface, and a correlator for measuring a correlation between the millimeter wave or microwave signal radiated by the antenna and the reflected millimeter wave or microwave signal received by the antenna. Alternatively or in addition, the distance may be estimated based on, or using, or integrated with, the device 145 lens focusing system.

Figure 17:
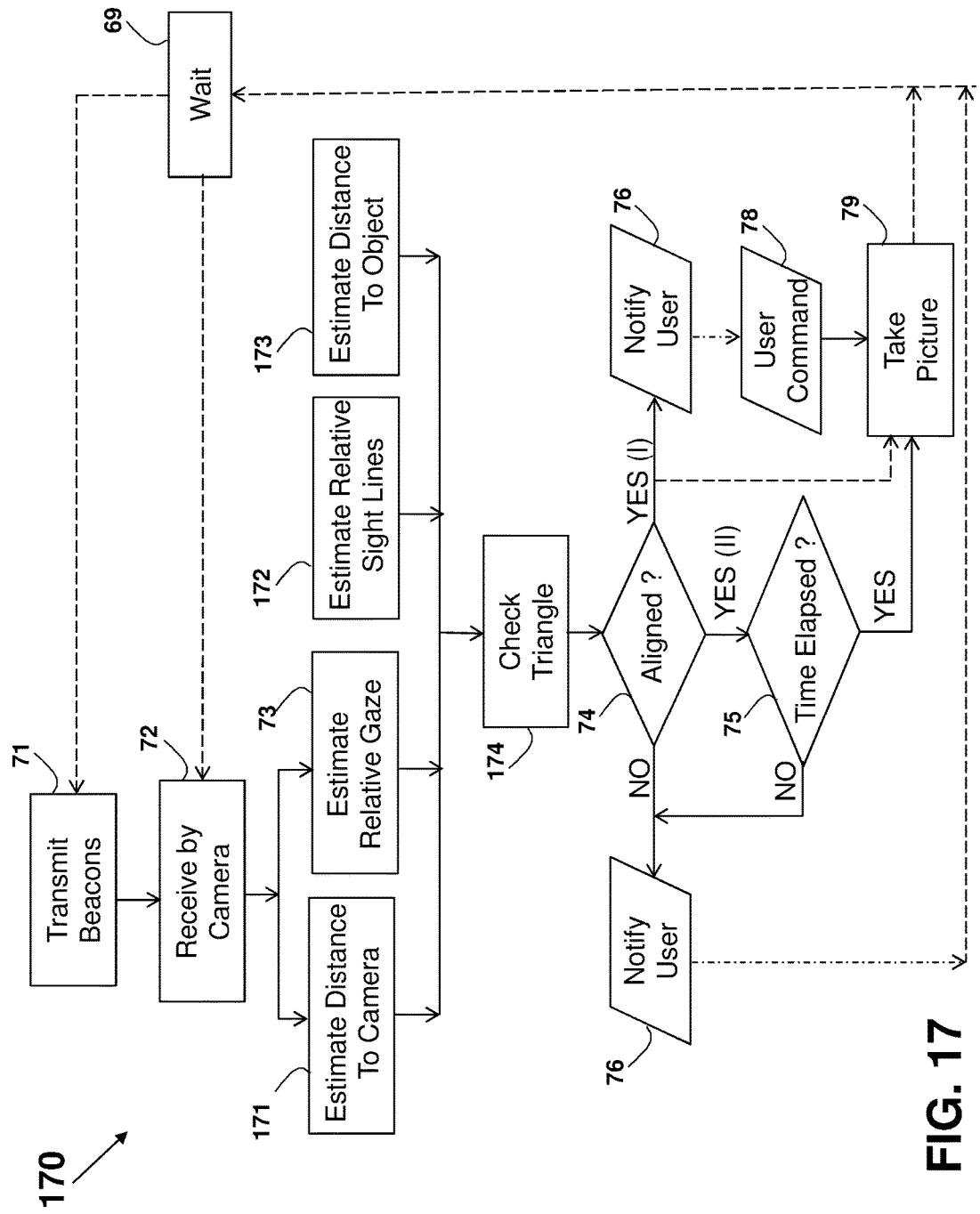
FIG. 17 illustrates schematically a simplified flow diagram of controlling a digital camera based on checking the forming of a triangle arrangement having a person head, a digital camera, and an object as the triangle vertices.
Figure 18:
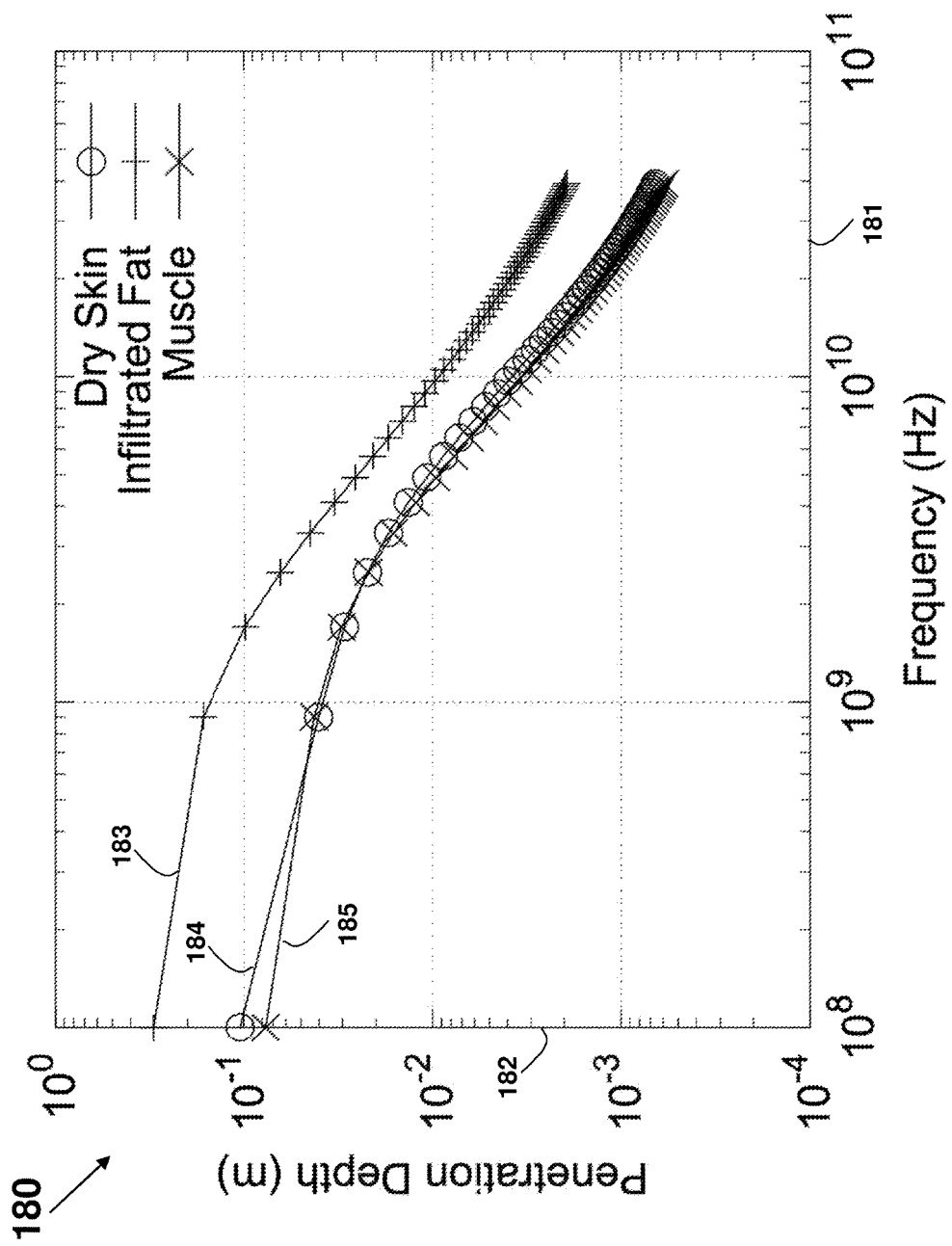
FIG. 18 illustrates a set of graphs of penetration depths versus signal frequencies for various human tissues types.
Figure 19:
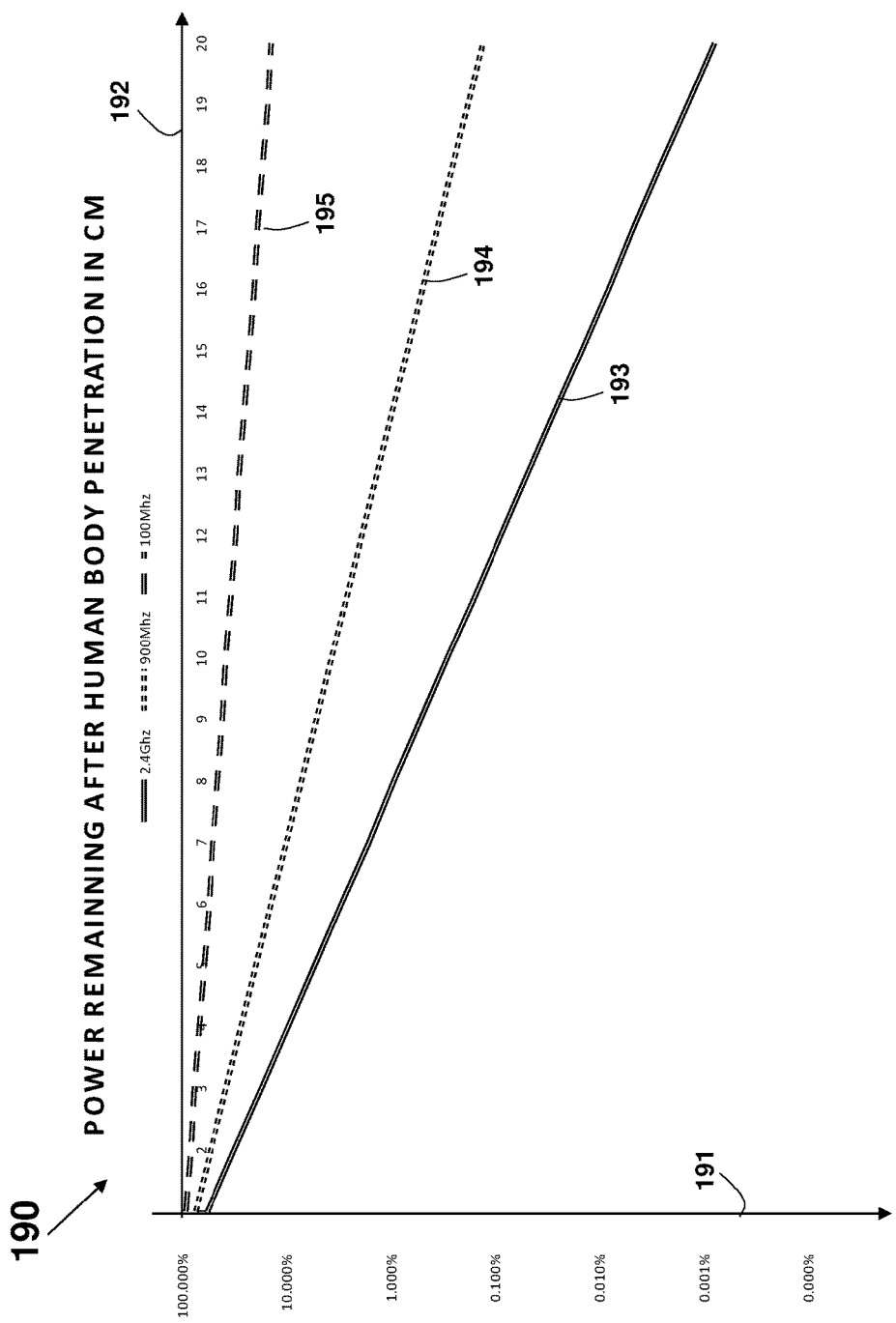
FIG. 19 illustrates a set of graphs of RF signal attenuations versus human body penetration distance for various RF frequencies.

The system operation is described in a flow chart 170 shown in FIG. 17, based on the flow chart 70 shown in FIG. 7. In addition to estimating the relative angle α 49 as part of the "Estimate Relative Gaze" step 73, the improved digital camera 145 further uses the received RF signals 54a and 54b from the respective LWEAR device 160a and RWEAR device 160b for estimating the distance d2 144b from the person head 43, as part of an "Estimate Distance To Camera" step 171. For example, the signal strength of one of, or both, RF signals 54a and 54b, such as the RSSI, may be used to estimate the distance d2 144b.

The IMU 151 in the improved digital camera 145 is used for measuring or estimating the spatial direction 142 of the digital camera 145 optical axis 142. Similarly, the IMU 151a in the LWEAR device 160a, the RWEAR device 160b, or the RLWEAR device 160', is used for measuring or estimating the spatial head 43 pose direction 44. In one example, this measurement or estimation is transmitted to the improved digital camera 145 using the wireless transceiver 52 and the antenna 53 in the LWEAR device 160a, the RWEAR device 160b, or using the wireless transceiver 52a or the wireless transceiver 52b and the antenna 53 of the RLWEAR device 160'. The difference between the spatial direction 44 (measured by the IMU 151 in LWEAR device 160a, the RWEAR device 160b, or the RLWEAR device 160') and the spatial direction 144 results in the angle β 143b, which is calculated as part of an "Estimate Relative Line Sights" step 172. Further, the distance meter 152 is the improved digital camera 145 is activated, and the distance d1 144a to the object 141 is measured, as part of an "Estimate Distance To Object" step 173. Any two of the "Estimate Relative Gaze" step 73, the "Estimate Distance To Camera" step 171, the "Estimate Relative Line Sights" step 172, and the "Estimate Distance To Object" step 173, may be performed in parallel or sequentially in any order.

In the "Aligned ?" step 74 in the flow chart 70 the alignment involved the relative angle α 49, and alignment as low value (or zero) of the relative angle α 49 in order to detect when the head 43 pose direction 44 is substantially aligned with the direction to the improved digital camera 45. In the flow chart 170, the "Aligned ?" step 74 involves the detection when the digital camera 145 optical axis direction 142 and the head 43 line of sight 44 are both directed towards the object 141 to be captured by the improved digital camera 145, indicating by the formed triangle where the object 141, the head 43, and the improved digital camera 145 are the vertices of the formed triangle, the relative angle α 49 and the angle β 143b are two angles in that triangle, and the distance d1 144a and the distance d2 144b are two edges of the formed triangle. The triangle forming is performed by checking if the equation d1/sin(α)=d2/sin(β) is approximately or exactly satisfied, as part of a "Check Triangle" step 174.

The value of the relative angle α 49 estimated or measured as part of the "Estimate Relative Gaze" step 73 is denoted as 'αest' and the value of the angle β 143b estimated or measured as part of the "Estimate Relative Sight Lines" step 172 is denoted as 'βest'. Similarly, the value of the distance d1 144a estimated or measured as part of the "Estimate Distance To Object" step 173 is denoted as 'd1est' and the value of the distance d2 144b estimated or measured as part of the "Estimate Distance To Camera" step 171 is denoted as 'd2est'. In the case the triangle in substantially formed, the estimated or measured values approximately or exactly satisfies the equation d1est/sin(αest)=d2est/sin(βest).

In one example, the distance d1 144a is used as a parameter for verifying the triangle existence. The triangle formed by using the estimated of measured values of the d2est, αest, and βest, results in a calculated value of the distance d1 144a ('d1calc') according to: d1calc=d2est*sin(αest)/sin(βest). In the case where the measured or estimated value of the distance d1 144a d1est is equal to, or close to, the calculated value d1calc, than the triangle is considered as formed in this plane or perspective. Hence, the absolute value of (d1calc −d1est), denoted as |d1calc−d1est| may be used to evaluate the triangle formation. In one example, the absolute difference |d1calc−d1est| may be compared to a maximum threshold (denoted 'thres'), and is the inequality |d1calc−d1est|≤thres is satisfied, a triangle is considered as formed, an alignment is assumed, and the result in the "Aligned ?" step 74 is considered as 'YES', while when the inequality is not satisfied (|d1calc−d1est|>thres), non-alignment is assumed, the result in the "Aligned ?" step 74 is considered as 'NO'. The threshold value ('thres') may be equal to, lower than, or higher than, 1, 2, 5, 8, 10, 12, 15, 20, 25, 30, 35, 40, 45, 50, 100, 120, 150, 200, 250, 300, 350, 400, 450, 500, or 1000 centimeters or inches. Alternatively or in addition to the absolute qualification of the difference (|d1calc−d1est|), a relative qualification may be used, such as comparing the relative difference calculated as |d1calc−d1est|*100/(d1calc+d1est) to a maximum threshold (denoted 'thres %'), and is the inequality |d1calc−d1est|*100/(d1calc+d1est)≤thres % is satisfied, a triangle is considered as formed, an alignment is assumed, and the result in the "Aligned ?" step 74 is considered as 'YES'. In such a case, the threshold value ('thres %') may be equal to, lower than, or higher than, 0.1%, 0.2%, 0.5%, 0.8%, 1%, 1.2%, 1.5%, 2%, 2.5%, 3%, 3.5%, 5%, 7%, 10%, 12%, 15%, 20%, 25%, or 30%.

Alternatively or in addition, the distance d2 144$b$ is used as a parameter for verifying the triangle existence. The triangle formed by using the estimated of measured values of the d1est, αest, and βest, results in a calculated value of the distance d2 144$b$ ('d2calc') according to: d2calc=d1est*sin(αest)/sin(βest). In the case where the measured or estimated value of the distance d2 144$b$ d2est is equal to, or close to, the calculated value d2calc, than the triangle is considered as formed. Hence, the absolute value of (d2calc–d2est), denoted as |d2calc–d2est| may be used to evaluate the triangle formation. In one example, the absolute difference |d2calc–d2est| may be compared to a maximum threshold (denoted 'thres'), and is the inequality |d2calc–d2est|≤thres is satisfied, a triangle is considered as formed, an alignment is assumed, and the result in the "Aligned ?" step 74 is considered as 'YES', while when the inequality is not satisfied (|d2calc–d2est|>thres), non-alignment is assumed, the result in the "Aligned ?" step 74 is considered as 'NO'. The threshold value ('thres') may be equal to, lower than, or higher than, 1, 2, 5, 8, 10, 12, 15, 20, 25, 30, 35, 40, 45, 50, 100, 120, 150, 200, 250, 300, 350, 400, 450, 500, or 1000 centimeters or inches. Alternatively or in addition to the absolute qualification of the difference (|d2calc–d2est|), a relative qualification may be used, such as comparing the relative difference calculated as |d2calc–d2est*100/(d2calc+d2est) to a maximum threshold (denoted 'thres %'), and is the inequality |d2calc–d2est|*100/(d2calc+d2est)<thres % is satisfied, a triangle is considered as formed, an alignment is assumed, and the result in the "Aligned ?" step 74 is considered as 'YES'. In such a case, the threshold value ('thres %') may be equal to, lower than, or higher than, 0.1%, 0.2%, 0.5%, 0.8%, 1%, 1.2%, 1.5%, 2%, 2.5%, 3%, 3.5%, 5%, 7%, 10%, 12%, 15%, 20%, 25%, or 30%.

Alternatively or in addition, the relative angle α 49 is used as a parameter for verifying the triangle existence. The triangle formed by using the estimated of measured values of the d1est, d2est, and βest, results in a calculated value of the relative angle α 49 ('αcalc') according to: αcalc=arcsin(d1est*sin(βest)/d2est). In the case where the measured or estimated value of the relative angle α 49 ('αest') is equal to, or close to, the calculated value αcalc, than the triangle is considered as formed. Hence, the absolute value of (αcalc –αest), denoted as |αcalc–αest| may be used to evaluate the triangle formation. In one example, the absolute difference |αcalc–αest| may be compared to a maximum threshold (denoted 'thres'), and is the inequality |αcalc–αest|≤thres is satisfied, a triangle is considered as formed, an alignment is assumed, and the result in the "Aligned ?" step 74 is considered as 'YES', while when the inequality is not satisfied (|αcalc–αest|>thres), non-alignment is assumed, the result in the "Aligned ?" step 74 is considered as 'NO'. The threshold value ('thres') may be equal to, lower than, or higher than, 40°, 30°, 20°, 18°, 15°, 13°, 10°, 8°, 5°, 3°, 2°, 1°, 0.8°, 0.5°, 0.3°, 0.2°, or 0.1°. Alternatively or in addition to the absolute qualification of the difference (|αcalc–αest|), a relative qualification may be used, such as comparing the relative difference calculated as |αcalc–αest*100/(αcalc+αest) to a maximum threshold (denoted 'thres %'), and is the inequality |αcalc–αest*100/(αcalc+αest) ≤thres % is satisfied, a triangle is considered as formed, an alignment is assumed, and the result in the "Aligned ?" step 74 is considered as 'YES'. In such a case, the threshold value ('thres %') may be equal to, lower than, or higher than, 0.1%, 0.2%, 0.5%, 0.8%, 1%, 1.2%, 1.5%, 2%, 2.5%, 3%, 3.5%, 5%, 7%, 10%, 12%, 15%, 20%, 25%, or 30%.

Alternatively or in addition, the angle β 143$b$ is used as a parameter for verifying the triangle existence. The triangle formed by using the estimated of measured values of the d1est, d2est, and αest, results in a calculated value of the angle β 143$b$ ('βcalc') according to: βcalc=arcsin(d2est*sin(αest)/d1est). In the case where the measured or estimated value of the angle β 143$b$ ('βest') is equal to, or close to, the calculated value βcalc, than the triangle is considered as formed. Hence, the absolute value of (βcalc –βest), denoted as |βcalc–βest| may be used to evaluate the triangle formation. In one example, the absolute difference |βcalc–βest| may be compared to a maximum threshold (denoted 'thres'), and is the inequality |βcalc –βest|≤thres is satisfied, a triangle is considered as formed, an alignment is assumed, and the result in the "Aligned ?" step 74 is considered as 'YES', while when the inequality is not satisfied (|βcalc–βest|>thres), non-alignment is assumed, the result in the "Aligned ?" step 74 is considered as 'NO'. The threshold value ('thres') may be equal to, lower than, or higher than, 40°, 30°, 20°, 18°, 15°, 13°, 10°, 8°, 5°, 3°, 2°, 1°, 0.8°, 0.5°, 0.3°, 0.2°, or 0.1°. Alternatively or in addition to the absolute qualification of the difference (|βcalc –βest|), a relative qualification may be used, such as comparing the relative difference calculated as (βcalc–βest|*100/(βcalc+βest) to a maximum threshold (denoted 'thres %'), and is the inequality |βcalc–βest|*100/(βcalc+βest) ≤thres % is satisfied, a triangle is considered as formed, an alignment is assumed, and the result in the "Aligned ?" step 74 is considered as 'YES'. In such a case, the threshold value ('thres %') may be equal to, lower than, or higher than, 0.1%, 0.2%, 0.5%, 0.8%, 1 1.2%, 1.5%, 2%, 2.5%, 3%, 3.5%, 5%, 7%, 10%, 12%, 15%, 20%, 25%, or 30%.

While exampled above regarding the checking if a triangle is formed by comparing estimated or measured values to calculated values by using the angle β 143$b$, the relative angle α 49, the distance d2 144$b$, or the distance d1 144$a$, any combination may equally be used, such as by examining or comparing to a threshold to a calculation that is based on the sines rule, such as |d2est*sin(αest)–d1est*sin(β)| or |d2est/sin(βest)–d1est*sin(α)|.

Similar to the flow chart 70 shown in FIG. 7, when alignment is assumed, then the digital camera 145 is controlled automatically or semi-automatically to capture a still image, or to record (or stop recording) of a video as part of the "Take Picture" step 79. Further, the controlled digital camera 145 may be substituted with any controlled apparatus 81, as described in the flow chart 70$a$ in FIG. 7$a$.

Figure 20:
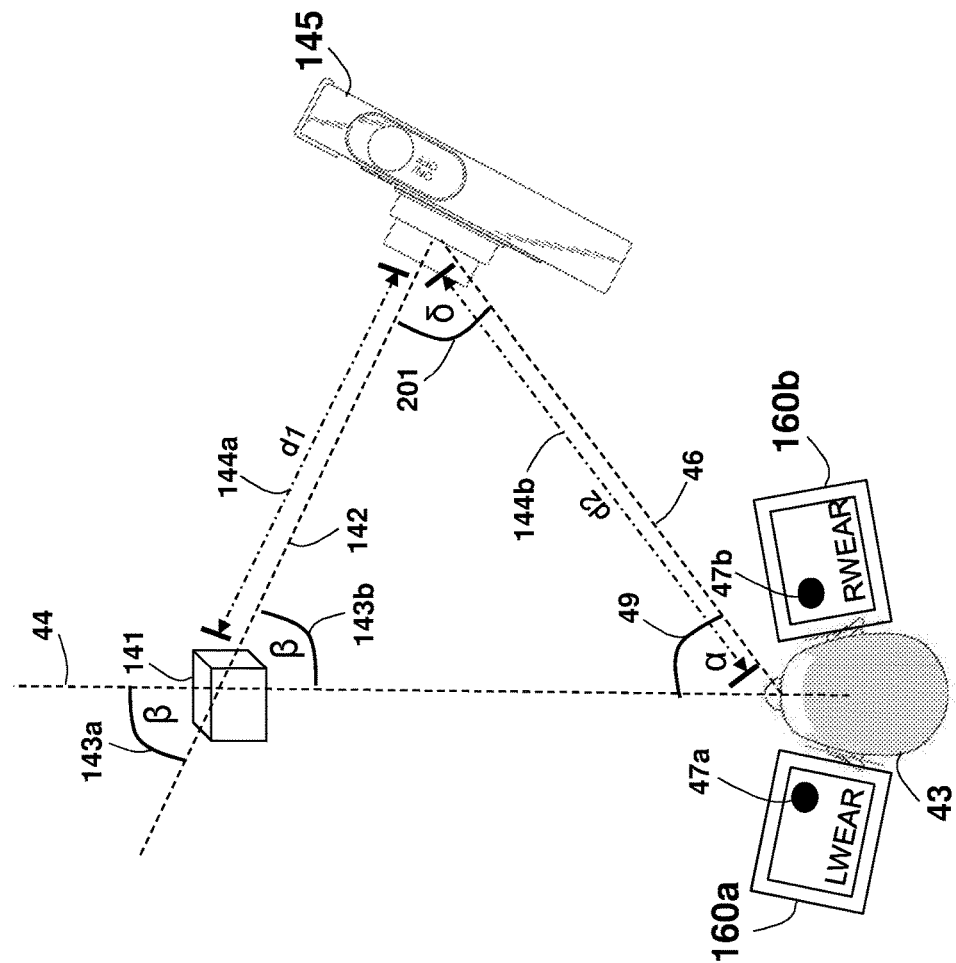
FIG. 20 depicts pictorially a top view of a triangle arrangement having a person head, a digital camera, and an object as the triangle vertices.

The triangle formed in the arrangement 140 shown in FIG. 14 was based on estimating or calculating the angle β 143$b$, such as by using inertial measurements that may be based on IMUs in the improved digital camera 145 and in the wearable devices 160$a$ or 160$b$. Alternatively or in addition, the triangle formation may be determined by estimating an angle δ 201, which is formed between the line-of-sight 46 connecting the improved digital camera 145 to the head 43 and the optical axis 142 of the improved digital camera 145, as illustrated in an arrangement 200 shown in FIG. 20. The angle β 143$b$ may be estimated or calculated based on the equation β=180°−α−δ.

In one example, the angle δ 201 is estimated or calculated based on RF Direction Finding (DF), where the digital camera 145 is further improved to include a direction finding functionality, to detect the direction of one of the transmitting wearable devices, such as the RWEAR device 160$b$ or the LWEAR device 160$a$ (or both).

Figure 21:
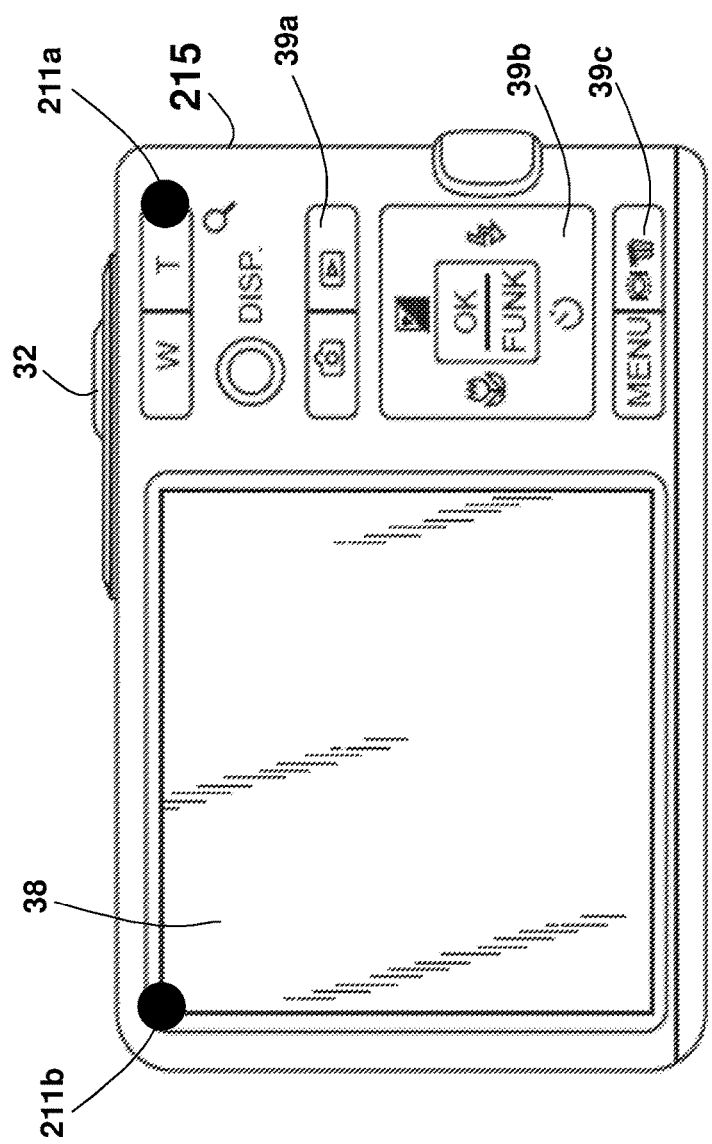
FIG. 21 depicts pictorially a rear view of a horizontal DF-capable digital camera.

A rear view of an example of a DF-capable digital camera 215 is illustrated in FIG. 21. Two antennas 211*a* and 211*b* are used, located along the elongated side of the digital camera 215 enclosure, preferably located apart as practical near the vertical edges. The DF-capable digital camera 215 may be based on, or may comprise, the block diagram 45 shown in FIG. 6, where the two antennas 211*a* and 211*b* respectively correspond to the antennas 53*c* and 53*d* of the digital camera device 45. The comparator 62 may be used for passive (or active) DF techniques that utilize the different propagation paths to the two antennas 211*a* and 211*b*. For example, the DF may be based on, or may use, comparison between the two received signals at the two antennas 53*c* and 53*d*, such as Time Difference of Arrival (TDOA) (or TOF) comparison, amplitude comparison, or phase interferometry using phase shift detection.

Figure 21A:
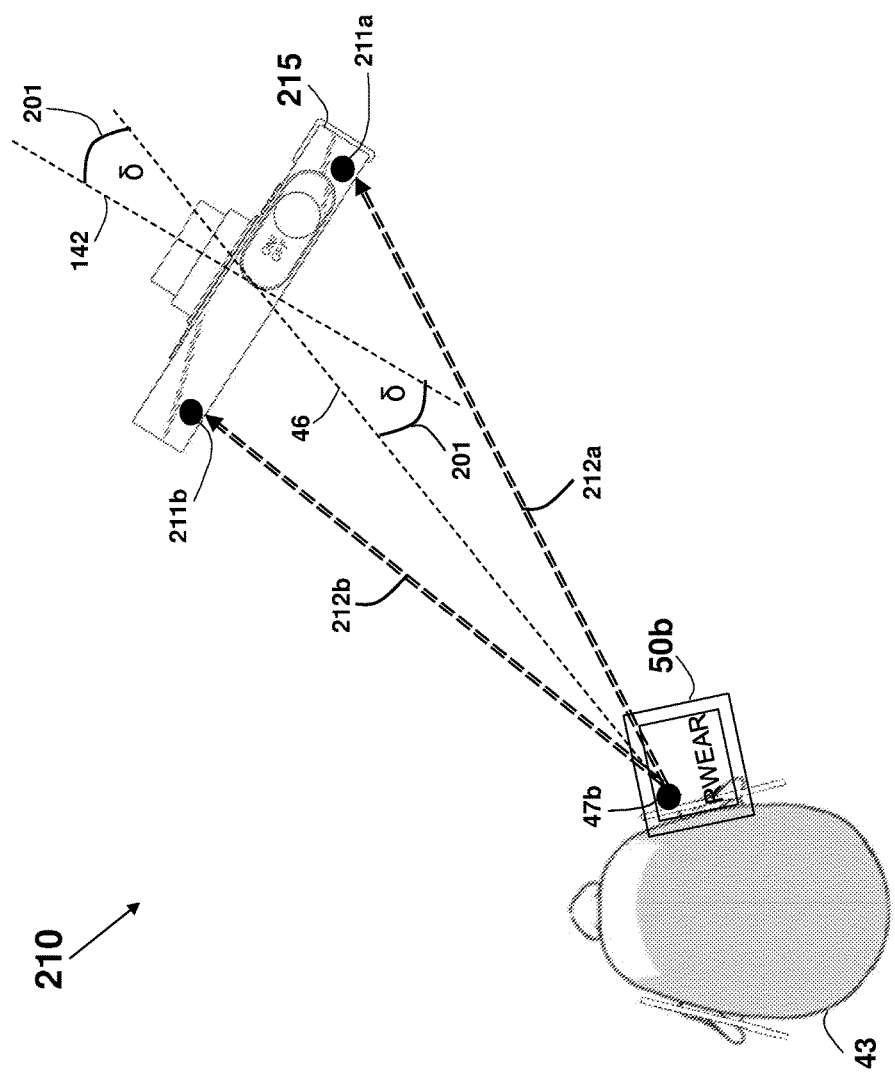
FIG. 21a depicts pictorially a top view of a relative angle between a direction to a person head and a camera device optical axis.

A DF scheme is described in an arrangement 210 shown in FIG. 21*a*. In this example, the RWEAR device 50*b* transmits an RF signal via the antenna 47*b*. The RF signal propagates over a propagation path 212*a* to the antenna 211*a* in the DF-capable digital camera 215, and simultaneously the RF signal propagates over a propagation path 212*b* to the antenna 211*b* in the DF-capable digital camera 215. The different propagation paths allows for the DF mechanism in the DF-capable digital camera 215 to estimate or calculate the angle $\delta$ 201 between the line 46 to the head 43 and the digital camera 215 optical axis 142.

Figure 21B:
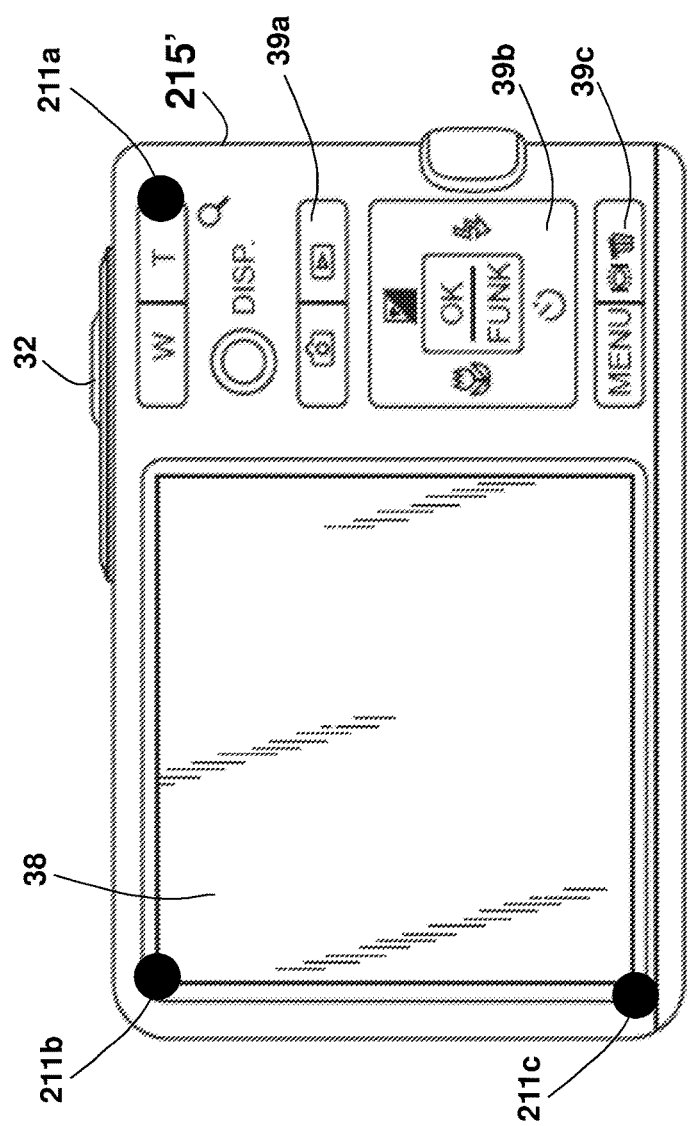
FIG. 21b depicts pictorially a rear view of a horizontal and vertical DF-capable digital camera.

The arrangement 210 was exampled regarding a single plane, such as the horizontal plane. Alternatively or in addition, a DF may be used in any other or additional plane, such as a vertical plane. A rear view of an exemplary DF-capable digital camera 215', capable of DF both horizontally and vertically, is shown in FIG. 21*b*. An additional antenna 211*c* is added, located vertically to the antenna 211*b* (or perpendicular to the line connecting the antennas 211*a* and 211*b*), preferably near the bottom camera enclosure edge. The DF functionality uses the signals received in the antenna 211*b* (or the antenna 211*a*) and the antenna 211*c* for estimating the vertical angle.

Figure 21C:
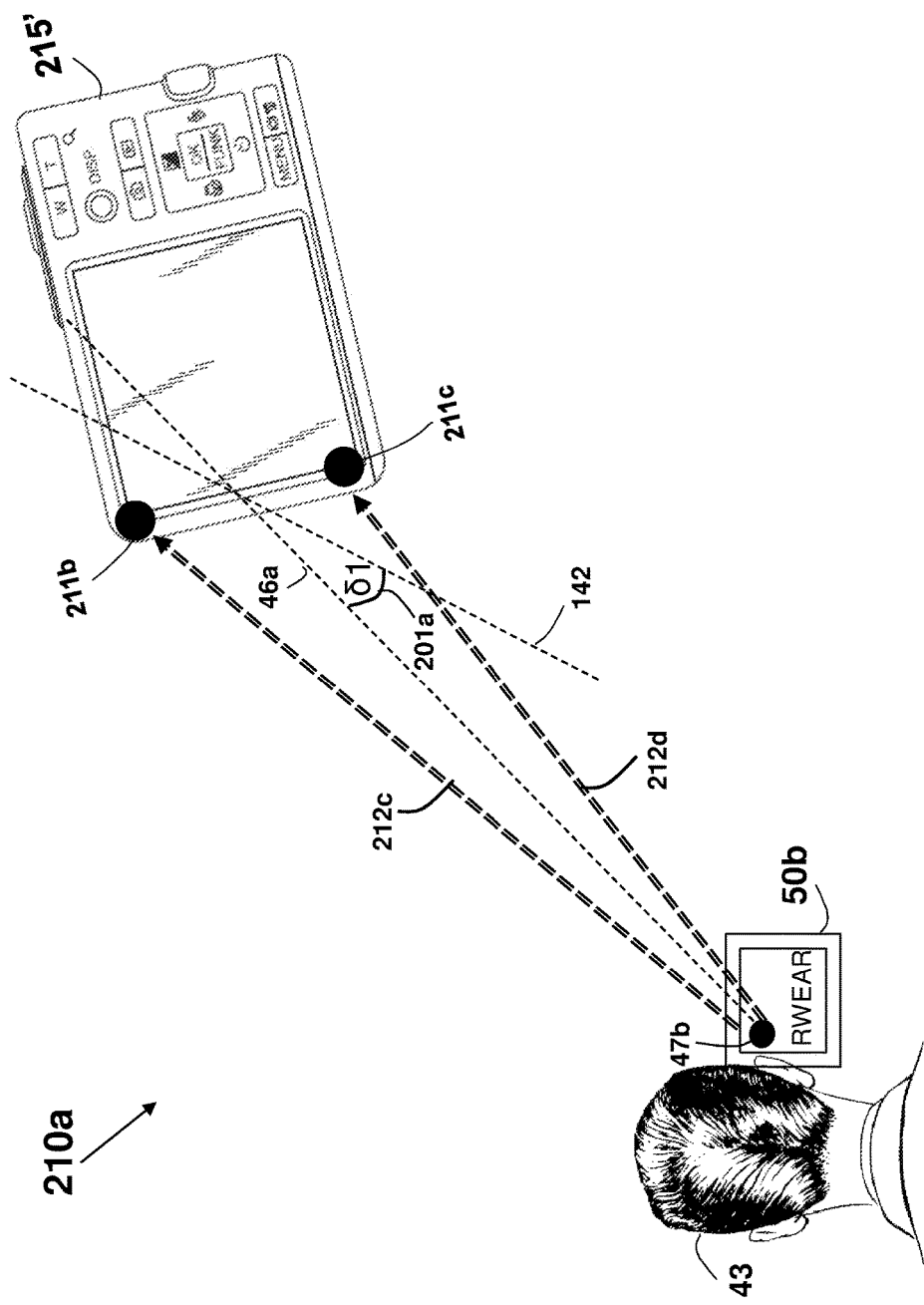
FIG. 21c depicts pictorially a side view of a relative angle between a direction to a person head and a camera device optical axis.
Figure 22:
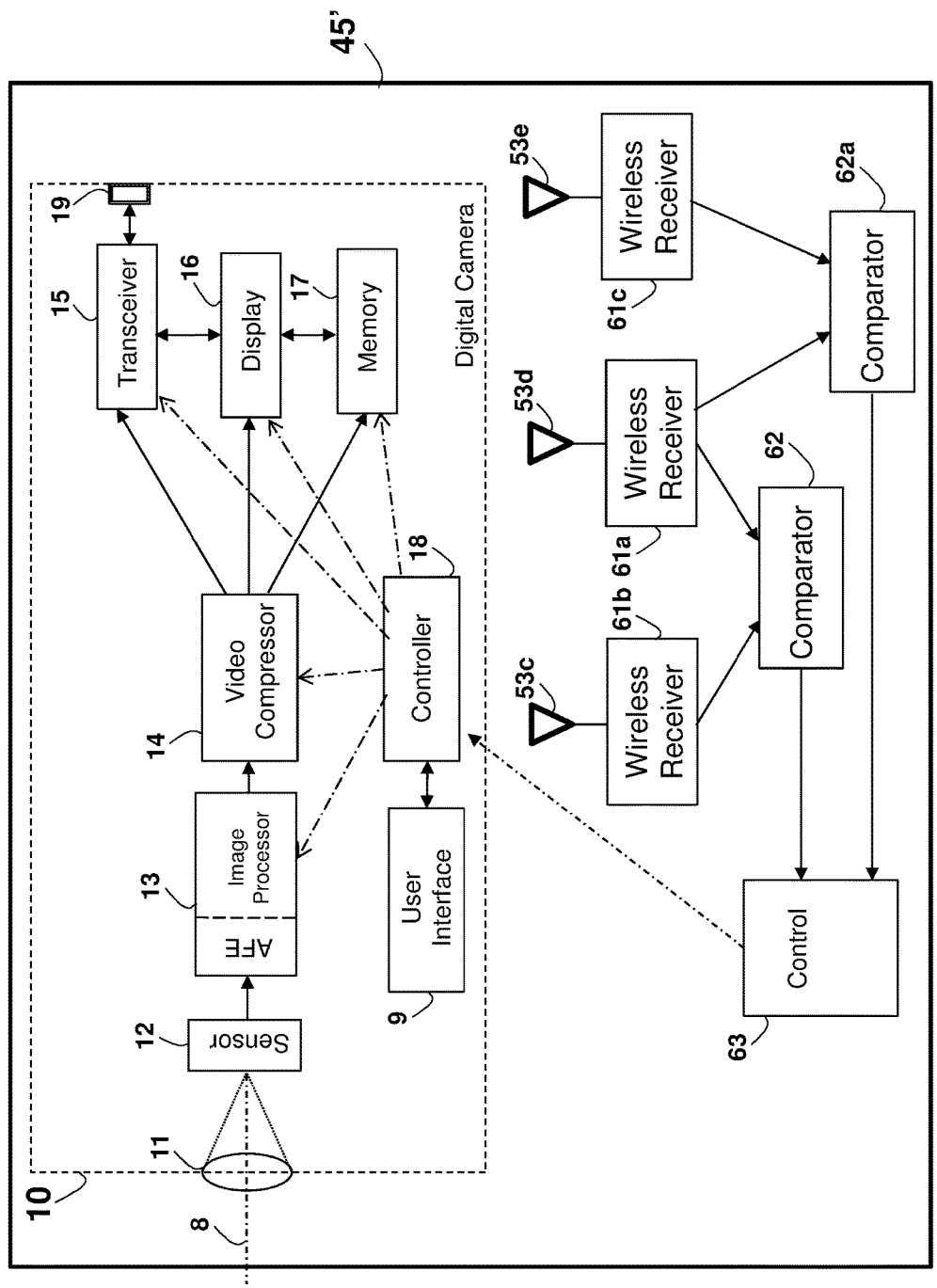
FIG. 22 illustrates a simplified schematic block diagram of a two-axis DF-capable head pose controlled digital camera.

A vertical DF scheme is described in an arrangement 210*a* shown in FIG. 21*c*. In this example, the RWEAR device 50*b* transmits an RF signal via the antenna 47*b*. The RF signal propagates over a propagation path 212*c* to the antenna 211*b* in the two-axis DF-capable digital camera 215', and simultaneously the RF signal propagates over a propagation path 212*d* to the antenna 211*c* in the DF-capable digital camera 215'. The different propagation paths allows for the DF mechanism in the DF-capable digital camera 215' to estimate or calculate a vertical angle $\delta 1$ 201*a* between the line 46*a* to the head 43 and the digital camera 215' optical axis 142. The two-axis DF-capable digital camera 215' may be based on, or using, the device 45' shown in FIG. 22. The antenna 211*c* may correspond to the antenna 53*e* that is connected to a wireless receiver 61*c*. The comparator 62 is used for DF estimation in one plane (such as a horizontal plane), while the other comparator 62*a* is used for DF estimation in another plane (such as a vertical plane), by comparing the signals received in the antennas 53*d* and 53*e*.

While exampled herein regarding a single plane, commonly a horizontal plane, analysis, the systems, devices, apparatuses, or methods herein equally apply to a vertical plane analysis. Further, any other plane, or any other two-dimensional (2D) analysis, may equally be used. Further, the systems, devices, apparatuses, or methods herein may be individually or independently apply to both horizontal and vertical planes simultaneously, such as for three-dimensional (3D) analysis.

While head pose or eye gaze direction was exampled by comparing two RF signals, any algorithm for an estimation of a person gaze direction may equally be used. In one example, the user gaze direction may be estimated based on eye location detection, eye tracking, or any other gaze direction based on eye detection. Alternatively or in addition, the person gaze direction estimation may be based on, according to, or use, a head pose estimation or detection algorithm. Preferably, the user gaze direction may be based on a combination of both head pose and eye location detection, as described for example in a paper published in IEEE Transaction on Image Processing, Vol. 21, No. 2, February 2012 by Roberto Valenti entitled: "*Combining Head Pose and Eye Information for Gaze Estimation*", and in an article by Roberto Valenti, Adel Lablack, Nicu Sebe, Chabane Djeraba, and Theo Gevers entitled: "*Visual Gaze estimation by Joint Head and Eye Information*", which are all incorporated in their entirety for all purposes as if fully set forth herein.

Any element capable of measuring or responding to a physical phenomenon may be used as the user sensor 57. An appropriate sensor may be adapted for a specific physical phenomenon produced by, or created, a human, such as a sensor responsive to temperature, humidity, pressure, audio, vibration, light, motion, sound, proximity, flow rate, electrical voltage, and electrical current. Further, the sensor may be any sensor described in U.S. Patent Application Publication No. 2013/0201316 to Binder et al., entitled: "System and Method for Server Based Control", which is incorporated in its entirety for all purposes as if fully set forth herein. The sensor may be semiconductor-based and may be based on MEMS technology. For example, the sensor 57 may be an accelerometer for sensing or estimating motion.

The action taken in response to the estimated value of the angle $\alpha$ 49, or as a result of any comparison herein, may include control, activation, or initiation of an actuator for affecting a physical phenomenon, and the actuator and its control may be as described in U.S. Patent Application Publication No. 2013/0201316 to Binder et al., entitled: "System and Method for Server Based Control", which is incorporated in its entirety for all purposes as if fully set forth herein.

The action taken may include activation of an annunciator that may consist of one or more visual or audible signaling component, or any other devices that indicate a status to the person. The annunciator may include a visual signaling device. For example, the annunciator may be activated when the estimated value of the angle $\alpha$ 49 exceeds a threshold that is either a minimum or a maximum one. Alternatively or in addition, the annunciator parameters may be controlled based on the estimated value. In one example, the device illuminates a visible light, such as a Light-Emitting-Diode (LED), or uses a Liquid Crystal Display (LCD) that uses changes in the reflectivity in an applied electric field. The LED may be a multi-color LED, such as LED Part No. 08L5015RGBC available from RSR Electronics, Inc. from NJ, U.S.A., described in Data-sheet Multi Color LED Part No. 08L5015RGBC, which is incorporated in its entirety for all purposes as if fully set forth herein. However, any type of visible electric light emitter such as a flashlight, an incandescent lamp, and compact fluorescent lamps can be used. Multiple light emitters may be used, and the illumination may be steady, blinking or flashing. Further, a single-state visual indicator may be used to provide multiple indications, such as by using different colors (of the same visual indicator), different intensity levels, variable duty-cycle and so forth. Such conceptual relationships may include, for example, the light emitters' brightness, appearance, location, type, color and steadiness that are influenced by the estimated value. In one example, the annunciator operation is based on a numerical digital display that provides readings in the form of numbers of the estimated value of any value derived thereof. For example, the annunciator may use the quadruple digits, seven-segments, LED display Part No.: LTC-3610G available from Lite-On Electronics, Inc., and described in Lite-On Electronics, Inc., Publication BNS-OD-C131/A4 downloaded March 2011, which is incorporated in its entirety for all purposes as if fully set forth herein. Similarly, the annunciator may be based on an alphanumerical digital display that provides readings in the form of characters, including numbers, letters or symbols. For example, the annunciator may use the quadruple digits, seven-segments, LED display Part No.: LTM-8647AC available from Lite-On Electronics, Inc., and described in Lite-On Electronics, Inc., Publication BNS-OD-C131/A4 downloaded March 2011, which is incorporated in its entirety for all purposes as if fully set forth herein.

Any apparatus herein may be used to display word messages in a variety of fashions and formats, such as scrolling, static, bold and flashing. The device may further display visual display material beyond words and characters, such as arrows, symbols, ASCII and non-ASCII characters, still images such as pictures and video. The annunciator may use any electronic display or any other output device used for the presentation of visual information. The display may be a digital or analog video display, and may use technologies such as LCD (Liquid Crystal Display), TFT (Thin-Film Transistor), FED (Field Emission Display), CRT (Cathode Ray Tube) or any other electronic screen technology that visually shows information such as graphics or text. In many cases, an adaptor (not shown) is required in order to connect an analog display to the digital data. For example, the adaptor may convert to composite video (PAL, NTSC) or S-Video or HDTV signal. Analog displays commonly use interfaces such as composite video such as NTSC, PAL or SECAM formats. Similarly, analog RGB, VGA (Video Graphics Array), SVGA (Super Video Graphics Array), SCART, S-video and other standard analog interfaces can be used. Further, personal computer monitors, plasma or flat panel displays, CRT, DLP display or a video projector may be equally used. Standard digital interfaces such as an IEEE1394 interface, also known as FireWire™, may be used. Other digital interfaces that can be used are USB, SDI (Serial Digital Interface), FireWire, HDMI (High-Definition Multimedia Interface), DVI (Digital Visual Interface), UDI (Unified Display Interface), DisplayPort, Digital Component Video and DVB (Digital Video Broadcast).

In one example, the annunciator affects sound or music generation. The estimated value may be associated with a musical tune (or a tone) or any other single sound, which is played upon activation of the annunciator. The annunciator may include an audible signaling device (sounder) that emits audible sounds that can be heard by a human (having frequency components in the 20-20,000 Hz band). In one example, the device is a buzzer (or beeper), a chime, a whistle or a ringer. Buzzers are known in the art and are either electromechanical or ceramic-based piezoelectric sounders that make a high-pitch noise. The sounder may emit a single or multiple tones, and can be in continuous or intermittent operation. In another example, the sounder simulates the voice of a human being or generates music, typically by using an electronic circuit having a memory for storing the sounds (e.g., click, gong, music, song, voice message, etc.), a digital to analog converter to reconstruct the electrical representation of the sound and driver for driving a loudspeaker, which is an electro-acoustical transducer that converts an electrical signal to sound. An example of a greeting card providing music and mechanical movement is disclosed in U.S. Patent Application 2007/0256337 to Segan entitled: "User Interactive Greeting Card", which is incorporated in its entirety for all purposes as if fully set forth herein. A 'Gong' sound may be generated using SAE 800 from Siemens, described in Data-sheet "*Programmable Single-/Dual-/Triple-Tone Gong, SAE 800, Siemens semiconductor Group, 02.05*", which is incorporated in its entirety for all purposes as if fully set forth herein.

In one example, a human voice talking is played by the annunciator. The sound may be a syllable, a word, a phrase, a sentence, a short story or a long story, and can be based on speech synthesis or pre-recorded. Male or female voice can be used, being young or old. The text sounded is preferably associated with the shape or theme. For example, an estimated value or a quality-associated value derived thereof of the system can be heard, such as 'good', 'not in field' and 'low quality'.

A tone, voice, melody or song sounder typically contains a memory storing a digital representation of the pre-recorder or synthesized voice or music, a digital to analog (D/A) converter for creating an analog signal, a speaker and a driver for feeding the speaker. An annunciator, which includes a sounder, may be based on Holtek HT3834 CMOS VLSI Integrated Circuit (IC) named '36 Melody Music Generator' available from Holtek Semiconductor Inc., headquartered in Hsinchu, Taiwan, and described with application circuits in a data sheet Rev. 1.00 dated Nov. 2, 2006, which is incorporated in their entirety for all purposes as if fully set forth herein. Similarly, the sounder may be based on EPSON 7910 series 'Multi-Melody IC' available from Seiko-Epson Corporation, Electronic Devices Marketing Division located in Tokyo, Japan, and described with application circuits in a data sheet PF226-04 dated 1998, which is incorporated in its entirety for all purposes as if fully set forth herein. A human voice synthesizer may be based on Magnevation SpeakJet chip available from Magnevation LLC and described in 'Natural Speech & Complex Sound Synthesizer' described in User's Manual Revision 1.0 Jul. 27, 2004, which is incorporated in its entirety for all purposes as if fully set forth herein. A general audio controller may be based on OPTi 82C931 'Plug and Play Integrated Audio Controller' described in Data Book 912-3000-035 Revision: 2.1 published on Aug. 1, 1997, which is incorporated in its entirety for all purposes as if fully set forth herein. Similarly, a music synthesizer may be based on YMF721 OPL4-ML2 FM+Wavetable Synthesizer LSI available from Yamaha Corporation described in YMF721 Catalog No. LSI-4MF721A20, which is incorporated in its entirety for all purposes as if fully set forth herein.

Some examples of devices that include generation of an audio signal such as music are disclosed in U.S. Pat. No. 4,496,149 to Schwartzberg entitled: "Game Apparatus Utilizing Controllable Audio Signals", in U.S. Pat. No. 4,516,260 to Breedlove et al. entitled: "Electronic Learning Aid or Game having Synthesized Speech", in U.S. Pat. No. 7,414,186 to Scarpa et al. entitled: "System and Method for Teaching Musical Notes", in U.S. Pat. No. 4,968,255 to Lee et al. entitled: "Electronic Instructional Apparatus", in U.S. Pat. No. 4,248,123 to Bunger et al. entitled: "Electronic Piano" and in U.S. Pat. No. 4,796,891 to Milner entitled: "Musical Puzzle Using Sliding Tiles", and toys with means for synthesizing human voice are disclosed in U.S. Pat. No. 6,527,611 to Cummings entitled: "Place and Find Toy", and in U.S. Pat. No. 4,840,602 to Rose entitled: "Talking Doll Responsive to External Signal", which are all incorporated in their entirety for all purposes as if fully set forth herein.

Timing information may use timers that may be implemented as a monostable circuit, producing a pulse of set length when triggered. In one example, the timers are based on RC based popular timers such as 555 and 556, such as ICM7555 available from Maxim Integrated Products, Inc. of Sunnyvale, Calif., U.S.A., described in the data sheet "*General Purpose Timers*" publication number 19-0481 Rev.2 11/92, which is incorporated in its entirety for all purposes as if fully set forth herein. Examples of general timing diagrams as well as monostable circuits are described in Application Note AN170 "*NE555 and NE556 Applications*" from Philips semiconductors dated 12/1988, which is incorporated in its entirety for all purposes as if fully set forth herein. Alternatively, a passive or active delay line may be used. Further, a processor based delay line can be used, wherein the delay is set by its firmware, typically as a service of the operation system.

Any apparatus herein, which may be any of the systems, devices, modules, or functionalities described herein, may be integrated with a smartphone, an appliance, a computer, or a digital camera (still or video). The integration may be implemented by being enclosed in the same housing, sharing a power source (such as a battery), using the same processor, or any other integration functionality. In one example, the functionality of any apparatus herein, which may be any of the systems, devices, modules, or functionalities described here, is used to improve, to control, or otherwise be used by the digital camera. In one example, a measured or calculated value by any of the systems, devices, modules, or functionalities described herein, is output to the digital camera device or functionality to be used therein. Alternatively or in addition, any of the systems, devices, modules, or functionalities described herein is used as a sensor for the digital camera device or functionality.

Any apparatus herein, which may be any of the systems, devices, modules, or functionalities described herein, may be integrated with a smartphone. The integration may be by being enclosed in the same housing, sharing a power source (such as a battery), using the same processor, or any other integration functionality. In one example, the functionality of any apparatus herein, which may be any of the systems, devices, modules, or functionalities described here, is used to improve, to control, or otherwise be used by the smartphone. In one example, a measured or calculated value by any of the systems, devices, modules, or functionalities described herein, is output to the smartphone device or functionality to be used therein. Alternatively or in addition, any of the systems, devices, modules, or functionalities described herein is used as a sensor for the smartphone device or functionality.

Any part of, or the whole of, any of the methods described herein may be provided as part of, or used as, an Application Programming Interface (API), defined as an intermediary software serving as the interface allowing the interaction and data sharing between an application software and the application platform, across which few or all services are provided, and commonly used to expose or use a specific software functionality, while protecting the rest of the application. The API may be based on, or according to, Portable Operating System Interface (POSIX) standard, defining the API along with command line shells and utility interfaces for software compatibility with variants of Unix and other operating systems, such as POSIX. 1-2008 that is simultaneously IEEE STD. 1003.1™—2008 entitled: "*Standard for Information Technology-Portable Operating System Interface (POSIX®) Description*", and The Open Group Technical Standard Base Specifications, Issue 7, IEEE STD. 1003.1™, 2013 Edition.

Any part of, or whole of, any of the methods described herein may be implemented by a processor, or by a processor that is part of a device that in integrated with a digital camera, and may further be used in conjunction with various devices and systems, for example a device may be a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, or a non-mobile or non-portable device.

Any device herein may serve as a client device in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Wash., U.S.A.), Linux, and Google Chrome OS available from Google Inc. headquartered in Mountain View, Calif., U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat)), iOS (available from Apple Inc., and includes variants such as versions 3-7), Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as servers may equally function as a server in the meaning of client/server architecture. Any one of the servers herein may be a web server using Hyper Text Transfer Protocol (HTTP) that responds to HTTP requests via the Internet, and any request herein may be an HTTP request.

Examples of web browsers include Microsoft Internet Explorer (available from Microsoft Corporation, headquartered in Redmond, Wash., U.S.A.), Google Chrome which is a freeware web browser (developed by Google, headquartered in Googleplex, Mountain View, Calif., U.S.A.), Opera™ (developed by Opera Software ASA, headquartered in Oslo, Norway), and Mozilla Firefox® (developed by Mozilla Corporation headquartered in Mountain View, Calif., U.S.A.). The web-browser may be a mobile browser, such as Safari (developed by Apple Inc. headquartered in Apple Campus, Cupertino, Calif., U.S.A), Opera Mini™ (developed by Opera Software ASA, headquartered in Oslo, Norway), and Android web browser.

Any device herein may be integrated with part or an entire appliance. The appliance primary function may be associated with food storage, handling, or preparation, such as microwave oven, an electric mixer, a stove, an oven, or an induction cooker for heating food, or the appliance may be a refrigerator, a freezer, a food processor, a dishwashers, a food blender, a beverage maker, a coffeemaker, or an iced-tea maker. The appliance primary function may be associated with environmental control such as temperature control, and the appliance may consist of, or may be part of, an HVAC system, an air conditioner or a heater. The appliance primary function may be associated with cleaning, such as a washing machine, a clothes dryer for cleaning clothes, or a vacuum cleaner. The appliance primary function may be associated with water control or water heating. The appliance may be an answering machine, a telephone set, a home cinema system, a HiFi system, a CD or DVD player, an electric furnace, a trash compactor, a smoke detector, a light fixture, or a dehumidifier. The appliance may be a handheld computing device or a battery-operated portable electronic device, such as a notebook or laptop computer, a media player, a cellular phone, a Personal Digital Assistant (PDA), an image processing device, a digital camera, or a video recorder. The integration with the appliance may involve sharing a component such as housing in the same enclosure, sharing the same connector such as sharing a power connector for connecting to a power source, where the integration involves sharing the same connector for being powered from the same power source. The integration with the appliance may involve sharing the same power supply, sharing the same processor, or mounting onto the same surface.

The steps described herein may be sequential, and performed in the described order. For example, in a case where a step is performed in response to another step, or upon completion of another step, the steps are executed one after the other. However, in case where two or more steps are not explicitly described as being sequentially executed, these steps may be executed in any order or may be simultaneously performed. Two or more steps may be executed by two different network elements, or in the same network element, and may be executed in parallel using multiprocessing or multitasking.

A 'nominal' value herein refers to a designed, expected, or target value. In practice, a real or actual value is used, obtained, or exists, which varies within a tolerance from the nominal value, typically without significantly affecting functioning. Common tolerances are 20%, 15%, 10%, 5%, or 1% around the nominal value.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Throughout the description and claims of this specification, the word "couple", and variations of that word such as "coupling", "coupled", and "couplable", refers to an electrical connection (such as a copper wire or soldered connection), a logical connection (such as through logical devices of a semiconductor device), a virtual connection (such as through randomly assigned memory locations of a memory device) or any other suitable direct or indirect connections (including combination or series of connections), for example for allowing the transfer of power, signal, or data, as well as connections formed through intervening devices or elements.

The arrangements and methods described herein may be implemented using hardware, software or a combination of both. The term "integration" or "software integration" or any other reference to the integration of two programs or processes herein refers to software components (e.g., programs, modules, functions, processes etc.) that are (directly or via another component) combined, working or functioning together or form a whole, commonly for sharing a common purpose or a set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "integration" or "hardware integration" or integration of hardware components herein refers to hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein refers (as applicable) to a software integration, a hardware integration, or any combination thereof.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

A non-limiting example of a processor may be 80186 or 80188 available from Intel Corporation located at Santa-Clara, Calif., USA. The 80186 and its detailed memory connections are described in the manual "80186/80188 *High-Integration 16-Bit Microprocessors*" by Intel Corporation, which is incorporated in its entirety for all purposes as if fully set forth herein. Other non-limiting example of a processor may be MC68360 available from Motorola Inc.

located at Schaumburg, Ill., USA. The MC68360 and its detailed memory connections are described in the manual "*MC68360 Quad Integrated Communications Controller—User's Manual*" by Motorola, Inc., which is incorporated in its entirety for all purposes as if fully set forth herein. While exampled above regarding an address bus having an 8-bit width, other widths of address buses are commonly used, such as the 16-bit, 32-bit and 64-bit. Similarly, while exampled above regarding a data bus having an 8-bit width, other widths of data buses are commonly used, such as 16-bit, 32-bit and 64-bit width. In one example, the processor consists of, comprises, or is part of, Tiva™ TM4C123GH6PM Microcontroller available from Texas Instruments Incorporated (Headquartered in Dallas, Tex., U.S.A.), described in a data sheet published 2015 by Texas Instruments Incorporated [DS-TM4C123GH6PM-15842.2741, SPMS376E, Revision 15842.2741 Jun. 2014], entitled: "*Tiva™ TM4CJ23GH6PM Microcontroller—Data Sheet*", which is incorporated in its entirety for all purposes as if fully set forth herein, and is part of Texas Instrument's Tiva™ C Series microcontrollers family that provide designers a high-performance ARM® Cortex™-M-based architecture with a broad set of integration capabilities and a strong ecosystem of software and development tools. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions by integrating application-specific peripherals and providing a comprehensive library of software tools which minimize board costs and design-cycle time. Offering quicker time-to-market and cost savings, the Tiva™ C Series microcontrollers are the leading choice in high-performance 32-bit applications. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions.

The terms "memory" and "storage" are used interchangeably herein and refer to any physical component that can retain or store information (that can be later retrieved) such as digital data on a temporary or permanent basis, typically for use in a computer or other digital electronic device. A memory can store computer programs or any other sequence of computer readable instructions, or data, such as files, text, numbers, audio and video, as well as any other form of information represented as a string or structure of bits or bytes. The physical means of storing information may be electrostatic, ferroelectric, magnetic, acoustic, optical, chemical, electronic, electrical, or mechanical. A memory may be in a form of an Integrated Circuit (IC, a.k.a. chip or microchip). Alternatively or in addition, a memory may be in the form of a packaged functional assembly of electronic components (module). Such module may be based on a Printed Circuit Board (PCB) such as PC Card according to Personal Computer Memory Card International Association (PCMCIA) PCMCIA 2.0 standard, or a Single In-line Memory Module (SIMM) or a Dual In-line Memory Module (DIMM), standardized under the JEDEC JESD-21C standard. Further, a memory may be in the form of a separately rigidly enclosed box such as an external Hard-Disk Drive (HDD). Capacity of a memory is commonly featured in bytes (B), where the prefix 'K' is used to denote kilo=$2^{10}$=$1024^1$=1024, the prefix 'M' is used to denote mega=$2^{20}$=$1024^2$=1,048,576, the prefix 'G' is used to denote Giga=$2^{30}$=$1024^3$=1,073,741,824, and the prefix 'T' is used to denote tera=$2^{40}$=$1024^4$=1,099,511,627,776.

As used herein, the term "Integrated Circuit" (IC) shall include any type of integrated device of any function where the electronic circuit is manufactured by the patterned diffusion of trace elements into the surface of a thin substrate of semiconductor material (e.g., Silicon), whether single or multiple die, or small or large scale of integration, and irrespective of process or base materials (including, without limitation Si, SiGe, CMOS and GAs) including, without limitation, applications specific integrated circuits (ASICs), field programmable gate arrays (FPGAs), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs.

The circuits in an IC are typically contained in a silicon piece or in a semiconductor wafer, and commonly packaged as a unit. The solid-state circuits commonly include interconnected active and passive devices, diffused into a single silicon chip. Integrated circuits can be classified into analog, digital and mixed signal (both analog and digital on the same chip). Digital integrated circuits commonly contain many of logic gates, flip-flops, multiplexers, and other circuits in a few square millimeters. The small size of these circuits allows high speed, low power dissipation, and reduced manufacturing cost compared with board-level integration. Further, a multi-chip module (MCM) may be used, where multiple integrated circuits (ICs), the semiconductor dies, or other discrete components are packaged onto a unifying substrate, facilitating their use as a single component (as though a larger IC).

The term "computer-readable medium" (or "machine-readable medium") as used herein is an extensible term that refers to any medium or any memory, that participates in providing instructions to a processor, (such as processor 71) for execution, or any mechanism for storing or transmitting information in a form readable by a machine (e.g., a computer). Such a medium may store computer-executable instructions to be executed by a processing element and/or software, and data that is manipulated by a processing element and/or software, and may take many forms, including but not limited to, non-volatile medium, volatile medium, and transmission medium. Transmission media includes coaxial cables, copper wire and fiber optics. Transmission media can also take the form of acoustic or light waves, such as those generated during radio-wave and infrared data communications, or other form of propagating signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

The term "computer" is used generically herein to describe any number of computers, including, but not limited to personal computers, embedded processing elements and systems, software, ASICs, chips, workstations, mainframes, etc. Any computer herein may consist of, or be part of, a handheld computer, including any portable computer that is small enough to be held and operated while holding in one hand or fit into a pocket. Such a device, also referred to as a mobile device, typically has a display screen with touch input and/or miniature keyboard. Non-limiting examples of such devices include Digital Still Camera (DSC), Digital video Camera (DVC or digital camcorder), Personal Digital Assistant (PDA), and mobile phones and Smartphones. The mobile devices may combine video, audio and advanced communication capabilities, such as PAN and WLAN. A mobile phone (also known as a cellular phone, cell phone and a hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

As used herein, the terms "program", "programmable", and "computer program" are meant to include any sequence or human or machine cognizable steps, which perform a function. Such programs are not inherently related to any particular computer or other apparatus, and may be rendered in virtually any programming language or environment, including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the like, as well as in firmware or other implementations. Generally, program modules include routines, programs, objects, components, data structures, etc., that perform particular tasks or implement particular abstract data types.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value: the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments of the invention are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. The invention may also be practiced in distributed computing environments where tasks are performed by remote processing devices that are linked through a communications network. In a distributed computing environment, program modules may be located in both local and remote memory storage devices.

Operating system. An Operating System (OS) is software that manages computer hardware resources and provides common services for computer programs. The operating system is an essential component of any system software in a computer system, and most application programs usually require an operating system to function. For hardware functions such as input/output and memory allocation, the operating system acts as an intermediary between programs and the computer hardware, although the application code is usually executed directly by the hardware and will frequently make a system call to an OS function or be interrupted by it. Common features typically supported by operating systems include process management, interrupts handling, memory management, file system, device drivers, networking (such as TCP/IP and UDP), and Input/Output (IO) handling. Examples of popular modern operating systems include Android, BSD, iOS, Linux, OS X, QNX, Microsoft Windows, Windows Phone, and IBM z/OS.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. A system for controlling or activating a component in response to an estimated head pose of a person by measuring signal attenuation induced by part of the propagation path being through the human head, the system comprising:
    a first device comprising:
        a first antenna for transmitting a first Radio-Frequency (RF) signal over the air;
        a first wireless transmitter coupled to the first antenna for producing the first RF signal;
        a first power source for electrically powering the first wireless transmitter; and
        a first enclosure housing the first power source and the first wireless transmitter;
    a second device comprising:
        a second antenna for transmitting a second Radio-Frequency (RF) signal over the air;
        a second wireless transmitter coupled to the second antenna for producing the second RF signal;
        a second power source for electrically powering the second wireless transmitter; and
        a second enclosure housing the second power source and the second wireless transmitter; and
    a third device comprising:
        a third antenna for receiving the first and second Radio-Frequency (RF) signals over the air;
        a wireless receiver coupled to the third antenna for receiving first and second RF signals corresponding to the transmitted first and second Radio-Frequency (RF) signals;
        a comparator for comparing the received first and second RF signals;
        the component;
        a third power source for electrically powering the wireless receiver and the comparator; and
        a third enclosure housing the wireless receiver, the comparator, the component, and the third power source,
        wherein the first and second devices are head wearable so that when worn by the person and used with the third device, the first or second RF signal is at least in part absorbed by the person body when propagated from the respective first or second antenna to the third antenna;
        wherein the third device is further operative to estimate the head pose based on the difference between the first and second in-body propagation path lengths of the respective first and second RF signals, by taking into account that the speed of light inside the human head is ¾ the speed of light in a vacuum or air or by taking into account the signal attenuation inside a human head versus the attenuation in vacuum or air;
        wherein the component is controlled or activated in response to the estimated head pose.

2. The system according to claim 1, wherein the third device is further operative to estimate the head pose based on the difference between the first and second in-body propagation path lengths of the respective first and second RF signals by taking into account the signal attenuation inside a human head versus the attenuation in vacuum or air.

3. The system according to claim 1, wherein the first device or the second device further comprises a memory or a non-transitory tangible computer readable storage media for storing computer executable instructions, and a processor for executing the instructions.

4. The system according to claim 1, wherein the component is controlled to be activated, initiated, stopped, operated, or inhibited from operation, in response to a comparison between the received first and second RF signals.

5. The system according to claim 1, wherein the first device is identical to the second device.

6. The system according to claim 1, wherein the first device is distinct from the second device.

7. The system according to claim 1, wherein the first and second RF signals use the same frequency, the same modulation, the same physical later, or are according to same protocol or standard.

8. The system according to claim 1, wherein the first device is wearable on a left side of a person and the second device is wearable on a right side of the person.

9. The system according to claim 8, wherein the first device is wearable on the left side of the person head and the second device is wearable on the right side of the person head.

10. The system according to claim 9, further operative to estimate or calculate the person head pose using, or based on, the comparing of the received first and second RF signals.

11. The system according to claim 9, wherein the first device is wearable on a first organ on the left side of the person head and the second device is wearable on a second organ on the right side of the person head.

12. The system according to claim 9, wherein the first or second organ is an eye, ear, face, cheek, nose, mouth, lip, forehead, or chin.

13. The system according to claim 8, wherein each of the first enclosure and the second enclosure is constructed to have a form substantially similar to, is constructed to have a shape allowing mounting or wearing identical or similar to, or is constructed to have a form to at least in part substitute for, headwear, eyewear, or earpiece.

14. The system according to claim 13, wherein the headwear consists of, structured as, or comprises, a bonnet, a cap, a crown, a fillet, a hair cover, a hat, a helmet, a hood, a mask, a turban, a veil, or a wig.

15. The system according to claim 13, wherein the eyewear consists of, structured as, or comprises, glasses, sunglasses, a contact lens, a blindfold, or a goggle.

16. The system according to claim 13, wherein the earpiece consists of, structured as, or comprises, a hearing aid, a headphone, a headset, or an earplug.

17. The system according to claim 8, wherein each of the first enclosure and the second enclosure is permanently or releseably attachable to, or is part of, a clothing piece of a person.

18. The system according to claim 17, wherein the attaching uses taping, gluing, pinning, enclosing, encapsulating, a pin, or a latch and hook clip.

19. The system according to claim 17, wherein the clothing piece is a top, bottom, or full-body underwear, or a headwear, a footwear, an accessory, an outwear, a suit, a dress, a skirt, or a top.

20. The system according to claim 1, wherein the third enclosure is a portable or a hand-held enclosure and the third power source is a battery.

21. The system according to claim 14, wherein the third device or the component consists of, or comprises, a notebook, a laptop computer, a media player, a cellular phone, a smartphone, a Personal Digital Assistant (PDA).

22. The system according to claim 21, wherein the third device or the component comprises a memory for storing software, and a processor for executing the software.

23. The system according to claim 14, wherein the third device or the component consists of, or comprises, a digital camera.

24. The system according to claim 23, wherein the digital camera consists of, or comprises, a Digital Still Camera (DSC), and the digital camera is controlled to capture an image or is inhibited from capturing an image in response to comparing the received first and second RF signals.

25. The system according to claim 23, wherein the digital camera consists of, or comprises, a Digital Video Camera (DVC), and the digital camera is controlled to start or stop video recording, or to be inhibited from video recording in response to comparing the received first and second RF signals.

26. The system according to claim 23, wherein the controlling of the digital camera includes changing a setting of the digital camera.

27. The system according to claim 26, wherein the setting is an aperture size, exposure time, focal length, or exposure index of the digital camera.

28. The system according to claim 23, wherein the digital camera comprises:
an optical lens for focusing received light, the lens being mechanically oriented to guide a captured image;
a photosensitive image sensor array disposed approximately at an image focal point plane of the optical lens for capturing the image and producing an analog signal representing the image; and
an analog-to-digital (A/D) converter coupled to the image sensor array for converting the analog signal to a digital data representation of the captured image.

29. The system according to claim 28, wherein the image sensor array is operative to respond to a visible or non-visible light.

30. The system according to claim 28, wherein the invisible light is infrared, ultraviolet, X-rays, or gamma rays.

31. The system according to claim 28, wherein the image sensor array uses, or is based on, semiconductor elements that use the photoelectric or photovoltaic effect.

32. The system according to claim 31, wherein the image sensor array uses, comprises, or is based on, Charge-Coupled Devices (CCD) or Complementary Metal-Oxide-Semiconductor Devices (CMOS) elements.

33. The system according to claim 28, wherein the digital camera further comprises an image processor coupled to the image sensor array for providing a digital video data signal according to a digital video format, the digital video signal carrying digital data video that comprise, or is based on, the captured images.

34. The system according to claim 33, wherein the digital video format uses, is compatible with, or is based on, one of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards.

35. The system according to claim 33, wherein the digital camera further comprises a video compressor coupled to the image sensor array for compressing the digital data video.

36. The system according to claim 1, for use with a wireless network, wherein the first, second, and third devices respectively comprise a first, second, and third wireless transceivers and communicate over the wireless network respectively using the first, second, and third wireless transceivers, the first wireless transmitter is part of the first wireless transceiver, the second wireless transmitter is part of the second wireless transceiver, and the wireless receiver is part of the third wireless transceiver.

37. The system according to claim 36, wherein the wireless network is a Wireless Personal Area Network (WPAN), each of the wireless transceivers is a WPAN transceiver, and each of the first, second, and third antennas is a WPAN antenna.

38. The system according to claim 37, wherein the WPAN is according to, compatible with, or based on, Bluetooth™ or IEEE 802.15.1-2005 standards, or wherein the WPAN is a wireless control network that is according to, or based on, Zigbee™, IEEE 802.15.4-2003, or Z-Wave™ standards.

39. The system according to claim 38, wherein the WPAN is according to, compatible with, or based on, Bluetooth Low-Energy (BLE).

40. The system according to claim 36, wherein the wireless network is a cellular telephone network, each of the wireless transceivers is a cellular modem, and each of the first, second, and third antennas is a cellular antenna.

41. The system according to claim 36, wherein the wireless network is over a licensed or unlicensed radio frequency band.

42. The system according to claim 1, wherein the wireless receiver is operative to extract or measure a parameter, feature, or a characteristic from each of the received first and second RF signals, and wherein the comparison is based on comparing the extracted parameters, features, or characteristics.

43. The system according to claim 42, wherein the extracted or measured parameters, features, or characteristics are responsive to propagation paths from the respective first and second antenna to the third antenna.

44. The system according to claim 43, wherein the extracted or measured parameters, features, or characteristics are responsive to length of the propagation paths, to the relative direction of the propagation paths, or to an RF energy-absorbing elements along the propagation paths.

45. The system according to claim 44, wherein the comparing comprises calculating a difference between the extracted or measured parameters, features, or characteristics of the received first and second RF signals.

46. The system according to claim 45, further for use with a minimum or maximum threshold, and wherein the component is controlled in response to comparing the difference to the minimum or maximum threshold.

47. The system according to claim 45, for use with a time interval, wherein the component is controlled in response to the difference being above the minimum threshold or below the maximum threshold during the time interval.

48. The system according to claim 42, wherein the extracted or measured parameters, features, or characteristics comprises, or is responsive to, signal strengths of the received first and second RF signals.

49. The system according to claim 48, wherein the signal strengths is using, or is based on, the respective Received Signal Strength Indicator (RSSI).

50. The system according to claim 49, further operative to estimate the distance between the first or second device to third device using the signal strengths of the received first and second RF signals.

51. The system according to claim 49, wherein the RF signals are using, or are based on, Bluetooth Low-Energy (BLE), and wherein the system is further operative to measure the signal strength by using, or based on, Apple iBeacon.

52. The system according to claim 48, wherein the comparing comprises calculating a difference between the signal strengths of the received first and second RF signals.

53. The system according to claim 52, further for use with a minimum or maximum threshold, and wherein the component is controlled in response to comparing the difference to the minimum or maximum threshold.

54. The system according to claim 53, wherein the system is operative to start, stop, or inhibit the component operation when the calculated difference is above the minimum threshold or is below the maximum threshold.

55. The system according to claim 1, wherein the third device further comprises a memory or a non-transitory tangible computer readable storage media for storing computer executable instructions, and a processor for executing the instructions, wherein the first device continuously transmits the first RF signal and the second device continuously transmits the second RF signal, and wherein the first and second antennas are spatially parallel to each other.

* * * * *